US011990160B2

(12) United States Patent
Bose et al.

(10) Patent No.: US 11,990,160 B2
(45) Date of Patent: *May 21, 2024

(54) DISPARATE SENSOR EVENT CORRELATION SYSTEM

(71) Applicant: BLAST MOTION INC., San Marcos, CA (US)

(72) Inventors: Bhaskar Bose, San Marcos, CA (US); Michael Bentley, San Marcos, CA (US); Ryan Kaps, Mesa, AZ (US)

(73) Assignee: BLAST MOTION INC., San Marcos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,689

(22) Filed: Dec. 16, 2022

(65) Prior Publication Data

US 2023/0260552 A1 Aug. 17, 2023

Related U.S. Application Data

(63) Continuation of application No. 17/834,864, filed on Jun. 7, 2022, which is a continuation of application
(Continued)

(51) Int. Cl.
*A63F 13/211* (2014.01)
*A63B 24/00* (2006.01)
(Continued)

(52) U.S. Cl.
CPC .......... *G11B 27/34* (2013.01); *A63B 24/0003* (2013.01); *A63B 24/0062* (2013.01);
(Continued)

(58) Field of Classification Search
CPC . A63F 13/211–213; A63F 13/216–218; G06F 7/20; A63B 2220/80; A63B 2220/83; A63B 2220/86
See application file for complete search history.

(56) References Cited

U.S. PATENT DOCUMENTS

| 1,712,537 | A | 5/1929 | White |
| 3,182,508 | A | 5/1965 | Varju |

(Continued)

FOREIGN PATENT DOCUMENTS

| EP | 2025369 A2 | 2/2009 |
| EP | 2479993 | 7/2012 |

(Continued)

OTHER PUBLICATIONS

International Search Report received in PCT/US2016/042668, dated Oct. 4, 2016, 21 pages.
(Continued)

*Primary Examiner* — Omkar A Deodhar
(74) *Attorney, Agent, or Firm* — ARC IP Law, PC; Joseph J. Mayo

(57) ABSTRACT

A sensor event detection system including a motion capture element and another sensor. The sensor captures values associated with an orientation, position, velocity and acceleration and recognizes an event within the data to determine event data. Uses other values associated with a temperature, humidity, wind and elevation, i.e., environmental and physiological sensors and correlates the data or event data with the other values to determine a type of event or true event or a false positive event, or a type of equipment the motion capture element is coupled with, or a type of activity indicated by the data or event data and transmits the data or event data associated with the event.

30 Claims, 54 Drawing Sheets

Related U.S. Application Data

No. 16/996,648, filed on Aug. 18, 2020, now Pat. No. 11,355,160, which is a continuation of application No. 16/460,961, filed on Jul. 2, 2019, now Pat. No. 10,748,581, which is a continuation of application No. 15/824,998, filed on Nov. 28, 2017, now Pat. No. 10,339,978, which is a continuation of application No. 15/471,742, filed on Mar. 28, 2017, now Pat. No. 9,830,951, which is a continuation of application No. 15/184,926, filed on Jun. 16, 2016, now Pat. No. 9,607,652, which is a continuation-in-part of application No. 14/801,428, filed on Jul. 16, 2015, now Pat. No. 9,406,336.

(51) Int. Cl.

| | |
|---|---|
| A63B 71/06 | (2006.01) |
| A63F 13/00 | (2014.01) |
| A63F 13/212 | (2014.01) |
| A63F 13/213 | (2014.01) |
| A63F 13/217 | (2014.01) |
| G01P 13/00 | (2006.01) |
| G06T 7/20 | (2017.01) |
| G06V 20/40 | (2022.01) |
| G06V 40/20 | (2022.01) |
| G11B 20/10 | (2006.01) |
| G11B 27/031 | (2006.01) |
| G11B 27/34 | (2006.01) |
| H04N 5/765 | (2006.01) |
| H04N 5/77 | (2006.01) |
| H04N 5/91 | (2006.01) |
| H04N 7/18 | (2006.01) |
| H04N 23/80 | (2023.01) |
| H04N 23/90 | (2023.01) |
| G08B 21/04 | (2006.01) |
| G08B 25/01 | (2006.01) |

(52) U.S. Cl.
CPC .............. *A63B 71/06* (2013.01); *A63F 13/00* (2013.01); *A63F 13/211* (2014.09); *A63F 13/212* (2014.09); *A63F 13/213* (2014.09); *A63F 13/217* (2014.09); *G01P 13/00* (2013.01); *G06T 7/20* (2013.01); *G06V 20/40* (2022.01); *G06V 20/42* (2022.01); *G06V 40/23* (2022.01); *G11B 20/10527* (2013.01); *G11B 27/031* (2013.01); *H04N 5/765* (2013.01); *H04N 5/77* (2013.01); *H04N 5/91* (2013.01); *H04N 7/188* (2013.01); *H04N 23/80* (2023.01); *H04N 23/90* (2023.01); *A63B 2024/0071* (2013.01); *A63B 2220/34* (2013.01); *A63B 2220/44* (2013.01); *A63B 2220/803* (2013.01); *A63B 2220/806* (2013.01); *A63B 2225/20* (2013.01); *A63B 2230/06* (2013.01); *A63F 2300/105* (2013.01); *A63F 2300/69* (2013.01); *G06T 2207/10016* (2013.01); *G06T 2207/30221* (2013.01); *G06V 20/44* (2022.01); *G08B 21/043* (2013.01); *G08B 21/0492* (2013.01); *G08B 25/016* (2013.01); *G11B 2020/10592* (2013.01)

(56) References Cited

U.S. PATENT DOCUMENTS

| | | |
|---|---|---|
| 3,226,704 A | 12/1965 | Petrash |
| 3,270,564 A | 9/1966 | Evans |
| 3,776,556 A | 12/1973 | Mclaughlin |
| 3,788,647 A | 1/1974 | Evans |
| 3,792,863 A | 2/1974 | Evans |
| 3,806,131 A | 4/1974 | Evans |
| 3,945,646 A | 3/1976 | Hammond |
| 4,515,365 A | 5/1985 | Horikoshi et al. |
| 4,759,219 A | 7/1988 | Cobb et al. |
| 4,898,389 A | 2/1990 | Plutt |
| 4,902,014 A | 2/1990 | Bontomase et al. |
| 4,910,677 A | 3/1990 | Remedio et al. |
| 4,940,236 A | 7/1990 | Allen |
| 4,991,850 A | 2/1991 | Wilhlem |
| 5,056,783 A | 10/1991 | Matcovich et al. |
| 5,086,390 A | 2/1992 | Matthews |
| 5,111,410 A | 5/1992 | Nakayama et al. |
| 5,127,044 A | 6/1992 | Bonito et al. |
| 5,184,295 A | 2/1993 | Mann |
| 5,230,512 A | 7/1993 | Tattershall |
| 5,233,544 A | 8/1993 | Kobayashi |
| 5,249,967 A | 10/1993 | O'Leary et al. |
| 5,259,620 A | 11/1993 | Marocco |
| 5,283,733 A | 2/1994 | Colley |
| 5,298,904 A | 3/1994 | Olich |
| 5,332,225 A | 7/1994 | Ura |
| 5,333,061 A | 7/1994 | Nakashima et al. |
| 5,364,093 A | 11/1994 | Huston et al. |
| 5,372,365 A | 12/1994 | McTeigue et al. |
| 5,441,256 A | 8/1995 | Hackman |
| 5,441,269 A | 8/1995 | Henwood |
| 5,443,260 A | 8/1995 | Stewart et al. |
| 5,486,001 A | 1/1996 | Baker |
| 5,524,081 A | 6/1996 | Paul |
| 5,542,676 A | 8/1996 | Howe et al. |
| 5,592,401 A | 1/1997 | Kramer |
| 5,610,590 A | 3/1997 | Johnson et al. |
| 5,638,300 A | 6/1997 | Johnson |
| 5,665,006 A | 9/1997 | Pellegrini |
| 5,688,183 A | 11/1997 | Sabatino et al. |
| 5,694,340 A | 12/1997 | Kim |
| 5,707,299 A | 1/1998 | McKenna |
| 5,772,522 A | 6/1998 | Nesbit |
| 5,779,555 A | 7/1998 | Nomura et al. |
| 5,792,001 A | 8/1998 | Henwood |
| 5,819,206 A | 10/1998 | Horton |
| 5,826,578 A | 10/1998 | Curchod |
| 5,868,578 A | 2/1999 | Baum |
| 5,904,484 A | 5/1999 | Burns |
| 5,941,779 A | 8/1999 | Zeiner-Gundersen |
| 5,973,596 A | 10/1999 | French et al. |
| 5,993,333 A | 11/1999 | Heckaman |
| 5,998,968 A | 12/1999 | Pittman et al. |
| 6,012,995 A | 1/2000 | Martin |
| 6,030,109 A | 2/2000 | Lobsenz |
| 6,044,704 A | 4/2000 | Sacher |
| 6,073,086 A | 6/2000 | Marinelli |
| 6,224,493 B1 | 5/2001 | Lee et al. |
| 6,248,021 B1 | 6/2001 | Ognjanovic |
| 6,253,159 B1 | 6/2001 | Bett et al. |
| 6,254,492 B1 | 7/2001 | Taggett |
| 6,266,623 B1 | 7/2001 | Vock et al. |
| 6,292,130 B1 | 9/2001 | Cavallaro et al. |
| 6,293,802 B1 | 9/2001 | Ahlgren |
| 6,366,205 B1 | 4/2002 | Sutphen |
| 6,441,745 B1 | 8/2002 | Gates |
| 6,456,938 B1 | 9/2002 | Barnard |
| 6,537,076 B2 | 3/2003 | McNitt |
| 6,540,620 B1 | 4/2003 | Consiglio |
| 6,567,536 B2 | 5/2003 | McNitt |
| 6,582,328 B2 | 6/2003 | Kuta et al. |
| 6,611,141 B1 | 8/2003 | Schulz |
| 6,697,820 B1 | 2/2004 | Tarlie |
| 6,705,942 B1 | 3/2004 | Crook et al. |
| 6,746,336 B1 | 6/2004 | Brant et al. |
| 6,757,572 B1 | 6/2004 | Forest |
| 6,774,932 B1 | 8/2004 | Ewing et al. |
| 6,802,772 B1 | 10/2004 | Kunzle et al. |
| 6,868,338 B1 | 3/2005 | Elliott |
| 6,900,759 B1 | 5/2005 | Katayama |
| 6,908,404 B1 | 6/2005 | Gard |
| 6,923,729 B2 | 8/2005 | McGinty et al. |
| 7,004,848 B2 | 2/2006 | Konow |

(56) References Cited

U.S. PATENT DOCUMENTS

| | | |
|---|---|---|
| 7,021,140 B2 | 4/2006 | Perkins |
| 7,034,694 B2 | 4/2006 | Yamaguchi et al. |
| 7,037,198 B2 | 5/2006 | Hameen-Antilla |
| 7,092,846 B2 | 8/2006 | Vock et al. |
| 7,118,498 B2 | 10/2006 | Meadows et al. |
| 7,121,962 B2 | 10/2006 | Reeves |
| 7,143,639 B2 | 12/2006 | Gobush |
| 7,160,200 B2 | 1/2007 | Grober |
| 7,175,177 B2 | 2/2007 | Meifu et al. |
| 7,205,894 B1 | 4/2007 | Savage |
| 7,212,943 B2 | 5/2007 | Aoshima et al. |
| 7,219,033 B2 | 5/2007 | Kolen |
| 7,234,351 B2 | 6/2007 | Perkins |
| 7,264,554 B2 | 9/2007 | Bentley |
| 7,283,647 B2 | 10/2007 | Mcnitt |
| 7,421,369 B2 | 9/2008 | Clarkson |
| 7,433,805 B2 | 10/2008 | Vock et al. |
| 7,457,439 B1 | 11/2008 | Madsen |
| 7,457,724 B2 | 11/2008 | Vock et al. |
| 7,492,367 B2 | 2/2009 | Mahajan et al. |
| 7,494,236 B2 | 2/2009 | Lim |
| 7,499,828 B2 | 3/2009 | Barton |
| 7,561,989 B2 | 7/2009 | Banks |
| 7,572,205 B1 | 8/2009 | Cribar |
| 7,623,987 B2 | 11/2009 | Vock et al. |
| 7,627,451 B2 | 12/2009 | Vock et al. |
| 7,689,378 B2 | 3/2010 | Kolen |
| 7,713,148 B2 | 5/2010 | Sweeney |
| 7,731,598 B1 | 6/2010 | Kim et al. |
| 7,736,242 B2 | 6/2010 | Stites et al. |
| 7,771,263 B2 | 8/2010 | Telford |
| 7,780,450 B2 | 8/2010 | Tarry |
| 7,800,480 B1 | 9/2010 | Joseph et al. |
| 7,813,887 B2 | 10/2010 | Vock et al. |
| 7,831,212 B1 | 11/2010 | Balardeta et al. |
| 7,871,333 B1 | 1/2011 | Davenport et al. |
| 7,966,154 B2 | 6/2011 | Vock et al. |
| 7,983,876 B2 | 7/2011 | Vock et al. |
| 8,036,826 B2 | 10/2011 | MacIntosh et al. |
| 8,117,888 B2 | 2/2012 | Chan et al. |
| 8,172,722 B2 | 5/2012 | Molyneux et al. |
| 8,231,506 B2 | 7/2012 | Molyneux et al. |
| 8,249,831 B2 | 8/2012 | Vock et al. |
| 8,257,191 B2 | 9/2012 | Stites et al. |
| 8,282,487 B2 | 10/2012 | Wilson et al. |
| 8,314,840 B1 | 11/2012 | Funk |
| 8,352,211 B2 | 1/2013 | Vock et al. |
| 8,400,548 B2 | 3/2013 | Bilbrey et al. |
| 8,425,292 B2 | 4/2013 | Lui et al. |
| 8,477,027 B2 | 7/2013 | Givens |
| 8,527,228 B2 | 9/2013 | Panagas |
| 8,565,483 B2 | 10/2013 | Nakaoka |
| 8,589,114 B2 | 11/2013 | Papadourakis et al. |
| 8,696,482 B1 | 4/2014 | Pedenko et al. |
| 8,723,986 B1 | 5/2014 | Merrill |
| 8,725,452 B2 | 5/2014 | Han |
| 8,764,576 B2 | 7/2014 | Takasugi |
| 8,781,610 B2 | 7/2014 | Han |
| 8,831,905 B2 | 9/2014 | Papadourakis |
| 8,876,621 B2 | 11/2014 | Shibuya |
| 8,888,603 B2 | 11/2014 | Sato et al. |
| 8,905,856 B2 | 12/2014 | Parke et al. |
| 8,929,709 B2 | 1/2015 | Lokshin |
| 8,944,932 B2 | 2/2015 | Sato et al. |
| 8,944,939 B2 | 2/2015 | Clark et al. |
| 8,956,238 B2 | 2/2015 | Boyd et al. |
| 8,988,341 B2 | 3/2015 | Lin et al. |
| 8,989,441 B2 | 3/2015 | Han et al. |
| 9,032,794 B2 | 5/2015 | Perkins et al. |
| 9,060,682 B2 | 6/2015 | Lokshin |
| 9,146,134 B2 | 9/2015 | Lokshin et al. |
| 9,500,464 B2 | 11/2016 | Coza |
| 9,646,199 B2 | 5/2017 | Bose et al. |
| 9,656,122 B2 | 5/2017 | Papadourakis |
| 10,124,230 B2 | 11/2018 | Thornbrue et al. |
| 10,456,653 B2 | 10/2019 | Thornbrue et al. |
| 10,460,157 B2 | 10/2019 | Matsunaga et al. |
| 10,716,989 B2 | 7/2020 | Thornbrue et al. |
| 10,780,331 B2 | 9/2020 | Lestrade et al. |
| 10,786,728 B2 | 9/2020 | Haas et al. |
| 10,814,168 B2 | 10/2020 | Weems |
| 10,946,243 B1 | 3/2021 | Smith et al. |
| 10,974,121 B2 | 4/2021 | Thornbrue et al. |
| 11,040,245 B2 | 6/2021 | Matsunaga et al. |
| 11,351,419 B2 | 6/2022 | Loh |
| 11,400,362 B2 | 8/2022 | Haas et al. |
| 11,602,668 B2 | 3/2023 | Chang |
| 11,660,505 B2 | 5/2023 | Kaji |
| 2001/0029207 A1 | 10/2001 | Cameron et al. |
| 2001/0035880 A1 | 11/2001 | Musatov et al. |
| 2001/0045904 A1 | 11/2001 | Silzer, Jr. |
| 2001/0049636 A1 | 12/2001 | Hudda et al. |
| 2002/0004723 A1 | 1/2002 | Meifu et al. |
| 2002/0019677 A1 | 2/2002 | Lee |
| 2002/0049507 A1 | 4/2002 | Hameen-Anttila |
| 2002/0052750 A1 | 5/2002 | Hirooka |
| 2002/0064764 A1 | 5/2002 | Fishman et al. |
| 2002/0072815 A1 | 6/2002 | McDonough et al. |
| 2002/0077189 A1 | 6/2002 | Tuer et al. |
| 2002/0082775 A1 | 6/2002 | Meadows et al. |
| 2002/0115046 A1 | 8/2002 | McNitt et al. |
| 2002/0126157 A1 | 9/2002 | Farago et al. |
| 2002/0151994 A1 | 10/2002 | Sisco |
| 2002/0173364 A1 | 11/2002 | Boscha |
| 2002/0177490 A1 | 11/2002 | Yong et al. |
| 2002/0188359 A1 | 12/2002 | Morse |
| 2003/0008722 A1 | 1/2003 | Konow |
| 2003/0073518 A1 | 4/2003 | Marty |
| 2003/0074659 A1 | 4/2003 | Louzoun |
| 2003/0109322 A1 | 6/2003 | Funk et al. |
| 2003/0163287 A1 | 8/2003 | Vock et al. |
| 2003/0191547 A1 | 10/2003 | Morse |
| 2003/0208830 A1 | 11/2003 | Marmaropoulos |
| 2004/0028258 A1 | 2/2004 | Naimark et al. |
| 2004/0033843 A1 | 2/2004 | Miller et al. |
| 2004/0044493 A1 | 3/2004 | Coulthard |
| 2004/0147329 A1 | 7/2004 | Meadows et al. |
| 2004/0227676 A1 | 11/2004 | Kim et al. |
| 2004/0248676 A1 | 12/2004 | Taylor |
| 2005/0021292 A1 | 1/2005 | Vock et al. |
| 2005/0023763 A1 | 2/2005 | Richardson |
| 2005/0032582 A1 | 2/2005 | Mahajan et al. |
| 2005/0054457 A1 | 3/2005 | Eyestone et al. |
| 2005/0156068 A1 | 7/2005 | Ivans |
| 2005/0203430 A1 | 9/2005 | Williams et al. |
| 2005/0213076 A1 | 9/2005 | Saegusa |
| 2005/0215340 A1 | 9/2005 | Stites et al. |
| 2005/0227775 A1 | 10/2005 | Cassady et al. |
| 2005/0261073 A1 | 11/2005 | Farrington, Jr. et al. |
| 2005/0268704 A1 | 12/2005 | Bissonnette et al. |
| 2005/0272516 A1 | 12/2005 | Gobush |
| 2005/0282650 A1 | 12/2005 | Miettinen et al. |
| 2005/0288119 A1 | 12/2005 | Wang et al. |
| 2006/0020177 A1 | 1/2006 | Seo et al. |
| 2006/0025229 A1 | 2/2006 | Mahajan et al. |
| 2006/0038657 A1 | 2/2006 | Denison et al. |
| 2006/0063600 A1 | 3/2006 | Grober |
| 2006/0068928 A1 | 3/2006 | Nagy |
| 2006/0084516 A1 | 4/2006 | Eyestone et al. |
| 2006/0109116 A1 | 5/2006 | Keays |
| 2006/0122002 A1 | 6/2006 | Konow |
| 2006/0166738 A1 | 7/2006 | Eyestone et al. |
| 2006/0189389 A1 | 8/2006 | Hunter et al. |
| 2006/0199659 A1 | 9/2006 | Caldwell |
| 2006/0247070 A1 | 11/2006 | Funk et al. |
| 2006/0250745 A1 | 11/2006 | Butler et al. |
| 2006/0270450 A1 | 11/2006 | Garratt et al. |
| 2006/0276256 A1 | 12/2006 | Storek |
| 2006/0284979 A1 | 12/2006 | Clarkson |
| 2006/0293112 A1 | 12/2006 | Yi |
| 2007/0052807 A1 | 3/2007 | Zhou et al. |
| 2007/0062284 A1 | 3/2007 | Machida |
| 2007/0081695 A1 | 4/2007 | Foxlin et al. |
| 2007/0087866 A1 | 4/2007 | Meadows et al. |

(56) References Cited

U.S. PATENT DOCUMENTS

| | | |
|---|---|---|
| 2007/0099715 A1 | 5/2007 | Jones et al. |
| 2007/0111811 A1 | 5/2007 | Grober |
| 2007/0129178 A1 | 6/2007 | Reeves |
| 2007/0135225 A1 | 6/2007 | Nieminen |
| 2007/0135237 A1 | 6/2007 | Reeves |
| 2007/0219744 A1 | 9/2007 | Kolen |
| 2007/0265105 A1 | 11/2007 | Barton |
| 2007/0270214 A1 | 11/2007 | Bentley |
| 2007/0298896 A1 | 12/2007 | Nusbaum |
| 2008/0027502 A1 | 1/2008 | Ransom |
| 2008/0085778 A1 | 4/2008 | Dugan |
| 2008/0090703 A1 | 4/2008 | Rosenberg |
| 2008/0108456 A1 | 5/2008 | Bonito |
| 2008/0164999 A1 | 7/2008 | Otto |
| 2008/0182685 A1 | 7/2008 | Marty et al. |
| 2008/0190202 A1 | 8/2008 | Kulach et al. |
| 2008/0211768 A1 | 9/2008 | Breen et al. |
| 2008/0234935 A1 | 9/2008 | Wolf et al. |
| 2008/0280642 A1 | 11/2008 | Coxhill et al. |
| 2008/0284979 A1 | 11/2008 | Yee et al. |
| 2008/0285805 A1 | 11/2008 | Luinge et al. |
| 2009/0002316 A1 | 1/2009 | Rofougaran |
| 2009/0017944 A1 | 1/2009 | Savarese et al. |
| 2009/0029754 A1 | 1/2009 | Slocum et al. |
| 2009/0033741 A1 | 2/2009 | Oh et al. |
| 2009/0036237 A1 | 2/2009 | Nipper et al. |
| 2009/0048044 A1 | 2/2009 | Oleson et al. |
| 2009/0055820 A1 | 2/2009 | Huang |
| 2009/0088276 A1 | 4/2009 | Solheim et al. |
| 2009/0111602 A1 | 4/2009 | Savarese et al. |
| 2009/0131190 A1 | 5/2009 | Kimber |
| 2009/0137333 A1 | 5/2009 | Lin et al. |
| 2009/0144785 A1 | 6/2009 | Walker et al. |
| 2009/0174676 A1 | 7/2009 | Westerman |
| 2009/0177097 A1 | 7/2009 | Ma et al. |
| 2009/0191846 A1 | 7/2009 | Shi |
| 2009/0209343 A1 | 8/2009 | Foxlin et al. |
| 2009/0209358 A1 | 8/2009 | Niegowski |
| 2009/0213134 A1 | 8/2009 | Stephanick et al. |
| 2009/0222163 A1 | 9/2009 | Plante |
| 2009/0233735 A1 | 9/2009 | Savarese et al. |
| 2009/0254971 A1 | 10/2009 | Herz et al. |
| 2009/0299232 A1 | 12/2009 | Lanfermann et al. |
| 2010/0049468 A1 | 2/2010 | Papadourakis |
| 2010/0062869 A1 | 3/2010 | Chung et al. |
| 2010/0063778 A1 | 3/2010 | Schrock et al. |
| 2010/0063779 A1 | 3/2010 | Schrock et al. |
| 2010/0091112 A1 | 4/2010 | Veeser et al. |
| 2010/0093458 A1 | 4/2010 | Davenport et al. |
| 2010/0099509 A1 | 4/2010 | Ahem et al. |
| 2010/0103269 A1 | 4/2010 | Wilson et al. |
| 2010/0113174 A1 | 5/2010 | Ahern |
| 2010/0121227 A1 | 5/2010 | Stirling et al. |
| 2010/0121228 A1 | 5/2010 | Stirling et al. |
| 2010/0130298 A1 | 5/2010 | Dugan et al. |
| 2010/0144414 A1 | 6/2010 | Edis et al. |
| 2010/0144456 A1 | 6/2010 | Ahern |
| 2010/0144457 A1 | 6/2010 | Kim |
| 2010/0178994 A1 | 7/2010 | Do et al. |
| 2010/0201512 A1 | 8/2010 | Stirling et al. |
| 2010/0204616 A1 | 8/2010 | Shears et al. |
| 2010/0216564 A1 | 8/2010 | Stites et al. |
| 2010/0222152 A1 | 9/2010 | Jaekel et al. |
| 2010/0308105 A1 | 12/2010 | Savarese et al. |
| 2010/0309097 A1 | 12/2010 | Raviv et al. |
| 2010/0323794 A1 | 12/2010 | Su |
| 2011/0004871 A1 | 1/2011 | Liu |
| 2011/0029235 A1 | 2/2011 | Berry |
| 2011/0037778 A1 | 2/2011 | Deng et al. |
| 2011/0050864 A1 | 3/2011 | Bond |
| 2011/0052005 A1 | 3/2011 | Selner |
| 2011/0053688 A1 | 3/2011 | Crawford |
| 2011/0075341 A1 | 3/2011 | Lau et al. |
| 2011/0081981 A1 | 4/2011 | Okamoto |
| 2011/0126184 A1 | 5/2011 | Lisboa |
| 2011/0165998 A1 | 7/2011 | Lau et al. |
| 2011/0195780 A1 | 8/2011 | Lu |
| 2011/0225178 A1 | 9/2011 | Ingrassia et al. |
| 2011/0230273 A1 | 9/2011 | Niegowski et al. |
| 2011/0230274 A1 | 9/2011 | Lafortune et al. |
| 2011/0230985 A1 | 9/2011 | Niegowski et al. |
| 2011/0230986 A1 | 9/2011 | Lafortune |
| 2011/0238308 A1 | 9/2011 | Miller et al. |
| 2012/0004034 A1 | 1/2012 | Pope et al. |
| 2012/0023354 A1 | 1/2012 | Chino |
| 2012/0052972 A1 | 3/2012 | Bentley |
| 2012/0088544 A1 | 4/2012 | Bentley et al. |
| 2012/0115626 A1 | 5/2012 | Davenport |
| 2012/0115682 A1 | 5/2012 | Homsi |
| 2012/0116548 A1 | 5/2012 | Goree et al. |
| 2012/0120572 A1 | 5/2012 | Bentley |
| 2012/0142415 A1 | 6/2012 | Lindsay |
| 2012/0157241 A1 | 6/2012 | Nomura et al. |
| 2012/0179418 A1 | 7/2012 | Takasugi et al. |
| 2012/0179742 A1 | 7/2012 | Acharya et al. |
| 2012/0191405 A1 | 7/2012 | Molyneux et al. |
| 2012/0238407 A1 | 9/2012 | Dilworth |
| 2012/0295726 A1 | 11/2012 | Cherbini |
| 2012/0302379 A1 | 11/2012 | Margoles |
| 2012/0316004 A1 | 12/2012 | Shibuya |
| 2013/0029791 A1 | 1/2013 | Rose et al. |
| 2013/0095924 A1 | 4/2013 | Geisner et al. |
| 2013/0095941 A1 | 4/2013 | Bentley et al. |
| 2013/0110415 A1 | 5/2013 | Davis et al. |
| 2013/0128022 A1 | 5/2013 | Bose et al. |
| 2013/0173212 A1 | 7/2013 | Saiki et al. |
| 2013/0178304 A1 | 7/2013 | Chan |
| 2013/0191063 A1 | 7/2013 | Nomura |
| 2013/0225309 A1 | 8/2013 | Bentley et al. |
| 2013/0245966 A1 | 9/2013 | Burroughs et al. |
| 2013/0267335 A1 | 10/2013 | Boyd et al. |
| 2013/0271602 A1 | 10/2013 | Bentley et al. |
| 2013/0281223 A1 | 10/2013 | Lee et al. |
| 2013/0298668 A1 | 11/2013 | Sato |
| 2013/0319113 A1 | 12/2013 | Mizuta |
| 2013/0330054 A1 | 12/2013 | Lokshin |
| 2013/0332004 A1 | 12/2013 | Gompert et al. |
| 2013/0343729 A1 | 12/2013 | Rav-Acha et al. |
| 2013/0346013 A1 | 12/2013 | Lokshin |
| 2014/0019083 A1 | 1/2014 | Nakaoka |
| 2014/0024471 A1 | 1/2014 | Johnson et al. |
| 2014/0100048 A1 | 4/2014 | Ota et al. |
| 2014/0100049 A1 | 4/2014 | Ota et al. |
| 2014/0100050 A1 | 4/2014 | Ota et al. |
| 2014/0357426 A1 | 4/2014 | Ishikawa et al. |
| 2014/0357427 A1 | 4/2014 | Ishikawa et al. |
| 2014/0135139 A1 | 5/2014 | Shibuya et al. |
| 2014/0156214 A1 | 6/2014 | Nomura |
| 2014/0172873 A1 | 6/2014 | Varoglu et al. |
| 2014/0200092 A1 | 7/2014 | Parke et al. |
| 2014/0200094 A1 | 7/2014 | Parke et al. |
| 2014/0206481 A1 | 7/2014 | Zuger |
| 2014/0213382 A1 | 7/2014 | Kang et al. |
| 2014/0229135 A1 | 8/2014 | Nomura |
| 2014/0229138 A1 | 8/2014 | Goree et al. |
| 2014/0257743 A1 | 9/2014 | Lokshin et al. |
| 2014/0257744 A1 | 9/2014 | Lokshin et al. |
| 2014/0334796 A1 | 11/2014 | Galant et al. |
| 2014/0376876 A1 | 12/2014 | Bentley et al. |
| 2014/0378239 A1 | 12/2014 | Sato et al. |
| 2014/0379293 A1 | 12/2014 | Sato |
| 2014/0379294 A1 | 12/2014 | Shibuya et al. |
| 2014/0379295 A1 | 12/2014 | Sato et al. |
| 2015/0007658 A1 | 1/2015 | Ishikawa et al. |
| 2015/0012240 A1 | 1/2015 | Sato |
| 2015/0042481 A1 | 2/2015 | Nomura |
| 2015/0098688 A1 | 4/2015 | Lokshin |
| 2015/0124048 A1 | 5/2015 | King |
| 2015/0131845 A1 | 5/2015 | Forouhar et al. |
| 2015/0256689 A1 | 9/2015 | Erkkila et al. |
| 2015/0258402 A1 | 9/2015 | Bynum |
| 2015/0348591 A1 | 12/2015 | Kaps et al. |
| 2015/0360082 A1 | 12/2015 | Rangel |
| 2016/0129332 A1 | 5/2016 | Davenport |

(56) References Cited

U.S. PATENT DOCUMENTS

| | | | |
|---|---|---|---|
| 2016/0166902 | A1 | 6/2016 | Day et al. |
| 2016/0175673 | A1 | 6/2016 | Shibuya |
| 2016/0292881 | A1 | 10/2016 | Bose et al. |
| 2017/0061817 | A1 | 3/2017 | Mettler |
| 2017/0157484 | A1 | 6/2017 | Altshuler et al. |
| 2017/0209741 | A1 | 7/2017 | Friedlander |
| 2018/0021648 | A1 | 1/2018 | Thornbrue et al. |
| 2018/0021653 | A1 | 1/2018 | Thornbrue et al. |
| 2018/0070056 | A1 | 3/2018 | Deangelis et al. |
| 2019/0192908 | A1 | 6/2019 | Chang |
| 2020/0320441 | A1 | 10/2020 | Bates et al. |
| 2022/0152455 | A1 | 5/2022 | Gray et al. |
| 2023/0123441 | A1 | 4/2023 | Kaji |
| 2023/0166155 | A1 | 6/2023 | Alves et al. |

FOREIGN PATENT DOCUMENTS

| | | |
|---|---|---|
| EP | 2652738 | 10/2013 |
| EP | 2781240 | 9/2014 |
| JP | 2002210055 A | 7/2002 |
| JP | 2004207985 | 7/2004 |
| JP | 2005176030 | 6/2005 |
| JP | 2011000367 | 1/2011 |
| JP | 2012196241 | 10/2012 |
| JP | 2013188426 | 9/2013 |
| KR | 10-20030085275 | 11/2003 |
| KR | 10-20060041060 | 5/2006 |
| KR | 10-20070119018 | 12/2007 |
| KR | 10-20100074068 | 7/2010 |
| KR | 101079319 | 6/2011 |
| KR | 10-20100020131 | 9/2011 |
| WO | 1994027683 | 12/1994 |
| WO | 2007130057 | 11/2007 |
| WO | 2009056688 A1 | 5/2009 |
| WO | 2011057194 | 5/2011 |
| WO | 2014085744 A1 | 6/2014 |

OTHER PUBLICATIONS

International Search Report received in PCT/US2016/042671, dated Oct. 13, 2016, 17 pages.
International Search Report and Written Opinion received in PCT/US2016/042676, dated Oct. 24, 2016 (12 pages).
International Preliminary Report on Patentability received in PCT/US2015/026917, dated Nov. 3, 2016 (5 pages).
International Search Report received for PCT Application No. PCT/US2012/065716, dated Jan. 3, 2013, 10 pages.
MyCaddie, 2009, from http://www.iMakePars.com, 4 pages.
Swing it See it Fix it, Improve Gold Swing, SwingSmart Golf Analyzer, retrieved on Sep. 26, 2012 from http://www.SwingSmart.com, 2 pages.
Learn how Swingbyte can improve your game, retrieved on Sep. 26, 2012 from http://www.swingbyte.com, 2 pages.
International Search Report received for PCT Application No. PCT/US2011/055173, dated Mar. 6, 2012, 8 pages.
International Search Report received for PCT Application No. PCT/US2011/049461, dated Feb. 23, 2012, 14 pages, 2012.
PCT Search Report, PCT/US2012/029310, dated Sep. 28, 2012, 3 pages.
IPRP, PCT/US2011/049461, dated Mar. 7, 2013, 6 pages.
IPRP, PCT/US2011/058182, dated Apr. 30, 2013, 5 pages.
IPER, PCT/US2011/055173, dated Apr. 25, 2013, 5 pages, (2013).
IPRP, PCT/US2012/065716, dated May 20, 2014, 6 pages.
International Search Report for PCT Application No. PCT/US2013/021999, dated Apr. 30, 2013, 8 pages.
International Search Report for PCT Application No. PCT/US2012/066915, dated Mar. 29, 2013, 10 pages.
International Search Report for PCT Application No. PCT/US2015/26896, dated Jul. 28, 2015, 15 pages.
International Search Report for PCT Application No. PCTUS2015/26917, dated Jul. 30, 2015, 16 pages.

The Nike+FuelBand User's Guide, rev 14, 26 pages 2012.
UP by Jawbone Extended User Guide, 10 pages, 2012.
Armour39, Under Armour Guarantee, Getting Started, retrieved from the Internet on Jul. 12, 2013, 7 pages.
Armour39 Module & Chest Strap, retrieved from the Internet on Jul. 12, 2013, 6 pages.
MiCoach Pacer User Manual, 31 pages, (2009).
Foreman et al. "A Comparative Analysis for the Measurement of Head Accelerations in Ice Hockey Helmets using Non-Accelerometer Based Systems," Nov. 19, 2012, 13 pages.
Reebok-CCM and MC10 to Launch Revolutionary Sports Impact Indicator, MC10 News (http://www.mc10inc.com/news/), Oct. 24, 2012, 3 pages.
CheckLight MC10 Overview, Reebok International Limited, Nov. 20, 2012, 7 pages.
Reebok and MC10 Team Up to Build CheckLight, a Head Impact Indicator (Hands-on), MC10 News (http://www.mc10inc.com/news/), Jan. 11, 2013, 1 pg.
TRACE—The Most Advanced Activity Monitor for Action Sports, webpage, retrieved on Aug. 6, 2013, 22 pages.
Checklight, Sports/Activity Impact Indicator, User Manual, 13 pages, 2013, Reebok International Limited.
King, The Design and Application of Wireless Mems Inertial Measurement Units for the Measurement and Analysis of Golf Swings, 2008.
Grober, An Accelerometer Based Instrumentation of the Golf Club: Comparative Analysis of Golf Swings, 2009.
Gehrig et al., Visual Golf Club Tracking for Enhanced Swing Analysis, Computer Vision Lab, Lausanne, Switzerland, 2003.
Pocketpro Golf Designs, PocketPro Full Swing Analysis in Your Pocket, www.PocketPro.org, (2011).
Clemson University, Golf Shot Tutorial, http://www.webnucleo.org/home/online_tools/newton/0.4/html/about_this_tool/tutorials/golf_1.shp.cgi, retrieved on Nov. 10, 2011.
MiCoach Speed_Cell TM, User Manual, 23 pages, (2011).
Nike+iPod, User Guide, 32 pages (2010).
SureShotGPS SS9000X, Intelligent Touch, Instruction Manual, 25 page, 2011.
ActiveReplay, "TRACE—The Most Advanced Activity Monitor for Action Sports", http://www.kickstarter.com/projects/activereplay/trace-the-most-advanced-activity-monitor-for-actio, 13 pages, Oct. 1, 2013.
ZEPP Golfsense@Launch2011, https://www.youtube.com/watch?v=VnOcu8szjIk (video), Mar. 14, 2011.
Epson US Newsroom, "Epson America Enters Sports Wearables Market with Introduction of M-Tracer MT500GII Golf Swing Analyzer", www.news.epson.com, Jan. 5, 2015, 4 pages.
International Search Report and Written Opinion dated Dec. 22, 2015 received in PCTUS1561695, 7 pages.
Search Report Received in PCT2013021999 dated Jan. 21, 2016.
Patent Examination Report received in Australia Application No. 2011313952, dated Mar. 15, 2016, 5 pages.
"About Banjo" webpages retrieved from internet, dated 2015.
International Search Report and Written Opinion mailed in PCTUS1642674 dated Aug. 12, 2016, 9 pages.
International Preliminary Report on Patentability in PCTUS2015061695, dated Jun. 1, 2017, 5 pages.
European Search Report received in PCTUS2015026896 dated May 11, 2017, 13 pages.
International Search Report and Written Opinion received in PCT/US2017/52114, dated October 3, 9 pages.
International Search Report and Written Opinion Received in PCT/US2017/37987, dated Nov. 9, 2017, 12 pages.
Supplementary Extended European Search Report received in 11820763.8 dated Nov. 13, 2017, 16 pages.
Supplementary Extended European Search Report received in 11833159.4 dated Nov. 6, 2017, 14 pages.
Supplementary Partial European Search Report received from EP Application Serial No. 11820763.8, dated Aug. 8, 2017, 15 pages.
Supplementary Partial European Search Report received from EP Application Serial No. 11833159.4, dated Aug. 8, 2017, 15 pages.
Supplemental Search Report Received from EP Application Serial No. 16825295.5, dated Jun. 6, 2019, 7 pages.

(56) References Cited

OTHER PUBLICATIONS

David E. Culler, et al., "Smart Sensors to Network the World", published in Scientific American Magazine, No. 06/2004, dated Jun. 1, 2004, pp. 85-91.
International Search Report and Written Opinion received in PCT/US2017/039209, dated Aug. 24, 2017, 7 pages.
*Zepp Labs, Inc.* v. *Blast Motion, Inc.* Petition for Inter Partes Review of U.S. Pat. No. 8,903,521 filed on Feb. 24, 2016, as IPR2016-00672, and accompanying Declaration of Dr. Steven M. Nesbit.
*Zepp Labs, Inc.* v. *Blast Motion, Inc.* Petition for Inter Partes Review of U.S. Pat. No. 9,039,527 filed on Feb. 24, 2016, as IPR2016-00674, and accompanying Declaration of Dr. Steven M. Nesbit.
*Zepp Labs, Inc.* v. *Blast Motion, Inc.* Petition for Inter Partes Review of U.S. Pat. No. 8,941,723 filed on Feb. 24, 2016, as IPR2016-00675, and accompanying Declaration of Dr. Steven M. Nesbit.
*Zepp Labs, Inc.* v. *Blast Motion, Inc.* Petition for Inter Partes Review of U.S. Pat. No. 8,905,855 filed on Feb. 24, 2016, as IPR2016-00676, and accompanying Declaration of Dr. Steven M. Nesbit.
*Zepp Labs, Inc.* v. *Blast Motion, Inc.* Petition for Inter Partes Review of U.S. Pat. No. 8,944,928 filed on Feb. 24, 2016, as IPR2016-00677, and accompanying Declaration of Dr. Steven M. Nesbit.
Chris Otto, et al., "System Architecture of a Wireless Body Area Sensor Network for Ubiquitous Health Monitoring", *Journal of Mobile Multimedia*, vol. 1, No. 4, Jan. 10, 2006, University of Alabama in Huntsville, 20 Pages.
Linx Technologies "High Performance RF Module: Hp3 Series Transmitter Module Data Guide Description", Jul. 27, 2011, 13 pages.
Roger Allan, "Wireless Sensor Architectures Uses Bluetooth Standard", www.electronicdesign.com/communications/wireless-sensor-architecture-uses-bluetooth-standard, Aug. 7, 2000, 5 pages.
Don Tuite, "Motion-Sensing MEMS Gyros and Accelerometers are Everywhere", www.electronicdesign.com/print/analog/motion-sensing-mems-gyros-and-accelerometers-are-everywhere, Jul. 9, 2009, 6 pages.
InvenSense News Release, "InvenSense Unveils World's $1^{st}$ IMU Solution for Consumer Applications", ir.invensense.com, 2016, 2 Pages.
Dean Takahashi, "Facebook, Twitter, Last.fm coming to Xbox Live this Fall", Jun. 1, 2009, Webpage printout, 5 pages.
The iClub System, Products pages, www.iclub.net, 2001-2005, 5 pages.
Websters New College Dictionary, Definition of "Virtual Reality", Third Edition, 2005, 3 Pages.

Smartswing, "SmartSwing Introduces Affordable Intelligent Golf Club", www.smartswinggolf.com , Jan. 2006, 2 pages.
Henrick Arfwedson, et al., "Ericsson's Bluetooth modules", Ericsson Review No. 4, 1999, 8 pages.
ZigBees, "Zigbee information", www.zigbees.com , 2015, 4 pages.
SolidState Technology, "MEMS enable smart golf clubs", www.electroiq.com , 2005, 3 pages.
IGN, "Japanese WII Price Release Date Revealed", www.ign.com, 2006, 1 page.
First Annual Better Golf Through Technology Conference 2006 webpage, www.bettergolfthroughtechnology.com , Massachusetts Institute of Technology, Cambridge Massachusetts, Feb. 2006, 1 page.
Concept2Rowing, "Training" web content, www.concept2.com , 2009, 1 page.
Expresso, Products pages, www.expresso.com/products , 2009, 2 pages.
Manish Kalia, et al., "Efficient Policies for Increasing Capacity in Bluetooth: An Indoor Pico-Cellular Wireless System", IBM India Research Laboratory, Indian Institute of Technology, 2000, 5 pages.
R. Rao, et al., "Demand-Based Bluetooth Scheduling", Pennsylvania State University, 2001, 13 pages.
Supplementary Extended European Search Report received in 15782595.1 dated Nov. 27, 2017, 5 pages.
Supplementary European Search Report received in 15860384.5 dated Jun. 21, 2018, 9 pages.
International Search Report and Written Opinion received in PCT/U.S. Pat. No. 18033757, dated Aug. 31, 2018, 8 pages.
International Preliminary Report on Patentability received in PCT/US2017/037987, dated Dec. 27, 2018, 11 pages.
International Preliminary Report on Patentability received in PCT/US2018/033757, dated Dec. 5, 2019, 6 pages.
Extended European Search Report received in 17851741.3, dated Nov. 12, 2019, 8 pages.
Supplemental Search Report received in EP1682529.5, dated Jun. 6, 2019, 7 pages.
International Search Report and Written Opinion received in PCT/US18033757, dated Aug. 31, 2018, 8 pages.
International Preliminary Report on Patentability received in PCT/US2018/033757, dated Dec. 5, 2019, 6 pages and transmittal thereof (1 page).
Wikipedia, "Inertial Navigation System" retrieved from wayback machine on Dec. 26, 2018 from https://web.archive.org/web/20170224173443//https://en.wikipedia.ort/wiki/inertial_navigation_system> which was published on Feb. 27, 2017.
Obuchoski, "Tiger Woods PGA Tour 2010 Gameplay (Wii)", retrieved from Youtube on Jul. 3, 2019 from https://www.youtube.com/watch?v=2NjzPJvyRJE> (2009).

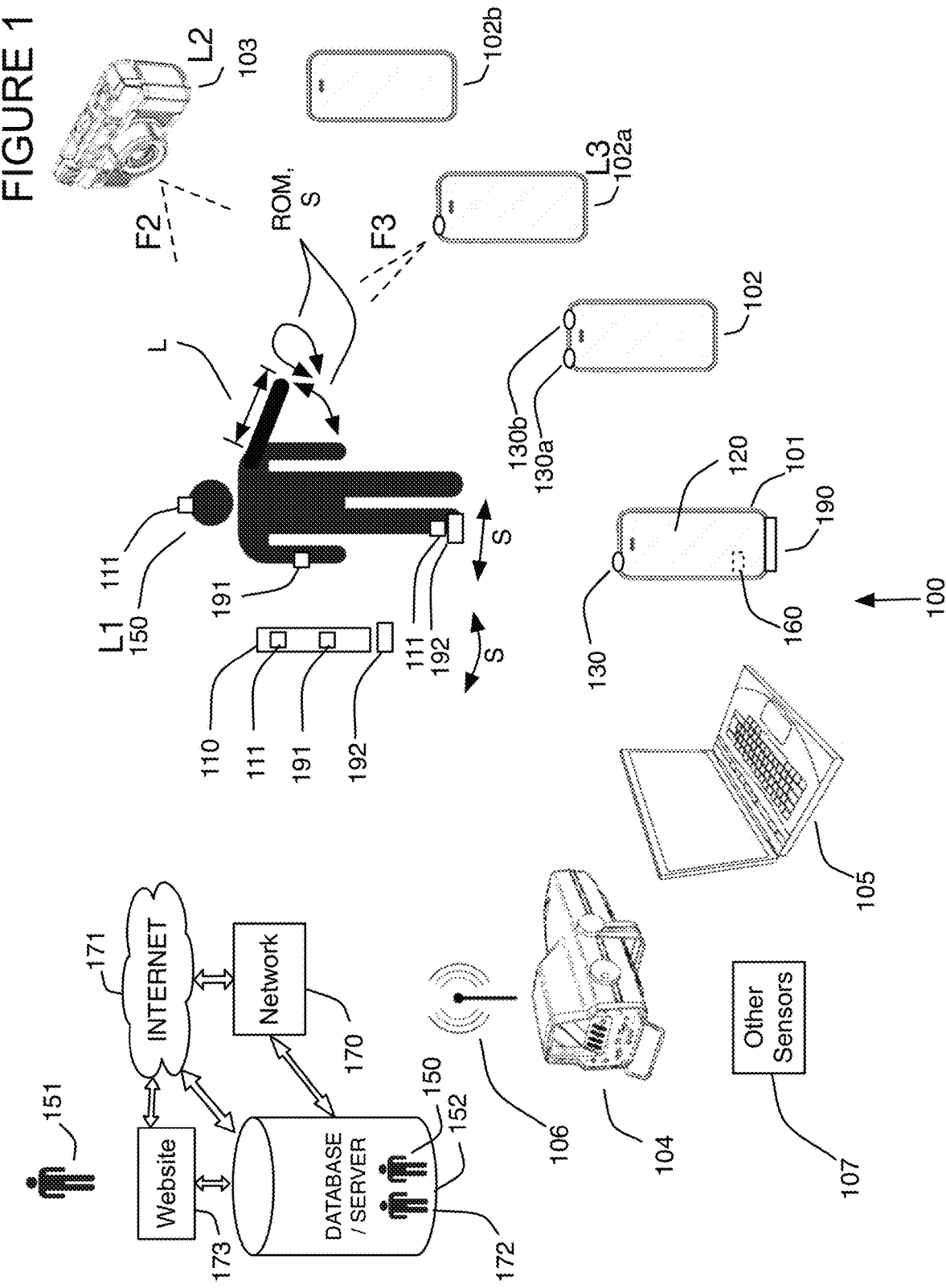

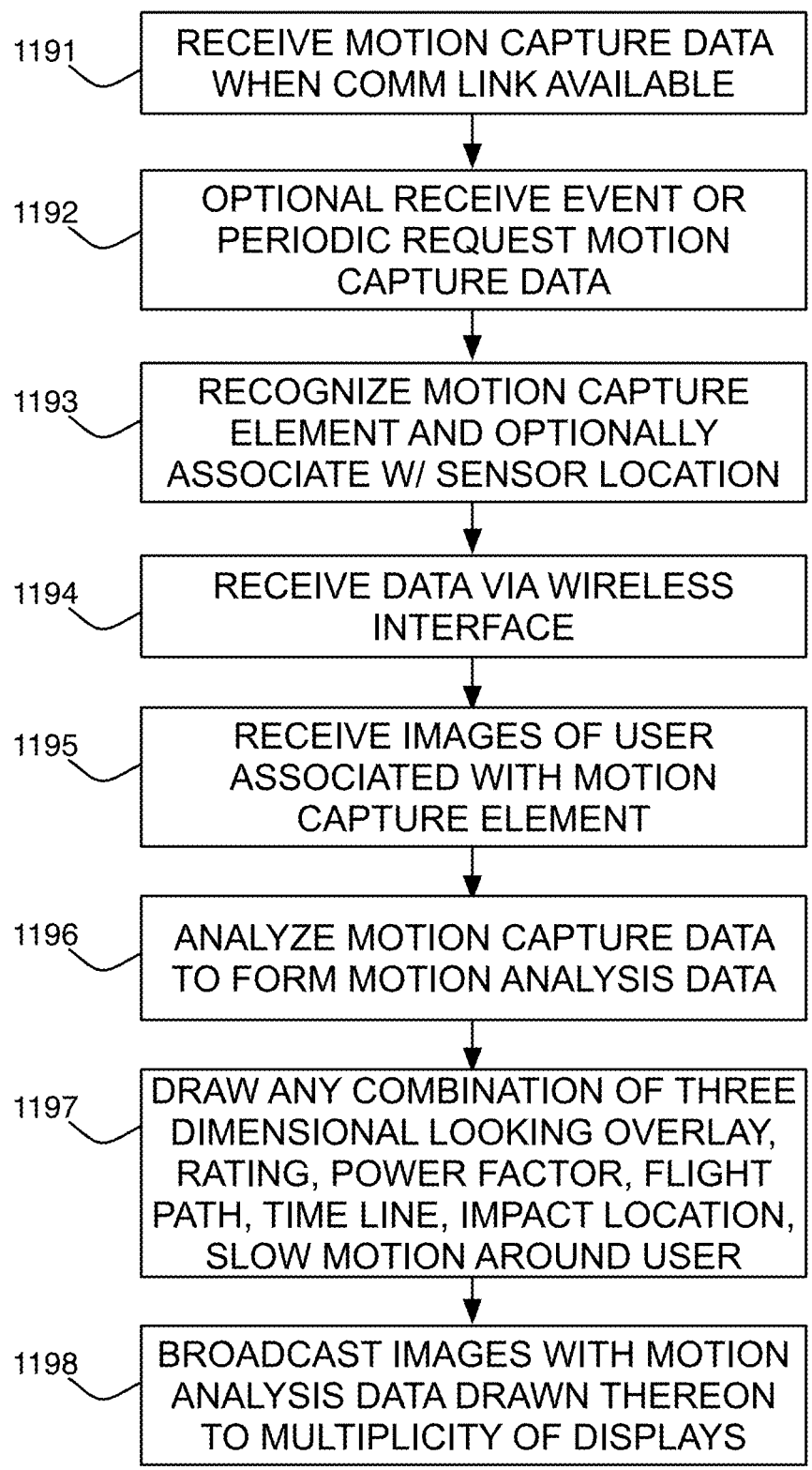

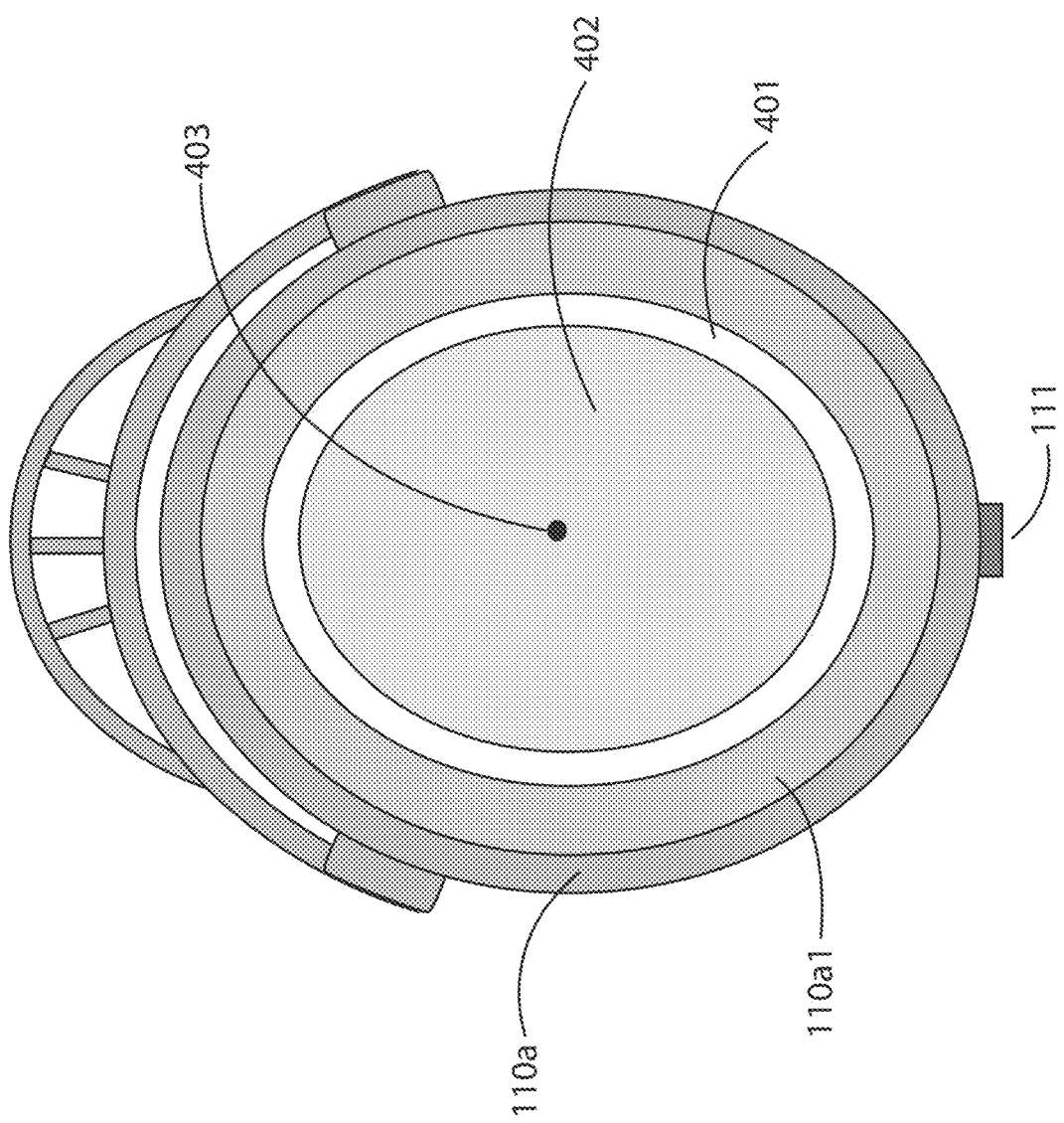

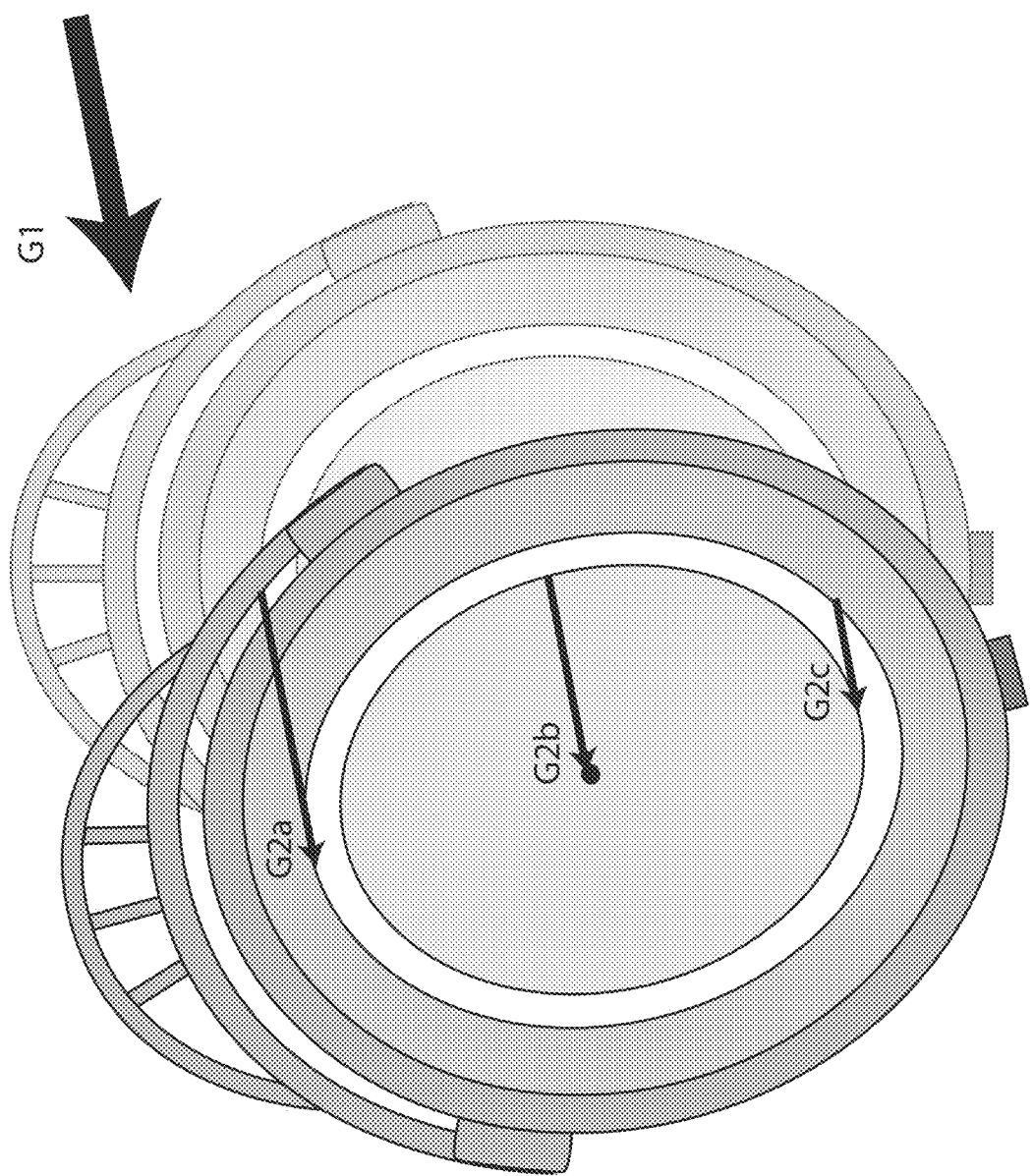

FIGURE 14
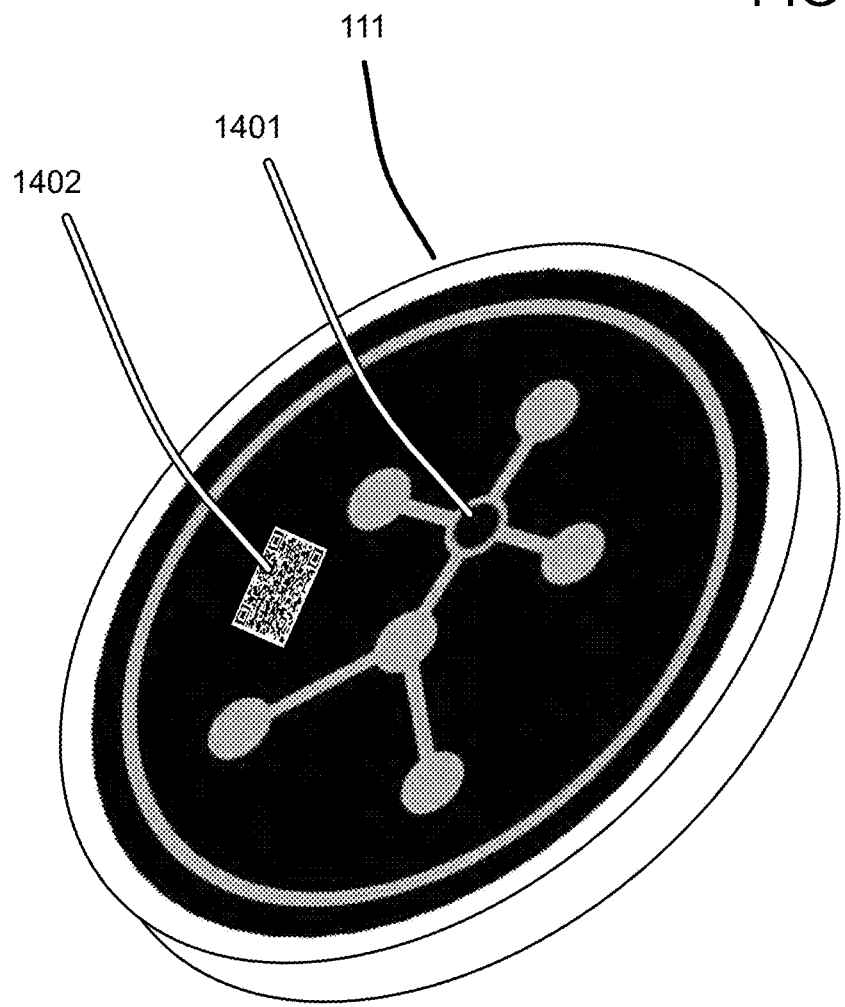
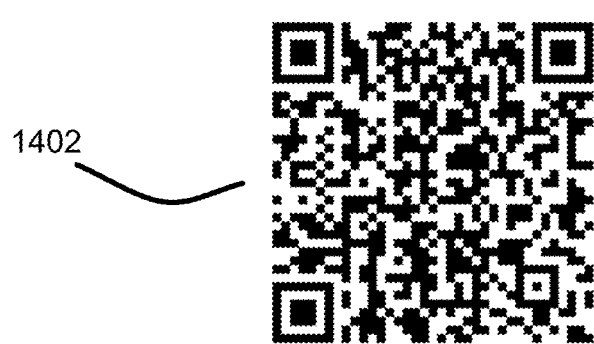

FIGURE 17
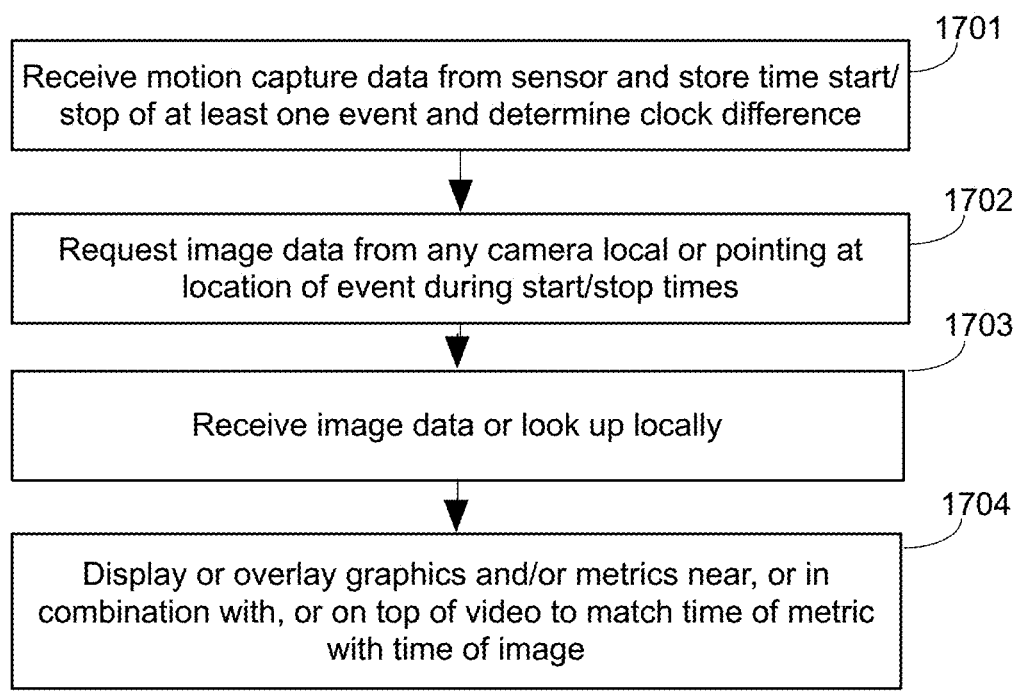

FIGURE 19
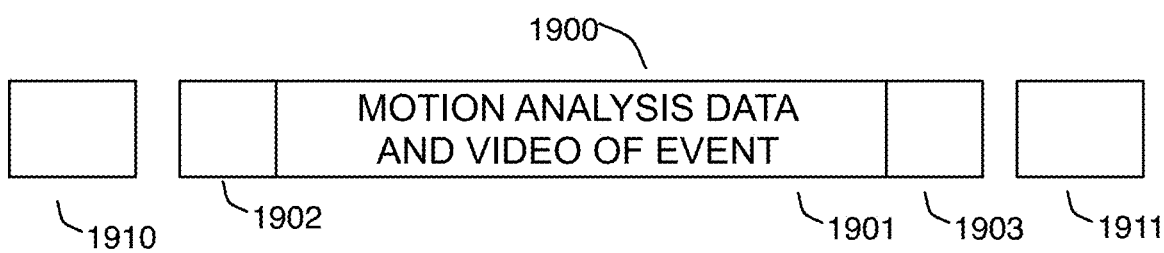
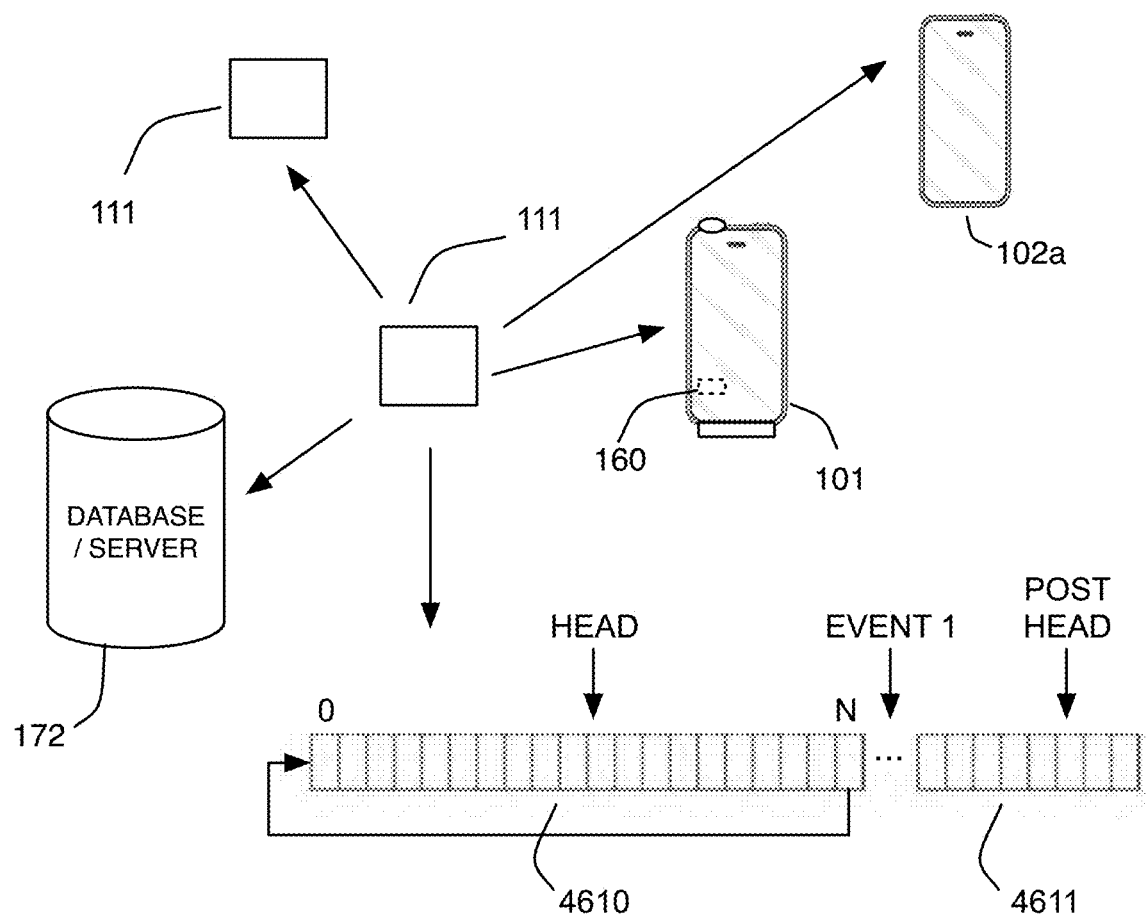

FIG. 29
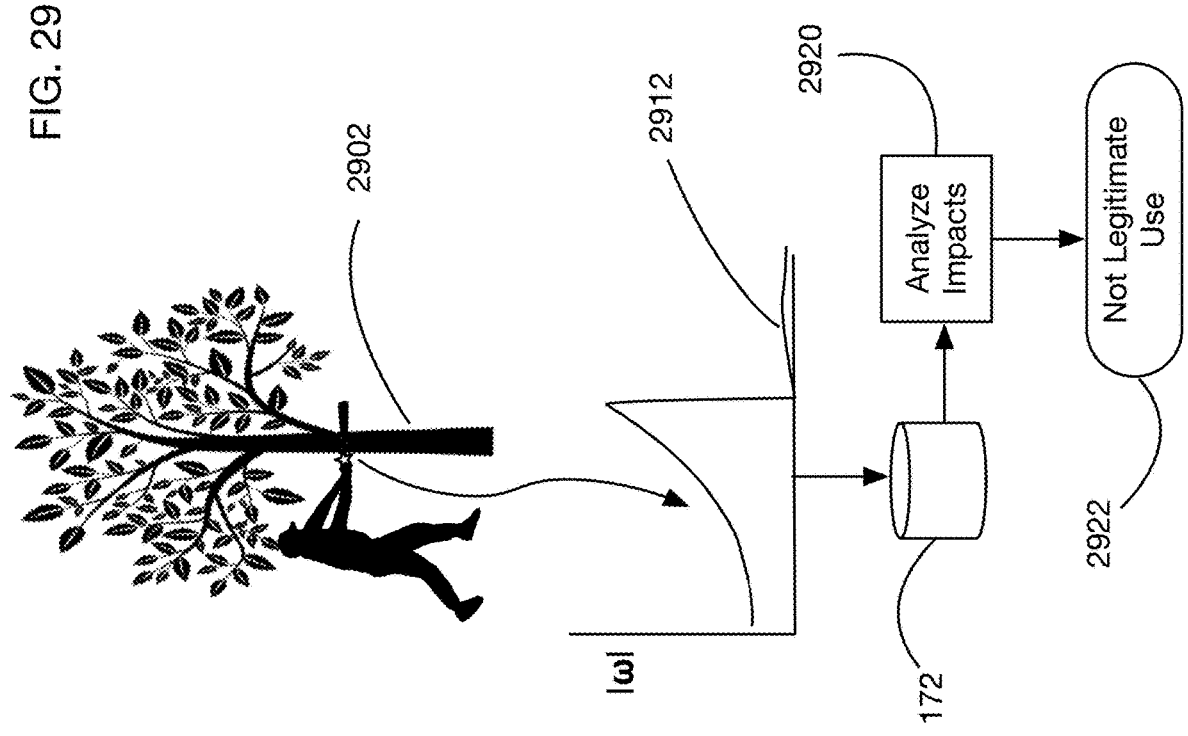
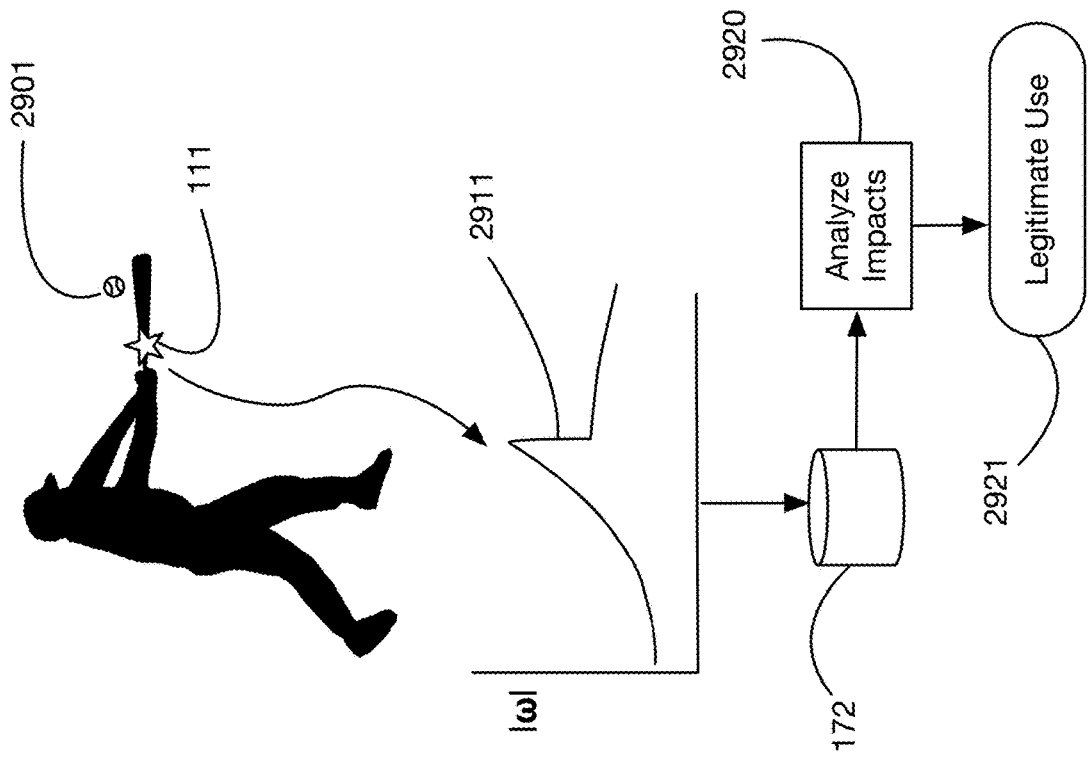

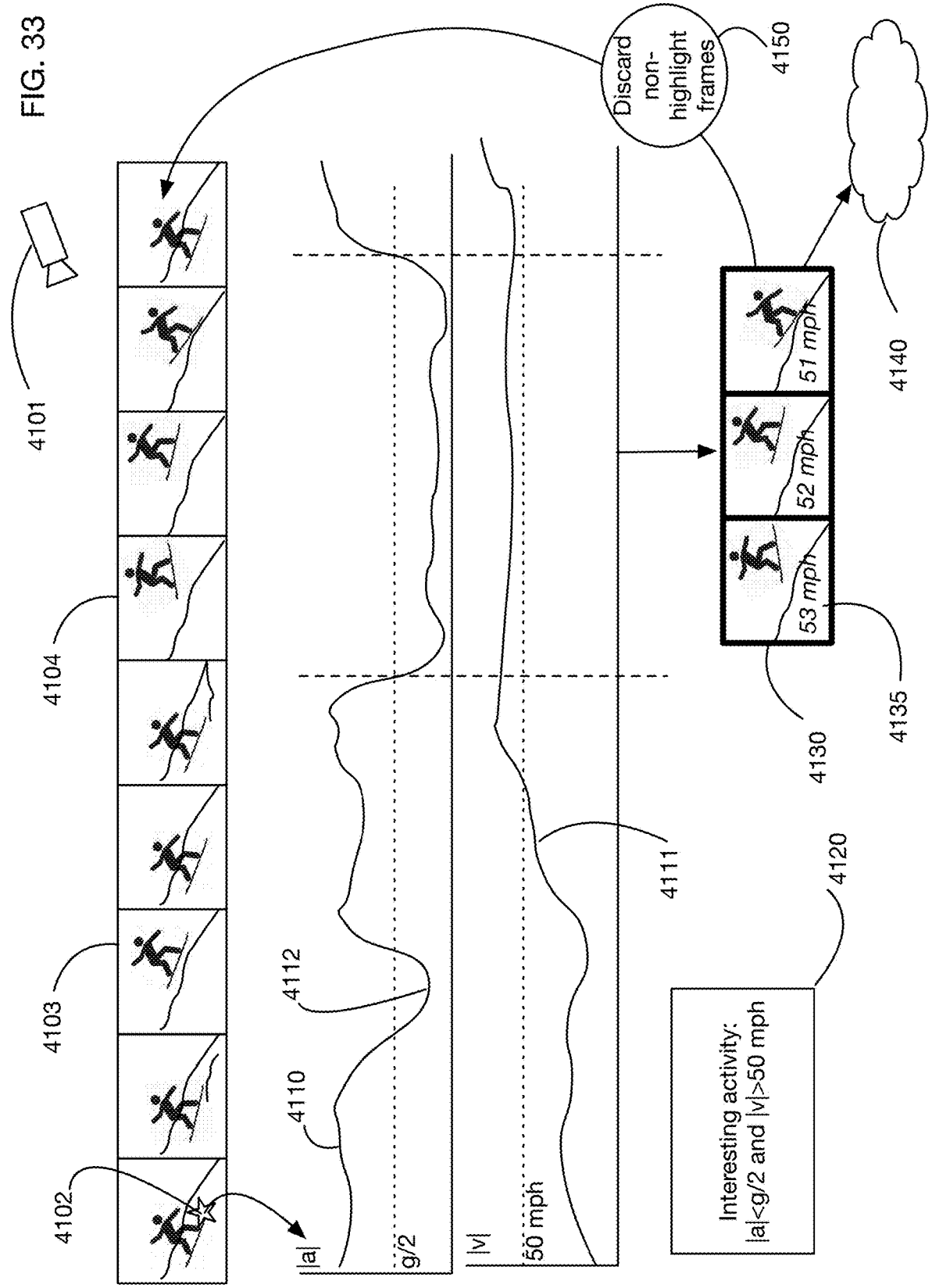

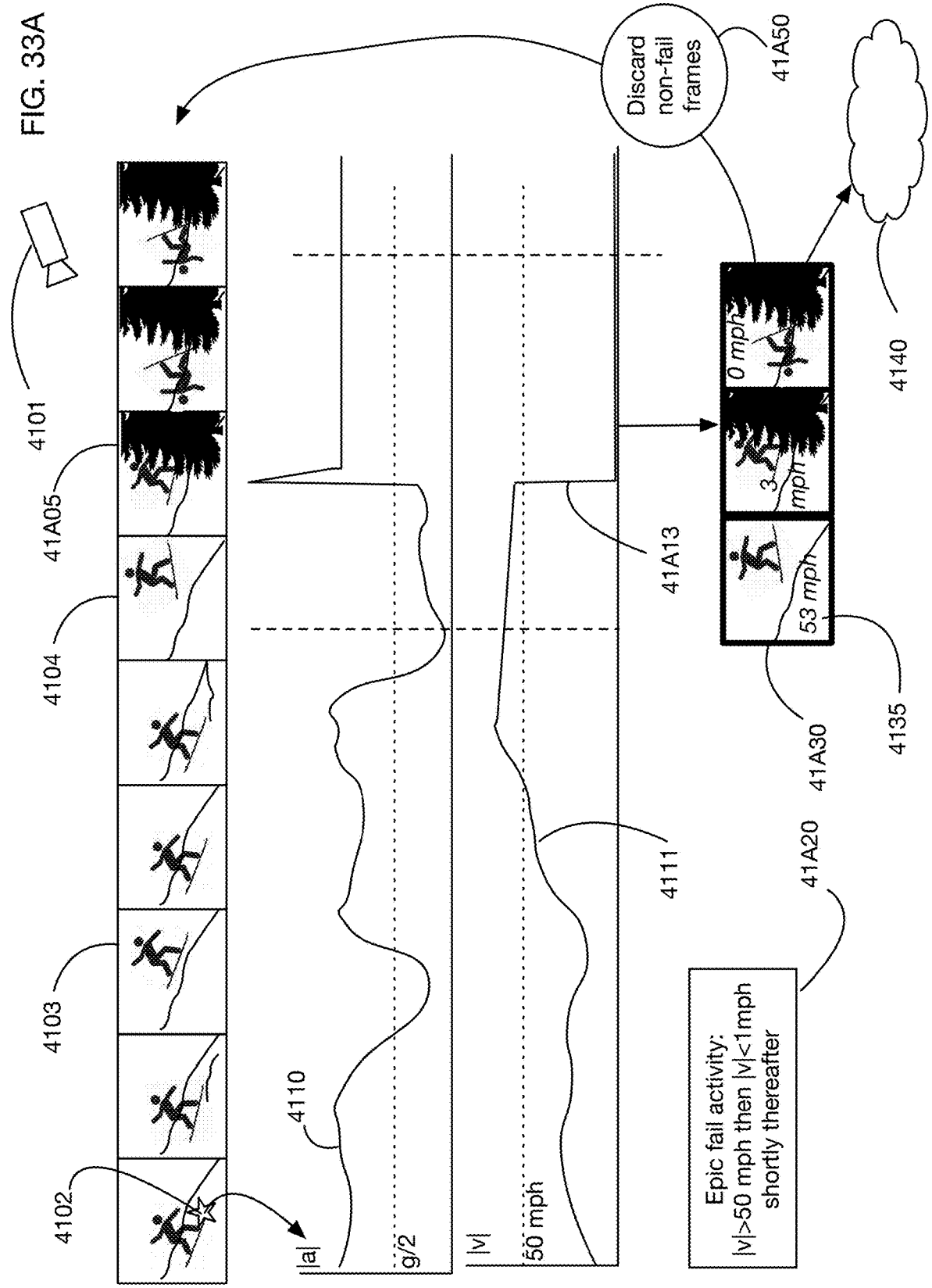

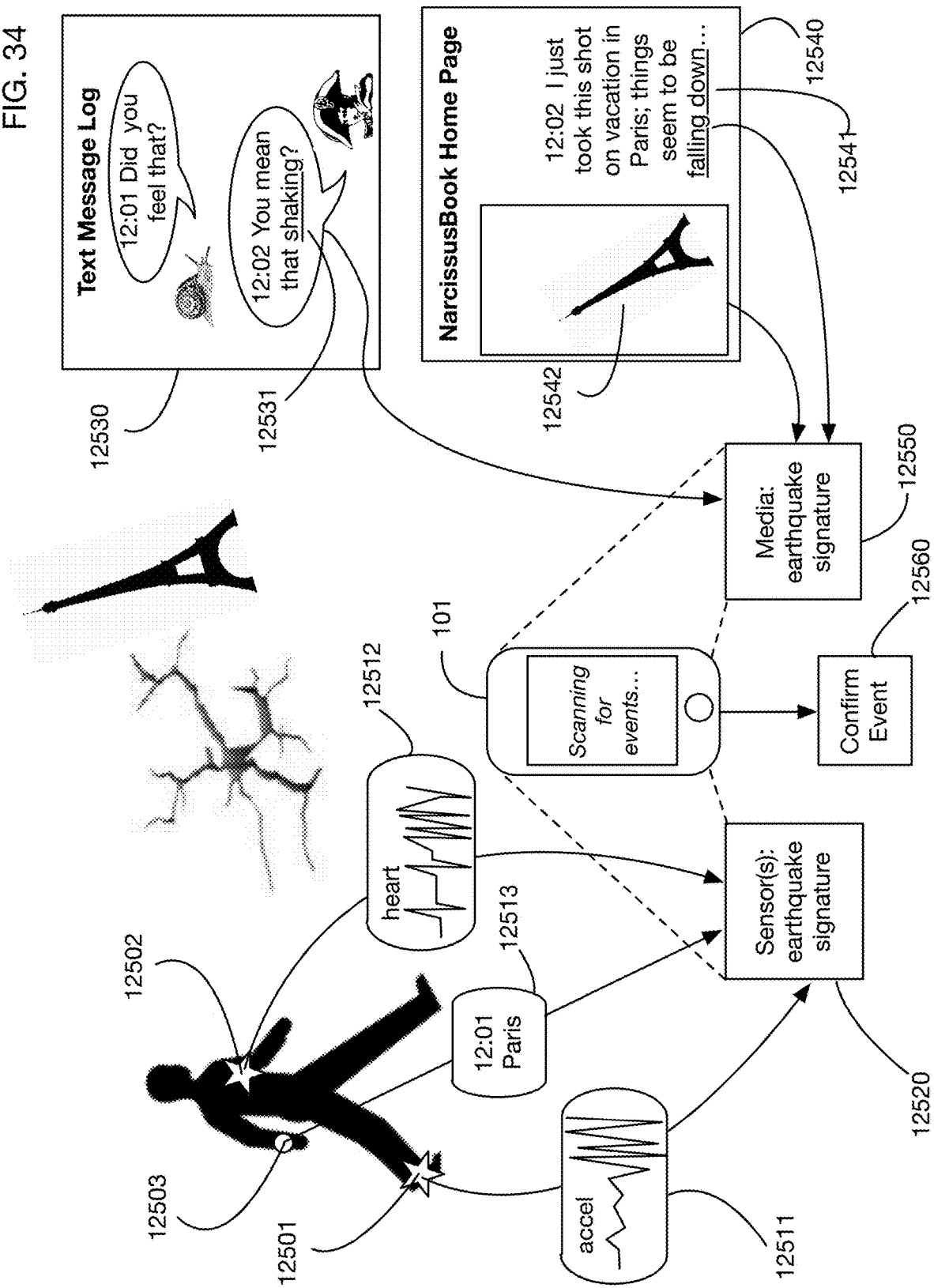

FIG. 35
12601
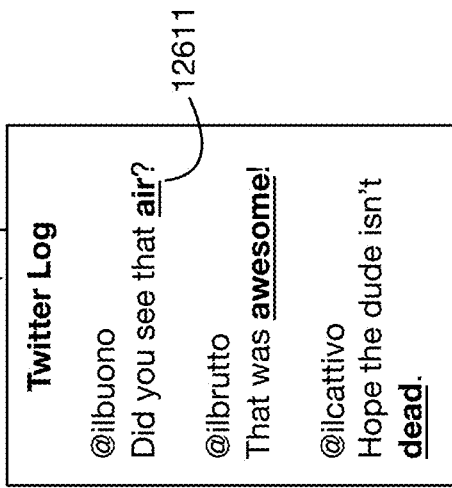
Twitter Log — 12610
@ilbuono
Did you see that air?  ← 12611
@ilbrutto
That was awesome!
@ilcattivo
Hope the dude isn't dead.
| | Touchdown | Crash | Earthquake | Jump |
|---|---|---|---|---|
| Shaking | 1 | 3 | 9 | 4 |
| Loud | 3 | 7 | 8 | 1 |
| Dead | 1 | 10 | 9 | 5 |
| Blood | 1 | 10 | 8 | 5 |
| Air | 5 | 6 | 2 | 10 |
| Score | 10 | 2 | 2 | 6 |
| Awesome | 8 | 5 | 6 | 9 |
| Uh-oh | 2 | 10 | 9 | 6 |
| Wow | 5 | 5 | 9 | 8 |
| Run | 8 | 2 | 10 | 1 |
12621 ← 12620
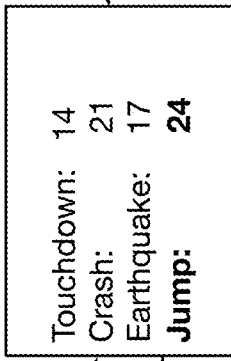
Touchdown: 14
Crash: 21
Earthquake: 17
Jump: 24
12630

DISPARATE SENSOR EVENT CORRELATION SYSTEM

This application is a continuation of U.S. Utility patent application Ser. No. 17/834,864, filed 7 Jun. 2022, which is a continuation of U.S. Utility patent application Ser. No. 16/996,648, filed on 18 Aug. 2020, issued as U.S. Pat. No. 11,355,160, which is a continuation of U.S. Utility patent application Ser. No. 16/460,961, filed on 2 Jul. 2019, issued as U.S. Pat. No. 10,748,581, which is a continuation of U.S. Utility patent application Ser. No. 15/824,998, filed on 28 Nov. 2017, issued as U.S. Pat. No. 10,339,978, which is a continuation of U.S. Utility patent application Ser. No. 15/471,742, filed on 28 Mar. 2017, issued as U.S. Pat. No. 9,830,951, which is a continuation of U.S. Utility patent application Ser. No. 15/184,926, filed on 16 Jun. 2016, issued as U.S. Pat. No. 9,607,652, which is a continuation in part of U.S. Utility patent application Ser. No. 14/801,428 filed 16 Jul. 2015, issued as U.S. Pat. No. 9,406,336, the specifications of which are hereby incorporated herein by reference.

BACKGROUND OF THE INVENTION

Field of the Invention

One or more embodiments pertain to the field of sensors including environmental, physiological and motion capture sensors and associated data analysis and displaying information based on events recognized within the environmental, physiological and/or motion capture data or within motion analysis data associated with a user, or piece of equipment and/or based on previous motion analysis data from the user or other user(s) and/or piece of equipment. More particularly, but not by way of limitation, one or more embodiments enable a multi-sensor event detection and tagging system that enables intelligent analysis, synchronization, and transfer of generally concise event videos synchronized with motion data from motion capture sensor(s) coupled with a user or piece of equipment. Event data including video and motion capture data are saved to database. Events including motion events are analyzed as they occur, and analysis of events stored in the database identifies trends, correlations, models, and patterns in motion event data. Greatly saves storage and increases upload speed by uploading event videos and avoiding upload of non-pertinent portions of large videos. Creates highlight reels filtered by metrics and can sort by metric. Integrates with multiple sensors to save event data even if other sensors do not detect the event. Events may be correlated and confirmed through multiple sensors and/or text/video on social media or other websites, and/or otherwise synchronized with image(s) or video, as the events happen or at a later time based on location and/or time of the event or both, for example on the mobile device or on a remote server, and as captured from internal/external camera(s) or nanny cam, for example to enable saving video of the event, such as the first steps of a child, violent shaking events, sporting, military or other motion events including concussions, or falling events associated with an elderly person and for example discarding non-event related video data, to greatly reduce storage requirements for event videos. The system may automatically generate tags for events based on analysis of sensor data; tags may also be generated based on analysis of social media site postings describing the event.

Description of the Related Art

Existing motion capture systems process and potentially store enormous amounts of data with respect to the actual events of interest. For example, known systems capture accelerometer data from sensors coupled to a user or piece of equipment and analyze or monitor movement. These systems do not intelligently confirm events using multiple disparate types of sensors or social media or other non-sensor based information, including postings to determine whether an event has actually occurred, or what type of equipment or what type of activity has occurred.

In these scenarios, thousands or millions of motion capture samples are associated with the user at rest or not moving in a manner that is related to a particular event that the existing systems are attempting to analyze. For example, if monitoring a football player, a large amount of motion data is not related to a concussion event, for a baby, a large amount of motion data is not related in general to a shaking event or non-motion event such as sudden infant death syndrome (SIDS), for a golfer, a large amount of motion data captured by a sensor mounted on the player's golf club is of low acceleration value, e.g., associated with the player standing or waiting for a play or otherwise not moving or accelerating in a manner of interest. Hence, capturing, transferring and storing non-event related data increases requirements for power, bandwidth and memory.

In addition, video capture of a user performing some type of motion may include even larger amounts of data, much of which has nothing to do with an actual event, such as a swing of a baseball bat or home run. There are no known systems that automatically trim video, e.g., save event related video or even discard non-event related video, for example by uploading for example only the pertinent event video as determined by a motion capture sensor, without uploading the entire raw videos, to generate smaller video segments that correspond to the events that occur in the video and for example as detected through analysis of the motion capture data.

Some systems that are related to monitoring impacts are focused on linear acceleration related impacts. These systems are unable to monitor rotational accelerations or velocities and are therefore unable to detect certain types of events that may produce concussions. In addition, many of these types of systems do not produce event related, connectionless messages for low power and longevity considerations. Hence, these systems are limited in their use based on their lack of robust characteristics.

Known systems also do not contemplate data mining of events within motion data to form a representation of a particular movement, for example a swing of an average player or average professional player level, or any player level based on a function of events recognized within previously stored motion data. Thus, it is difficult and time consuming and requires manual labor to find, trim and designate particular motion related events for use in virtual reality for example. Hence, current systems do not easily enable a particular user to play against a previously stored motion event of the same user or other user along with a historical player for example. Furthermore, known systems do not take into account cumulative impacts, and for example with respect to data mined information related to concussions, to determine if a series of impacts may lead to impaired brain function over time.

Other types of motion capture systems include video systems that are directed at analyzing and teaching body mechanics. These systems are based on video recording of an athlete and analysis of the recorded video of an athlete. This technique has various limitations including inaccurate and inconsistent subjective analysis based on video for example. Another technique includes motion analysis, for example using at least two cameras to capture three-dimensional points of movement associated with an athlete. Known implementations utilize a stationary multi-camera system that is not portable and thus cannot be utilized outside of the environment where the system is installed, for example during an athletic event such as a golf tournament, football game or to monitor a child or elderly person. In general video based systems do not also utilize digital motion capture data from sensors on the object undergoing motion since they are directed at obtaining and analyzing images having visual markers instead of electronic sensors. These fixed installations are extremely expensive as well. Such prior techniques are summarized in U.S. Pat. No. 7,264,554, filed 26 Jan. 2006, which claims the benefit of U.S. Provisional Patent Application Ser. No. 60/647,751 filed 26 Jan. 2005, the specifications of which are both hereby incorporated herein by reference. Both disclosures are to the same inventor of the subject matter of the instant application.

Regardless of the motion capture data obtained, the data is generally analyzed on a per user or per swing basis that does not contemplate processing on a mobile phone, so that a user would only buy a motion capture sensor and an "app" for a pre-existing mobile phone. In addition, existing solutions do not contemplate mobile use, analysis and messaging and/or comparison to or use of previously stored motion capture data from the user or other users or data mining of large data sets of motion capture data, for example to obtain or create motion capture data associated with a group of users, for example professional golfers, tennis players, baseball players or players of any other sport to provide events associated with a "professional level" average or exceptional virtual reality opponent. To summarize, motion capture data is generally used for immediate monitoring or sports performance feedback and generally has had limited and/or primitive use in other fields.

Known motion capture systems generally utilize several passive or active markers or several sensors. There are no known systems that utilize as little as one visual marker or sensor and an app that for example executes on a mobile device that a user already owns, to analyze and display motion capture data associated with a user and/or piece of equipment. The data is generally analyzed in a laboratory on a per user or per swing basis and is not used for any other purpose besides motion analysis or representation of motion of that particular user and is generally not subjected to data mining.

There are no known systems that allow for motion capture elements such as wireless sensors to seamlessly integrate or otherwise couple with a user or shoes, gloves, shirts, pants, belts, or other equipment, such as a baseball bat, tennis racquet, golf club, mouth piece for a boxer, football or soccer player, or protective mouthpiece utilized in any other contact sport for local analysis or later analysis in such a small format that the user is not aware that the sensors are located in or on these items. There are no known systems that provide seamless mounts, for example in the weight port of a golf club or at the end shaft near the handle so as to provide a wireless golf club, configured to capture motion data. Data derived from existing sensors is not saved in a database for a large number of events and is not used relative to anything but the performance at which the motion capture data was acquired.

In addition, for sports that utilize a piece of equipment and a ball, there are no known portable systems that allow the user to obtain immediate visual feedback regarding ball flight distance, swing speed, swing efficiency of the piece of equipment or how centered an impact of the ball is, i.e., where on the piece of equipment the collision of the ball has taken place. These systems do not allow for user's to play games with the motion capture data acquired from other users, or historical players, or from their own previous performances. Known systems do not allow for data mining motion capture data from a large number of swings to suggest or allow the searching for better or optimal equipment to match a user's motion capture data and do not enable original equipment manufacturers (OEMs) to make business decisions, e.g., improve their products, compare their products to other manufacturers, up-sell products or contact users that may purchase different or more profitable products.

In addition, there are no known systems that utilize motion capture data mining for equipment fitting and subsequent point-of-sale decision making for instantaneous purchasing of equipment that fits an athlete. Furthermore, no known systems allow for custom order fulfillment such as assemble-to-order (ATO) for custom order fulfillment of sporting equipment, for example equipment that is built to customer specifications based on motion capture data mining, and shipped to the customer to complete the point of sales process, for example during play or virtual reality play.

In addition, there are no known systems that use a mobile device and RFID tags for passive compliance and monitoring applications.

There are no known systems that enable data mining for a large number of users related to their motion or motion of associated equipment to find patterns in the data that allows for business strategies to be determined based on heretofore undiscovered patterns related to motion. There are no known systems that enable obtain payment from OEMs, medical professionals, gaming companies or other end users to allow data mining of motion data.

There are no known systems that create synchronized event videos containing both video capture and motion sensor data for events, store these synchronized event videos in a database, and use database analysis to generate models, metrics, reports, alerts, and graphics from the database. For at least the limitations described above there is a need for a motion event analysis system.

Known systems such as Lokshin, United States Patent Publication No. 20130346013, published 26 Dec. 2013 and 2013033054 published 12 Dec. 2013 for example do not contemplate uploading only the pertinent videos that occur during event, but rather upload large videos that are later synchronized. Both Lokshin references does not contemplate a motion capture sensor commanding a camera to alter camera parameters on-the-fly based on the event, to provide increased frame rate for slow motion for example during the event video capture, and do not contemplate changing playback parameters during a portion of a video corresponding to an event. The references also do not contemplate generation of highlight or fail reels where multiple cameras may capture an event, for example from a different angle and do not contemplate automatic selection of the best video for a given event. In addition, the references do not contemplate a multi-sensor environment where other sensors may not observe or otherwise detect an event, while the sensor data is still valuable for obtaining metrics, and hence the references do not teach saving event data on other sensors after one sensor has identified an event.

Associating one or more tags with events is often useful for event analysis, filtering, and categorizing. Tags may for example indicate the players involved in an event, the type of action, and the result of an action (such as a score).

Known systems rely on manual tagging of events by human operators who review event videos and event data. For example, there are existing systems for coaches to tag videos of sporting events or practices, for example to review a team's performance or for scouting reports. There are also systems for sports broadcasting that manually tag video events with players or actions. There are no known systems that analyze data from motion sensors, video, radar, or other sensors to automatically select one or more tags for an event based on the data. An automatic event tagging system would provide a significant labor saving over the current manual tagging methods, and would provide valuable information for subsequent event retrieval and analysis.

BRIEF SUMMARY OF THE INVENTION

Embodiments of the invention relate to a multi-sensor event detection and tagging system that enables intelligent analysis of event data from a variety of sensors and/or non-sensor data, for example blog, chat, or social media postings to generate an event, and publish the event and/or generate event videos. Enables intelligent analysis, synchronization, and transfer of generally concise event videos synchronized with motion data from motion capture sensor(s) coupled with a user or piece of equipment. Event data including video and motion capture data are saved to database. Events are analyzed as they occur, and correlated from a variety of sensors for example. Analysis of events stored in the database identifies trends, correlations, models, and patterns in event data. Greatly saves storage and increases upload speed by uploading event videos and avoiding upload of non-pertinent portions of large videos. Provides intelligent selection of multiple videos from multiple cameras covering an event at a given time, for example selecting one with least shake. Video and other media describing an event may be obtained from a server, such as a social media site. Enables near real-time alteration of camera parameters during an event determined by the motion capture sensor, and alteration of playback parameters and special effects for synchronized event videos. Creates highlight reels filtered by metrics and can sort by metric. A type of highlight reel may include positive events, while another type may include negative events, such as "fails", which are generally crashes, wipeouts or other unintended events, which may in some cases show for example that old age and treachery beat youth and exuberance in many cases. Integrates with multiple sensors to save event data even if other sensors do not detect the event. Also enables analysis or comparison of movement associated with the same user, other user, historical user or group of users. At least one embodiment provides intelligent recognition of events within motion data including but not limited to motion capture data obtained from portable wireless motion capture elements such as visual markers and sensors, radio frequency identification tags and mobile device computer systems, or calculated based on analyzed movement associated with the same user, or compared against the user or another other user, historical user or group of users. Enables low memory utilization for event data and video data by trimming motion data and videos to correspond to the detected events. This may be performed on the mobile device or on a remote server and based on location and/or time of the event and based on the location and/or time of the video, and may optionally include the orientation of the camera to further limit the videos that may include the motion events. Embodiments enable event based viewing and low power transmission of events and communication with an app executing on a mobile device and/or with external cameras to designate windows that define the events. Enables recognition of motion events, and designation of events within images or videos, such as a shot, move or swing of a player, a concussion of a player, boxer, rider or driver, or a heat stroke, hypothermia, seizure, asthma attack, epileptic attack or any other sporting or physical motion related event including walking and falling. Events may be correlated with one or more images or video as captured from internal/external camera or cameras or nanny cam, for example to enable saving video of the event, such as the first steps of a child, violent shaking events, sporting events including concussions, or falling events associated with an elderly person. Concussion related events and other events may be monitored for linear acceleration thresholds and/or patterns as well as rotational acceleration and velocity thresholds and/or patterns and/or saved on an event basis and/or transferred over lightweight connectionless protocols or any combination thereof.

Embodiments of the invention enable a user to purchase an application or "app" and a motion capture element and immediately utilize the system with their existing mobile computer, e.g., mobile phone. Embodiments of the invention may display motion information to a monitoring user, or user associated with the motion capture element or piece of equipment. Embodiments may also display information based on motion analysis data associated with a user or piece of equipment based on (via a function such as but not limited to a comparison) previously stored motion capture data or motion analysis data associated with the user or piece of equipment or previously stored motion capture data or motion analysis data associated with at least one other user. This enables sophisticated monitoring, compliance, interaction with actual motion capture data or pattern obtained from other user(s), for example to play a virtual game using real motion data obtained from the user with responses generated based thereon using real motion data capture from the user previously or from other users (or equipment). This capability provides for playing against historical players, for example a game of virtual tennis, or playing against an "average" professional sports person, and is unknown in the art until now.

For example, one or more embodiments include at least one motion capture element that may couple with a user or piece of equipment or mobile device coupled with the user, wherein the at least one motion capture element includes a memory, such as a sensor data memory, and a sensor that may capture any combination of values associated with an orientation, position, velocity, acceleration (linear and/or rotational), angular velocity and angular acceleration, of the at least one motion capture element. In at least one embodiment, the at least one motion capture element may include a first communication interface or at least one other sensor, and a microcontroller coupled with the memory, the sensor and the first communication interface.

According to at least embodiment of the invention, the microcontroller may be a microprocessor. By way of one or more embodiments, the first communication interface may receive one or more other values associated with a temperature, humidity, wind, elevation, light sound, heart rate, or any combination thereof. In at least one embodiment, the at least one other sensor may locally capture the one or more other values associated with the temperature, humidity, wind, elevation, light sound, heart rate, or any combination thereof. At least one embodiment of the invention may include both the first communication interface and the at least one other sensor to obtain motion data and/or environmental or physiological data in any combination.

In one or more embodiments, the microprocessor may one or more of collect data that includes sensor values from the sensor, store the data in the memory, analyze the data and recognize an event within the data to determine event data. In at least one embodiment, the microprocessor may correlate the data or the event data with the one or more other values associated with the temperature, humidity, wind, elevation, light sound, heart rate, or any combination thereof. As such, in at least one embodiment, the microprocessor may correlate the data or the event data with the one or more other values to determine one or more of a false positive event, a type of equipment that the at least one motion capture element is coupled with, and a type of activity indicated by the data or the event data.

In one or more embodiments, the microprocessor may transmit one or more of the data and the event data associated with the event via the first communication interface. Embodiments of the system may also include an application that executes on a mobile device, wherein the mobile device includes a computer, a communication interface that communicates with the communication interface of the motion capture element to obtain the event data associated with the event. In at least one embodiment, the computer may couple with a communication interface, such as the first communication interface, wherein the computer executes the application or "app" to configure the computer to receive one or more of the data and the event data from the communication interface, analyze the data and event data to form motion analysis data, store the data and event data, or the motion analysis data, or both the event data and the motion analysis data, and display information including the event data, or the motion analysis data, or both associated with the at least one user on a display.

In one or more embodiments, the microprocessor may detect the type of equipment the at least one motion capture sensor is coupled with or the type of activity the at least one motion sensor is sensing through the correlation to differentiate a similar motion for a first type of activity with respect to a second type of activity. In at least one embodiment, the at least one motion capture sensor may differentiate the similar motion based on the one or more values associated with temperature, humidity, wind, elevation, light, sound, heart rate, or any combination thereof.

By way of one or more embodiments, the microprocessor may detect the type of equipment or the type of activity through the correlation to differentiate a similar motion for a first type of activity including surfing with respect to a second type of activity including snowboarding. In at least one embodiment, the microprocessor may differentiate the similar motion based on the temperature or the altitude or both the temperature and the altitude. In at least one embodiment, the microprocessor may recognize a location of the sensor on the piece of equipment or the user based on the data or event data. In one or more embodiments, the microprocessor may collect data that includes sensor values from the sensor based on a sensor personality selected from a plurality of sensor personalities. In at least one embodiment, the sensor personality may control sensor settings to collect the data in an optimal manner with respect to a specific type of movement or the type of activity associated with a specific piece of equipment or type of clothing.

By way of one or more embodiments, the microprocessor may determine the false positive event as detect a first value from the sensor values having a first threshold value and detect a second value from the sensor values having a second threshold value within a time window. In at least one embodiment, the microprocessor may then signify a prospective event, compare the prospective event to a characteristic signal associated with a typical event and eliminate any false positive events, signify a valid event if the prospective event is not a false positive event, and save the valid event in the sensor data memory including information within an event time window as the data.

In at least one embodiment, the at least one motion capture element may be contained within a motion capture element mount, a mobile device, a mobile phone, a smart phone, a smart watch, a camera, a laptop computer, a notebook computer, a tablet computer, a desktop computer, a server computer or any combination thereof.

In one or more embodiments, the microprocessor may recognize the at least one motion capture element with newly assigned locations after the at least one motion capture element is removed from the piece of equipment and coupled with a second piece of equipment of a different type based on the data or event data.

In at least one embodiment, the system may include a computer wherein the computer may include a computer memory, a second communication interface that may communicate with the first communication interface to obtain the data or the event data associated with the event or both the data the event data. In one or more embodiments, the computer may be coupled with the computer memory and the second communication interface, wherein the computer may receive the data from the second communication interface and analyze the data and recognize an event within the data to determine event data. In at least one embodiment, the computer may receive the event data from the second communication interface, or may receive both the data and the event data from the second communication interface.

In one or more embodiments, the computer may analyze the event data to form motion analysis data, store the event data, or the motion analysis data, or both the event data and the motion analysis data in the computer memory, obtain an event start time and an event stop time from the event data, and obtain at least one video start time and at least one video stop time associated with at least one video. In at least one embodiment, the computer may synchronize the event data, the motion analysis data or any combination thereof with the at least one video. In one or more embodiments, the computer may synchronize based on the first time associated with the data or the event data obtained from the at least one motion capture element coupled with the user or the piece of equipment or the mobile device coupled with the user, and at least one time associated with the at least one video to create at least one synchronized event video. In at least one embodiment, the computer may store the at least one synchronized event video in the computer memory without at least a portion of the at least one video outside of the event start time to the event stop time.

By way of one or more embodiments, the computer may include at least one processor in a mobile device, a mobile phone, a smart phone, a smart watch, a camera, a laptop computer, a notebook computer, a tablet computer, a desktop computer, a server computer or any combination of any number of the mobile device, mobile phone, smart phone, smart watch, camera, laptop computer, notebook computer, tablet computer, desktop computer and server computer.

According to at least one embodiment, the computer may display a synchronized event video including both of the event data, motion analysis data or any combination thereof that occurs during a timespan from the event start time to the event stop time, and the video captured during the timespan from the event start time to the event stop time.

In one or more embodiments, the computer may transmit the at least one synchronized event video or a portion of the at least one synchronized event video to one or more of a repository, a viewer, a server, another computer, a social media site, a mobile device, a network, and an emergency service.

In at least one embodiment, the computer may accept a metric associated with the at least one synchronized event video, and accept selection criteria for the metric. In one or more embodiments, the computer may determine a matching set of synchronized event videos that have values associated with the metric that pass the selection criteria, and display the matching set of synchronized event videos or corresponding thumbnails thereof along with the value associated with the metric for each of the matching set of synchronized event videos or the corresponding thumbnails.

In at least one embodiment of the invention, the sensor or the computer may include a microphone that records audio signals. In one or more embodiments, the recognize an event may include determining a prospective event based on the data, and correlating the data with the audio signals to determine if the prospective event is a valid event or a false positive event. In at least one embodiment, the computer may store the audio signals in the computer memory with the at least one synchronized event video if the prospective event is a valid event.

One or more embodiments include at least one motion capture sensor that may be placed near the user's head wherein the microcontroller or microprocessor may calculate a location of impact on the user's head. Embodiments of the at least one motion capture sensor may be coupled on a hat or cap, within a protective mouthpiece, using any type of mount, enclosure or coupling mechanism. One or more embodiments of the at least one motion capture sensor may be coupled with a helmet on the user's head and wherein the calculation of the location of impact on the user's head is based on the physical geometry of the user's head and/or helmet. Embodiments may include a temperature sensor coupled with the at least one motion capture sensor or with the microcontroller, or microprocessor, for example.

Embodiments of the invention may also utilize an isolator to surround the at least one motion capture element to approximate physical acceleration dampening of cerebrospinal fluid around the user's brain to minimize translation of linear acceleration and rotational acceleration of the event data to obtain an observed linear acceleration and an observed rotational acceleration of the user's brain. Thus, embodiments may eliminate processing to translate forces or acceleration values or any other values from the helmet based acceleration to the observed brain acceleration values. Therefore, embodiments utilize less power and storage to provide event specific data, which in turn minimizes the amount of data transfer, which yields lower transmission power utilization and even lower total power utilization. Different isolators may be utilized on a football/hockey/lacrosse player's helmet based on the type of padding inherent in the helmet. Other embodiments utilized in sports where helmets are not worn, or occasionally worn may also utilize at least one motion capture sensor on a cap or hat, for example on a baseball player's hat, along with at least one sensor mounted on a batting helmet. Headband mounts may also be utilized in sports where a cap is not utilized, such as soccer to also determine concussions. In one or more embodiments, the isolator utilized on a helmet may remain in the enclosure attached to the helmet and the sensor may be removed and placed on another piece of equipment that does not make use of an isolator that matches the dampening of a user's brain fluids. Embodiments may automatically detect a type of motion and determine the type of equipment that the motion capture sensor is currently attached to based on characteristic motion patterns associated with certain types of equipment, i.e., surfboard versus baseball bat, snow board and skate board, etc.

Embodiments of the invention may obtain/calculate a linear acceleration value or a rotational acceleration value or both. This enables rotational events to be monitored for concussions as well as linear accelerations. In one or more embodiments, other events may make use of the linear and/or rotational acceleration and/or velocity, for example as compared against patterns or templates to not only switch sensor personalities during an event to alter the capture characteristics dynamically, but also to characterize the type of equipment currently being utilized with the current motion capture sensor. As such, in at least one embodiment, a single motion capture element may be purchased by a user to instrument multiple pieces of equipment or clothing by enabling the sensor to automatically determine what type of equipment or piece of clothing the sensor is coupled to based on the motion captured by the sensor when compared against characteristic patterns or templates of motion.

Embodiments of the invention may transmit the event data associated with the event using a connectionless broadcast message. In one or more embodiments, depending on the communication protocol employed, broadcast messages may include payloads with a limited amount of data that may be utilized to avoid handshaking and overhead of a connection based protocol. In other embodiments connectionless or connection based protocols may be utilized in any combination.

In one or more embodiments, the computer may access previously stored event data or motion analysis data associated with at least one other user, or the user, or at least one other piece of equipment, or the piece of equipment, for example to determine the number of concussions or falls or other swings, or any other motion event. Embodiments may also display information including a presentation of the event data associated with the at least one user on a display based on the event data or motion analysis data associated with the user or piece of equipment and the previously stored event data or motion analysis data associated with the user or piece of equipment or with the at least one other user or the at least one other piece of equipment. This enables comparison of motion events, in number or quantitative value, e.g., the maximum rotational acceleration observed by the user or other users in a particular game or historically. In addition, in at least one embodiment, patterns or templates that define characteristic motion of particular pieces of equipment for typical events may be dynamically updated, for example on a central server or locally, and dynamically updated in motion capture sensors via the communication interface in one or more embodiments. This enables sensors to improve over time.

Embodiments of the invention may transmit the information to a display on a visual display coupled with the computer or a remote computer, for example over broadcast television or the Internet for example. Embodiments of the display may also accept sub-event time locations to provide discrete scrolling along the timeline of the whole event. For example a golf swing may include sub-events such as an address, swing back, swing forward, strike, follow through. The system may display time locations for the sub-events and accept user input near the location to assert that the video should start or stop at that point in time, or scroll to or back to that point in time for ease of viewing sub-events for example.

Embodiments of the invention may also include an identifier coupled with the at least one motion capture sensor or the user or the piece of equipment. In one or more embodiments, the identifier may include a team and jersey number or student identifier number or license number or any other identifier that enables relatively unique identification of a particular event from a particular user or piece of equipment. This enables team sports or locations with multiple players or users to be identified with respect to the app that may receive data associated with a particular player or user. One or more embodiments receive the identifier, for example a passive RFID identifier or MAC address or other serial number associated with the player or user and associate the identifier with the event data and motion analysis data.

One or more embodiments of the at least one motion capture element may further include a light emitting element that may output light if the event occurs. This may be utilized to display a potential, mild or severe level of concussion on the outer portion of the helmet without any required communication to any external device for example. Different colors or flashing intervals may also be utilized to relay information related to the event. Alternatively, or in combination, the at least one motion capture element may further include an audio output element that may output sound if the event occurs or if the at least one motion capture sensor is out of range of the computer or wherein the computer may display and alert if the at least one motion capture sensor is out of range of the computer, or any combination thereof. Embodiments of the sensor may also utilize an LCD that outputs a coded analysis of the current event, for example in a Quick Response (QR) code or bar code for example so that a referee may obtain a snapshot of the analysis code on a mobile device locally, and so that the event is not viewed in a readable form on the sensor or transmitted and intercepted by anyone else.

In one or more embodiments, the at least one motion capture element further includes a location determination element coupled with the microcontroller. This may include a GPS (Global Positioning System) device for example. Alternatively, or in combination, the computer may triangulate the location in concert with another computer, or obtain the location from any other triangulation type of receiver, or calculate the location based on images captured via a camera coupled with the computer and known to be oriented in a particular direction, wherein the computer calculates an offset from the mobile device based on the direction and size of objects within the image for example.

In one or more embodiments, the computer may to request at least one image or video that contains the event from at least one camera proximal to the event. This may include a broadcast message requesting video from a particular proximal camera or a camera that is pointing in the direction of the event. In one or more embodiments, the computer may broadcast a request for camera locations proximal to the event or oriented to view the event, and optionally display the available cameras, or videos therefrom for the time duration around the event of interest. In one or more embodiments, the computer may display a list of one or more times at which the event has occurred, which enables the user obtain the desired event video via the computer, and/or to independently request the video from a third party with the desired event times. For example, one or more embodiments may obtain a video or other media, such as images, text, or audio, from a social media server.

In one or more embodiments, the at least one motion capture sensor is coupled with the mobile device and for example uses an internal motion sensor within or coupled with the mobile device. This enables motion capture and event recognition with minimal and ubiquitous hardware, e.g., using a mobile device with a built-in accelerometer. In one or more embodiments, a first mobile device may be coupled with a user recording motion data, while a second mobile device is utilized to record a video of the motion. In one or more embodiments, the user undergoing motion may gesture, e.g., tap N times on the mobile device to indicate that the second user's mobile device should start recording video or stop recording video. Any other gesture may be utilized to communicate event related or motion related indications between mobile devices.

Embodiments of the at least one motion capture sensor may include a temperature sensor, or the microcontroller may otherwise be coupled with a temperature sensor. In these embodiments, the microcontroller, or microprocessor, may transmit a temperature obtained from the temperature sensor as a temperature event, for example as a potential indication of heat stroke or hypothermia. Any other type of physiological sensor may be utilized, as well as any type of environmental sensor.

Thus embodiments of the invention may recognize any type of motion event, including events related to motion associated with the at least one motion capture sensor coupled with any combination of the user, or the piece of equipment or the mobile device or motion that is indicative of standing, walking, falling, a heat stroke, seizure, violent shaking, a concussion, a collision, abnormal gait, abnormal or non-existent breathing or any combination thereof or any other type of event having a duration of time during with motion occurs. For example, one or more embodiments may include an accelerometer in a motion capture element, and may recognize an event when the acceleration reading from the accelerometer exceeds a predefined threshold. Such events may correspond to the motion capture element experiencing significant forces, which in some embodiments may indicate events of interest. One or more embodiments may in addition or instead use for example the change in acceleration as an indicator of an event, since a rapid change in acceleration may indicate a shock or impact event. Embodiments may use any sensors and any functions of sensor data to detect events.

Embodiments of the invention may utilize data mining on the motion capture data to obtain patterns for users, equipment, or use the motion capture data or events of a given user or other user in particular embodiments of the invention. Data mining relates to discovering new patterns in large databases wherein the patterns are previously unknown. Many methods may be applied to the data to discover new patterns including statistical analysis, neural networks and artificial intelligence for example. Due to the large amount of data, automated data mining may be performed by one or more computers to find unknown patterns in the data. Unknown patterns may include groups of related data, anomalies in the data, dependencies between elements of the data, classifications and functions that model the data with minimal error or any other type of unknown pattern. Displays of data mining results may include displays that summarize newly discovered patterns in a way that is easier for a user to understand than large amounts of pure raw data. One of the results of the data mining process is improved market research reports, product improvement, lead generation and targeted sales. Generally, any type of data that will be subjected to data mining must be cleansed, data mined and the results of which are generally validated. Businesses may increase profits using data mining. Examples of benefits of embodiments of the invention include customer relationship management to highly target individuals based on patterns discovered in the data. In addition, market basket analysis data mining enables identifying products that are purchased or owned by the same individuals and which can be utilized to offer products to users that own one product but who do not own another product that is typically owned by other users.

Other areas of data mining include analyzing large sets of motion data from different users to suggest exercises to improve performance based on performance data from other users. For example if one user has less rotation of the hips during a swing versus the average user, then exercises to improve flexibility or strength may be suggested by the system. In a golf course embodiment, golf course planners may determine over a large amount of users on a golf course which holes should be adjusted in length or difficulty to obtain more discrete values for the average number of shots per hole, or for determining the amount of time between golfers, for example at a certain time of day or for golfers of a certain age. In addition, sports and medical applications of data mining include determining morphological changes in user performance over time, for example versus diet or exercise changes to determine what improves performance the most, or for example what times of the day, temperatures, or other conditions produce swing events that result in the furthest drive or lowest score. Use of motion capture data for a particular user or with respect to other users enables healthcare compliance, for example to ensure a person with diabetes moves a certain amount during the day, and morphological analysis to determine how a user's motion or range of motion has changed over time. Games may be played with motion capture data that enables virtual reality play against historical greats or other users. For example, a person may play against a previous performance of the same person or against the motion capture data of a friend. This allows users to play a game in a historic stadium or venue in a virtual reality environment, but with motion capture data acquired from the user or other users previously for example. Military planners may utilize the motion capture data to determine which soldiers are most fit and therefore eligible for special operations, or which ones should retire, or by coaches to determine when a player should rest based on the concussion events and severity thereof sustained by a player for example and potentially based on a mined time period where other users have increased performance after a concussion related event.

Embodiments of the system perform motion capture and/or display with an application for example that executes on mobile device that may include a visual display and an optional camera and which is capable of obtaining data from at least one motion capture element such as a visual marker and/or a wireless sensor. The system can also integrate with standalone cameras, or cameras on multiple mobile devices. The system also enables the user to analyze and display the motion capture data in a variety of ways that provide immediate easy to understand graphical information associated with the motion capture data. Motion capture elements utilized in the system intelligently store data for example related to events associated with striking a ball, making a ski turn, jumping, etc., and eliminate false events, and greatly improve memory usage and minimize storage requirements. In addition, the data may be stored for example for more than one event associated with the sporting equipment, for example multiple bat swings or for an entire round of golf or more if necessary at least until the data is downloaded to a mobile device or to the Internet. Data compression of captured data may also be utilized to store more motion capture data in a given amount of memory. Motion capture elements utilized in the system may intelligently power down portions of their circuitry to save power, for example power down transceivers until motion is detected of a certain type. Embodiments of the invention may also utilize flexible battery connectors to couple two or more batteries in parallel to increase the time the system may be utilized before replacing the batteries. Motion capture data is generally stored in memory such as a local database or in a network accessible database, any of which enables data mining described above. Any other type of data mining may be performed using embodiments of the invention, including searching for temporal changes of data related to one or more users and or simply searching for data related to a particular user or piece of equipment.

Other embodiments may display information such as music selections or music playlists to be played based on the motion related data. This for example enables a performance to be compared to another user's performance and select the type of music the other user plays, or to compare the performance relative to a threshold that determines what type of music selection to suggest or display.

Embodiments of the invention directed sports for example enable RFID or passive RFID tags to be placed on items that a user moves wherein embodiments of the system keep track of the motion. For example, by placing passive RFID tags on a particular helmet or cap, or protective mouthpiece for boxing, football, soccer or other contact sport, particular dumbbells at a gym, and by wearing motion capture elements such as gloves and with a pre-existing mobile device for example an IPHONE®, embodiments of the invention provide automatic safety compliance or fitness and/or healthcare compliance. This is achieved by keeping track of the motion, and via RFID or passive RFID, the weight that the user is lifting. Embodiments of the invention may thus add the number of repetitions multiplied by the amount of weight indicated by each RFID tag to calculate the number of calories burned by the user. In another example, an RFID tag coupled with a stationary bike, or wherein the stationary bike can mimic the identifier and/or communicate wirelessly to provide performance data and wherein the mobile computer includes an RFID reader, the number of rotations of the user's legs may be counted. Any other use of RFID or passive RFID is in keeping with the spirit of the invention. This enables doctors to remotely determine whether a user has complied with their medical recommendations, or exceeded linear or rotational acceleration indicative of a concussion for example. Embodiments may thus be utilized by users to ensure compliance and by doctors to lower their malpractice insurance rates since they are ensuring that their patients are complying with their recommendations, albeit remotely. Embodiments of the invention do not require RFID tags for medical compliance, but may utilize them. Embodiments of the invention directed at golf also enable golf shots for each club associated with a golfer to be counted through use of an identifier such as RFID tags on each club (or optionally via an identifier associated with motion capture electronics on a golf club or obtained remotely over the radio) and a mobile computer, for example an IPHONE® equipped with an RFID reader that concentrates the processing for golf shot counting on the mobile computer instead of on each golf club. Embodiments of the invention may also allow for the measurement of orientation (North/South, and/or two horizontal axes and the vertical axis) and acceleration using an inertial measurement unit, or accelerometers and/or magnetometers, and/or gyroscopes. This is not required for golf shot counting, although one or more embodiments may determine when the golf club has struck a golf ball through vibration analysis for example and then query a golfer whether to count a shot or not. This functionality may be combined with speed or acceleration threshold or range detection for example to determine whether the golf club was travelling within an acceptable speed or range, or acceleration or range for the "hit" to count. Wavelets may also be utilized to compare valid swing signatures to eliminate count shots or eliminate false strikes for example. This range may vary between different clubs, for example a driver speed range may be "greater than 30 mph" while a putter speed range may be "less than 20 mph", any range may be utilized with any club as desired, or the speed range may be ignored for example. Alternatively or in combination, the mobile computer may only query the golfer to count a shot if the golfer is not moving laterally, i.e., in a golf cart or walking, and/or wherein the golfer may have rotated or taken a shot as determined by a orientation or gyroscope sensor coupled with the mobile computer. The position of the stroke may be shown on a map on the mobile computer for example. In addition, GPS receivers with wireless radios may be placed within the tee markers and in the cups to give daily updates of distances and helps with reading putts and greens for example. The golfer may also wear virtual glasses that allow the golfer to see the golf course map, current location, distance to the hole, number of shots on the current hole, total number of shots and any other desired metric. If the user moves a certain distance, as determined by GPS for example, from the shot without counting the shot, the system may prompt the user on whether to count the shot or not. The system does not require a user to initiate a switch on a club to count a shot and does not require LED's or active or battery powered electronics on each club to count shots. The mobile computer may also accept gestures from the user to count a shot or not count a shot so that the golfer does not have to remove any gloves to operate the mobile computer. For embodiments that utilize position/orientation sensors, the system may only count shots when a club is oriented vertically for example when an impact is detected. The apparatus may also include identifiers that enable a specific apparatus to be identified. The identifiers may be a serial number for example. The identifier for example may originate from an RFID tag on each golf club, or optionally may include a serial number or other identifier associated with motion capture elements associated with a golf club. Utilizing this apparatus enables the identification of a specific golfer, specific club and also enables motion capture and/or display with a system that includes a television and/or mobile device having a visual display and an optional camera and capable of obtaining data from at least one motion capture element such as a visual marker and/or a wireless sensor. The system can also integrate with standalone cameras, or cameras on multiple mobile devices. The system also enables the user to analyze and display the motion capture data in a variety of ways that provide immediate and easy to understand graphical information associated with the motion capture data. The apparatus enables the system to also determine how "centered" an impact is with respect to a ball and a piece of equipment, such as a golf club for example. The system also allows for fitting of equipment including shoes, clubs, etc., and immediate purchasing of the equipment even if the equipment requires a custom assemble-to-order request from a vendor. Once the motion capture data, videos or images and shot count indications are obtained by the system, they may be stored locally, for example in a local database or sent over a wired or wireless interface to a remote database for example. Once in a database, the various elements including any data associated with the user, such as age, sex, height, weight, address, income or any other related information may be utilized in embodiments of the invention and/or subjected to data mining. One or more embodiments enable users or OEMs for example to pay for access to the data mining capabilities of the system.

For example, embodiments that utilize motion capture elements allow for analyzing the data obtained from the apparatus and enable the presentation of unique displays associated with the user, such as 3D overlays onto images of the body of the user to visually depict the captured motion data. In addition, these embodiments may also utilize active wireless technology such as BLUETOOTH® Low Energy for a range of up to 50 meters to communicate with a golfer's mobile computer. Embodiments of the invention also allow for display of queries for counting a stroke for example as a result of receiving a golf club ID, for example via an RFID reader or alternatively via wireless communication using BLUETOOTH® or IEEE 802.11 for example. Use of BLUETOOTH® Low Energy chips allows for a club to be in sleep mode for up to 3 years with a standard coin cell battery, thus reducing required maintenance. One or more embodiments of the invention may utilize more than one radio, of more than one technology for example. This allows for a level of redundancy that increases robustness of the system. For example, if one radio no longer functions, e.g., the BLUETOOTH® radio for example, then the IEEE 802.11 radio may be utilized to transfer data and warn the golfer that one of the radios is not functioning, while still allowing the golfer to record motion data and count shots associated with the particular club. For embodiments of the invention that utilize a mobile device (or more than one mobile device) without camera(s), sensor data may be utilized to generate displays of the captured motion data, while the mobile device may optionally obtain images from other cameras or other mobile devices with cameras. For example, display types that may or may not utilize images of the user may include ratings, calculated data and time line data. Ratings associated with the captured motion can also be displayed to the user in the form of numerical or graphical data with or without a user image, for example an "efficiency" rating. Other ratings may include linear acceleration and/or rotational acceleration values for the determination of concussions and other events for example. Calculated data, such as a predicted ball flight path data can be calculated and displayed on the mobile device with or without utilizing images of the user's body. Data depicted on a time line can also be displayed with or without images of the user to show the relative peaks of velocity for various parts of the equipment or user's body for example. Images from multiple cameras including multiple mobile devices, for example from a crowd of golf fans, may be combined into a BULLET TIME® visual effect characterized by slow motion of the golf swing shown from around the golfer at various angles at normal speed. All analyzed data may be displayed locally, or uploaded to the database along with the motion capture data, images/videos, shot count and location data where it may undergo data mining processes, wherein the system may charge a fee for access to the results for example.

In one or more embodiments, a user may play a golf course or hit tennis balls, or alternatively simply swing to generate motion capture data for example and when wearing virtual reality glasses, see an avatar of another user, whether virtual or real in an augmented reality environment. In other embodiments, the user moves a piece of equipment associated with any sport or simply move the user's own body coupled with motion capture sensors and view a virtual reality environment displayed in virtual reality glasses of the user's movement or movement of a piece of equipment so instrumented. Alternatively or in combination, a virtual reality room or other environment may be utilized to project the virtual reality avatars and motion data. Hence, embodiments of the system may allow a user on a real golf course to play along with another user at a different location that is not actually hitting balls along with a historical player whose motion data has been analyzed or a data mining constructed user based on one or more motion capture data sequences, and utilized by an embodiment of the system to project an avatar of the historical player. Each of the three players may play in turn, as if they were located in the same place.

Motion capture data and/or events can be displayed in many ways, for example tweeted, to a social network during or after motion capture. For example, if a certain amount of exercise or motion is performed, or calories performed, or a new sports power factor maximum has been obtained, the system can automatically tweet the new information to a social network site so that anyone connected to the Internet may be notified. Motion capture data, motion analyses, and videos may be transmitted in one or more embodiments to one or more social media sites, repositories, databases, servers, other computers, viewers, displays, other mobile devices, emergency services, or public agencies. The data uploaded to the Internet, i.e., a remote database or remote server or memory remote to the system may be viewed, analyzed or data mined by any computer that may obtain access to the data. This allows for remote compliance tweeting and/or compliance and/or original equipment manufacturers to determine for a given user what equipment for compliance or sporting equipment for sports related embodiments is working best and/or what equipment to suggest. Data mining also enables suggestions for users to improve their compliance and/or the planning of sports venues, including golf courses based on the data and/or metadata associated with users, such as age, or any other demographics that may be entered into the system. Remote storage of data also enables medical applications such as morphological analysis, range of motion over time, and diabetes prevention and exercise monitoring and compliance applications as stated. Other applications also allow for games that use real motion capture data from other users, or historical players whether alive or dead after analyzing videos of the historical players for example. Virtual reality and augmented virtual reality applications may also utilize the motion capture data or historical motion data. Military personnel such as commanders and/or doctors may utilize the motion and/or images in determine what type of G-forces a person has undergone from an explosion near an Improvised Explosive Device and automatically route the best type of medical aid automatically to the location of the motion capture sensor. One or more embodiments of the system may relay motion capture data over a G-force or velocity threshold, to their commanding officer or nearest medical personnel for example via a wireless communication link. Alternatively, embodiments of the invention may broadcast lightweight connectionless concussion related messages to any mobile devices listening, e.g., a referee's mobile phone to aid in the assistance of the injured player wherein the lightweight message includes an optional team/ jersey number and an acceleration related number such as a potential/probable concussion warning or indicator.

In one or more embodiments of the invention, fixed cameras such as at a tennis tournament, football game, baseball game, car or motorcycle race, golf tournament or other sporting event can be utilized with a communication interface located near the player/equipment having motion capture elements so as to obtain, analyze and display motion capture data. In this embodiment, real-time or near real-time motion data can be displayed on the video for augmented video replays. An increase in the entertainment level is thus created by visually displaying how fast equipment is moving during a shot, for example with rings drawn around a players hips and shoulders. Embodiments of the invention also allow images or videos from other players having mobile devices to be utilized on a mobile device related to another user so that users don't have to switch mobile phones for example. In one embodiment, a video obtained by a first user for a piece of sporting equipment in motion that is not associated with the second user having the video camera equipped mobile phone may automatically transfer the video to the first user for display with motion capture data associated with the first user. Video and images may be uploaded into the database and data mined through image analysis to determine the types/colors of clothing or shoes for example that users are wearing.

Based on the display of data, the user can determine the equipment that fits the best and immediately purchase the equipment, via the mobile device. For example, when deciding between two sets of skis, a user may try out both pairs that are instrumented with motion capture elements wherein the motion capture data is analyzed to determine which pair of skis enables more efficient movement. For golf embodiments, when deciding between two golf clubs, a user can take swings with different clubs and based on the analysis of the captured motion data and quantitatively determine which club performs better. Custom equipment may be ordered through an interface on the mobile device from a vendor that can assemble-to-order customer built equipment and ship the equipment to the user for example. Shaft lengths for putters for example that are a standard length can be custom made for a particular user based on captured motion data as a user putts with an adjustable length shaft for example. Based on data mining of the motion capture data and shot count data and distances for example allows for users having similar swing characteristics to be compared against a current user wherein equipment that delivers longer shots for a given swing velocity for a user of a particular size and age for example may be suggested or searched for by the user to improve performance. OEMs may determine that for given swing speeds, which make and model of club delivers the best overall performance as well. One skilled in the art will recognize that this applies to all activities involving motion, not just golf.

Embodiments of the system may utilize a variety of sensor types. In one or more embodiments of the invention, active sensors may integrate with a system that permits passive or active visual markers to be utilized to capture motion of particular points on a user's body or equipment. This may be performed in a simply two-dimensional manner or in a three-dimensional manner if the mobile device includes two or more cameras, or if multiple cameras or mobile devices are utilized to capture images such as video and share the images in order to create triangulated three-dimensional motion data from a set of two-dimensional images obtained from each camera. Another embodiment of the invention may utilize inertial measurement units (IMU)

or any other sensors that can produce any combination of weight, balance, posture, orientation, position, velocity, friction, acceleration, angular velocity and/or angular acceleration information to the mobile device. The sensors may thus obtain data that may include any combination of one or more values associated with orientation (vertical or North/South or both), position (either via through Global Positioning System, i.e., "GPS" or through triangulation), linear velocity (in all three axes), angular velocity (e.g., from a gyroscope), linear acceleration (in all three axes) (e.g., from an accelerometer), and angular acceleration. All motion capture data obtained from the various sensor types may be saved in a database for analysis, monitoring, compliance, game playing or other use and/or data mining, regardless of the sensor type.

In one or more embodiments of the invention, a sensor may be utilized that includes a passive marker or active marker on an outside surface of the sensor, so that the sensor may also be utilized for visual tracking (either two-dimensional or three-dimensional) and for orientation, position, velocity, acceleration, angular velocity, angular acceleration or any other physical quantity produced by the sensor. Visual marker embodiments of the motion capture element(s) may be passive or active, meaning that they may either have a visual portion that is visually trackable or may include a light emitting element such as a light emitting diode (LED) that allows for image tracking in low light conditions. This for example may be implemented with a graphical symbol or colored marker at the end of the shaft near the handle or at the opposing end of the golf club at the head of the club. Images or videos of the markers may be analyzed locally or saved in the database and analyzed and then utilized in data mining. In addition, for concussion related embodiments, the visual marker may emit a light that is indicative of a concussion, for example flashing yellow for a moderate concussion and fast flashing red for a sever concussion or any other visual or optional audio event indicators or both. As previously discussed, an LCD may output a local visual encoded message so that it is not intercepted or otherwise readable by anyone not having a mobile device local and equipped to read the code. This enables sensitive medical messages to only be read by a referee or local medical personnel for a concussion or paralysis related event for example.

Embodiments of the motion capture sensors may be generally mounted on or near one or more end or opposing ends of sporting equipment, for example such as a golf club and/or anywhere in between (for EI measurements) and may integrate with other sensors coupled to equipment, such as weapons, medical equipment, wristbands, shoes, pants, shirts, gloves, clubs, bats, racquets, balls, helmets, caps, mouthpieces, etc., and/or may be attached to a user in any possible manner. For example, a rifle to determine where the rifle was pointing when a recoil was detected by the motion capture sensor. This data may be transmitted to a central server, for example using a mobile computer such as a mobile phone or other device and analyzed for war games practice for example. In addition, one or more embodiments of the sensor can fit into a weight port of a golf club, and/or in the handle end of the golf club. Other embodiments may fit into the handle of, or end of, a tennis racquet or baseball bat for example. Embodiments that are related to safety or health monitoring may be coupled with a cap, helmet, and/or mouthpiece or in any other type of enclosure. One or more embodiments of the invention may also operate with balls that have integrated sensors as well. One or more embodiments of the mobile device may include a small mountable computer such as an IPOD® SHUFFLE® or IPOD® NANO® that may or may not have integrated displays, and which are small enough to mount on a shaft of a piece of sporting equipment and not affect a user's swing. Alternatively, the system may calculate the virtual flight path of a ball that has come in contact with equipment moved by a player. For example with a baseball bat or tennis racquet or golf club having a sensor integrated into a weight port of other portion of the end of the club striking the golf ball and having a second sensor located in the tip of the handle of the golf club, or in one or more gloves worn by the player, an angle of impact can be calculated for the club. By knowing the loft of the face of the club, an angle of flight may be calculated for the golf ball. In addition, by sampling the sensor at the end of the club at a high enough speed to determine oscillations indicative of where on the face of the club the golf ball was struck, a quality of impact may be determined. These types of measurements and the analysis thereof help an athlete improve, and for fitting purposes, allow an athlete to immediately purchase equipment that fits correctly. Centering data may be uploaded to the database and data mined for patterns related to the bats, racquets or clubs with the best centering on average, or the lowest torsion values for example on a manufacturer basis for product improvement. Any other unknown patterns in the data that are discovered may also be presented or suggested to users or search on by users, or paid for, for example by manufacturers or users.

One or more embodiments of the sensor may contain charging features such as mechanical eccentric weight, as utilized in some watches known as "automatic" or "self-winding" watches, optionally including a small generator, or inductive charging coils for indirect electromechanical charging of the sensor power supply. Other embodiments may utilize plugs for direct charging of the sensor power supply or electromechanical or microelectromechanical (MEMS) based charging elements. Any other type of power micro-harvesting technologies may be utilized in one or more embodiments of the invention. One or more embodiments of the sensor may utilize power saving features including gestures that power the sensor on or off. Such gestures may include motion, physical switches, contact with the sensor, wired or wireless commands to the sensor, for example from a mobile device that is associated with the particular sensors. Other elements that may couple with the sensor includes a battery, low power microcontroller, antenna and radio, heat sync, recharger and overcharge sensor for example. In addition, embodiments of the invention allow for power down of some or all of the components of the system until an electronic signal from accelerometers or a mechanical switch determines that the club has moved for example.

One or more embodiments of the invention enable Elasticity Inertia or EI measurement of sporting equipment and even body parts for example. Placement of embodiments of the sensor along the shaft of a golf club, tennis racquet, baseball bat, hockey stick, shoe, human arm or any other item that is not perfectly stiff enables measurement of the amount of flex at points where sensors are located or between sensors. The angular differences in the each sensor over time allow for not only calculation of a flex profile, but also a flex profile that is dependent on time or force. For example, known EI machines use static weights between to support points to determine an EI profile. These machines therefore cannot detect whether the EI profile is dependent upon the force applied or is dependent on the time at which the force is applied, for example EI profiles may be nonlinear with respect to force or time. Example materials that are known to have different physical properties with respect to time include Maxwell materials and non-Newtonian fluids.

A user may also view the captured motion data in a graphical form on the display of the mobile device or for example on a set of glasses that contains a video display. The captured motion data obtained from embodiments of the motion capture element may also be utilized to augment a virtual reality display of user in a virtual environment. Virtual reality or augmented reality views of patterns that are found in the database via data mining are also in keeping with the spirit of the invention. User's may also see augmented information such as an aim assist or aim guide that shows for example where a shot should be attempted to be placed for example based on existing wind conditions, or to account for hazards, e.g., trees that are in the way of a desired destination for a ball, i.e., the golf hole for example.

One or more embodiments of the invention include a motion event recognition and video synchronization system that includes at least one motion capture element that may couple with a user or piece of equipment or mobile device coupled with the user. The at least one motion capture element may include a memory, a sensor that may capture any combination of values associated with an orientation, position, velocity, acceleration, angular velocity, and angular acceleration of the at least one motion capture element, a communication interface, a microcontroller coupled with the memory, the sensor and the communication interface. In at least one embodiment, the microprocessor or microcontroller may collect data that includes sensor values from the sensor, store the data in the memory, analyze the data and recognize an event within the data to determine event data, transmit the event data associated with the event via the communication interface. The system may also include a mobile device that includes a computer, a communication interface that communicates with the communication interface of the motion capture element to obtain the event data associated with the event, wherein the computer is coupled with computer's communication interface, wherein the computer may receive the event data from the computer's communication interface. The computer may also analyze the event data to form motion analysis data, store the event data, or the motion analysis data, or both the event data and the motion analysis data, obtain an event start time and an event stop time from the event, request image data from camera that includes a video captured at least during a timespan from the event start time to the event stop time and display an event video on a display that includes both the event data, the motion analysis data or any combination thereof that occurs during the timespan from the event start time to the event stop time and the video captured during the timespan from the event start time to the event stop time.

Embodiments may synchronize clocks in the system using any type of synchronization methodology and in one or more embodiments the computer on the mobile device may determine a clock difference between the motion capture element and the mobile device and synchronize the motion analysis data with the video. For example, one or more embodiments of the invention provides procedures for multiple recording devices to synchronize information about the time, location, or orientation of each device, so that data recorded about events from different devices can be combined. Such recording devices may be embedded sensors, mobile phones with cameras or microphones, or more generally any devices that can record data relevant to an activity of interest. In one or more embodiments, this synchronization is accomplished by exchanging information between devices so that the devices can agree on a common measurement for time, location, or orientation. For example, a mobile phone and an embedded sensor may exchange messages with the current timestamps of their internal clocks; these messages allow a negotiation to occur wherein the two devices agree on a common time. Such messages may be exchanged periodically as needed to account for clock drift or motion of the devices after a previous synchronization. In other embodiments, multiple recording devices may use a common server or set of servers to obtain standardized measures of time, location, or orientation. For example, devices may use a GPS system to obtain absolute location information for each device. GPS systems may also be used to obtain standardized time. NTP (Network Time Protocol) servers may also be used as standardized time servers. Using servers allows devices to agree on common measurements without necessarily being configured at all times to communicate with one another.

In one or more embodiments of the invention, some of the recording devices may detect the occurrence of various events of interest. Some such events may occur at specific moments in time; others may occur over a time interval, wherein the detection includes detection of the start of an event and of the end of an event. These devices may record any combination of the time, location, or orientation of the recording device along with the event data, using the synchronized measurement bases for time, location, and orientation described above.

Embodiments of the computer on the mobile device may discard at least a portion of the video outside of the event start time to the event stop. In one or more embodiments, the computer may command or instruct other devices, including the computer or other computers, or another camera, or the camera or cameras that captured the video, to discard at least a portion of the video outside of the event start time to the event stop time. For example, in one or more embodiments of the invention, some of the recording devices capture data continuously to memory while awaiting the detection of an event. To conserve memory, some devices may store data to a more permanent local storage medium, or to a server, only when this data is proximate in time to a detected event. For example, in the absence of an event detection, newly recorded data may ultimately overwrite previously recorded data in memory. A circular buffer may be used in some embodiments as a typical implementation of such an overwriting scheme. When an event detection occurs, the recording device may store some configured amount of data prior to the start of the event, and some configured amount of data after the end of the event, in addition to storing the data captured during the event itself. Any pre or post time interval is considered part of the event start time and event stop time so that context of the event is shown in the video for example. Saving only the video for the event on the mobile device with camera or camera itself saves tremendous space and drastically reduces upload times.

Embodiments of the system may include a server computer remote to the mobile device and wherein the server computer discards at least a portion of the video outside of the event start time to the event stop and return the video captured during the timespan from the event start time to the event stop time to the computer in the mobile device.

In one or more embodiments, for example of the at least one motion capture element, the microprocessor may transmit the event to at least one other at least one motion capture sensor or element, or the computer, or at least one other mobile device or any combination thereof, and wherein the at least one other motion capture sensor or element or the at least one other mobile device or any combination thereof may save data or transmit data, or both, associated with the event, even if the at least one other motion capture element has not detected the event. For example, in embodiments with multiple recording devices operating simultaneously, one such device may detect an event and send a message to other recording devices that such an event detection has occurred. This message can include the timestamp of the start and/or stop of the event, using the synchronized time basis for the clocks of the various devices. The receiving devices, e.g., other motion capture sensors and/or cameras may use the event detection message to store data associated with the event to nonvolatile storage or to a server. The devices may store some amount of data prior to the start of the event and some amount of data after the end of the event, in addition to the data directly associated with the event. In this way all devices can record data simultaneously, but use an event trigger from only one of the devices to initiate saving of distributed event data from multiple sources.

Embodiments of the computer may save the video from the event start time to the event stop time with the motion analysis data that occurs from the event start time to the event stop time or a remote server may be utilized to save the video. In one or more embodiments of the invention, some of the recording devices may not be in direct communication with each other throughout the time period in which events may occur. In these situations, devices may save complete records of all of the data they have recorded to permanent storage or to a server. Saving of only data associated with events may not be possible in these situations because some devices may not be able to receive event trigger messages. In these situations, saved data can be processed after the fact to extract only the relevant portions associated with one or more detected events. For example, multiple mobile devices may record video of a player or performer, and upload this video continuously to a server for storage. Separately the player or performer may be equipped with an embedded sensor that is able to detect events such as particular motions or actions. Embedded sensor data may be uploaded to the same server either continuously or at a later time. Since all data, including the video streams as well as the embedded sensor data, is generally timestamped, video associated with the events detected by the embedded sensor can be extracted and combined on the server.

Embodiments of the server or computer may, while a communication link is open between the at least one motion capture sensor and the mobile device, discard at least a portion of the video outside of the event start time to the event stop and save the video from the event start time to the event stop time with the motion analysis data that occurs from the event start time to the event stop time. Alternatively, if the communication link is not open, embodiments of the computer may save video and after the event is received after the communication link is open, then discard at least a portion of the video outside of the event start time to the event stop and save the video from the event start time to the event stop time with the motion analysis data that occurs from the event start time to the event stop time. For example, in some embodiments of the invention, data may be uploaded to a server as described above, and the location and orientation data associated with each device's data stream may be used to extract data that is relevant to a detected event. For example, a large set of mobile devices may be used to record video at various locations throughout a golf tournament. This video data may be uploaded to a server either continuously or after the tournament. After the tournament, sensor data with event detections may also be uploaded to the same server. Post-processing of these various data streams can identify particular video streams that were recorded in the physical proximity of events that occurred and at the same time. Additional filters may select video streams where a camera was pointing in the correct direction to observe an event. These selected streams may be combined with the sensor data to form an aggregate data stream with multiple video angles showing an event.

The system may obtain video from a camera coupled with the mobile device, or any camera that is separate from or otherwise remote from the mobile device. In one or more embodiments, the video is obtained from a server remote to the mobile device, for example obtained after a query for video at a location and time interval.

Embodiments of the server or computer may synchronize the video and the event data, or the motion analysis data via image analysis to more accurately determine a start event frame or stop event frame in the video or both, that is most closely associated with the event start time or the event stop time or both. In one or more embodiments of the invention, synchronization of clocks between recording devices may be approximate. It may be desirable to improve the accuracy of synchronizing data feeds from multiple recording devices based on the view of an event from each device. In one or more embodiments, processing of multiple data streams is used to observe signatures of events in the different streams to assist with fine-grained synchronization. For example, an embedded sensor may be synchronized with a mobile device including a video camera, but the time synchronization may be accurate only to within 100 milliseconds. If the video camera is recording video at 30 frames per second, the video frame corresponding to an event detection on the embedded sensor can only be determined within 3 frames based on the synchronized timestamps alone. In one embodiment of the device, video frame image processing can be used to determine the precise frame corresponding most closely to the detected event. For instance, a shock from a snowboard hitting the ground that is detected by an inertial sensor may be correlated with the frame at which the geometric boundary of the snowboard makes contact with the ground. Other embodiments may use other image processing techniques or other methods of detecting event signatures to improve synchronization of multiple data feeds.

Embodiments of the at least one motion capture element may include a location determination element that may determine a location that is coupled with the microcontroller and wherein the microcontroller may transmit the location to the computer on the mobile device. In one or more embodiments, the system further includes a server wherein the microcontroller may transmit the location to the server, either directly or via the mobile device, and wherein the computer or server may form the event video from portions of the video based on the location and the event start time and the event stop time. For example, in one or more embodiments, the event video may be trimmed to a particular length of the event, and transcoded to any or video quality, and overlaid or otherwise integrated with motion analysis data or event data, e.g., velocity or acceleration data in any manner. Video may be stored locally in any resolution, depth, or image quality or compression type to store video or any other technique to maximize storage capacity or frame rate or with any compression type to minimize storage, whether a communication link is open or not between the mobile device, at least one motion capture sensor and/or server. In one or more embodiments, the velocity or other motion analysis data may be overlaid or otherwise combined, e.g., on a portion beneath the video, that includes the event start and stop time, that may include any number of seconds before and/or after the actual event to provide video of the swing before a ball strike event for example. In one or more embodiments, the at least one motion capture sensor and/or mobile device(s) may transmit events and video to a server wherein the server may determine that particular videos and sensor data occurred in a particular location at a particular time and construct event videos from several videos and several sensor events. The sensor events may be from one sensor or multiple sensors coupled with a user and/or piece of equipment for example. Thus the system may construct short videos that correspond to the events, which greatly decreases video storage requirements for example.

In one or more embodiments, the microcontroller or the computer may determine a location of the event or the microcontroller and the computer may determine the location of the event and correlate the location, for example by correlating or averaging the location to provide a central point of the event, and/or erroneous location data from initializing GPS sensors may be minimized. In this manner, a group of users with mobile devices may generate videos of a golfer teeing off, wherein the event location of the at least one motion capture device may be utilized and wherein the server may obtain videos from the spectators and generate an event video of the swing and ball strike of the professional golfer, wherein the event video may utilize frames from different cameras to generate a BULLET TIME® video from around the golfer as the golfer swings. The resulting video or videos may be trimmed to the duration of the event, e.g., from the event start time to the event stop time and/or with any pre or post predetermined time values around the event to ensure that the entire event is captured including any setup time and any follow through time for the swing or other event.

In at least one embodiment, the computer may request or broadcast a request from camera locations proximal to the event or oriented to view the event, or both, and may request the video from the at least one camera proximal to the event, wherein the video includes the event. For example, in one or more embodiments, the computer on the mobile device may request at least one image or video that contains the event from at least one camera proximal to the event directly by broadcasting a request for any videos taken in the area by any cameras, optionally that may include orientation information related to whether the camera was not only located proximally to the event, but also oriented or otherwise pointing at the event. In other embodiments, the video may be requested by the computer on the mobile device from a remote server. In this scenario, any location and/or time associated with an event may be utilized to return images and/or video near the event or taken at a time near the event, or both. In one or more embodiments, the computer or server may trim the video to correspond to the event duration and again, may utilize image processing techniques to further synchronize portions of an event, such as a ball strike with the corresponding frame in the video that matches the acceleration data corresponding to the ball strike on a piece of equipment for example.

Embodiments of the computer on the mobile device or on the server may display a list of one or more times at which an event has occurred or wherein one or more events has occurred. In this manner, a user may find events from a list to access the event videos in rapid fashion.

Embodiments of the invention may include at least one motion capture sensor that is physically coupled with the mobile device. These embodiments enable any type of mobile phone or camera system with an integrated sensor, such as any type of helmet mounted camera or any mount that includes both a camera and a motion capture sensor to generate event data and video data.

In some embodiments the system may also include one or more computers with a communication interface that can communicate with the communication interfaces of one or more motion capture elements to receive the event data associated with motion events. The computer may receive raw motion data, and it may analyze this data to determine events. In other embodiments the determination of events may occur in the motion capture element, and the computer may receive event data. Combinations of these two approaches are also possible in some embodiments.

In some embodiments the computer or computers may determine the start time and end time of a motion event from the event data. They may then request image data from a camera that has captured video or one or more images for some time interval at least within some portion of the time between this event start time and event end time. The term video in this specification will include individual images as well as continuous video, including the case of a camera that takes a single snapshot image during an event interval. This video data may then be associated with the motion data form a synchronized event video. Events may be gestured by a user by shaking or tapping a motion capture sensor a fixed number of times for example. Any type of predefined event including user gesture events may be utilized to control at least one camera to transfer generally concise event videos without requiring the transfer of huge raw video files.

In some embodiments the request of video from a camera may occur concurrently with the capture or analysis of motion data. In such embodiments the system will obtain or generate a notification that an event has begun, and it will then request that video be streamed from one or more cameras to the computer until the end of the event is detected. In other embodiments the request of video may occur after a camera has uploaded its video records to another computer, such as a server. In this case the computer will request video from the server rather than directly from the camera.

Various techniques may be used to perform synchronization of motion data and video data. Such techniques include clock synchronization methods well-known in the art, such as the network time protocol, that ensure that all devices—motion capture elements, computer, and cameras—use a common time base. In another technique the computer may compare its clock to an internal clock of the motion capture element and to an internal clock of a camera, by exchanging packets containing the current time as registered by each device. Other techniques analyze motion data and video data to align their different time bases for synchronization. For instance a particular video frame showing a contact with a ball may be aligned with a particular data frame from motion data showing a shock in an accelerometer; these frames can then be used effectively as key frames, to synchronize the motion data and the video data. The combined video data and motion data forms a synchronized event video with an integrated record of an event.

In one or more embodiments, a computer may receive or process motion data or video data may be a mobile device, including but not limited to a mobile telephone, a smartphone, a smart watch (such as for example an Apple Watch®), a tablet, a PDA, a laptop, a notebook, or any other device that can be easily transported or relocated. In other embodiments, such a computer may integrated into a camera, and in particular it may be integrated into the camera from which video data is obtained. In other embodiments, such a computer may be a desktop computer or a server computer, including but not limited to virtual computers running as virtual machines in a data center or in a cloud-based service. In some embodiments, the system may include multiple computers of any of the above types, and these computers may jointly perform the operations described in this specification. As will be obvious to one skilled in the art, such a distributed network of computers can divide tasks in many possible ways and can coordinate their actions to replicate the actions of a single centralized computer if desired. The term computer in this specification is intended to mean any or all of the above types of computers, and to include networks of multiple such computers acting together.

In one or more embodiments, the computer may obtain or create a sequence of synchronized event videos. The computer may display a composite summary of this sequence for a user to review the history of the events. For the videos associated with each event, in some embodiments this summary may include one or more thumbnail images generated from the videos. In other embodiments the summary may include smaller selections from the full event video. The composite summary may also include display of motion analysis or event data associated with each synchronized event video. In some embodiments, the computer may obtain a metric and display the value of this metric for each event. The display of these metric values may vary in different embodiments. In some embodiments the display of metric values may be a bar graph, line graph, or other graphical technique to show absolute or relative values. In other embodiments color-coding or other visual effects may be used. In other embodiments the numerical values of the metrics may be shown. Some embodiments may use combinations of these approaches.

In one or more embodiments, the computer may accept selection criteria for a metric of interest associated with the motion analysis data or event data of the sequence of events. For example, a user may provide criteria such as metrics exceeding a threshold, or inside a range, or outside a range. Any criteria may be used that may be applied to the metric values of the events. In response to the selection criteria, the computer may display only the synchronized event videos or their summaries (such as thumbnails) that meet the selection criteria. As an example, a user capturing golf swing event data may wish to see only those swings with the swing speed above 100 mph.

In some embodiments of the invention, the computer may sort and rank synchronized event videos for display based on the value of a selected metric, in addition to the filtering based on selection criteria as described above. Continuing the example above, the user capturing golf swing data may wish to see only those swings with swing speed above 100 mph, sorted with the highest swing speed shown first.

In one or more embodiments, the computer may generate a highlight reel, or fail reel, or both, of the matching set of synchronized events that combines the video for events that satisfy selection criteria. Other criteria may be utilized to create a fail reel that includes negative events, crashes, wipeouts or other unintended events for example. In at least one embodiment, the highlight reel or fail reel may include the entire video for the selected events, or a portion of the video that corresponds to the important moments in the event as determined by the motion analysis. In some embodiments the highlight reel or fail reel may include displays or overlays of data or graphics on or near the video or on selected frames showing the value of metrics from the motion analysis. Such a highlight reel or fail reel may be generated automatically for a user once the user indicates which events to include by specifying selection criteria. In some embodiments the computer may allow the user to edit the highlight reel or fail reel to add or remove events, to lengthen or shorten the video shown for each event, to add or remove graphic overlays for motion data, or to add special effects or soundtracks.

In embodiments with multiple camera, motion data and multiple video streams may be combined into a single synchronized event video. Videos from multiple cameras may provide different angles or views of an event, all synchronized to motion data and to a common time base. In some embodiments one or more videos may be available on one or more computers (such as servers or cloud services) and may be correlated later with event data. In these embodiments a computer may search for stored videos that were in the correct location and orientation to view an event. The computer could then retrieve the appropriate videos and combine them with event data to form a composite view of the event with video from multiple positions and angles.

In some embodiments the computer may select a particular video from the set of possible videos associated with an event. The selected video may be the best or most complete view of the event based on various possible criteria. In some embodiments the computer may use image analysis of each of the videos to determine the best selection. For example, some embodiments may use image analysis to determine which video is most complete in that the equipment or people of interest are least occluded or are most clearly visible. In some embodiments this image analysis may include analysis of the degree of shaking of a camera during the capture of the video, and selection of the video with the most stable images. In some embodiments a user may make the selection of a preferred video, or the user may assist the computer in making the selection by specifying the most important criteria.

In some embodiments, event data from a motion capture element may be used to send control messages to a camera that can record video for the event. In at least one embodiment, the computer may send a control message local to the computer or external to the computer to at least one camera. In one or more embodiments, such as embodiments with multiple cameras, control messages could be broadcast or could be send to a set of cameras during the event. These control messages may modify the video recording parameters of the at least one video based on the data or the event data, including the motion analysis data. For example, in at least one embodiment, a camera may be on standby and not recording while there is no event of interest in progress. In one or more embodiments, a computer may await event data, and once an event starts it may send a command to a camera to begin recording. Once the event has finished, in at least one embodiment, the computer may then send a command to the camera to stop recording. Such techniques may conserve camera power as well as video memory.

More generally in one or more embodiments, a computer may send control messages to a camera or cameras to modify any relevant video recording parameters in response to the data, event data or motion analysis data. In at least one embodiment, the recording parameters may for example include one or more of the frame rate, resolution, color depth, color or grayscale, compression method, and compression quality of the video, as well as turning recording on or off. As an example of where this may be useful, motion analysis data may indicate when a user or piece of equipment is moving rapidly; the frame rate of a video recording could be increased during periods of rapid motion in response, and decreased during periods of relatively slow motion. By using a higher frame rate during rapid motion, the user can slow the motion down during playback to observe high motion events in great detail. These techniques can allow cameras to conserve video memory and to use available memory efficiently for events of greatest interest.

In some embodiments, the computer may accept a sound track, for example from a user, and integrate this sound track into the synchronized event video. This integration would for example add an audio sound track during playback of an event video or a highlight reel or fail reel. Some embodiments may use event data or motion analysis data to integrate the sound track intelligently into the synchronized event video. For example, some embodiments may analyze a sound track to determine the beats of the sound track based for instance on time points of high audio amplitude. The beats of the sound track may then be synchronized with the event using event data or motion analysis data. For example such techniques may automatically speed up or slow down a sound track as the motion of a user or object increases or decreases. These techniques provide a rich media experience with audio and visual cues associated with an event.

In one or more embodiments, a computer may playback a synchronized event video on one or more displays. These displays may be directly attached to the computer, or may be remote on other devices. Using the event data or the motion analysis data, the computer may modify the playback to add or change various effects. These modifications may occur multiple times during playback, or even continuously during playback as the event data changes. For instance, during periods of low motion the playback may occur at normal speed, while during periods of high motion the playback may switch to slow motion to highlight the details of the motion. Modifications to playback speed may be made based on any observed or calculated characteristics of the event or the motion. For instance, event data may identify particular sub-events of interest, such as the striking of a ball, beginning or end of a jump, or any other interesting moments. The computer may modify the playback speed to slow down playback as the synchronized event video approaches these sub-events. This slowdown could increase continuously to highlight the sub-event in fine detail. Playback could even be stopped at the sub-event and await input from the user to continue. Playback slowdown could also be based on the value of one or more metrics from the motion analysis data or the event data. For example, motion analysis data may indicate the speed of a moving baseball bat or golf club, and playback speed could be adjusted continuously to be slower as the speed of such an object increases. Playback speed could be made very slow near the peak value of such metrics.

In other embodiments, modifications could be made to other playback characteristics not limited to playback speed. For example, the computer could modify any or all of playback speed, image brightness, image colors, image focus, image resolution, flashing special effects, or use of graphic overlays or borders. These modifications could be made based on motion analysis data, event data, sub-events, or any other characteristic of the synchronized event video. As an example, as playback approaches a sub-event of interest, a flashing special effect could be added, and a border could be added around objects of interest in the video such as a ball that is about to be struck by a piece of equipment.

In embodiments that include a sound track, modifications to playback characteristics can include modifications to the playback characteristics of the sound track. For example such modifications may include modifications to the volume, tempo, tone, or audio special effects of the sound track. For instance the volume and tempo of a sound track may be increased as playback approaches a sub-event of interest, to highlight the sub-event and to provide a more dynamic experience for the user watching and listening to the playback.

In one or more embodiments, a computer may use image analysis of a video to generate a metric from an object within the video. This metric may for instance measure some aspect of the motion of the object. Such metrics derived from image analysis may be used in addition to or in conjunction with metrics obtained from motion analysis of data from motion sensors. In some embodiments image analysis may use any of several techniques known in the art to locate the pixels associated with an object of interest. For instance, certain objects may be known to have specific colors, textures, or shapes, and these characteristics can be used to locate the objects in video frames. As an example, a tennis ball may be known to be approximately round, yellow, and of texture associate with the ball's materials. Using these characteristics image analysis can locate a tennis ball in a video frame. Using multiple video frames the approximate speed of the tennis ball could be calculated. For instance, assuming a stationary or almost stationary camera, the location of the tennis ball in three-dimensional space can be estimated based on the ball's location in the video frame and based on its size. The location in the frame gives the projection of the ball's location onto the image plane, and the size provides the depth of the ball relative to the camera. By using the ball's location in multiple frames, and by using the frame rate that gives the time difference between frames, the ball's velocity can be estimated.

In one or more embodiments, the microcontroller coupled to a motion capture element may communicate with other motion capture sensors to coordinate the capture of event data. The microcontroller may transmit a start of event notification to another motion capture sensor to trigger that other sensor to also capture event data. The other sensor may save its data locally for later upload, or it may transmit its event data via an open communication link to a computer while the event occurs. These techniques provide a type of master-slave architecture where one sensor can act as a master and can coordinate a network of slave sensors.

In one or more embodiments, a computer may obtain sensor values from other sensors, such as the at least one other sensor, in addition to motion capture sensors, where these other sensors are proximal to an event and provide other useful data associated with the event. For example, such other sensors may sense various combinations of temperature, humidity, wind, elevation, light, oxygen levels, sound and physiological metrics (like a heartbeat or heart rate). The computer may retrieve these other values and save them along with the event data and the motion analysis data to generate an extended record of the event during the timespan from the event start to the event stop.

In one or more embodiments, the system may include one or more sensor elements that measure motion or any desired sensor value. Sensor values may include for example, without limitation, one or more of orientation, position, velocity, acceleration, angular velocity, angular acceleration, electromagnetic field, temperature, humidity, wind, pressure, elevation, light, sound, or heart rate.

In one or more embodiments any computer or computers of the system may access or receive media information from one or more servers, and they may use this media information in conjunction with sensor data to detect and analyze events. Media information may include for example, without limitation, text, audio, image, and video information. The computer or computers may analyze the sensor data to recognize an event, and they may analyze the media information to confirm the event. Alternatively, in one or more embodiments the computer or computers may analyze the media information to recognize an event, and they may analyze the sensor data to confirm the event. One or more embodiments may analyze the combination of sensor data from sensor elements and media information from servers to detect, confirm, reject, characterize, measure, monitor, assign probabilities to, or analyze any type of event.

Media information may include for example, without limitation, one or more of email messages, voice calls, voicemails, audio recordings, video calls, video messages, video recordings, Tweets®, Instagrams®, text messages, chat messages, postings on social media sites, postings on blogs, or postings on wikis. Servers providing media information may include for example, without limitation, one or more of an email server, a social media site, a photo sharing site, a video sharing site, a blog, a wiki, a database, a newsgroup, an RSS server, a multimedia repository, a document repository, a text message server, and a Twitter® server.

One or more embodiments may combine the media information (such as video, text, images, or audio) obtained from servers with the sensor data or other information to generate integrated records of an event. For example, images or videos that capture an event, or commentaries on the event, may be retrieved from social media sites, filtered, summarized, and combined with sensor data and analyses; the combined information may then be reposted to social media sites as an integrated record of the event. The integrated event records may be curated to contain only highlights or selected media, or they may be comprehensive records containing all retrieved media.

One or more embodiments may analyze media information by searching text for key words or key phrases related to an event, by searching images for objects in those images that are related to an event, or by searching audio for sounds related to an event.

One or more embodiments of the system may obtain sensor data from a sensor element, and may obtain additional sensor data from additional sensors or additional computers. This additional sensor data may be used to detect events or to confirm events. One or more embodiments may employ a multi-stage event detection procedure that uses sensor data to detect a prospective event, and then uses additional sensor data, or media information, or both, to determine if the prospective event is a valid event or is a false positive.

One or more embodiments may use information from additional sensors to determine the type of an activity or the equipment used for an activity. For example, one or more embodiments may use temperature or altitude data from additional sensors to determine if motion data is associated with a surfing activity on a surfboard (high temperature and low altitude) or with a snowboarding activity on a snowboard (low temperature and high altitude).

One or more embodiments of the system may receive sensor data from sensors coupled to multiple users or multiple pieces of equipment. These embodiments may detect events that for example involve actions of multiple users that occur at related times, at related locations, or both. For example, one or more embodiments may analyze sensor data to detect individual events associated with a particular user or a particular piece of equipment, and may aggregate these individual events to search for collective events across users or equipment that are correlated in time or location. One or more embodiments may determine that a collective event has occurred if the number of individual events within a specified time and location range exceeds a threshold value. Alternatively, or in addition, one or more embodiments may generate aggregate metrics from sensor data associated with groups of individual users or individual pieces of equipment. These embodiments may detect collective events for example if one or more aggregate metrics exceeds certain threshold values. One or more embodiments may generate aggregate metrics for subgroups of users in particular areas, or at particular time ranges, to correlate sensor data from these users by time and location.

In one or more embodiments, motion analysis may involve analyzing the trajectory over time of a motion variable, such as for example position or velocity. Embodiments may analyze any motion variable that is included in sensor data or is derived from the sensor data or the video or any combination thereof. In one or more embodiments, certain trajectories of motion variables are more efficient or effective than other trajectories, and the motion analysis by the system may include comparing the efficiency of an observed trajectory to the efficiency of an optimal trajectory. An optimal trajectory may be determined based for example on a mechanical model of the moving objects, such as a biomechanical model for sports actions for example. An optimal trajectory may also be determined by analyzing data in the database to select a set of efficient examples, and by constructing an optimal trajectory from these examples. One or more embodiments may calculate an efficiency index for an observed trajectory that quantifies the comparison of this trajectory to an optimal trajectory.

In one or more embodiments an observed trajectory for an object of interest, such as for example a ball, may be compared to a desired trajectory for that object. In golf, for example, a desired trajectory for the golf ball is one that puts the ball in the hole. The actual trajectory of the object may be calculated based on video analysis, for example. In one or more embodiments, the system may further determine the changes necessary to transform the observed trajectory into the desired trajectory. Continuing the example of golf, the trajectory of a golf ball is determined largely by the impact conditions between the golf club and the ball, which determine the initial velocity of the ball after impact. These impact conditions may be measured by the system using for example the motion capture element. One or more embodiments may determine the changes necessary to the initial conditions or the impact conditions to achieve the desired trajectory.

Continuing the golf example, the trajectory of a golf ball during a putt, for example, is also a function of conditions of the putting green. Therefore calculating the desired trajectory for the golf ball may depend on the putting green, for example on its topography and friction. One or more embodiments may obtain a model of an area of activity and use this model to calculate desired trajectories for objects, and to calculate changes in initial conditions needed to transform observed trajectories into actual trajectories. Such a model may for example include information on the topography of the area, on the coefficients of friction at points of the area, on other forces between the area and the objects of interest, and on any other physical properties of points of the area.

One or more embodiments of the system include one or more computers coupled to the database. These computers may analyze the data in the database to generate various metrics, reports, graphics, charts, plots, alerts, and models. An analysis computer may be for example, without limitation, a mobile device, smart watch, a camera, a desktop computer, a server computer or any combination thereof. A computer used for database analysis may coincide with the processor or processors integrated into motion capture elements, cameras, or mobile devices.

One or more embodiments may develop a model of an area of activity using analysis of the database. Such a model may for example include factors like those discussed above, such as the topography of the area, on the coefficients of friction at points of the area, on other forces between the area and the objects of interest, and on any other physical properties of points of the area. Analysis of object motions that have occurred in the area and that are stored in the database may be used to derived such a model. Such a model may then be used to compute desired trajectories and changes to initial conditions needed to transform actual trajectories into desired trajectories, as described above.

One or more embodiments may use motion analysis or analysis of the database to identify the time or location, or both, of one or more accidents. For example, accelerometers may be used in one or more embodiments to detect crashes. Alerts on accidents may be sent for example to one or more of an emergency service, a government agency, a safety agency, a quality control organization, and a group of persons potentially at risk for additional accidents similar to the one or more accidents.

One or more embodiments may use database analysis to identify the locations at which activities of interest have occurred. For example, continuing the example above of accidents, one or more embodiments may identify locations with unusually high accident rates. One or more embodiments may identify areas of a house or building with high levels of activity, or with unexpected activity. One or more embodiments may generate reports on areas of activity, including for example graphics that may be overlaid onto maps, videos, or images showing these areas of activity.

One or more embodiments may use database analysis to determine whether a piece of equipment has been used in a legitimate manner. For example, legitimate use of baseball bat may be limited to hitting baseballs; non-legitimate use may include for example hitting the bat against a tree, a telephone pole, or a sidewalk. One or more embodiments may obtain signatures of legitimate use and signatures of non-legitimate use, and analyze motion events in the database against these signatures to determine whether the equipment has been used correctly.

One or more embodiments of the system may use motion capture elements mounted on or near a joint of user in order to measure the rotation and range of motion of the joint. For example, one or more embodiments may use two (or more) motion capture elements on either side of a joint, where each motion capture element measures orientation; the joint rotation may then be determined from the difference in orientation on the two sides of the joint. Sensors that measure orientation may include for example, without limitation, accelerometers, magnetometers, and rate gyroscopes. Motion data for joint movements may be stored in the database, and database analysis may be used by one or more embodiments to compare joint rotation angles over time to previous values, and to a target value for example. One or more embodiments may compare a measured range of motion to a threshold or target value, or a target range. One or more embodiments may send an alert message, for example to a medical team or to the user, if the range of motion exceeds a target value or a threshold value.

One or more embodiments of the system may use microphones to capture audio signals, and use these audio signals in conjunction with other sensor and video data for event detection and motion analysis. Microphones may be incorporated in motion capture elements, in mobile devices, in cameras, in computers; in one or more embodiments stand-alone microphones may be used for audio capture. One or more embodiments may correlate audio signatures with sensor data signatures to differentiate between true events and false positive events.

Embodiments of the invention may automatically generate or select one more tags for events, based for example on analysis of sensor data. Event data with tags may be stored in an event database for subsequent retrieval and analysis. Tags may represent for example, without limitation, activity types, players, timestamps, stages of an activity, performance levels, or scoring results.

One or more embodiments may also analyze media such as text, audio, images, or videos from social media sites or other servers to generate, modify, or confirm event tags. Media analyzed may include for example, without limitation, email messages, voice calls, voicemails, audio recordings, video calls, video messages, video recordings, text messages, chat messages, postings on social media sites, postings on blogs, or postings on wikis. Sources of media for analysis may include for example, without limitation, an email server, a social media site, a photo sharing site, a video sharing site, a blog, a wiki, a database, a newsgroup, an RSS server, a multimedia repository, a document repository, and a text message server. Analysis may include searching of text for key words and phrases related to an event. Event tags and other event data may be published to social media sites or to other servers or information systems.

One or more embodiments may provide the capability for users to manually add tags to events, and to filter or query events based on the automatic or manual tags. Embodiments of the system may generate a video highlight reel for a selected set of events matching a set of tags. One or more embodiments may discard portions of video based on the event analysis and tagging; for example, analysis may indicate a time interval with significant event activity, and video outside this time interval may be discarded, e.g., to save tremendous amounts of memory, and/or not transferred to another computer to save significant time in uploading the relevant events without the non-event data for example.

BRIEF DESCRIPTION OF THE DRAWINGS

The above and other aspects, features and advantages of the ideas conveyed through this disclosure will be more apparent from the following more particular description thereof, presented in conjunction with the following drawings wherein:

FIG. 1 illustrates an embodiment of the multi-sensor event detection and tagging system.

FIG. 1G illustrates a flow chart for an embodiment of the system for intermittent data broadcast scenarios.

FIG. 4A illustrates a top cross sectional view of the helmet, padding, cranium, and brain of a user. FIG. 4B illustrates a rotational concussion event for the various elements shown in FIG. 4.

FIG. 14 illustrates an embodiment of the motion capture element with optional LED visual indicator for local display and viewing of event related information and an optional LCD to display a text or encoded message associated with the event.

FIG. 17 illustrates an embodiment of the algorithm utilized by any computer in FIG. 1 that displays motion images and motion capture data in a combined format.

FIG. 19 illustrates the detection of an event by one of the motion capture sensors, transmission of the event detection to other motion capture sensors and/or cameras, saving of the event motion data and trimming of the video to correspond to the event.

FIG. 29 illustrates an embodiment of the system that analyzes impact events for a baseball bat to determine whether the bat was used legitimately for hitting baseballs, or was used for other purposes.

FIG. 33 illustrates an embodiment that uses sensor data to identify highlight frames, displays highlight frames with motion metrics, and discards frames outside the highlighted timeframe.

FIG. 33A illustrates an embodiment that uses sensor data to identify epic fail frames, displays these fail frames with motion metrics, and discards frames outside the fail timeframe.

FIG. 34 illustrates an embodiment of the system that combines sensor data analysis with analysis of text, audio, images and video from servers to detect an event.

FIG. 35 illustrates an embodiment that analyzes text to classify an event; it uses a weighting factor for each event and keyword combination to compute an event score from the keywords located in the analyzed text.

DETAILED DESCRIPTION OF THE INVENTION

Figure 1A:
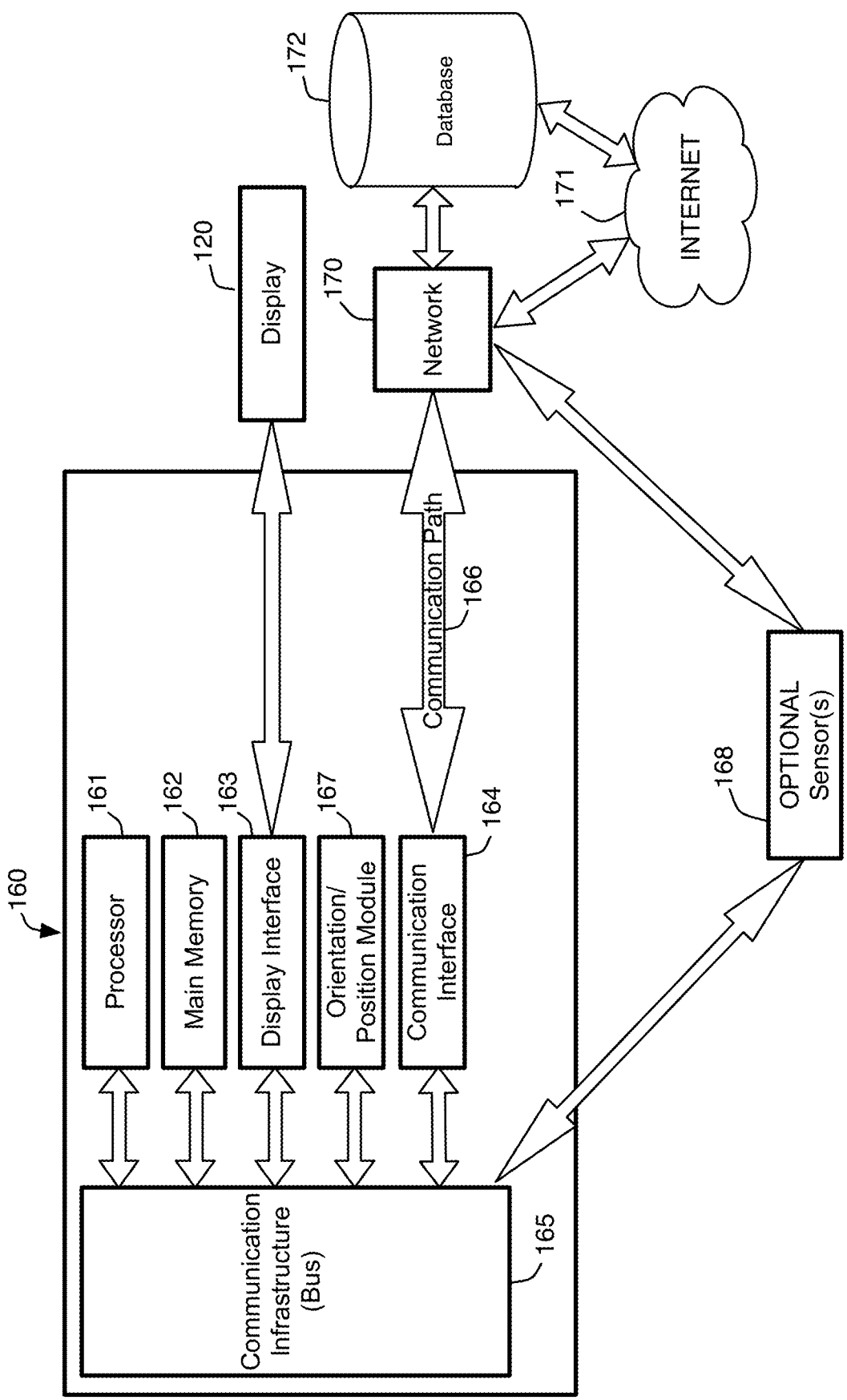
FIG. 1A illustrates a logical hardware block diagram of an embodiment of the computer.

A multi-sensor event detection and tagging system will now be described. In the following exemplary description numerous specific details are set forth in order to provide a more thorough understanding of the ideas described throughout this specification. It will be apparent, however, to an artisan of ordinary skill that embodiments of ideas described herein may be practiced without incorporating all aspects of the specific details described herein. In other instances, specific aspects well known to those of ordinary skill in the art have not been described in detail so as not to obscure the disclosure. Readers should note that although examples of the innovative concepts are set forth throughout this disclosure, the claims, and the full scope of any equivalents, are what define the invention.

FIG. 1 illustrates an embodiment of the multi-sensor event detection and tagging system 100. At least one embodiments enables intelligent analysis of event data from a variety of sensors and/or non-sensor data, for example blog, chat, or social media postings to generate an event, and publish the event and/or generate event videos. Enables intelligent analysis, synchronization, and transfer of generally concise event videos synchronized with motion data from motion capture sensor(s) coupled with a user or piece of equipment. Event data including video and motion capture data are saved to database. Events are analyzed as they occur, and correlated from a variety of sensors for example. Analysis of events stored in the database identifies trends, correlations, models, and patterns in event data. Greatly saves storage and increases upload speed by uploading event videos and avoiding upload of non-pertinent portions of large videos. Provides intelligent selection of multiple videos from multiple cameras covering an event at a given time, for example selecting one with least shake. Enables near real-time alteration of camera parameters during an event determined by the motion capture sensor, and alteration of playback parameters and special effects for synchronized event videos. Creates highlight reels filtered by metrics and can sort by metric. Integrates with multiple sensors to save event data even if other sensors do not detect the event. Also enables analysis or comparison of movement associated with the same user, other user, historical user or group of users. At least one embodiment provides intelligent recognition of events within motion data including but not limited to motion capture data obtained from portable wireless motion capture elements such as visual markers and sensors, radio frequency identification tags and mobile device computer systems, or calculated based on analyzed movement associated with the same user, or compared against the user or another other user, historical user or group of users. Enables low memory utilization for event data and video data by trimming motion data and videos to correspond to the detected events. This may be performed on the mobile device or on a remote server and based on location and/or time of the event and based on the location and/or time of the video, and may optionally include the orientation of the camera to further limit the videos that may include the motion events. Embodiments enable event based viewing and low power transmission of events and communication with an app executing on a mobile device and/or with external cameras to designate windows that define the events. Enables recognition of motion events, and designation of events within images or videos, such as a shot, move or swing of a player, a concussion of a player, boxer, rider or driver, or a heat stroke, hypothermia, seizure, asthma attack, epileptic attack or any other sporting or physical motion related event including walking and falling. Events may be correlated with one or more images or video as captured from internal/external camera or cameras or nanny cam, for example to enable saving video of the event, such as the first steps of a child, violent shaking events, sporting events including concussions, or falling events associated with an elderly person. Concussion related events and other events may be monitored for linear acceleration thresholds and/or patterns as well as rotational acceleration and velocity thresholds and/or patterns and/or saved on an event basis and/or transferred over lightweight connectionless protocols or any combination thereof. One or more embodiments may create integrated, curated records of an event by combining sensor data with media retrieved from social media postings.

Embodiments also enable event based viewing and low power transmission of events and communication with an app executing on a mobile device and/or with external cameras to designate windows that define the events. Enables recognition of event, including motion events, and designation of events within images or videos, such as a shot, move or swing of a player, a concussion of a player, boxer, rider or driver, or a heat stroke, hypothermia, seizure, asthma attack, epileptic attack or any other sporting or physical motion related event including walking and falling. Events may be correlated with one or more images or video as captured from internal/external camera or cameras or nanny cam, for example to enable saving video of the event, such as the first steps of a child, violent shaking events, sporting events including concussions, or falling events associated with an elderly person. As shown, embodiments of the system generally include a mobile device 101 and applications that execute thereon, that includes computer 160, shown as located internally in mobile device 101 as a dotted outline, (i.e., also see functional view of computer 160 in FIG. 1A), display 120 coupled to computer 160 and a communication interface, such as a second communication interface, (generally internal to the mobile device, see element 164 in FIG. 1A) coupled with the computer. In one or more embodiments, mobile device 101 may be for example, without limitation, a smart phone, a mobile phone, a laptop computer, a notebook computer, a tablet computer, a personal digital assistant, a music player, or a smart watch (including for example an Apple Watch®). Since mobile phones having mobile computers are ubiquitous, users of the system may purchase one or more motion capture elements and an application, a.k.a., "app", that they install on their pre-existing phone to implement an embodiment of the system. Motion capture capabilities are thus available at an affordable price for any user that already owns a mobile phone, tablet computer, smart watch, music player, etc., which has never been possible before.

Each mobile device 101, 102, 102a, 102b may optionally include an internal identifier reader 190, for example an RFID reader, or may couple with an identifier reader or RFID reader (see mobile device 102) to obtain identifier 191. Alternatively, embodiments of the invention may utilize any wired or wireless communication technology in any of the devices to communicate an identifier that identifies equipment 110 to the system. Embodiments of the invention may also include any other type of identifier coupled with the at least one motion capture sensor or the user or the piece of equipment. In one or more embodiments, the identifier may include a team and jersey number or student identifier number or license number or any other identifier that enables relatively unique identification of a particular event from a particular user or piece of equipment. This enables team sports or locations with multiple players or users to be identified with respect to the app that may receive data associated with a particular player or user. One or more embodiments receive the identifier, for example a passive RFID identifier or MAC address or other serial number associated with the player or user and associate the identifier with the event data and motion analysis data.

The system generally includes at least one sensor, which may be any type of environment sensor, physiological sensor and/or motion sensor. For example, computer 101 may include an altimeter, or thermometer or obtain these values wirelessly. Sensor or smart watch 191 may include a heart rate monitor or may obtain values from an internal medical device wirelessly for example. In addition embodiments may include motion capture element 111 that couples with user 150 or with piece of equipment 110, for example via mount 192, for example to a golf club, or baseball bat, tennis racquet, hockey stick, weapon, stick, sword, snow board, surf board, skate board, or any other board or piece of equipment for any sport, or other sporting equipment such as a shoe, belt, gloves, glasses, hat, or any other item. The at least one motion capture element 111 may be placed at one end, both ends, or anywhere between both ends of piece of equipment 110 or anywhere on user 150, e.g., on a cap, headband, helmet, mouthpiece or any combination thereof, and may also be utilized for EI measurements of any item. The motion capture element may optionally include a visual marker, either passive or active, and/or may include a sensor, for example any sensor capable of providing any combination of one or more values associated with an orientation (North/South and/or up/down), position, velocity, acceleration, angular velocity, and angular acceleration of the motion capture element. The computer may obtain data associated with an identifier unique to each piece of equipment 110, e.g., clothing, bat, etc., for example from an RFID coupled with club 110, i.e., identifier 191, and optionally associated with the at least one motion capture element, either visually or via a communication interface receiving data from the motion capture element, analyze the data to form motion analysis data and display the motion analysis data on display 120 of mobile device 101. Motion capture element 111 may be mounted on or near the equipment or on or near the user via motion capture mount 192. Motion capture element 111 mounted on a helmet for example may include an isolator including a material that is may surround the motion capture element to approximate physical acceleration dampening of cerebrospinal fluid around the user's brain to minimize translation of linear acceleration and rotational acceleration of event data to obtain an observed linear acceleration and an observed rotational acceleration of the user's brain. This lowers processing requirements on the motion capture element microcontroller for example and enables low memory utilization and lower power requirements for event based transmission of event data. The motion capture data from motion capture element 111, any data associated with the piece of equipment 110, such as identifier 191 and any data associated with user 150, or any number of such users 150, such as second user 152 may be stored in locally in memory, or in a database local to the computer or in a remote database, for example database 172 for example that may be coupled with a server. Data from any sensor type, or event data from analysis of sensor data may be stored in database 172 from each user 150, 152 for example when a network or telephonic network link is available from motion capture element 111 to mobile device 101 and from mobile device 101 to network 170 or Internet 171 and to database 172. Data mining is then performed on a large data set associated with any number of users and their specific characteristics and performance parameters. For example, in a golf embodiment of the invention, a club ID is obtained from the golf club and a shot is detected by the motion capture element. Mobile computer 101 stores images/video of the user and receives the motion capture data for the events/hits/shots/motion and the location of the event on the course and subsequent shots and determines any parameters for each event, such as distance or speed at the time of the event and then performs any local analysis and display performance data on the mobile device. When a network connection from the mobile device to network 170 or Internet 171 is available or for example after a round of golf, the images/video, motion capture data and performance data is uploaded to database 172, for later analysis and/or display and/or data mining. In one or more embodiments, users 151, such as original equipment manufacturers pay for access to the database, for example via a computer such as computer 105 or mobile computer 101 or from any other computer capable of communicating with database 172 for example via network 170, Internet 171 or via website 173 or a server that forms part of or is coupled with database 172. Data mining may execute on database 172, for example that may include a local server computer, or may be run on computer 105 or mobile device 101, 102, 102*a* or 102*b* and access a stand-alone embodiment of database 172 for example. Data mining results may be displayed on mobile device 101, computer 105, television broadcast or web video originating from camera 130, 130*a* and 103*b*, or 104 or accessed via website 173 or any combination thereof.

One or more embodiments of the at least one motion capture element may further include a light emitting element that may output light if the event occurs. This may be utilized to display a potential, mild or severe level of concussion on the outer portion of the helmet without any required communication to any external device for example. Different colors or flashing intervals may also be utilized to relay information related to the event. Alternatively, or in combination, the at least one motion capture element may further include an audio output element that may output sound if the event occurs or if the at least one motion capture sensor is out of range of the computer or wherein the computer may display and alert if the at least one motion capture sensor is out of range of the computer, or any combination thereof. Embodiments of the sensor may also utilize an LCD that outputs a coded analysis of the current event, for example in a Quick Response (QR) code or bar code for example so that a referee may obtain a snapshot of the analysis code on a mobile device locally, and so that the event is not viewed in a readable form on the sensor or transmitted and intercepted by anyone else.

One or more embodiments of the system may utilize a mobile device that includes at least one camera 130, for example coupled to the computer within the mobile device. This allows for the computer within mobile device 101 to command or instruct the camera 130, or any other devices, the computer or any other computer, to obtain an image or images, for example of the user during an athletic movement. The image(s) of the user may be overlaid with displays and ratings to make the motion analysis data more understandable to a human for example. Alternatively, detailed data displays without images of the user may also be displayed on display 120 or for example on the display of computer 105. In this manner two-dimensional images and subsequent display thereof is enabled. If mobile device 101 contains two cameras, as shown in mobile device 102, i.e., cameras 130*a* and 130*b*, then the cameras may be utilized to create a three-dimensional data set through image analysis of the visual markers for example. This allows for distances and positions of visual markers to be ascertained and analyzed. Images and/or video from any camera in any embodiments of the invention may be stored on database 172, for example associated with user 150, for data mining purposes. In one or more embodiments of the invention image analysis on the images and/or video may be performed to determine make/models of equipment, clothes, shoes, etc., that is utilized, for example per age of user 150 or time of day of play, or to discover any other pattern in the data. Cameras may have field of views F2 and F3 at locations L1, L2 and L3 for example, and the user may have range of motion S, and dimensions L.

Alternatively, for embodiments of mobile devices that have only one camera, multiple mobile devices may be utilized to obtain two-dimensional data in the form of images that is triangulated to determine the positions of visual markers. In one or more embodiments of the system, mobile device 101 and mobile device 102*a* share image data of user 150 to create three-dimensional motion analysis data. By determining the positions of mobile devices 101 and 102 (via position determination elements such as GPS chips in the devices as is common, or via cell tower triangulation and which are not shown for brevity but are generally located internally in mobile devices just as computer 160 is), and by obtaining data from motion capture element 111 for example locations of pixels in the images where the visual markers are in each image, distances and hence speeds are readily obtained as one skilled in the art will recognize.

Camera 103 may also be utilized either for still images or as is now common, for video. In embodiments of the system that utilize external cameras, any method of obtaining data from the external camera is in keeping with the spirit of the system including for example wireless communication of the data, or via wired communication as when camera 103 is docked with computer 105 for example, which then may transfer the data to mobile device 101.

In one or more embodiments of the system, the mobile device on which the motion analysis data is displayed is not required to have a camera, i.e., mobile device 102*b* may display data even though it is not configured with a camera. As such, mobile device 102*b* may obtain images from any combination of cameras on mobile device 101, 102, 102*a*, camera 103 and/or television camera 104 so long as any external camera may communicate images to mobile device 102*b*. Alternatively, no camera is required at all to utilize the system. See also FIG. 17.

For television broadcasts, motion capture element 111 wirelessly transmits data that is received by antenna 106. The wireless sensor data thus obtained from motion capture element 111 is combined with the images obtained from television camera 104 to produce displays with augmented motion analysis data that can be broadcast to televisions, computers such as computer 105, mobile devices 101, 102, 102*a*, 102*b* or any other device that may display images. The motion analysis data can be positioned on display 120 for example by knowing the location of a camera (for example via GPS information), and by knowing the direction and/or orientation that the camera is pointing so long as the sensor data includes location data (for example GPS information). In other embodiments, visual markers or image processing may be utilized to lock the motion analysis data to the image, e.g., the golf club head can be tracked in the images and the corresponding high, middle and low position of the club can be utilized to determine the orientation of user 150 to camera 130 or 104 or 103 for example to correctly plot the augmented data onto the image of user 150. By time stamping images and time stamping motion capture data, for example after synchronizing the timer in the microcontroller with the timer on the mobile device and then scanning the images for visual markers or sporting equipment at various positions, simplified motion capture data may be overlaid onto the images. Any other method of combining images from a camera and motion capture data may be utilized in one or more embodiments of the invention. Any other algorithm for properly positioning the motion analysis data on display 120 with respect to a user (or any other display such as on computer 105) may be utilized in keeping with the spirit of the system. For example, when obtaining events or groups of events via the sensor, after the app receives the events and/or time ranges to obtain images, the app may request image data from that time span from it's local memory, any other mobile device, any other type of camera that may be communicated with and/or post event locations/times so that external camera systems local to the event(s) may provide image data for the times of the event(s).

One such display that may be generated and displayed on mobile device 101 include a BULLET TIME® view using two or more cameras selected from mobile devices 101, 102, 102*a*, camera 103, and/or television camera 104 or any other external camera. In this embodiment of the system, the computer may obtain two or more images of user 150 and data associated with the at least one motion capture element (whether a visual marker or sensor), wherein the two or more images are obtained from two or more cameras and wherein the computer may generate a display that shows slow motion of user 150 shown from around the user at various angles at normal speed. Such an embodiment for example allows a group of fans to create their own BULLET TIME® shot of a golf pro at a tournament for example. The shots may be sent to computer 105 and any image processing required may be performed on computer 105 and broadcast to a television audience for example. In other embodiments of the system, the users of the various mobile devices share their own set of images, and or upload their shots to a website for later viewing for example. Embodiments of the invention also allow images or videos from other players having mobile devices to be utilized on a mobile device related to another user so that users don't have to switch mobile phones for example. In one embodiment, a video obtained by a first user for a piece of equipment in motion that is not associated with the second user having the video camera mobile phone may automatically transfer the video to the first user for display with motion capture data associated with the first user. Alternatively, the first user's mobile phone may be utilized as a motion sensor in place of or in addition to motion capture element 111 and the second user's mobile phone may be utilized to capture video of the first user while in motion. The first user may optionally gesture on the phone, tap/shake, etc., to indicate that the second mobile phone should start/stop motion capture for example.

FIG. 1A shows an embodiment of computer 160. In computer 160 includes processor 161 that executes software modules, commonly also known as applications, generally stored as computer program instructions within main memory 162. Display interface 163 drives display 120 of mobile device 101 as shown in FIG. 1. Optional orientation/position module 167 may include a North/South or up/down orientation chip or both. In one or more embodiments, the orientation/position module may include a location determination element coupled with the microcontroller. This may include a GPS device for example. Alternatively, or in combination, the computer may triangulate the location in concert with another computer, or obtain the location from any other triangulation type of receiver, or calculate the location based on images captured via a camera coupled with the computer and known to be oriented in a particular direction, wherein the computer calculates an offset from the mobile device based on the direction and size of objects within the image for example. Optional sensors 168 may coupled with processor 161 via a wired or wireless link. Optional sensors may include for example, without limitation, motion sensors, inertial sensors, temperature sensors, humidity sensors, altitude sensors, pressure sensors, ultrasonic or optical rangefinders, magnetometers, heartbeat sensors, pulse sensors, breathing sensors, and any sensors of any biological functions or any other environmental or physiological sensor. The sensors may obtain data from network 170, or provide sensor data to network 170. In addition, Processor 161 may obtain data directly from sensors 168 or via the communications interface. Optional sensors 168 may be utilized for example as an indicator of hypothermia or heat stroke alone or in combination with any motion detected that may be indicative of shaking or unconsciousness for example. Communication interface 164 may include wireless or wired communications hardware protocol chips and/or an RFID reader or an RFID reader may couple to computer 160 externally or in any other manner for example. In one or more embodiments of the system communication interface may include telephonic and/or data communications hardware. In one or more embodiments communication interface 164 may include a Wi-Fi™ or other IEEE 802.11 device and/or BLUETOOTH® wireless communication interface or ZigBee® wireless device or any other wired or wireless technology. BLUETOOTH® class 1 devices have a range of approximately 100 meters, class 2 devices have a range of approximately 10 meters. BLUETOOTH® Low Power devices have a range of approximately 50 meters. Any network protocol or network media may be utilized in embodiments of the system so long as mobile device 101 and motion capture element 111 can communicate with one another. Processor 161, main memory 162, display interface 163, communication interface 164 and orientation/position module 167 may communicate with one another over communication infrastructure 165, which is commonly known as a "bus". Communications path 166 may include wired or wireless medium that allows for communication with other wired or wireless devices over network 170. Network 170 may communicate with Internet 171 and/or database 172. Database 172 may be utilized to save or retrieve images or videos of users, or motion analysis data, or users displayed with motion analysis data in one form or another. The data uploaded to the Internet, i.e., a remote database or remote server or memory remote to the system may be viewed, analyzed or data mined by any computer that may obtain access to the data. This allows for original equipment manufacturers to determine for a given user what sporting equipment is working best and/or what equipment to suggest. Data mining also enables the planning of golf courses based on the data and/or metadata associated with users, such as age, or any other demographics that may be entered into the system. Remote storage of data also enables medical applications such as morphological analysis, range of motion over time, and diabetes prevention and exercise monitoring and compliance applications. Data mining based applications also allow for games that use real motion capture data from other users, one or more previous performances of the same user, or historical players whether alive or dead after analyzing motion pictures or videos of the historical players for example. Virtual reality and augmented virtual reality applications may also utilize the motion capture data or historical motion data. The system also enables uploading of performance related events and/or motion capture data to database 172, which for example may be implemented as a social networking site. This allows for the user to "tweet" high scores, or other metrics during or after play to notify everyone on the Internet of the new event. For example, one or more embodiments include at least one motion capture element 111 that may couple with a user or piece of equipment or mobile device coupled with the user, wherein the at least one motion capture element includes a memory, such as a sensory data memory, a sensor that may capture any combination of values associated with an orientation, position, velocity, acceleration, angular velocity, and angular acceleration of the at least one motion capture element, one or more of a first communication interface and at least one other sensor, and a microcontroller, or microprocessor, coupled with the memory, the sensor and the first communication interface. According to at least embodiment of the invention, the microcontroller may be a microprocessor. The microcontroller, or microprocessor, may collect data that includes sensor values from the sensor, store the data in the memory, analyze the data and recognize an event within the data to determine event data and transmit the event data associated with the event via the communication interface. Embodiments of the system may also include an application that may execute on a mobile device wherein the mobile device includes a computer, a second communication interface that may communicate with the first communication interface of the motion capture element to obtain the event data associated with the event. The computer is coupled with the first communication interface wherein the computer executes the application or "app" to configure the computer to receive the event data from the communication interface, analyze the event data to form motion analysis data, store the event data, or the motion analysis data, or both the event data and the motion analysis data, and display information including the event data, or the motion analysis data, or both associated with the at least one user on a display.

Figure 1B:
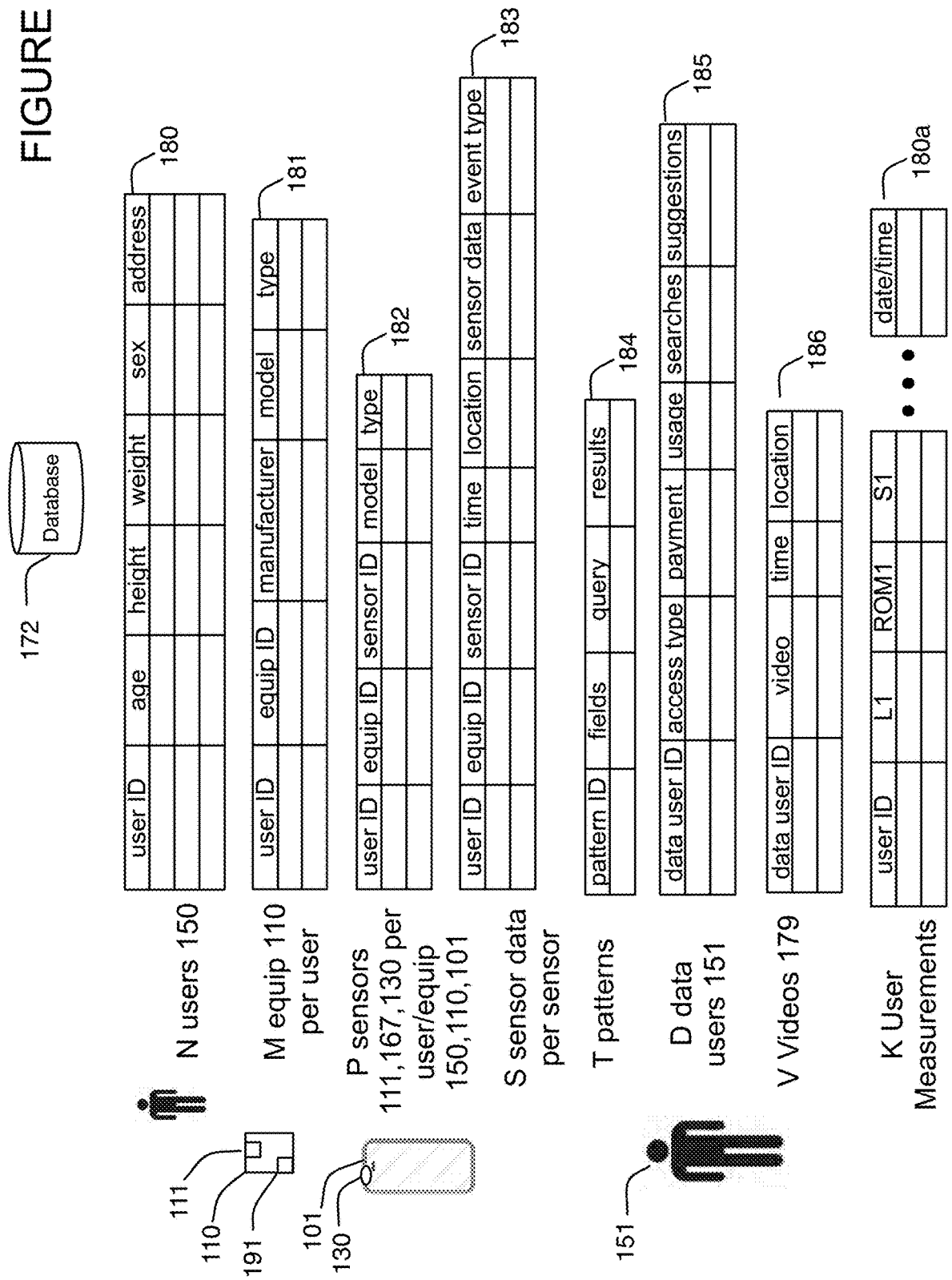
FIG. 1B illustrates an architectural view of an embodiment of the database utilized in embodiments of the system.

FIG. 1B illustrates an architectural view of an embodiment of database 172 utilized in embodiments of the system. As shown tables 180-186 include information related to N number of users, M pieces of equipment per user, P number of sensors per user or equipment, S number of sensor data per sensor, T number of patterns found in the other tables, D number of data users, V videos, and K user measurements (size, range of motion, speed for particular body parts/joints). All tables shown in FIG. 1B are exemplary and may include more or less information as desired for the particular implementation. Specifically, table 180 includes information related to user 150 which may include data related to the user such as age, height, weight, sex, address or any other data. Table 181 include information related to M number of pieces of equipment 110, which may include clubs, racquets, bats, shirts, pants, shoes, gloves, helmets, etc., for example the manufacturer of the equipment, model of the equipment, and type of the equipment. For example, in a golf embodiment, the manufacturer may be the name of the manufacturer, the model may be a name or model number and the type may be the club number, i.e., 9 iron, the equipment ID may be identifier 191 in one or more embodiments of the invention. Table 182 may include information related to P number of sensors 111 on user 150 or equipment 110 or mobile computer 101. The sensors associated with user 150 may include clothing, clubs, helmets, caps, headbands, mouthpieces, etc., the sensors associated with equipment 110 may for example be motion capture data sensors, while the sensors associated with mobile computer 101 may include sensors 167 for position/orientation and sensors 130 for images/video for example. Table 183 may include information related to S number of sensor data per user per equipment, wherein the table may include the time and location of the sensor data, or any other metadata related to the sensor data such as temperature, weather, humidity, as obtained locally via the temperature sensor shown in FIG. 1A, or via wired or wireless communications or in any other manner for example, or the sensor data may include this information or any combination thereof. The table may also contain a myriad of other fields, such as ball type, i.e., in a golf embodiment the type of golf ball utilized may be saved and later data mined for the best performing ball types, etc. This table may also include an event type as calculated locally, for example a potential concussion event. Table 184 may include information related to T number of patterns that have been found in the data mining process for example. This may include fields that have been searched in the various tables with a particular query and any resulting related results. Any data mining results table type may be utilized in one or more embodiments of the invention as desired for the particular implementation. This may include search results of any kind, including EI measurements, which also may be calculated on computer 160 locally, or any other search value from simple queries to complex pattern searches. Table 185 may include information related to D number of data mining users 151 and may include their access type, i.e., full database or pattern table, or limited to a particular manufacturer, etc., the table may also include payment requirements and/or receipts for the type of usage that the data mining user has paid for or agreed to pay for and any searches or suggestions related to any queries or patterns found for example. Any other schema, including object oriented database relationships or memory based data structures that allow for data mining of sensor data including motion capture data is in keeping with the spirit of the invention. Although exemplary embodiments for particular activities are given, one skilled in the art will appreciate that any type of motion based activity may be captured and analyzed by embodiments of the system using a motion capture element and app that runs on a user's existing cell phone 101, 102 or other computer 105 for example. Embodiments of the database may include V number of videos 179 as held in table 186 for example that include the user that generated the video, the video data, time and location of the video. The fields are optional and in one or more embodiments, the videos may be stored on any of the mobile devices in the system or any combination of the mobile devices and server/DB 172. In one or more embodiments, the videos may be broken into a subset of videos that are associated with the "time" field of the sensor data table 183, wherein the time field may include an event start time and event stop time. In this scenario, large videos may be trimmed into one or more smaller event videos that correspond to generally smaller time windows associated with events of the event type held in table 183 to greatly reduce video storage requirements of the system. Table 180a may include information related to K number of user measurements, for example of lengths, speeds, ranges of motion, or other measurements of user dimensions or movements over time.

There are a myriad of applications that benefit and which are enabled by embodiments of the system that provide for viewing and analyzing motion capture data on the mobile computer or server/database, for example for data mining database 172 by users 151. For example, users 151 may include compliance monitors, including for example parents, children or elderly, managers, doctors, insurance companies, police, military, or any other entity such as equipment manufacturers that may data mine for product improvement. For example in a tennis embodiment by searching for top service speeds for users of a particular size or age, or in a golf embodiment by searching for distances, i.e., differences in sequential locations in table 183 based on swing speed in the sensor data field in table 183 to determine which manufacturers have the best clubs, or best clubs per age or height or weight per user, or a myriad of other patterns. Other embodiments related to compliance enable messages from mobile computer 101 or from server/database to be generated if thresholds for G-forces, (high or zero or any other levels), to be sent to compliance monitors, managers, doctors, insurance companies, etc., as previously described. Users 151 may include marketing personnel that determine which pieces of equipment certain users own and which related items that other similar users may own, in order to target sales at particular users. Users 151 may include medical personnel that may determine how much movement a sensor for example coupled with a shoe, i.e., a type of equipment, of a diabetic child has moved and how much this movement relates to the average non-diabetic child, wherein suggestions as per table 185 may include giving incentives to the diabetic child to exercise more, etc., to bring the child in line with healthy children. Sports physicians, physiologists or physical therapists may utilize the data per user, or search over a large number of users and compare a particular movement of a user or range of motion for example to other users to determine what areas a given user can improve on through stretching or exercise and which range of motion areas change over time per user or per population and for example what type of equipment a user may utilize to account for changes over time, even before those changes take place. Data mining motion capture data and image data related to motion provides unique advantages to users 151. Data mining may be performed on flex parameters measured by the sensors to determine if sporting equipment, shoes, human body parts or any other item changes in flexibility over time or between equipment manufacturers or any combination thereof.

To ensure that analysis of user 150 during a motion capture includes images that are relatively associated with the horizon, i.e., not tilted, the system may include an orientation module that executes on computer 160 within mobile device 101 for example. The computer is may prompt a user to align the camera along a horizontal plane based on orientation data obtained from orientation hardware within mobile device 101. Orientation hardware is common on mobile devices as one skilled in the art will appreciate. This allows the image so captured to remain relatively level with respect to the horizontal plane. The orientation module may also prompt the user to move the camera toward or away from the user, or zoom in or out to the user to place the user within a graphical "fit box", to somewhat normalize the size of the user to be captured. Images may also be utilized by users to prove that they have complied with doctor's orders for example to meet certain motion requirements.

Embodiments of the system may recognize the at least one motion capture element associated with user 150 or piece of equipment 110 and associate at least one motion capture element 111 with assigned locations on user 150 or piece of equipment 110. For example, the user can shake a particular motion capture element when prompted by the computer within mobile device 101 to acknowledge which motion capture element the computer is requesting an identity for. Alternatively, motion sensor data may be analyzed for position and/or speed and/or acceleration when performing a known activity and automatically classified as to the location of mounting of the motion capture element automatically, or by prompting the user to acknowledge the assumed positions. Sensors may be associated with a particular player by team name and jersey number for example and stored in the memory of the motion capture sensor for transmission of events. Any computer shown in FIG. 1 may be utilized to program the identifier associated with the particular motion capture sensor in keeping with the spirit of the invention.

One or more embodiments of the computer in mobile device 101 may obtain at least one image of user 150 and display a three-dimensional overlay onto the at least one image of user 150 wherein the three-dimensional overlay is associated with the motion analysis data. Various displays may be displayed on display 120. The display of motion analysis data may include a rating associated with the motion analysis data, and/or a display of a calculated ball flight path associated with the motion analysis data and/or a display of a time line showing points in time along a time axis where peak values associated with the motion analysis data occur and/or a suggest training regimen to aid the user in improving mechanics of the user. These filtered or analyzed data sensor results may be stored in database 172, for example in table 183, or the raw data may be analyzed on the database (or server associated with the database or in any other computer or combination thereof in the system shown in FIG. 1 for example), and then displayed on mobile computer 101 or on website 173, or via a television broadcast from camera 104 for example. Data mining results may be combined in any manner with the unique displays of the system and shown in any desired manner as well.

Embodiments of the system may also present an interface to enable user 150 to purchase piece of equipment 110 over the second communication interface of mobile device 101, for example via the Internet, or via computer 105 which may be implemented as a server of a vendor. In addition, for custom fitting equipment, such as putter shaft lengths, or any other custom sizing of any type of equipment, embodiments of the system may present an interface to enable user 150 to order a customer fitted piece of equipment over the second communication interface of mobile device 101. Embodiments of the invention also enable mobile device 101 to suggest better performing equipment to user 150 or to allow user 150 to search for better performing equipment as determined by data mining of database 172 for distances of golf shots per club for users with swing velocities within a predefined range of user 150. This allows for real life performance data to be mined and utilized for example by users 151, such as OEMs to suggest equipment to user 150, and be charged for doing so, for example by paying for access to data mining results as displayed in any computer shown in FIG. 1 or via website 173 for example. In one or more embodiments of the invention database 172 keeps track of OEM data mining and may bill users 151 for the amount of access each of users 151 has purchased and/or used for example over a giving billing period. See FIG. 1B for example.

Embodiments of the system may analyze the data obtained from at least one motion capture element and determine how centered a collision between a ball and the piece of equipment is based on oscillations of the at least one motion capture element coupled with the piece of equipment and display an impact location based on the motion analysis data. This performance data may also be stored in database 172 and used by OEMs or coaches for example to suggest clubs with higher probability of a centered hit as data mined over a large number of collisions for example.

While FIG. 1A depicts a physical device, the scope of the systems and methods set forth herein may also encompass a virtual device, virtual machine or simulator embodied in one or more computer programs executing on a computer or computer system and acting or providing a computer system environment compatible with the methods and processes implementing the disclosed ideas. Where a virtual machine, process, device or otherwise performs substantially similarly to that of a physical computer system of the system, such a virtual platform will also fall within the scope of a system of the disclosure, notwithstanding the description herein of a physical system such as that in FIG. 1A.

Figure 1C:
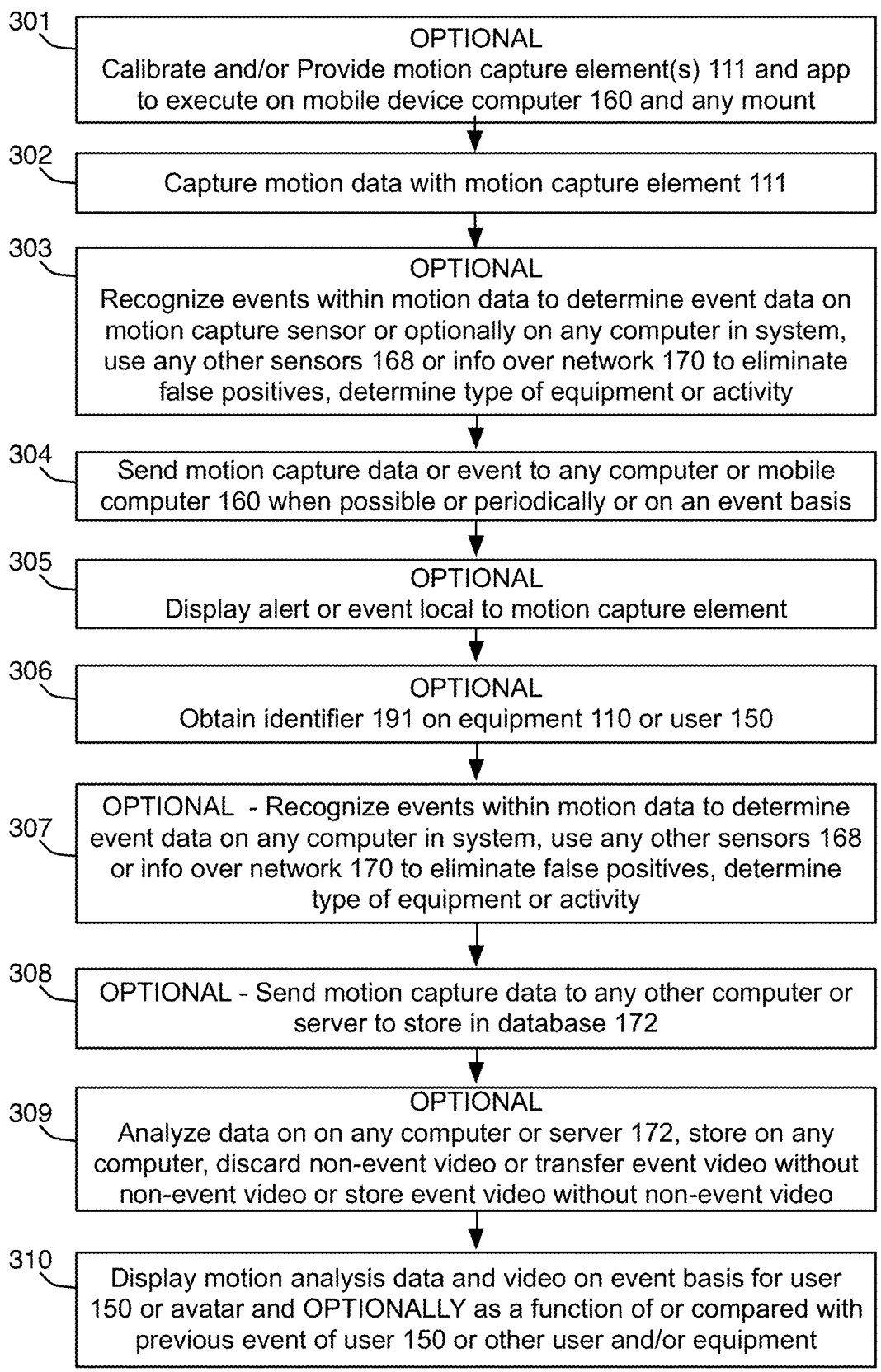
FIG. 1C illustrates a flow chart for an embodiment of the processing performed by embodiments of the computers in the system as shown in FIGS. 1 and 1A.

FIG. 1C illustrates a flow chart for an embodiment of the processing performed and enabled by embodiments of the computers utilized in the system. In one or more embodiments of the system, a plurality of motion capture elements are optionally calibrated at 301. In some embodiments this means calibrating multiple sensors on a user or piece of equipment to ensure that the sensors are aligned and/or set up with the same speed or acceleration values for a given input motion. In other embodiments of the invention, this means placing multiple motion capture sensors on a calibration object that moves and calibrates the orientation, position, velocity, acceleration, angular velocity, angular acceleration or any combination thereof at the same time. This step general includes providing motion capture elements and optional mount (or alternatively allowing a mobile device with motion capture sensing capabilities to be utilized), and an app for example that allows a user with an existing mobile phone or computer to utilize embodiments of the system to obtain motion capture data, and potentially analyze and/or send messages based thereon. In one or more embodiments, users may simply purchase a motion capture element and an app and begin immediately using the system. The system captures motion data with motion capture element(s) at 302, recognized any events within the motion capture data, i.e., a linear and/or rotational acceleration over a threshold indicative of a concussion, or a successful skateboard trick, and eliminate false positives through use of multiple sensors to correlate data and determine if indeed a true event has occurred for example at 303, and sends the motion capture data to a mobile computer 101, 102 or 105 for example, which may include an IPOD®, ITOUCH®, IPAD®, IPHONE®, ANDROID® Phone or any other type of computer that a user may utilize to locally collect data at 304. In one or more embodiments the sensor may transmit an event to any other motion capture sensor to start an event data storage process on the other sensors for example. In other embodiments, the sensor may transmit the event to other mobile devices to signify that videos for the event should be saved with unneeded portions of the video discarded for example, to enable the video to be trimmed either near the point in time of the event or at a later time. In one or more embodiments, the system minimizes the complexity of the sensor and offloads processing to extremely capable computing elements found in existing mobile phones and other electronic devices for example. The transmitting of data from the motion capture elements to the user's computer may happen when possible, periodically, on an event basis, when polled, or in any other manner as will be described in various sections herein. This saves great amount of power compared to known systems that continuously send raw data in two ways, first data may be sent in event packets, within a time window around a particular motion event which greatly reduces the data to a meaningful small subset of total raw data, and secondly the data may be sent less than continuously, or at defined times, or when asked for data so as to limit the total number of transmissions. In one or more embodiments, the event may displayed locally, for example with an LED flashing on the motion capture sensor 111, for example yellow slow flashing for potential concussion or red fast flashing for probably concussion at 305. Alternatively, or in combination, the alert or event may be transmitted and displayed on any other computer or mobile device shown in FIG. 1 for example.

The main intelligence in the system is generally in the mobile computer or server where more processing power may be utilized and so as to take advantage of the communications capabilities that are ubiquitous in existing mobile computers for example. In one or more embodiments of the system, the mobile computer may optionally obtain an identifier from the user or equipment at 306, or this identifier may be transmitted as part of step 305, such as a passive RFID or active RFID or other identifier such as a team/jersey number or other player ID, which may be utilized by the mobile computer to determine what user has just been potentially injured, or what weight as user is lifting, or what shoes a user is running with, or what weapon a user is using, or what type of activity a user is using based on the identifier of the equipment. The mobile computer may analyze the motion capture data locally at 307 (just as in 303 or in combination therewith), and display, i.e., show or send information such as a message for example when a threshold is observed in the data, for example when too many G-forces have been registered by a player, soldier or race car driver, or when not enough motion is occurring (either at the time or based on the patterns of data in the database as discussed below based on the user's typical motion patterns or other user's motion patterns for example.) In other embodiments, once a user has performed a certain amount of motion, a message may be sent to safety or compliance monitor(s) at 307 to store or otherwise display the data, including for example referees, parents, children or elderly, managers, doctors, insurance companies, police, military, or any other entity such as equipment manufacturers. The message may be an SMS message, or email, or tweet or any other type of electronic communication. If the particular embodiment is configured for remote analysis or only remote analysis, then the motion capture data may be sent to the server/database at 308. If the implementation does not utilize a remote database, the analysis on the mobile computer is local. If the implementation includes a remote database, then the analysis may be performed on the mobile computer or server/database or both at 309. Once the database obtains the motion capture data, then the data may be analyzed and a message may be sent from the server/database to compliance personnel or business entities as desired to display the event alone or in combination or with respect to previous event data associated with the user or other users at 310, for example associated with video of the event having the user or an avatar of the user and for example as compared with previous performance data of the user or other user.

Embodiments of the invention make use of the data from the mobile computer and/or server for gaming, morphological comparing, compliance, tracking calories burned, work performed, monitoring of children or elderly based on motion or previous motion patterns that vary during the day and night, safety monitoring for players, troops when G-forces exceed a threshold or motion stops, local use of running, jumping throwing motion capture data for example on a cell phone including virtual reality applications that make use of the user's current and/or previous data or data from other users, or play music or select a play list based on the type of motion a user is performing or data mining. For example if motion is similar to a known player in the database, then that user's playlist may be sent to the user's mobile computer 101. The processing may be performed locally so if the motion is fast, fast music is played and if the motion is slow, then slow music may be played. Any other algorithm for playing music based on the motion of the user is in keeping with the spirit of the invention. Any use of motion capture data obtained from a motion capture element and app on an existing user's mobile computer is in keeping with the spirit of the invention, including using the motion data in virtual reality environments to show relative motion of an avatar of another player using actual motion data from the user in a previous performance or from another user including a historical player for example. Display of information is generally performed via three scenarios, wherein display information is based on the user's motion analysis data or related to the user's piece of equipment and previous data, wherein previous data may be from the same user/ equipment or one or more other users/equipment. Under this scenario, a comparison of the current motion analysis data with previous data associated with this user/equipment allows for patterns to be analyzed with an extremely cost effective system having a motion capture sensor and app. Under another scenario, the display of information is a function of the current user's performance, so that the previous data selected from the user or another user/equipment is based on the current user's performance. This enables highly realistic game play, for example a virtual tennis game against a historical player wherein the swings of a user are effectively responded to by the capture motion from a historical player. This type of realistic game play with actual data both current and previously stored data, for example a user playing against an average pattern of a top 10 player in tennis, i.e., the speed of serves, the speed and angle of return shots, for a given input shot of a user makes for game play that is as realistic as is possible. Television images may be for example analyzed to determine swing speeds and types of shots taken by historical players that may no longer be alive to test one's skills against a master, as if the master was still alive and currently playing the user. Compliance and monitoring by the user or a different user may be performed in a third scenario without comparison to the user's previous or other user's previous data wherein the different user does not have access to or own for example the mobile computer. In other words, the mobile phone is associated with the user being monitored and the different user is obtaining information related to the current performance of a user for example wearing a motion capture element, such as a baby, or a diabetes patient.

Figure 1D:
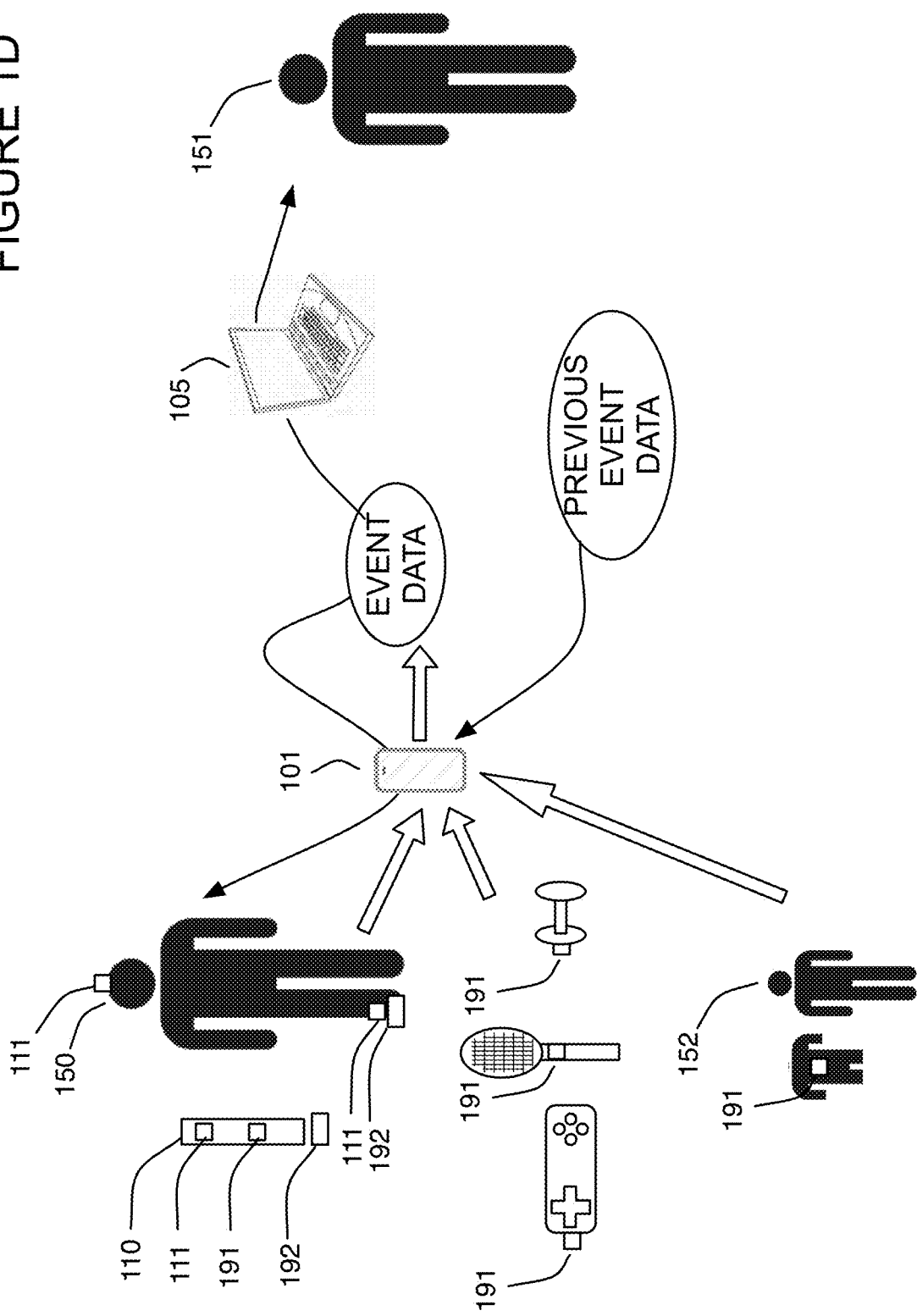
FIG. 1D illustrates a data flow diagram for an embodiment of the system.

FIG. 1D illustrates a data flow diagram for an embodiment of the system. As shown motion capture data is sent from a variety of motion capture elements 111 on many different types of equipment 110 or associated with user 150, for example on clothing, a helmet, headband, cap, mouthpiece or anywhere else coupled with the user. The equipment or user may optionally have an identifier 191 that enables the system to associate a value with the motion, i.e., the weight being lifted, the type of racquet being used, the type of electronic device being used, i.e., a game controller or other object such as baby pajamas associated with second user 152, e.g., a baby. In one or more embodiments, elements 191 in the figure may be replaced or augmented with motion capture elements 111 as one skilled in the art will appreciate. In one or more embodiments of the system, mobile computer 101 receives the motion capture data, for example in event form and for example on an event basis or when requested by mobile computer 101, e.g., after motion capture elements 111 declares that there is data and turns on a receiver for a fix amount of time to field requests so as to not waste power, and if no requests are received, then turn the receiver off for a period of time. Once the data is in mobile computer 101, then the data is analyzed, for example to take raw or event based motion capture data and for example determine items such as average speed, etc., that are more humanly understandable in a concise manner. The data may be stored, shown to the right of mobile computer 101 and then the data may be displayed to user 150, or 151, for example in the form of a monitor or compliance text or email or on a display associated with mobile computer 101 or computer 105. This enables users not associated with the motion capture element and optionally not even the mobile computer potentially to obtain monitor messages, for example saying that the baby is breathing slowly, or for example to watch a virtual reality match or performance, which may include a user supplying motion capture data currently, a user having previously stored data or a historical player, such as a famous golfer, etc., after analysis of motion in video from past tournament performance(s). In gaming scenarios, where the data obtained currently, for example from user 150 or equipment 110, the display of data, for example on virtual reality glasses may make use of the previous data from that user/equipment or another user/equipment to respond to the user's current motion data, i.e., as a function of the user's input. The previous data may be stored anywhere in the system, e.g., in the mobile computer 101, computer 105 or on the server or database 172 (see FIG. 1). The previous data may be utilized for example to indicate to user 151 that user 150 has undergone a certain number of potential concussion events, and therefore must heal for a particular amount of time before playing again. Insurance companies may demand such compliance to lower medical expenses for example. Video may be stored and retrieved from mobile device 101, computer 105 or as shown in FIG. 1, on server or in database coupled with server 172 to form event videos that include the event data and the video of the event shown simultaneously for example on a display, e.g., overlaid or shown in separate portions of the display of mobile computer 101 or computer 105 generally.

Figure 2A:
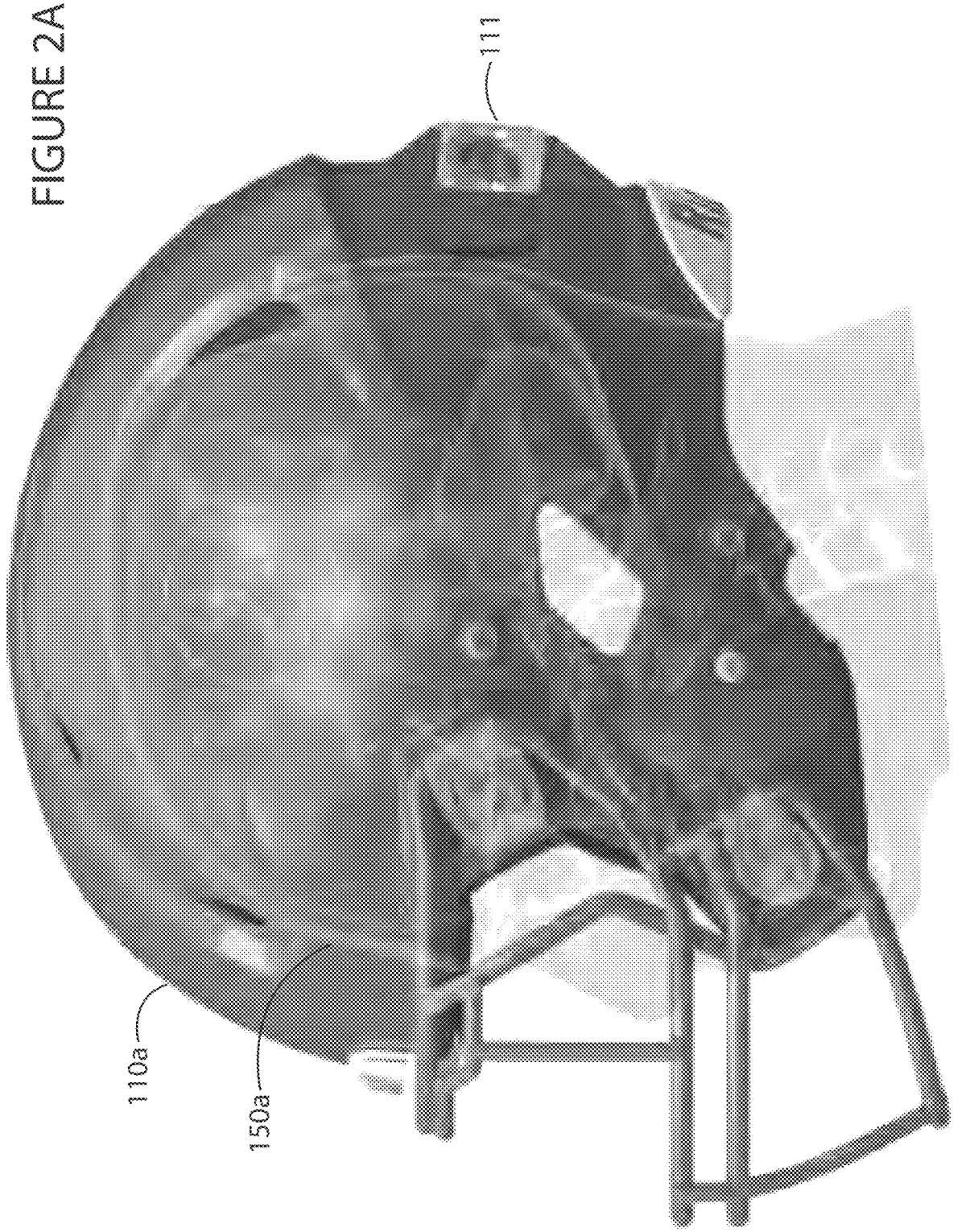
FIG. 2A illustrates a helmet based mount that surrounds the head of a user wherein the helmet based mount holds a motion capture sensor.
Figure 2B:
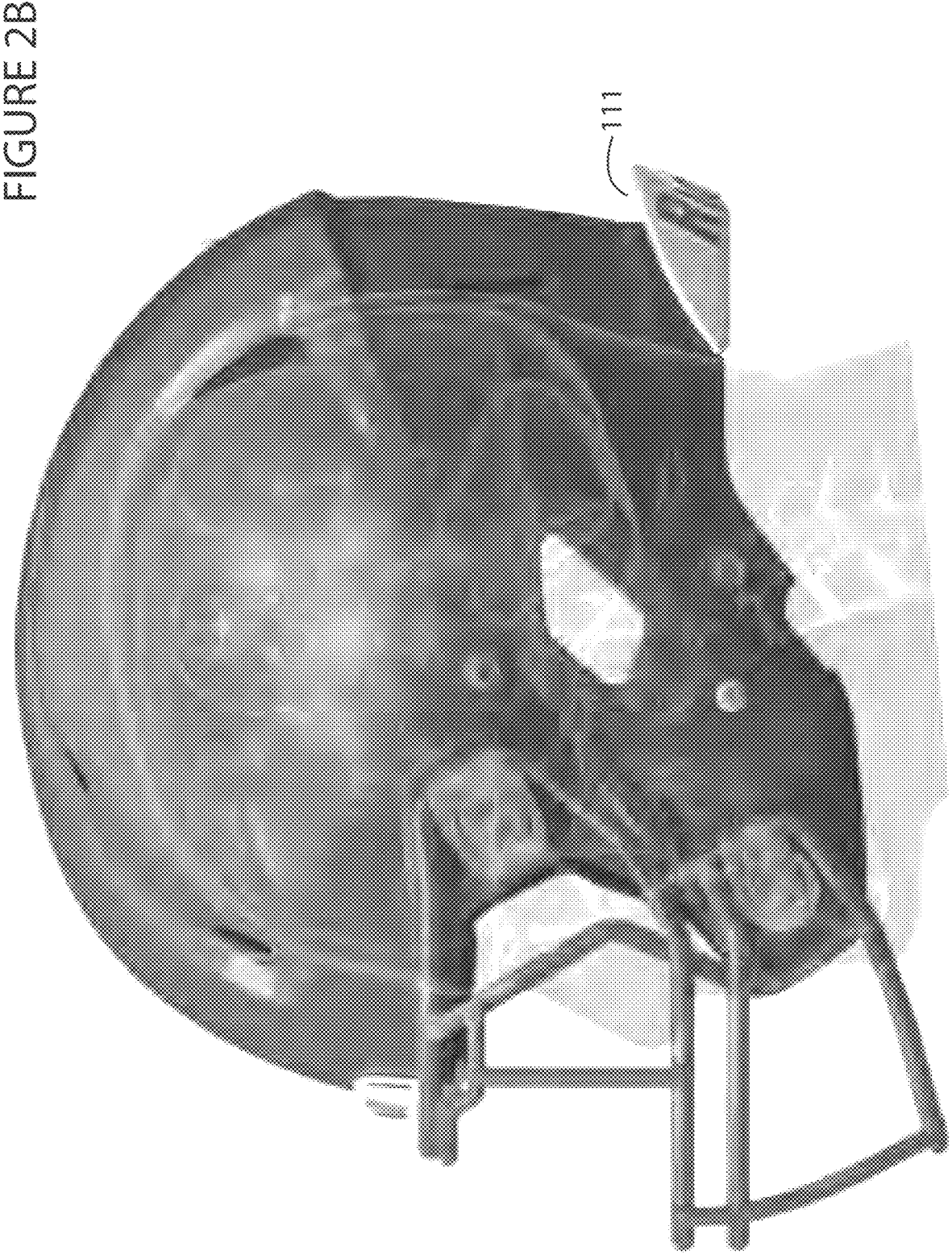
FIG. 2B illustrates a neck insert based mount that enables retrofitting existing helmets with a motion capture sensor.

FIG. 2A illustrates a helmet 110*a* based mount that surrounds the head 150*a* of a user wherein the helmet based mount holds a motion capture sensor 111, for example as shown on the rear portion of the helmet. FIG. 2B illustrates a neck insert based mount, shown at the bottom rear portion of the helmet, that enables retrofitting existing helmets with a motion capture sensor 111. In embodiments that include at least one motion capture sensor that may be coupled with or otherwise worn near the user's head 150*a*, the microcontroller, or microprocessor, may calculate of a location of impact on the user's head. The calculation of the location of impact on the user's head is based on the physical geometry of the user's head and/or helmet. For example, if motion capture element 111 indicates a rearward acceleration with no rotation (to the right in the figure as shown), then the location of impact may be calculated by tracing the vector of acceleration back to the direction of the outside perimeter of the helmet or user's head. This non-rotational calculation effectively indicates that the line of force passes near or through the center of gravity of the user's head/helmet, otherwise rotational forces are observed by motion capture element 111. If a sideward vector is observed at the motion capture element 111, then the impact point is calculated to be at the side of the helmet/head and through the center of gravity. Hence, any other impact that does not impart a rotational acceleration to the motion capture sensor over at least a time period near the peak of the acceleration for example, or during any other time period, may be assumed to be imparted in a direction to the helmet/head that passes through the center of gravity. Hence, the calculation of the point of impact is calculated as the intersection of the outer perimeter of the helmet/head that a vector of force is detected and traversed backwards to the point of impact by calculating the distance and angle back from the center of gravity. For example, if the acceleration vector is at 45 degrees with no rotation, then the point of impact is 45 degrees back from the center of gravity of the helmet/head, hence calculating the sine of 45, approximately 0.7 multiplied by the radius of the helmet or 5 inches, results in an impact about 3.5 inches from the front of the helmet. Alternatively, the location of impact may be kept in angular format to indicate that the impact was at 45 degrees from the front of the helmet/head. Conversely, if rotational acceleration is observed without linear acceleration, then the helmet/head is rotating about the sensor. In this scenario, the force required to rotate the brain passes in front of the center of gravity and is generally orthogonal to a line defined as passing through the center of gravity and the sensor, e.g., a side impact, otherwise translation linear acceleration would be observed. In this case, the location of impact then is on the side of the helmet/head opposite the direction of the acceleration. Hence, these two calculations of location of impact as examples of simplified methods of calculations that may be utilized although any other vector based algorithm that takes into account the mass of the head/helmet and the size of the head/helmet may be utilized. One such algorithm may utilize any mathematical equations such as F=m*a, i.e., Force equal mass times acceleration, and Torque=r×F, where r is the position vector at the outer portion of the head/helmet, X is the cross product and F is the Force vector, to calculate the force vector and translate back to the outer perimeter of the helmet/head to calculate the Force vector imparted at that location if desired. Although described with respect to a helmet, other embodiments of the at least one motion capture sensor may be coupled with a hat or cap, within a protective mouthpiece, using any type of mount, enclosure or coupling mechanism. Similar calculations may be utilized for the hat/cap/mouthpiece to determine a location/direction of impact, linear or rotational forces from the accelerations or any other quantities that may be indicative of concussion related events for example. Embodiments may include a temperature sensor coupled with the at least one motion capture sensor or with the microcontroller for example as shown in FIG. 1A. The temperature sensor may be utilized alone or in combination with the motion capture element, for example to determine if the body or head is shivering, i.e., indicative of hypothermia, or if no movement is detected and the temperature for example measure wirelessly or via a wire based temperature sensor indicates that the body or brain is above a threshold indicative of heat stroke.

Embodiments of the invention may also utilize an isolator that may surround the at least one motion capture element to approximate physical acceleration dampening of cerebrospinal fluid around the user's brain to minimize translation of linear acceleration and rotational acceleration of the event data to obtain an observed linear acceleration and an observed rotational acceleration of the user's brain. Thus embodiments do not have to translate forces or acceleration values or any other values from the helmet based acceleration to the observed brain acceleration values and thus embodiments of the invention utilize less power and storage to provide event specific data, which in turn minimizes the amount of data transfer which yields lower transmission power utilization. Different isolators may be utilized on a football/hockey/lacrosse player's helmet based on the type of padding inherent in the helmet. Other embodiments utilized in sports where helmets are not worn, or occasionally worn may also utilize at least one motion capture sensor on a cap or hat, for example on a baseball player's hat, along with at least one sensor mounted on a batting helmet. Headband mounts may also be utilized in sports where a cap is not utilized, such as soccer to also determine concussions. In one or more embodiments, the isolator utilized on a helmet may remain in the enclosure attached to the helmet and the sensor may be removed and placed on another piece of equipment that does not make use of an isolator that matches the dampening of a user's brain fluids. Embodiments may automatically detect a type of motion and determine the type of equipment that the motion capture sensor is currently attached to based on characteristic motion patterns associated with certain types of equipment, i.e., surfboard versus baseball bat. In one or more embodiments an algorithm that may be utilized to calculate the physical characteristics of an isolator may include mounting a motion capture sensor on a helmet and mounting a motion capture sensor in a headform in a crash test dummy head wherein the motion capture sensor in the headform is enclosed in an isolator. By applying linear and rotational accelerations to the helmet and observing the difference in values obtained by the helmet sensor and observed by the sensor in the headform for example with respect to a sensor placed in a cadaver head within a helmet, the isolator material of the best matching dampening value may be obtained that most closely matches the dampening effect of a human brain.

Figure 3:
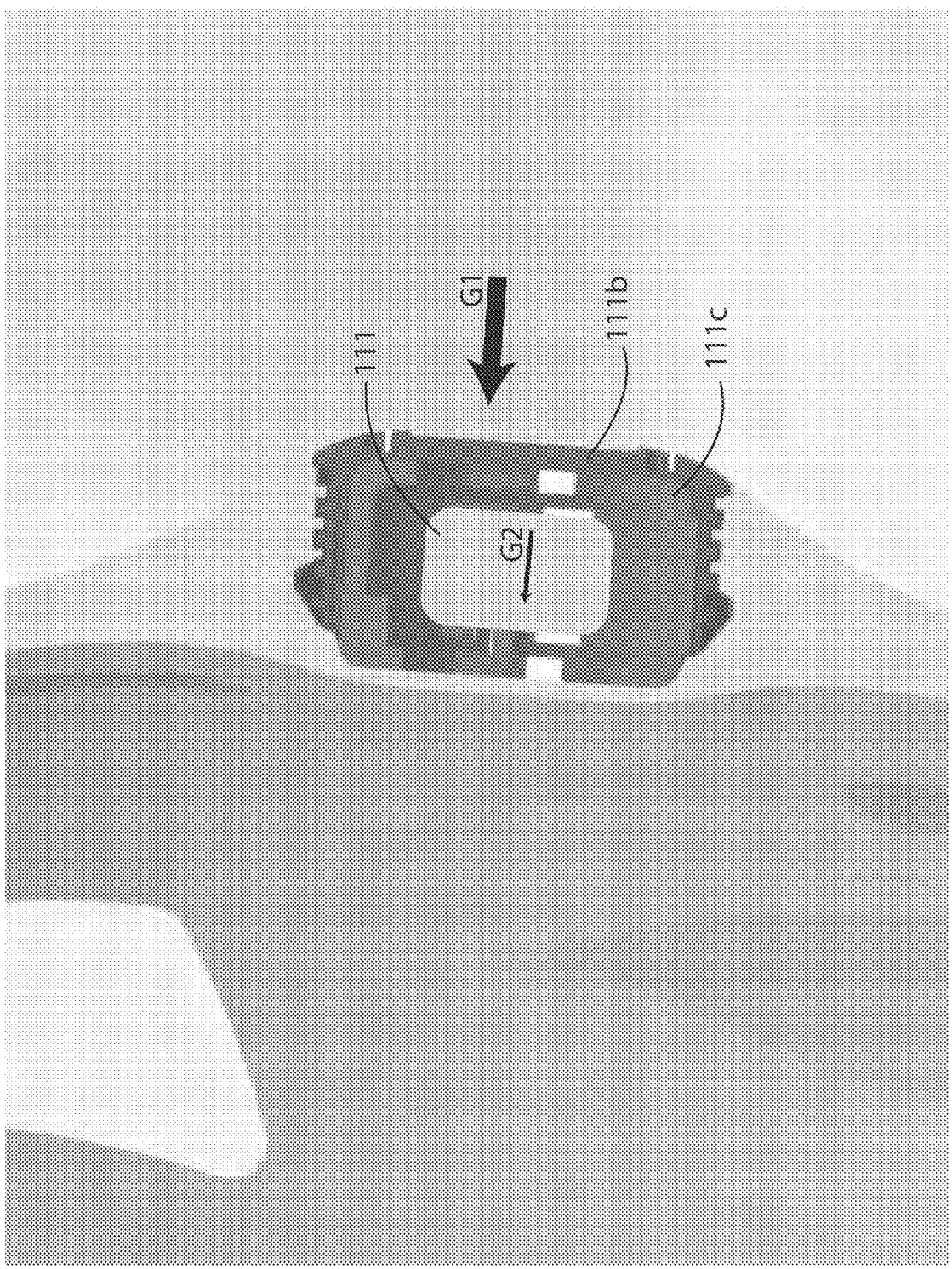
FIG. 3 illustrates a close-up of the mount of FIGS. 2A-B showing the isolator between the motion capture sensor and external portion of the helmet.

FIG. 3 illustrates a close-up of the mount of FIGS. 2A-B showing the isolator between the motion capture sensor and external portion of the helmet. Embodiments of the invention may obtain/calculate a linear acceleration value or a rotational acceleration value or both. This enables rotational events to be monitored for concussions as well as linear accelerations. As shown, an external acceleration G1 may impart a lower acceleration more associated with the acceleration observed by the human brain, namely G2 on sensor 111 by utilizing isolator 111*c* within sensor mount 111*b*. This enables rotational events to be monitored for concussions as well as linear accelerations. Other events may make use of the linear and/or rotational acceleration and/or velocity, for example as compared against patterns or templates to not only switch sensor personalities during an event to alter the capture characteristics dynamically, but also to characterize the type of equipment currently being utilized with the current motion capture sensor. This enables a single motion capture element purchase by a user to instrument multiple pieces of equipment or clothing by enabling the sensor to automatically determine what type of equipment or piece of clothing the sensor is coupled to based on the motion captured by the sensor when compared against characteristic patterns or templates of motion.

FIG. 4A illustrates a top cross sectional view of the motion capture element 111 mounted on helmet 110*a* having padding 110*a*1 that surrounds cranium 401, and brain 402 of a user. FIG. 4B illustrates a rotational concussion event for the various elements shown in FIG. 4. As shown, different acceleration values may be imparted on the human brain 402 and cranium 401 having center of gravity 403 and surrounded by padding 110*a*1 in helmet 110*a*. As shown, to move within a unit time period, the front portion of the brain must accelerate at a higher rate G2*a*, than the rear portion of the brain at G2*c* or at G2*b* at the center of gravity. Hence, for a given rotational acceleration value different areas of the brain may be affected differently. One or more embodiments of the invention may thus transmit information not only related to linear acceleration, but also with rotational acceleration.

Figure 5:
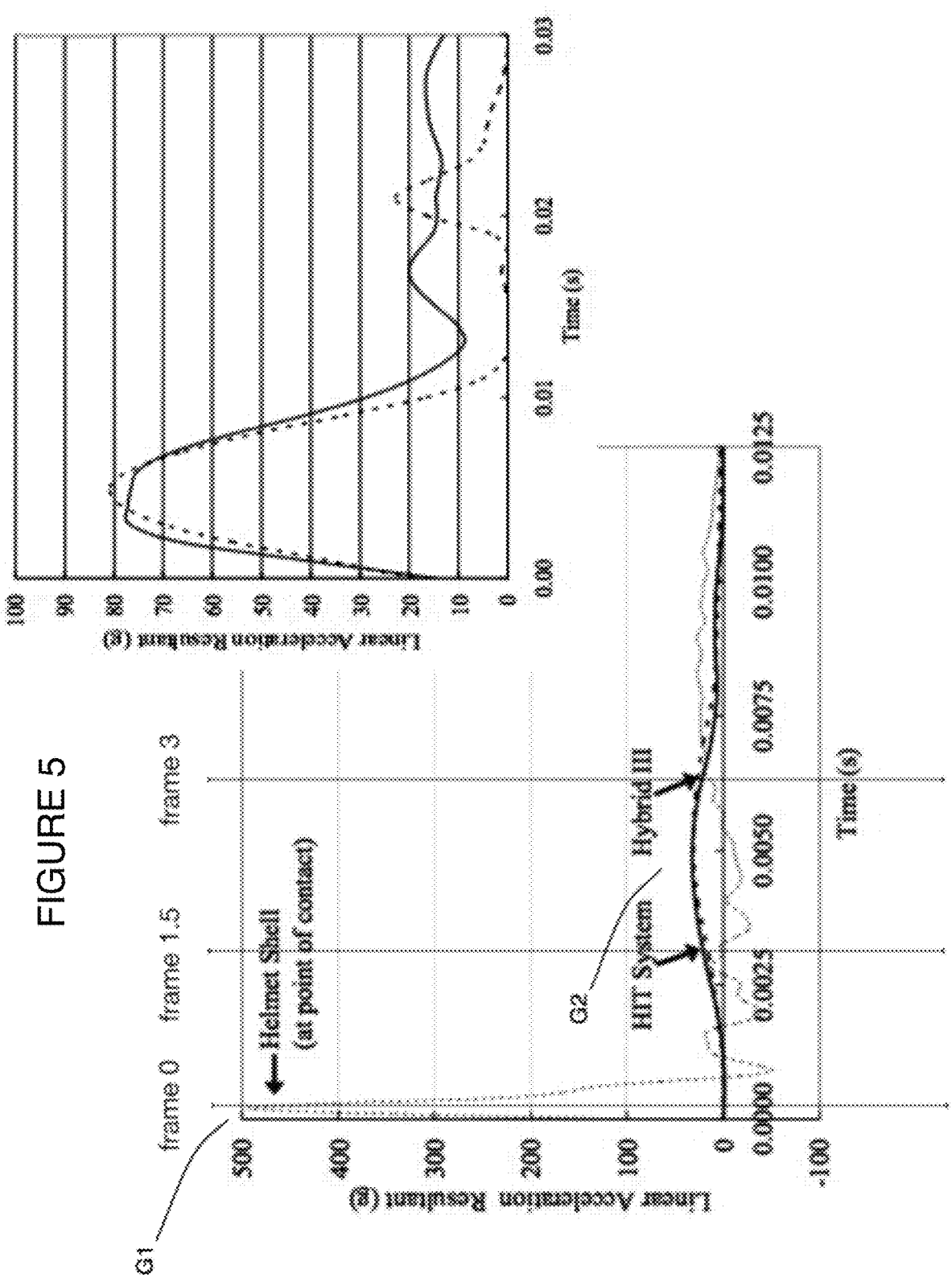
FIG. 5 illustrates the input force to the helmet, G1, versus the observed force within the brain and as observed by the sensor when mounted within the isolator.

FIG. 5 illustrates the input force to the helmet, G1, e.g., as shown at 500 *g*, versus the observed force within the brain G2, and as observed by the sensor when mounted within the isolator and as confirmed with known headform acceleration measurement systems. The upper right graph shows that two known headform systems confirm acceleration values observed by an isolator based motion capture element 111 shown in FIG. 4A with respect to headform mounted accelerometers.

Figure 6:
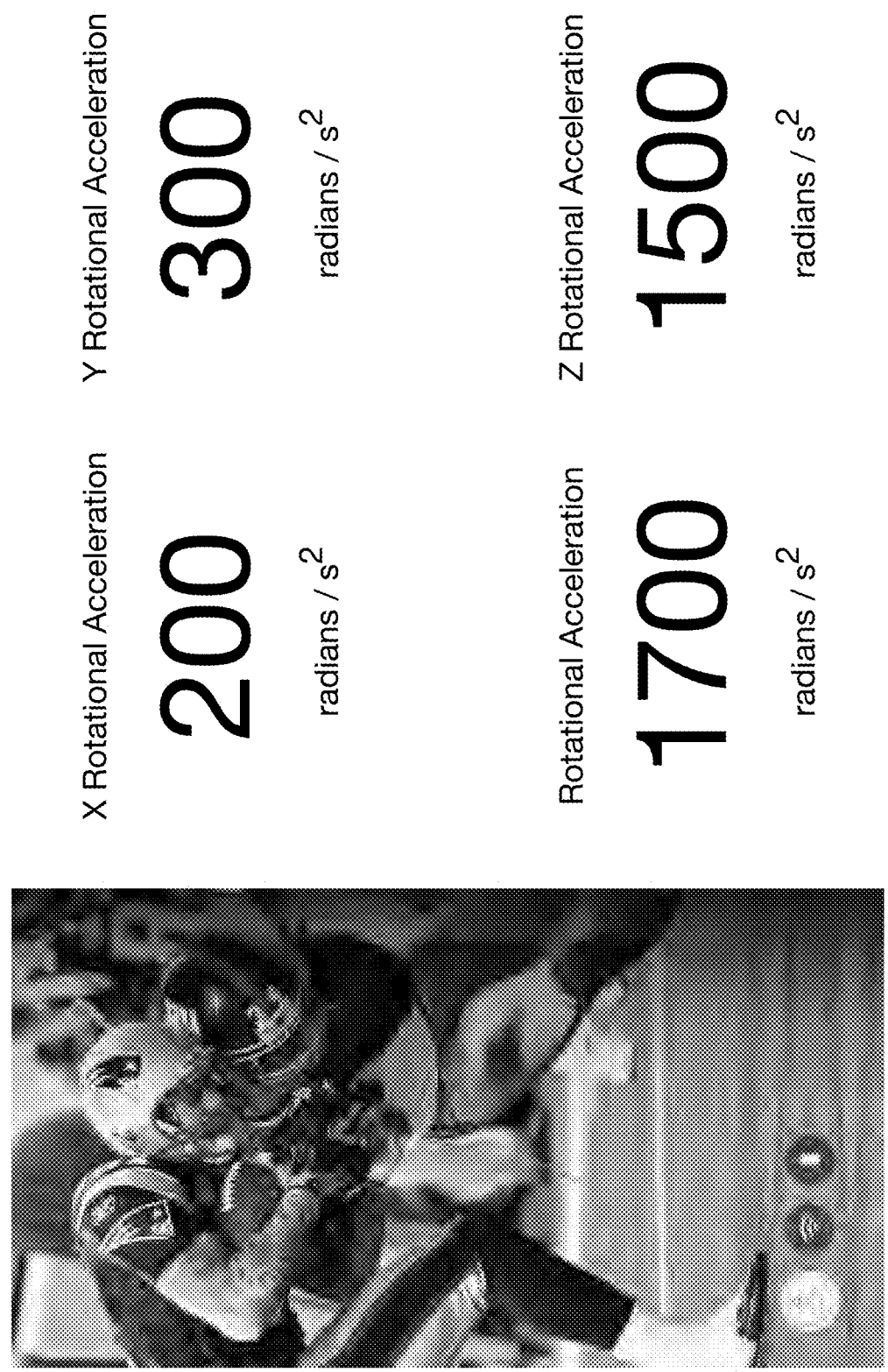
FIG. 6 illustrates the rotational acceleration values of the 3 axes along with the total rotational vector amount along with video of the concussion event as obtained from a camera and displayed with the motion event data.

FIG. 6 illustrates the rotational acceleration values of the 3 axes along with the total rotational vector amount along with video of the concussion event as obtained from a camera and displayed with the motion event data. In one or more embodiments, the acceleration values from a given sensor may be displayed for rotational (as shown) or linear values, for example by double tapping a mobile device screen, or in any other manner. Embodiments of the invention may transmit the event data associated with the event using a connectionless broadcast message. In one or more embodiments, depending on the communication employed, broadcast messages may include payloads with a limited amount of data that may be utilized to avoid handshaking and overhead of a connection based protocol. In other embodiments connectionless or connection based protocols may be utilized in any combination. In this manner, a referee may obtain nearly instantaneous readouts of potential concussion related events on a mobile device, which allows the referee to obtain medical assistance in rapid fashion.

In one or more embodiments, the computer may access previously stored event data or motion analysis data associated with at least one other user, or the user, or at least one other piece of equipment, or the piece of equipment, for example to determine the number of concussions or falls or other swings, or any other motion event. Embodiments may also display information including a presentation of the event data associated with the at least one user on a display based on the event data or motion analysis data associated with the user or piece of equipment and the previously stored event data or motion analysis data associated with the user or the piece of equipment or with the at least one other user or the other piece of equipment. This enables comparison of motion events, in number or quantitative value, e.g., the maximum rotational acceleration observed by the user or other users in a particular game or historically. In addition, in at least one embodiment, patterns or templates that define characteristic motion of particular pieces of equipment for typical events may be dynamically updated, for example on a central server or locally, and dynamically updated in motion capture sensors via the first communication interface in one or more embodiments. This enables sensors to improve over time. Hence, the display shown in FIG. 6 may also indicate the number of concussions previously stored for a given boxer/player and enable the referee/doctor to make a decision as to whether or not the player may keep playing or not.

Embodiments of the invention may transmit the information to a display on a visual display coupled with the computer or a remote computer, for example over broadcast television or the Internet for example. Hence, the display in FIG. 6 may be also shown to a viewing audience, for example in real-time to indicate the amount of force imparted upon the boxer/player/rider, etc.

Figure 7:
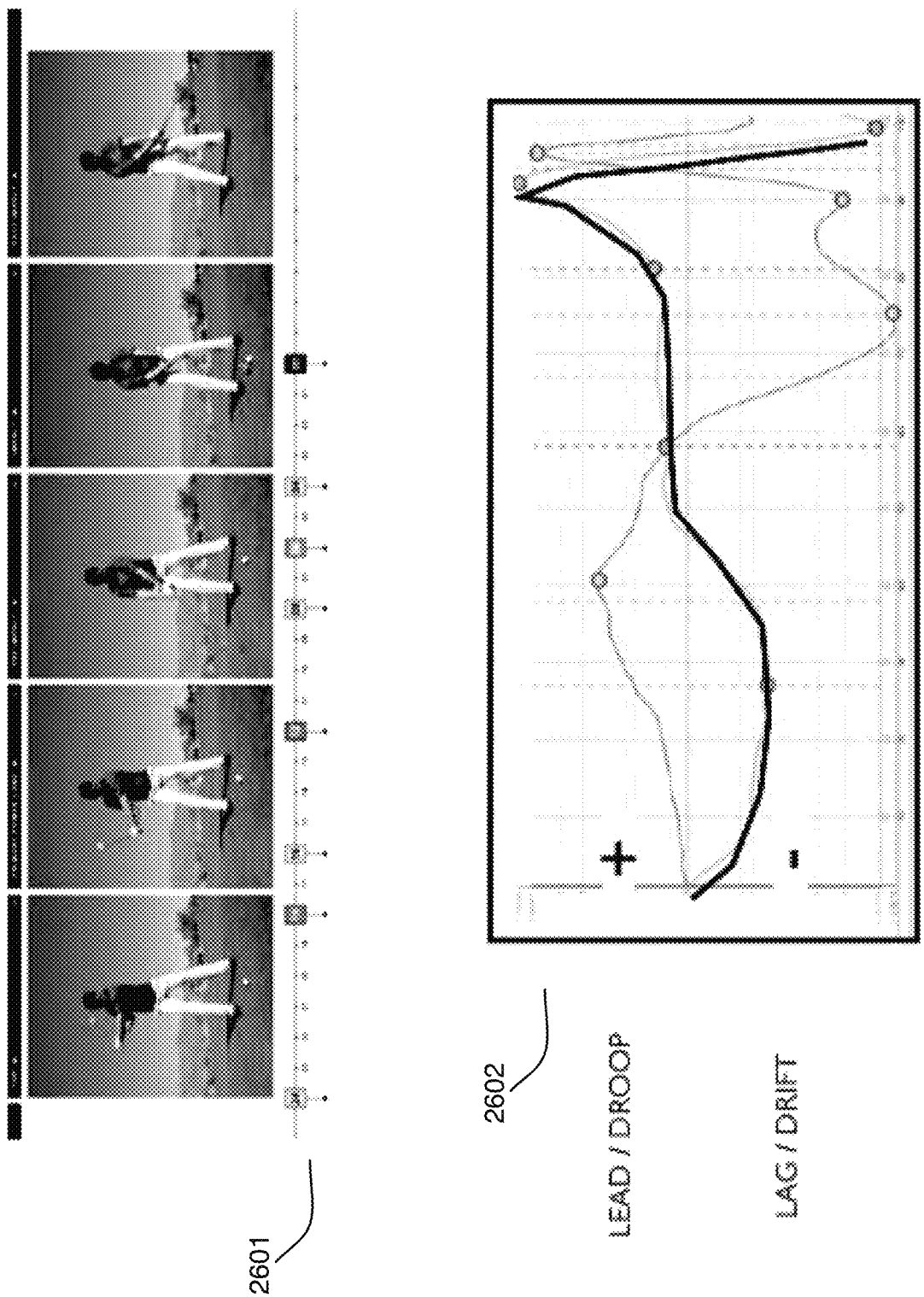
FIG. 7 illustrates a timeline display of a user along with peak and minimum angular speeds along the timeline shown as events along the time line. In addition, a graph showing the lead and lag of the golf club along with the droop and drift of the golf club is shown in the bottom display wherein these values determine how much the golf club shaft is bending in two axes as plotted against time.

FIG. 7 illustrates a timeline display 2601 of a user along with peak and minimum angular speeds along the timeline shown as events along the time line. In addition, a graph showing the lead and lag of the golf club 2602 along with the droop and drift of the golf club is shown in the bottom display wherein these values determine how much the golf club shaft is bending in two axes as plotted against time. An embodiment of the display is shown in FIG. 8 with simplified time line and motion related event (maximum speed of the swing) annotated on the display.

Figure 8:
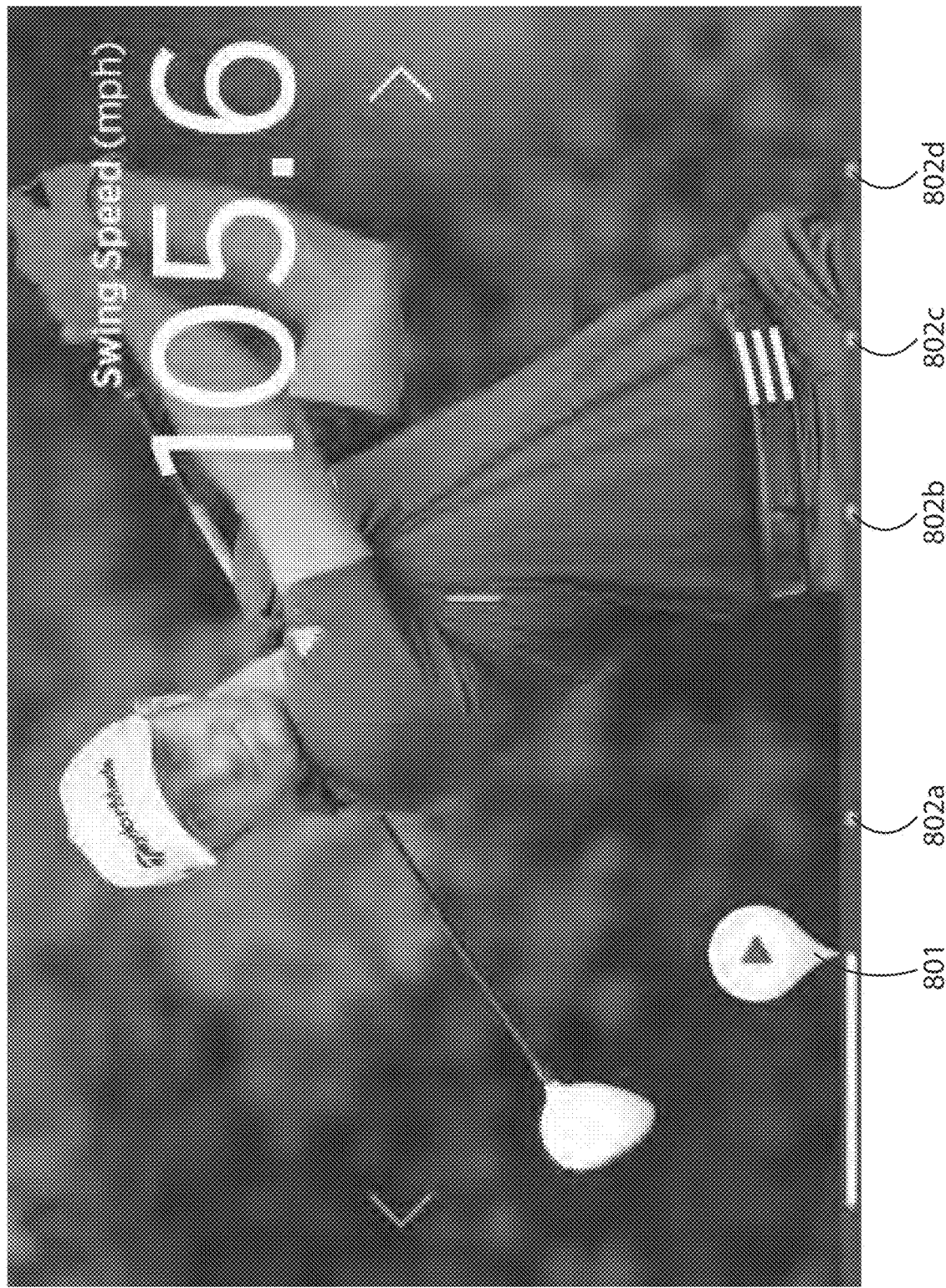
FIG. 8 illustrates a sub-event scrub timeline that enables inputs near the start/stop points in time associated with sub-events to be scrolled to, played to or from, to easily enable viewing of sub-events.

FIG. 8 illustrates a sub-event scrub timeline that enables inputs near the start/stop points 802*a*-*d* in time, i.e., sub-event time locations shown in FIG. 7 and associated with sub-events to be scrolled to, played to or from, to easily enable viewing of sub-events. For example a golf swing may include sub-events such as an address, swing back, swing forward, strike, follow through. The system may display time locations for the sub-events 802*a*-*d* and accept user input near the location to assert that the video should start or stop at that point in time, or scroll to or back to that point in time for ease of viewing sub-events for example. User input element 801 may be utilized to drag the time to a nearby sub-event for example to position the video at a desired point in time. Alternatively, or in combination a user input such as asserting a finger press near another sub-event point in time while the video is playing, may indicate that the video should stop at the next sub-event point in time. The user interface may also be utilized to control-drag the points to more precisely synchronize the video to the frame in which a particular sub-event or event occurs. For example, the user may hold the control key and drag a point 802*b* to the left or right to match the frame of the video to the actual point in time where the velocity of the club head is zero for example to more closely synchronize the video to the actual motion analysis data shown, here Swing Speed in miles per hour. Any other user gesture may be utilized in keeping with the spirit of the invention to synchronize a user frame to the motion analysis data, such as voice control, arrow keys, etc.

Figure 9:
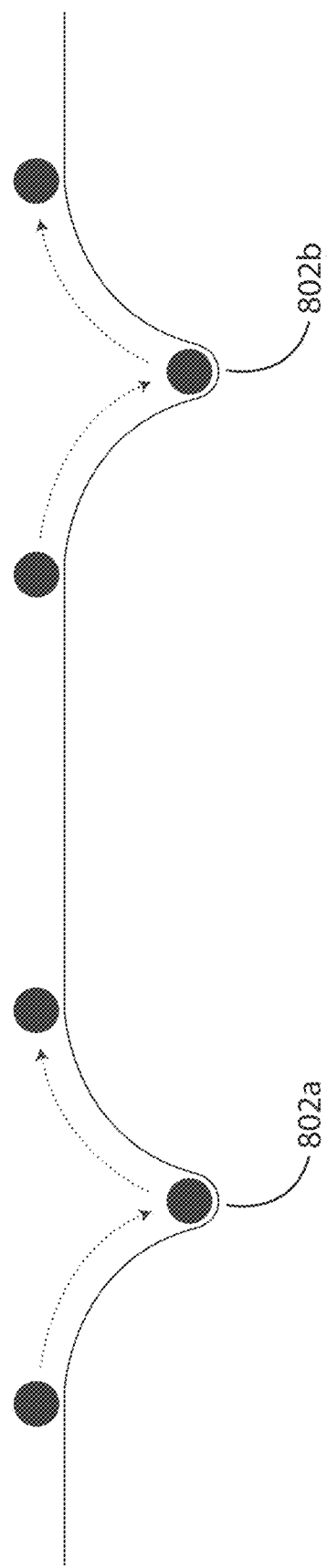
FIG. 9 illustrates the relative locations along the timeline where sub-events start and stop and the gravity associated with the start and stop times, which enable user inputs near those points to gravitate to the start and stop times.

FIG. 9 illustrates the relative locations along the timeline where sub-events 802*a* and 802*b* start and stop and the gravity associated with the start and stop times, which enable user inputs near those points to gravitate to the start and stop times. For example, when dragging the user interface element 801 left and right along the time line, the user interface element may appear to move toward the potential well 802*a* and 802*b*, so that the user interface element is easier to move to the start/stop point of a sub-event.

In one or more embodiments, the computer may request at least one image or video that contains the event from at least one camera proximal to the event. This may include a broadcast message requesting video from a particular proximal camera or a camera that is pointing in the direction of the event. In one or more embodiments, the computer may broadcast a request for camera locations proximal to the event or oriented to view the event, and optionally display the available cameras, or videos therefrom for the time duration around the event of interest. In one or more embodiments, the computer may display a list of one or more times at which the event has occurred, which enables the user obtain the desired event video via the computer, and/or to independently request the video from a third party with the desired event times. The computer may obtain videos from the server 172 as well and locally trim the video to the desired events. This may be utilized to obtain third party videos or videos from systems that do not directly interface with the computer, but which may be in communication with the server 172.

Figure 10:
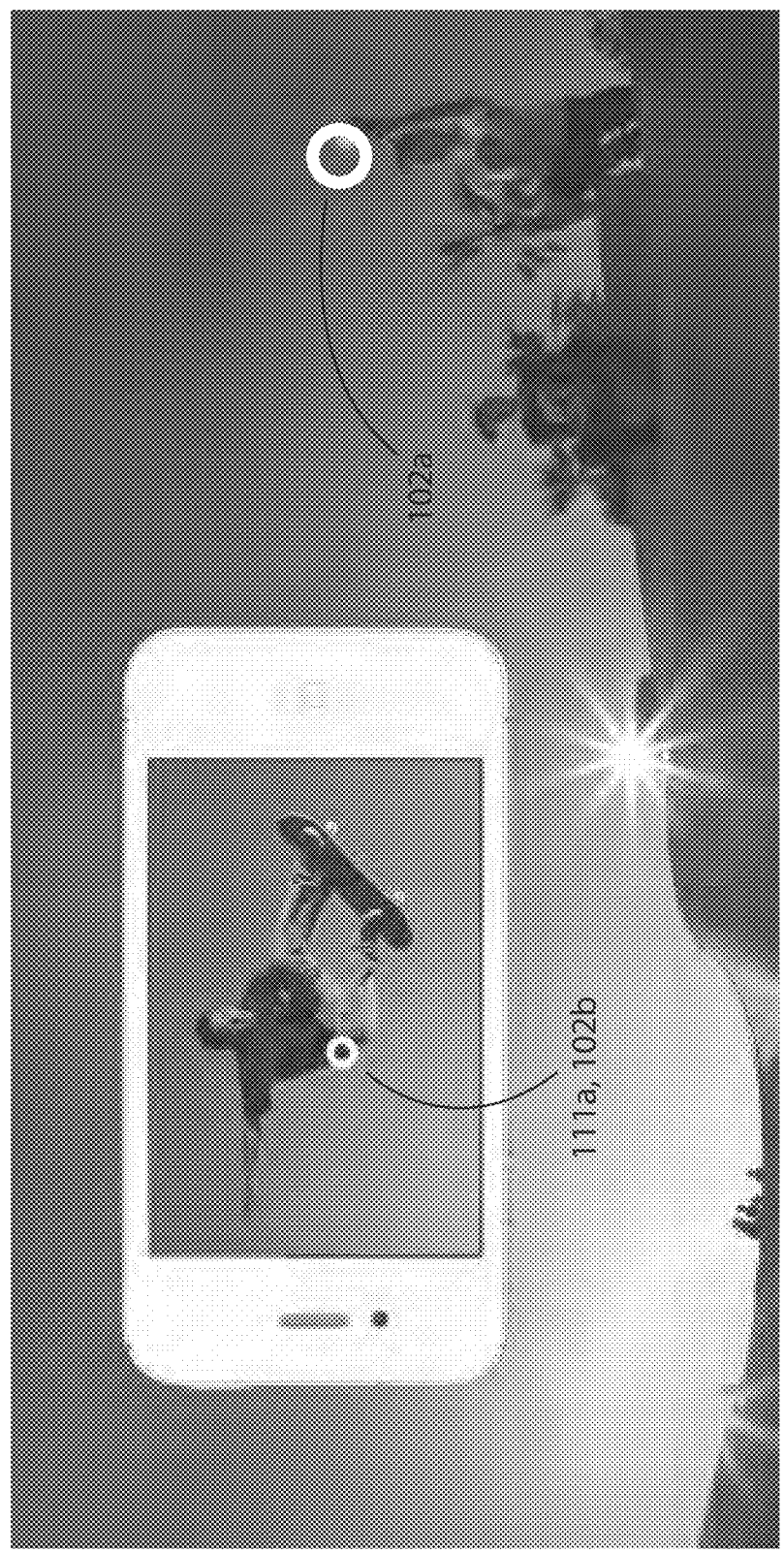
FIG. 10 illustrates an embodiment that utilizes a mobile device as the motion capture element and another mobile device as the computer that receives the motion event data and video of the first user event.

FIG. 10 illustrates an embodiment that utilizes a mobile device 102*b* as the motion capture element 111*a* and another mobile device 102*a* as the computer that receives the motion event data and video of the first user event. The view from mobile device 102*a* is shown in the left upper portion of the figure. In one or more embodiments, the at least one motion capture sensor is coupled with the mobile device and for example uses an internal motion sensor 111*a* within or coupled with the mobile device. This enables motion capture and event recognition with minimal and ubiquitous hardware, e.g., using a mobile device with a built-in accelerometer. In one or more embodiments, a first mobile device 102*b* may be coupled with a user recording motion data, here shown skateboarding, while a second mobile device 102*a* is utilized to record a video of the motion. In one or more embodiments, the user undergoing motion may gesture, e.g., tap N times on the mobile device to indicate that the second user's mobile device should start recording video or stop recording video. Any other gesture may be utilized to communicate event related or motion related indications between mobile devices.

Thus embodiments of the invention may recognize any type of motion event, including events related to motion that is indicative of standing, walking, falling, a heat stroke, seizure, violent shaking, a concussion, a collision, abnormal gait, abnormal or non-existent breathing or any combination thereof or any other type of event having a duration of time during with motion occurs. Events may also be of any granularity, for example include sub-events that have known signatures, or otherwise match a template or pattern of any type, including amplitude and/or time thresholds in particular sets of linear or rotational axes. For example, events indicating a skateboard push-off or series of pushes may be grouped into a sub-event such as "prep for maneuver", while rotational axes in X for example may indicate "skateboard flip/roll". In one or more embodiments, the events may be grouped and stored/sent.

Figure 11:
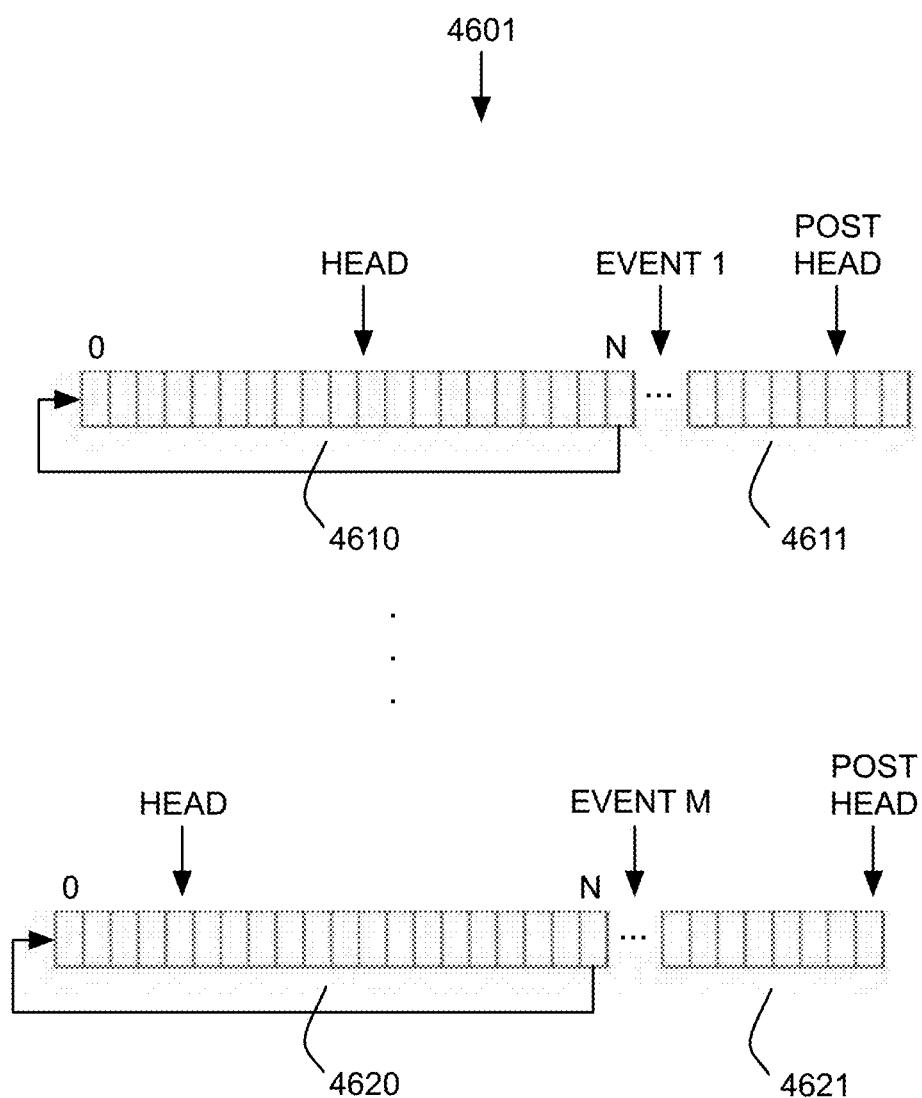
FIG. 11 illustrates an embodiment of the memory utilized to store data related to a potential event.

FIG. 11 illustrates an embodiment of the memory utilized to store data. Memory 4601 may for example be integral to the microcontroller in motion capture element 111 or may couple with the microcontroller, as for example a separate memory chip. Memory 4601 as shown may include one or more memory buffer 4610, 4611 and 4620, 4621 respectively. One embodiment of the memory buffer that may be utilized is a ring buffer. The ring buffer may be implemented to be overwritten multiple times until an event occurs. The length of the ring buffer may be from 0 to N memory units. There may for example be M ring buffers, for M strike events for example. The number M may be any number greater than zero. In one or more embodiments, the number M may be equal to or greater than the number of expected events, e.g., number of hits, or shots for a round of golf, or any other number for example that allows all motion capture data to be stored on the motion capture element until downloaded to a mobile computer or the Internet after one or more events. In one embodiment, a pointer, for example called HEAD keeps track of the head of the buffer. As data is recorded in the buffer, the HEAD is moved forward by the appropriate amount pointing to the next free memory unit. When the buffer becomes full, the pointer wraps around to the beginning of the buffer and overwrites previous values as it encounters them. Although the data is being overwritten, at any instance in time (t), there is recorded sensor data from time (t) back depending on the size of the buffer and the rate of recording. As the sensor records data in the buffer, an "Event" in one or more embodiments stops new data from overwriting the buffer. Upon the detection of an Event, the sensor can continue to record data in a second buffer 4611 to record post Event data, for example for a specific amount of time at a specific capture rate to complete the recording of a prospective shot. Memory buffer 4610 now contains a record of data for a desired amount of time from the Event backwards, depending on the size of the buffer and capture rate along with post Event data in the post event buffer 4611. Video may also be stored in a similar manner and later trimmed, see FIG. 19 for example.

For example, in a golf swing, the event can be the impact of the club head with the ball. Alternatively, the event can be the impact of the club head with the ground, which may give rise to a false event. In other embodiments, the event may be an acceleration of a user's head which may be indicative of a concussion event, or a shot fired from a weapon, or a ball striking a baseball bat or when a user moves a weight to the highest point and descends for another repetition. The Pre-Event buffer stores the sensor data up to the event of impact, the Post-Event buffer stores the sensor data after the impact event. One or more embodiments of the microcontroller, or microprocessor, may analyze the event and determine if the event is a repetition, firing or event such as a strike or a false strike. If the event is considered a valid event according to a pattern or signature or template (see FIGS. 13 and 15), and not a false event, then another memory buffer 4620 is used for motion capture data up until the occurrence of a second event. After that event occurs, the post event buffer 4621 is filled with captured data.

Specifically, the motion capture element 111 may be implemented as one or more MEMs sensors. The sensors may be commanded to collect data at specific time intervals. At each interval, data is read from the various MEMs devices, and stored in the ring buffer. A set of values read from the MEMs sensors is considered a FRAME of data. A FRAME of data can be 0, 1, or multiple memory units depending on the type of data that is being collected and stored in the buffer. A FRAME of data is also associated with a time interval. Therefore frames are also associated with a time element based on the capture rate from the sensors. For example, if each Frame is filled at 2 ms intervals, then 1000 FRAMES would contain 2000 ms of data (2 seconds). In general, a FRAME does not have to be associated with time.

Data can be constantly stored in the ring buffer and written out to non-volatile memory or sent over a wireless or wired link over a radio/antenna to a remote memory or device for example at specified events, times, or when communication is available over a radio/antenna to a mobile device or any other computer or memory, or when commanded for example by a mobile device, i.e., "polled", or at any other desired event.

Figure 12:
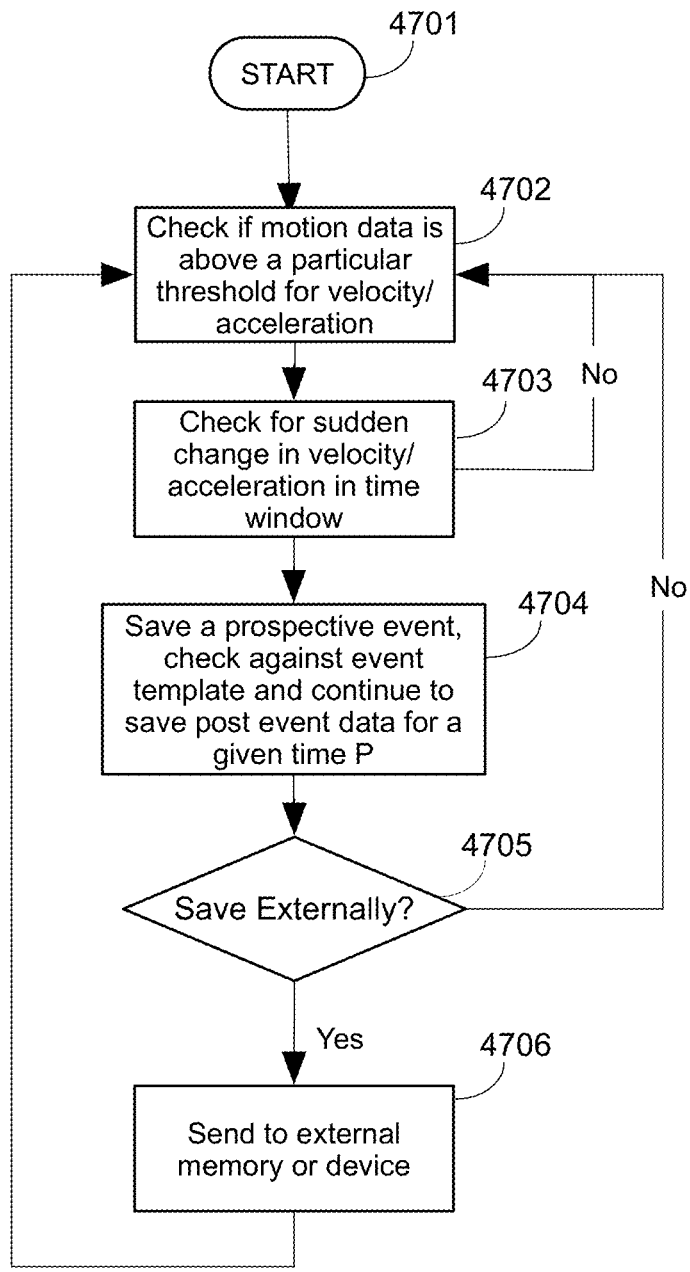
FIG. 12 shows a flow chart of an embodiment of the functionality specifically programmed into the microcontroller to determine whether a prospective event has occurred.

FIG. 12 shows a flow chart of an embodiment of the functionality specifically programmed into the microcontroller to determine whether an event that is to be transmitted for the particular application, for example a prospective event or for example an event has occurred. The motion, acceleration or shockwave that occurs from an impact to the sporting equipment is transmitted to the sensor in the motion capture element, which records the motion capture data as is described in FIG. 11 above. The microcontroller, or microprocessor, may analyze the event and determine whether the event is a prospective event or not.

One type of event that occurs is acceleration or a head/helmet/cap/mouthpiece based sensor over a specified linear or rotational value, or the impact of the clubface when it impacts a golf ball. In other sports that utilize a ball and a striking implement, the same analysis is applied, but tailored to the specific sport and sporting equipment. In tennis a prospective strike can be the racquet hitting the ball, for example as opposed to spinning the racquet before receiving a serve. In other applications, such as running shoes, the impact detection algorithm can detect the shoe hitting the ground when someone is running. In exercise it can be a particular motion being achieved, this allows for example the counting of repetitions while lifting weights or riding a stationary bike.

In one or more embodiments of the invention, processing starts at 4701. The microcontroller compares the motion capture data in memory 4610 with linear velocity over a certain threshold at 4702, within a particular impact time frame and searches for a discontinuity threshold where there is a sudden change in velocity or acceleration above a certain threshold at 4703. If no discontinuity in velocity or for example acceleration occurs in the defined time window, then processing continues at 4702. If a discontinuity does occur, then the prospective impact is saved in memory and post impact data is saved for a given time P at 4704. For example, if the impact threshold is set to 12 G, discontinuity threshold is set to 6 G, and the impact time frames is 10 frames, then microcontroller 3802 signals impact, after detection of a 12 G acceleration in at least one axis or all axes within 10 frames followed by a discontinuity of 6 G. In a typical event, the accelerations build with characteristic accelerations curves. Impact is signaled as a quick change in acceleration/velocity. These changes are generally distinct from the smooth curves created by an incrementally increasing or decreasing curves of a particular non-event. For concussion based events, linear or rotational acceleration in one or more axes is over a threshold. For golf related events, if the acceleration curves are that of a golf swing, then particular axes have particular accelerations that fit within a signature, template or other pattern and a ball strike results in a large acceleration strike indicative of a hit. If the data matches a given template, then it is saved, if not, it processing continues back at 4702. If data is to be saved externally as determined at 4705, i.e., there is a communication link to a mobile device and the mobile device is polling or has requested impact data when it occurs for example, then the event is transmitted to an external memory, or the mobile device or saved externally in any other location at 4706 and processing continues again at 4702 where the microcontroller analyzes collected motion capture data for subsequent events. If data is not to be saved externally, then processing continues at 4702 with the impact data saved locally in memory 4601. If sent externally, the other motion capture devices may also save their motion data for the event detected by another sensor. This enables sensors with finer resolution or more motion for example to alert other sensors associated with the user or piece of equipment to save the event even if the motion capture data does not reach a particular threshold or pattern, for example see FIG. 15. This type of processing provides more robust event detection as multiple sensors may be utilized to detect a particular type of event and notify other sensors that may not match the event pattern for one reason or another. In addition, cameras may be notified and trim or otherwise discard unneeded video and save event related video, which may lower memory utilization not only of events but also for video. In one or more embodiments of the invention, noise may be filtered from the motion capture data before sending, and the sample rate may be varied based on the data values obtained to maximize accuracy. For example, some sensors output data that is not accurate under high sampling rates and high G-forces. Hence, by lowering the sampling rate at high G-forces, accuracy is maintained. In one or more embodiments of the invention, the microcontroller associated with motion capture element 111 may sense high G forces and automatically switch the sampling rate. In one or more embodiments, instead of using accelerometers with 6 G/12 G/24 G ranges or 2 G/4 G/8 G/16 G ranges, accelerometers with 2 ranges, for example 2 G and 24 G may be utilized to simplify the logic of switching between ranges.

One or more embodiments of the invention may transmit the event to a mobile device and/or continue to save the events in memory, for example for a round of golf or until a mobile device communication link is achieved.

Figure 13:
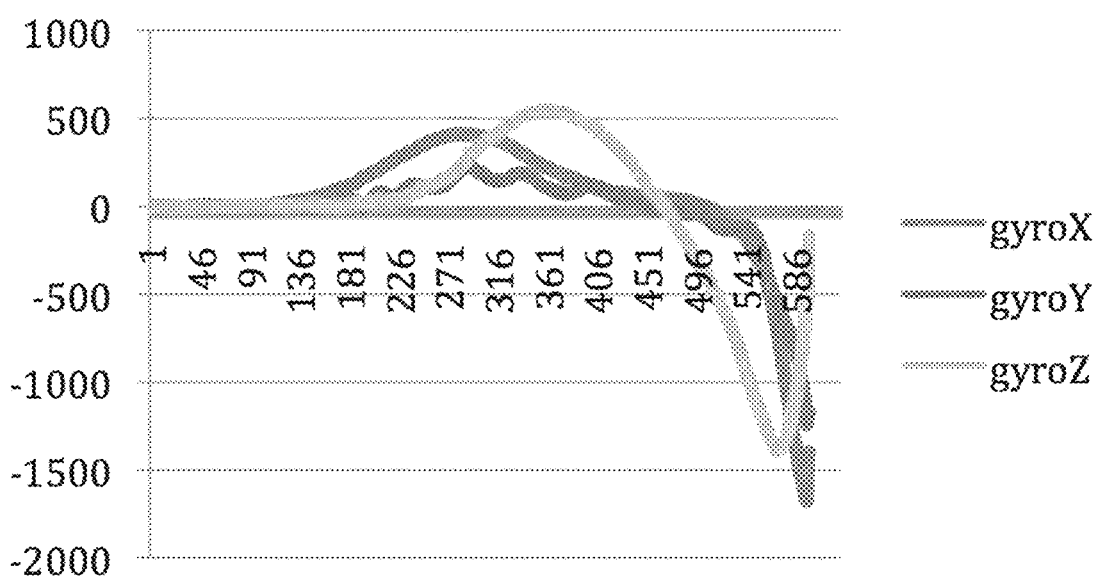
FIG. 13 illustrates a typical event signature or template, which is compared to motion capture data to eliminate false positive events.
Figure 15:
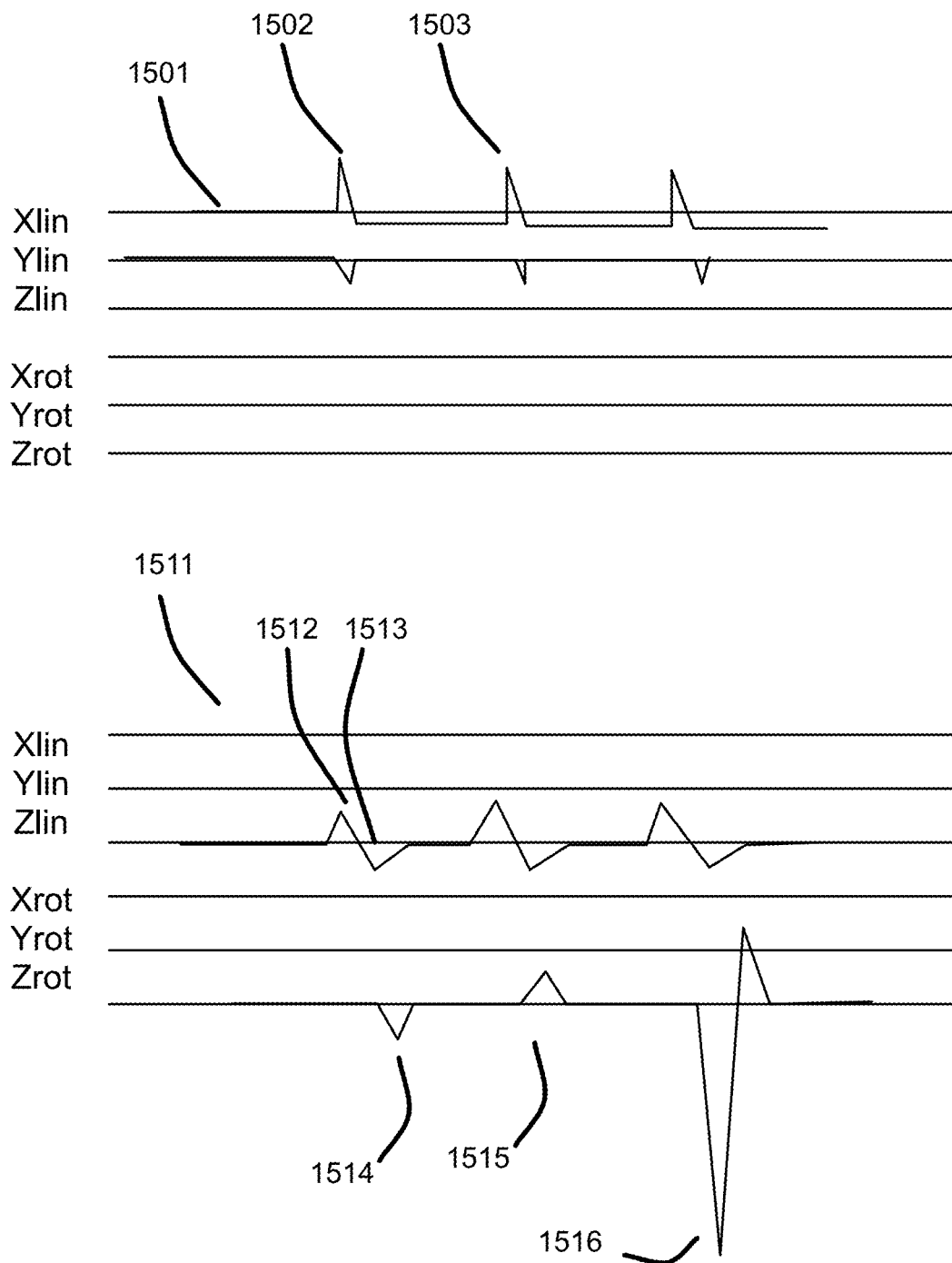
FIG. 15 illustrates an embodiment of templates characteristic of motion events associated with different types of equipment and/or instrumented clothing along with areas in which the motion capture sensor personality may change to more accurately or more efficiently capture data associated with a particular period of time and/or sub-event.

For example, with the sensor mounted in a particular mount, a typical event signature is shown in FIG. 13, also see FIG. 15 for comparison of two characteristic motion types as shown via patterns or templates associated with different pieces of equipment or clothing for example. In one or more embodiments, the microcontroller may execute a pattern matching algorithm to follow the curves for each of the axis and use segments of 1 or more axis to determine if a characteristic swing has taken place, in either linear or rotational acceleration or any combination thereof. If the motion capture data in memory 4601 is within a range close enough to the values of a typical swing as shown in FIG. 13, then the motion is consistent with an event. Embodiments of the invention thus reduce the number of false positives in event detection, after first characterizing the angular and/or linear velocity signature of the movement, and then utilizing elements of this signature to determine if similar signatures for future events have occurred.

The motion capture element collects data from various sensors. The data capture rate may be high and if so, there are significant amounts of data that is being captured. Embodiments of the invention may use both lossless and lossy compression algorithms to store the data on the sensor depending on the particular application. The compression algorithms enable the motion capture element to capture more data within the given resources. Compressed data is also what is transferred to the remote computer(s). Compressed data transfers faster. Compressed data is also stored in the Internet "in the cloud", or on the database using up less space locally.

FIG. 14 illustrates an embodiment of the motion capture element 111 may include an optional LED visual indicator 1401 for local display and viewing of event related information and an optional LCD 1402 that may display a text or encoded message associated with the event. In one or more embodiments, the LED visual indicator may flash slow yellow for a moderate type of concussion, and flash fast red for a severe type of concussion to give a quick overall view of the event without requiring any data communications. In addition, the LED may be asserted with a number of flashes or other colors to indicate any temperature related event or other event. One or more embodiments may also employ LCD 1402 for example that may show text, or alternatively may display a coded message for sensitive health related information that a referee or medical personnel may read or decode with an appropriate reader app on a mobile device for example. In the lower right portion of the figure, the LCD display may produce an encoded message that states "Potential Concussion 1500 degree/s/s rotational event detect— alert medical personnel immediately". Other paralysis diagnostic messages or any other type of message that may be sensitive may be encoded and displayed locally so that medical personnel may immediately begin assessing the user/player/boxer without alarming other players with the diagnostic message for example, or without transmitting the message over the air wirelessly to avoid interception.

FIG. 15 illustrates an embodiment of templates characteristic of motion events associated with different types of equipment and/or instrumented clothing along with areas in which the motion capture sensor personality may change to more accurately or more efficiently capture data associated with a particular period of time and/or sub-event. As shown, the characteristic push off for a skateboard is shown in acceleration graphs 1501 that display the X, Y and Z axes linear acceleration and rotational acceleration values in the top 6 timelines, wherein time increases to the right. As shown, discrete positive x-axis acceleration captured is shown at 1502 and 1503 while the user pushes the skateboard with each step, followed by negative acceleration as the skateboard slows between each push. In addition, y-axis wobbles during each push are also captured while there is no change in the z axis linear acceleration and no rotational accelerations in this characteristic template or pattern of a skateboard push off or drive. Alternatively, the pattern may include a group of threshold accelerations in x at predefined time windows with other thresholds or no threshold for wobble for example that the captured data is compared against to determine automatically the type of equipment that the motion capture element is mounted to or that the known piece of equipment is experiencing currently. This enables event based data saving and transmission for example.

The pattern or template in graphs 1511 however show a running event as the user slightly accelerates up and down during a running event. Since the user's speed is relatively constant there is relatively no acceleration in x and since the user is not turning, there is relatively no acceleration in y (left/right). This pattern may be utilized to compare within ranges for running for example wherein the pattern includes z axis accelerations in predefined time windows. Hence, the top three graphs of graphs 1511 may be utilized as a pattern to notate a running event at 1512 and 1513. The bottom three graphs may show captured data that are indicative of the user looking from side to side when the motion capture element is mounted in a helmet and/or mouthpiece at 1514 and 1515, while captured data 1516 may be indicative of a moderate or sever concussion observed via a rotational motion of high enough angular degrees per second squared. In addition, the sensor personality may be altered dynamically at 1516 or at any other threshold for example to change the motion capture sensor rate of capture or bit size of capture to more accurately in amplitude or time capture the event. This enables dynamic alteration of quality of capture and/or dynamic change of power utilization for periods of interest, which is unknown in the art. In one or more embodiments, a temperature timeline may also be recorded for embodiments of the invention that utilize temperature sensors, either mounted within a helmet, mouthpiece or in any other piece of equipment or within the user's body for example.

Figure 16:
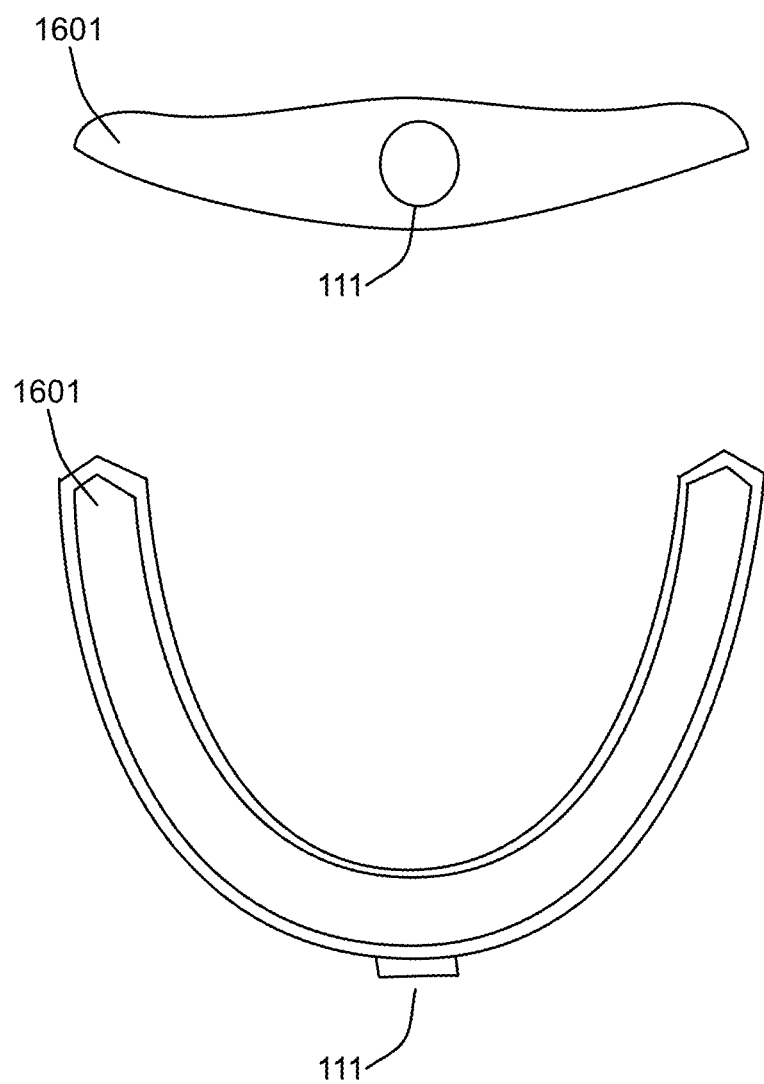
FIG. 16 illustrates an embodiment of a protective mouthpiece in front view and at the bottom portion of the figure in top view, for example as worn in any contact sport such as, but not limited to soccer, boxing, football, wrestling or any other sport for example.

FIG. 16 illustrates an embodiment of a protective mouthpiece 1601 in front view and at the bottom portion of the figure in top view, for example as worn in any contact sport such as, but not limited to soccer, boxing, football, wrestling or any other sport for example. Embodiments of the mouthpiece may be worn in addition to any other headgear with or without a motion capture element to increase the motion capture data associated with the user and correlate or in any other way combine or compare the motion data and or events from any or all motion capture elements worn by the user. Embodiments of the mouthpiece and/or helmet shown in FIGS. 2A-B or in any other piece of equipment may also include a temperature sensor for example and as previously discussed.

FIG. 17 illustrates an embodiment of the algorithm utilized by any computer in FIG. 1 may display motion images and motion capture data in a combined format. In one or more embodiments, the motion capture data and any event related start/stop times may be saved on the motion capture element 111. One or more embodiments of the invention include a motion event recognition and video synchronization system that includes at least one motion capture element that may couple with a user or piece of equipment or mobile device coupled with the user. The at least one motion capture element may include a memory, a sensor that may capture any combination of values associated with an orientation, position, velocity, acceleration, angular velocity, and angular acceleration of the at least one motion capture element, a communication interface, a microcontroller coupled with the memory, the sensor and the communication interface. The microcontroller may collect data that includes sensor values from the sensor, store the data in the memory, analyze the data and recognize an event within the data to determine event data, transmit the event data associated with the event via the communication interface. The system may also include a mobile device that includes a computer, a communication interface that may communicate with the communication interface of the motion capture element to obtain the event data associated with the event, wherein the computer is coupled with the communication interface, wherein the computer may receive the event data from the computer's communication interface. The computer may also analyze the event data to form motion analysis data, store the event data, or the motion analysis data, or both the event data and the motion analysis data, obtain an event start time and an event stop time from the event. In one or more embodiments, the computer may request image data from camera that includes a video captured at least during a timespan from the event start time to the event stop time and display an event video on a display that includes both the event data, the motion analysis data or any combination thereof that occurs during the timespan from the event start time to the event stop time and the video captured during the timespan from the event start time to the event stop time.

In one or more embodiments, the computer may synchronize based on the first time associated with the data or the event data obtained from the at least one motion capture element coupled with the user or the piece of equipment or the mobile device coupled with the user, and at least one time associated with the at least one video to create at least one synchronized event video. In at least one embodiment, the computer may store the at least one synchronized event video in the computer memory without at least a portion of the at least one video outside of the event start time to the event stop time. According to at least one embodiment, the computer may display a synchronized event video including both of the event data, motion analysis data or any combination thereof that occurs during a timespan from the event start time to the event stop time, and the video captured during the timespan from the event start time to the event stop time.

In one or more embodiments, the computer may transmit the at least one synchronized event video or a portion of the at least one synchronized event video to one or more of a repository, a viewer, a server, another computer, a social media site, a mobile device, a network, and an emergency service.

When a communication channel is available, motion capture data and any event related start/stop times are pushed to, or obtained by or otherwise received by any computer, e.g., 101, 102, 102a, 102b, 105 at 1701. The clock difference between the clock on the sensor and/or in motion capture data times may also be obtained. This may be performed by reading a current time stamp in the incoming messages and comparing the incoming message time with the current time of the clock of the local computer, see also FIG. 18 for example for more detail on synchronization. The difference in clocks from the sensor and computer may be utilized to request images data from any camera local or pointing at the location of the event for the adjusted times to take into account any clock difference at 1702. For example, the computer may request images taken at the time/location by querying all cameras 103, 104, or on devices 101, 102 and/or 102a for any or all such devices having images taken nearby, e.g., based on GPS location or wireless range, and/or pointed at the event obtained from motion capture element 111. If a device is not nearby, but is pointing at the location of the event, as determined by its location and orientation when equipped with a magnetometer for example, then it may respond as well with images for the time range. Any type of camera that may communicate electronically may be queried, including nanny cameras, etc. For example, a message may be sent by mobile computer 101 after receiving events from motion capture sensor 111 wherein the message may be sent to any cameras for example within wireless range of mobile device 101. Alternatively, or in combination, mobile device 101 may send a broadcast message asking for any cameras identities that are within a predefined distance from the location of the event or query for any cameras pointed in the direction of the event even if not relatively close. Upon receiving the list of potential cameras, mobile device 101 may query them for any images obtained in a predefined window around the event for example. The computer may receive image data or look up the images locally if the computer is coupled with a camera at 1703. In one or more embodiments, the server 172 may iterate through videos and events to determine any that correlate and automatically trim the videos to correspond to the durations of the event start and stop times. Although wireless communications may be utilized, any other form of transfer of image data is in keeping with the spirit of the invention. The data from the event whether in numerical or graphical overlay format or any other format including text may be shown with or otherwise overlaid onto the corresponding image for that time at 1704. This is shown graphically at time 1710, i.e., the current time, which may be scrollable for example, for image 1711 showing a frame of a motion event with overlaid motion capture data 1712. See FIG. 6 for combined or simultaneously non-overlaid data for example.

Figure 18:
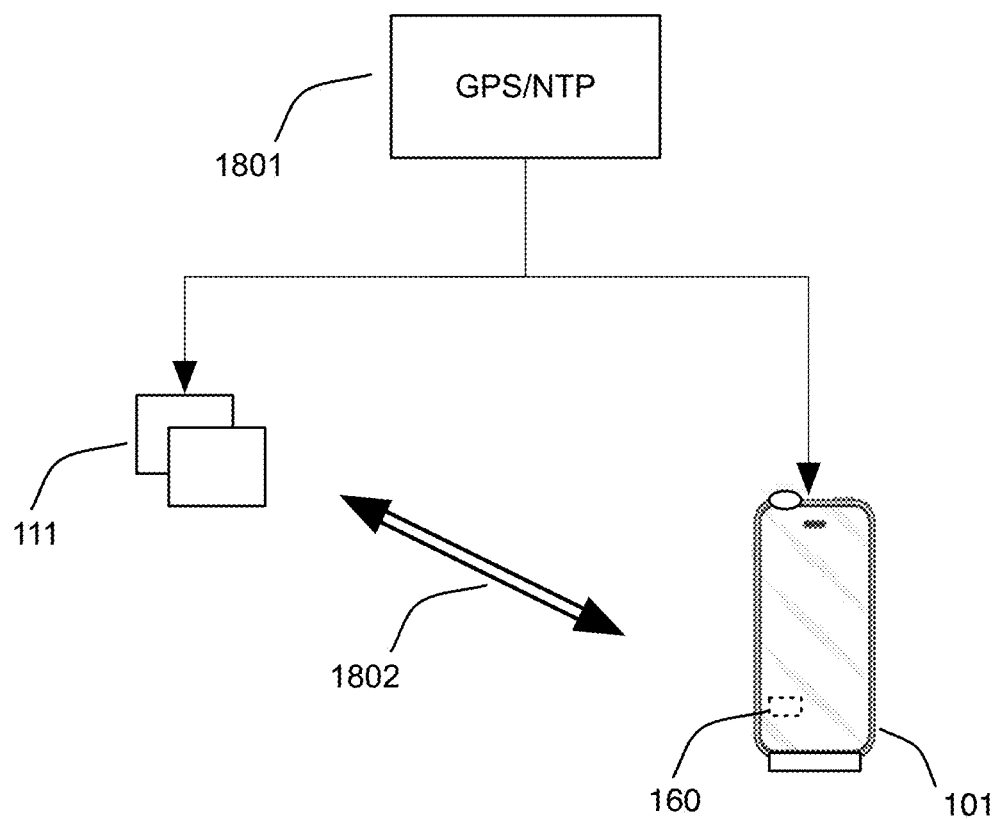
FIG. 18 illustrates an embodiment of the synchronization architecture that may be utilized by one or more embodiments of the invention.

FIG. 18 illustrates an embodiment of the synchronization architecture that may be utilized by one or more embodiments of the invention. Embodiments may synchronize clocks in the system using any type of synchronization methodology and in one or more embodiments the computer 160 on the mobile device 101 may determine a clock difference between the motion capture element 111 and the mobile device and synchronize the motion analysis data with the video. For example, one or more embodiments of the invention provides procedures for multiple recording devices to synchronize information about the time, location, or orientation of each device, so that data recorded about events from different devices can be combined. Such recording devices may be embedded sensors, mobile phones with cameras or microphones, or more generally any devices that can record data relevant to an activity of interest. In one or more embodiments, this synchronization is accomplished by exchanging information between devices so that the devices can agree on a common measurement for time, location, or orientation. For example, a mobile phone and an embedded sensor may exchange messages across link 1802, e.g., wirelessly, with the current timestamps of their internal clocks; these messages allow a negotiation to occur wherein the two devices agree on a common time. Such messages may be exchanged periodically as needed to account for clock drift or motion of the devices after a previous synchronization. In other embodiments, multiple recording devices may use a common server or set of servers 1801 to obtain standardized measures of time, location, or orientation. For example, devices may use a GPS system to obtain absolute location information for each device. GPS systems may also be used to obtain standardized time. NTP (Network Time Protocol) servers may also be used as standardized time servers. Using servers allows devices to agree on common measurements without necessarily being configured at all times to communicate with one another.

FIG. 19 illustrates the detection of an event by one of the motion capture sensors 111, transmission of the event detection, here shown as arrows emanating from the centrally located sensor 111 in the figure, to other motion capture sensors 111 and/or cameras, e.g., on mobile device 101, saving of the event motion data and trimming of the video to correspond to the event. In one or more embodiments of the invention, some of the recording devices may detect the occurrence of various events of interest. Some such events may occur at specific moments in time; others may occur over a time interval, wherein the detection includes detection of the start of an event and of the end of an event. These devices may record any combination of the time, location, or orientation of the recording device, for example included in memory buffer 4610 for example along with the event data, or in any other data structure, using the synchronized measurement bases for time, location, and orientation described above.

Embodiments of the computer on the mobile device may discard at least a portion of the video outside of the event start time to the event stop, for example portions 1910 and 1911 before and after the event or event with predefined pre and post intervals 1902 and 1903. In one or more embodiments, the computer may command or instruct other devices, including the computer or other computers, or another camera, or the camera or cameras that captured the video, to discard at least a portion of the video outside of the event start time to the event stop time. For example, in one or more embodiments of the invention, some of the recording devices capture data continuously to memory while awaiting the detection of an event. To conserve memory, some devices may store data to a more permanent local storage medium, or to server 172, only when this data is proximate in time to a detected event. For example, in the absence of an event detection, newly recorded data may ultimately overwrite previously recorded data in memory, depending on the amount of memory in each device that is recording motion data or video data. A circular buffer may be used in some embodiments as a typical implementation of such an overwriting scheme. When an event detection occurs, the recording device may store some configured amount of data prior to the start of the event, near start of pre interval 1902 and some configured amount of data after the end of the event, near 1903, in addition to storing the data captured during the event itself, namely 1901. Any pre or post time interval is considered part of the event start time and event stop time so that context of the event is shown in the video for example. This gives context to the event, for example the amount of pre time interval may be set per sport for example to enable a setup for a golf swing to be part of the event video even though it occurs before the actual event of striking the golf ball. The follow through may be recorded as per the amount of interval allotted for the post interval as well.

Embodiments of the system may include a server computer remote to the mobile device and wherein the server computer may discard at least a portion of the video outside of the event start time to the event stop and return the video captured during the timespan from the event start time to the event stop time to the computer in the mobile device. The server or mobile device may combine or overlay the motion analysis data or event data, for example velocity or raw acceleration data with or onto the video to form event video 1900, which may thus greatly reduce the amount of video storage required as portions 1910 and 1911 may be of much larger length in time that the event in general.

Embodiments of the at least one motion capture element, for example the microprocessor, may transmit the event to at least one other motion capture sensor or at least one other mobile device or any combination thereof, and wherein the at least one other motion capture sensor or the at least one other mobile device or any combination thereof may save data, or transmit data, or both associated with the event, even if the at least one other motion capture element has not detected the event. For example, in embodiments with multiple recording devices operating simultaneously, one such device may detect an event and send a message to other recording devices that such an event detection has occurred. This message can include the timestamp of the start and/or stop of the event, using the synchronized time basis for the clocks of the various devices. The receiving devices, e.g., other motion capture sensors and/or cameras may use the event detection message to store data associated with the event to nonvolatile storage, for example within motion capture element 111 or mobile device 101 or server 172. The devices may store some amount of data prior to the start of the event and some amount of data after the end of the event, 1902 and 1903 respectively, in addition to the data directly associated with the event 1901. In this way all devices can record data simultaneously, but use an event trigger from only one of the devices to initiate saving of distributed event data from multiple sources.

Embodiments of the computer may save the video from the event start time to the event stop time with the motion analysis data that occurs from the event start time to the event stop time or a remote server may be utilized to save the video. In one or more embodiments of the invention, some of the recording devices may not be in direct communication with each other throughout the time period in which events may occur. In these situations, devices may save complete records of all of the data they have recorded to permanent storage or to a server. Saving of only data associated with events may not be possible in these situations because some devices may not be able to receive event trigger messages. In these situations, saved data can be processed after the fact to extract only the relevant portions associated with one or more detected events. For example, multiple mobile devices may record video of a player or performer, and upload this video continuously to server 172 for storage. Separately the player or performer may be equipped with an embedded sensor that is able to detect events such as particular motions or actions. Embedded sensor data may be uploaded to the same server either continuously or at a later time. Since all data, including the video streams as well as the embedded sensor data, is generally timestamped, video associated with the events detected by the embedded sensor can be extracted and combined on the server. Embodiments of the server or computer may, while a communication link is open between the at least one motion capture sensor and the mobile device, discard at least a portion of the video outside of the event start time to the event stop and save the video from the event start time to the event stop time with the motion analysis data that occurs from the event start time to the event stop time. Alternatively, if the communication link is not open, embodiments of the computer may save video and after the event is received after the communication link is open, then discard at least a portion of the video outside of the event start time to the event stop and save the video from the event start time to the event stop time with the motion analysis data that occurs from the event start time to the event stop time. For example, in some embodiments of the invention, data may be uploaded to a server as described above, and the location and orientation data associated with each device's data stream may be used to extract data that is relevant to a detected event. For example, a large set of mobile devices may be used to record video at various locations throughout a golf tournament. This video data may be uploaded to a server either continuously or after the tournament. After the tournament, sensor data with event detections may also be uploaded to the same server. Post-processing of these various data streams can identify particular video streams that were recorded in the physical proximity of events that occurred and at the same time. Additional filters may select video streams where a camera was pointing in the correct direction to observe an event. These selected streams may be combined with the sensor data to form an aggregate data stream with multiple video angles showing an event.

The system may obtain video from a camera coupled with the mobile device, or any camera that is separate from or otherwise remote from the mobile device. In one or more embodiments, the video is obtained from a server remote to the mobile device, for example obtained after a query for video at a location and time interval.

Embodiments of the server or computer may synchronize the video and the event data, or the motion analysis data via image analysis to more accurately determine a start event frame or stop event frame in the video or both, that is most closely associated with the event start time or the event stop time or both. In one or more embodiments of the invention, synchronization of clocks between recording devices may be approximate. It may be desirable to improve the accuracy of synchronizing data feeds from multiple recording devices based on the view of an event from each device. In one or more embodiments, processing of multiple data streams is used to observe signatures of events in the different streams to assist with fine-grained synchronization. For example, an embedded sensor may be synchronized with a mobile device including a video camera, but the time synchronization may be accurate only to within 100 milliseconds. If the video camera is recording video at 30 frames per second, the video frame corresponding to an event detection on the embedded sensor can only be determined within 3 frames based on the synchronized timestamps alone. In one embodiment of the device, video frame image processing can be used to determine the precise frame corresponding most closely to the detected event. See FIG. 8 and description thereof for more detail. For instance, a shock from a snowboard hitting the ground as shown in FIG. 17, that is detected by an inertial sensor may be correlated with the frame at which the geometric boundary of the snowboard makes contact with the ground. Other embodiments may use other image processing techniques or other methods of detecting event signatures to improve synchronization of multiple data feeds.

Embodiments of the at least one motion capture element may include a location determination element that may determine a location that is coupled with the microcontroller and wherein the microcontroller may transmit the location to the computer on the mobile device. In one or more embodiments, the system further includes a server wherein the microcontroller may transmit the location to the server, either directly or via the mobile device, and wherein the computer or server may form the event video from portions of the video based on the location and the event start time and the event stop time. For example, in one or more embodiments, the event video may be trimmed to a particular length of the event, and transcoded to any or video quality for example on mobile device 101 or on server 172 or on computer 105 or any other computer coupled with the system, and overlaid or otherwise integrated with motion analysis data or event data, e.g., velocity or acceleration data in any manner. Video may be stored locally in any resolution, depth, or image quality or compression type to store video or any other technique to maximize storage capacity or frame rate or with any compression type to minimize storage, whether a communication link is open or not between the mobile device, at least one motion capture sensor and/or server. In one or more embodiments, the velocity or other motion analysis data may be overlaid or otherwise combined, e.g., on a portion beneath the video, that includes the event start and stop time, that may include any number of seconds before and/or after the actual event to provide video of the swing before a ball strike event for example. In one or more embodiments, the at least one motion capture sensor and/or mobile device(s) may transmit events and video to a server wherein the server may determine that particular videos and sensor data occurred in a particular location at a particular time and construct event videos from several videos and several sensor events. The sensor events may be from one sensor or multiple sensors coupled with a user and/or piece of equipment for example. Thus the system may construct short videos that correspond to the events, which greatly decreases video storage requirements for example.

In one or more embodiments, the microcontroller or the computer may determine a location of the event or the microcontroller and the computer may determine the location of the event and correlate the location, for example by correlating or averaging the location to provide a central point of the event, and/or erroneous location data from initializing GPS sensors may be minimized. In this manner, a group of users with mobile devices may generate videos of a golfer teeing off, wherein the event location of the at least one motion capture device may be utilized and wherein the server may obtain videos from the spectators and generate an event video of the swing and ball strike of the professional golfer, wherein the event video may utilize frames from different cameras to generate a BULLET TIME® video from around the golfer as the golfer swings. The resulting video or videos may be trimmed to the duration of the event, e.g., from the event start time to the event stop time and/or with any pre or post predetermined time values around the event to ensure that the entire event is captured including any setup time and any follow through time for the swing or other event.

In at least one embodiment, the computer may request or broadcast a request from camera locations proximal to the event or oriented to view the event, or both, and may request the video from the at least one camera proximal to the event, wherein the video includes the event. For example, in one or more embodiments, the computer on the mobile device may request at least one image or video that contains the event from at least one camera proximal to the event directly by broadcasting a request for any videos taken in the area by any cameras, optionally that may include orientation information related to whether the camera was not only located proximally to the event, but also oriented or otherwise pointing at the event. In other embodiments, the video may be requested by the computer on the mobile device from a remote server. In this scenario, any location and/or time associated with an event may be utilized to return images and/or video near the event or taken at a time near the event, or both. In one or more embodiments, the computer or server may trim the video to correspond to the event duration and again, may utilize image processing techniques to further synchronize portions of an event, such as a ball strike with the corresponding frame in the video that matches the acceleration data corresponding to the ball strike on a piece of equipment for example.

Embodiments of the computer on the mobile device or on the server may display a list of one or more times at which an event has occurred or wherein one or more events has occurred. In this manner, a user may find events from a list to access the event videos in rapid fashion.

Embodiments of the invention may include at least one motion capture sensor that is physically coupled with the mobile device. These embodiments enable any type of mobile phone or camera system with an integrated sensor, such as any type of helmet mounted camera or any mount that includes both a camera and a motion capture sensor to generate event data and video data.

In one or more embodiments of the invention, the system enables integration of motion event data and video event data. FIG. 1 illustrates core elements of embodiments of such a system. Motion event data may be provided by one or more motion capture elements 111, which may be attached to user 150 at location L1, to a piece of equipment 110, or to a mobile device 130. These motion capture elements may include one or more sensors that measure motion values such as orientation, position, velocity, acceleration, angular velocity, and angular acceleration. The motion capture elements may also include a memory, for storing capture data, and a microprocessor for analyzing this data. They may also include a communication interface for communicating with other devices and for transferring motion capture data. The communication interface may be wired or wireless. It may include for example, without limitation: a radio for a wireless network such as for example Bluetooth, Bluetooth Low Energy, 802.11, or cellular networks; a network interface card for a LAN or WAN wired network using a protocol such as for example Ethernet; a serial interface such as for example RS232 or USB; or a local bus interface such as for example ISA, PCI, or SPI.

In some embodiments the microprocessor coupled with the motion capture element may collect data from the sensor, store the data in its memory, and possibly analyze the data to recognize an event within the data. It may then transmit the raw motion data or the event data via the attached wired or wireless communication interface. This raw motion data or event data may include other information such an identifier of the motion capture element, the user, or the equipment, and an identifier of the type of event detected by the motion capture element.

In some embodiments the system may also include one or more computers 105 (a laptop or desktop computer), 160 (a mobile phone CPU), or other computers in communication with sensors or cameras. FIG. 1A illustrates possible components of an embodiment of a computer processor or "computer" 160 integrated into a mobile device. Computers may have a communication interface 164 that can communicate with the communication interfaces of one or more motion capture elements 111 to receive the event data associated with motion events. Computers may also have wired communication interfaces to communicate with motion capture elements or with other components or other computers. One or more embodiments may use combinations of wired and wireless communication interfaces. The computer may receive raw motion data, and it may analyze this data to determine events. In other embodiments the determination of events may occur in the motion capture element 111, and the computer (such as 105 or 160) may receive event data. Combinations of these two approaches are also possible in some embodiments.

In some embodiments the computer or computers may further analyze event data to generate motion analysis data. This motion analysis data may include characteristics of interest for the motion recorded by the motion capture element or elements. One or more computers may store the motion data, the event data, the motion analysis data, or combinations thereof for future retrieval and analysis. Data may be stored locally, such as in memory 162, or remotely as in database 172. In some embodiments the computer or computers may determine the start time and end time of a motion event from the event data. They may then request image data from a camera, such as 103, 130, 130a, or 130b, that has captured video or one or more images for some time interval at least within some portion of the time between this event start time and event end time. The term video in this specification will include individual images as well as continuous video, including the case of a camera that takes a single snapshot image during an event interval. This video data may then be associated with the motion data to form a portion of a video and motion capture integration system. As shown camera 103 at location L2 has field of view F2, while camera on mobile device 102a at position L3 has field of view F3. For cameras whose field of view overlaps an event, intelligent selection of the best video is achieved in at least one embodiment via image analysis. Sensors 107, such as environmental sensors may also be utilized to trigger events or at least be queried for values to combine with event videos, for example wind speed, humidity, temperature, sound, etc. In other embodiments, the system may query for video and events within a predefined area around location L1, and may also use field of view of each camera at L2 and L3 to determine if the video has potentially captured the event.

In some embodiments the request of video from a camera may occur concurrently with the capture or analysis of motion data. In such embodiments the system will obtain or generate a notification that an event has begun, and it will then request that video be streamed from one or more cameras to the computer until the end of the event is detected. In other embodiments, the user may gesture by tapping or moving a motion capture sensor a predefined number of time to signify the start of an event, for example tapping a baseball bat twice against the batter's shoes may signify the start of an at bat event.

In other embodiments the request of video may occur after a camera (such as 103) has uploaded its video records to another computer, such as a server 172. In this case the computer will request video from the server 172 rather than directly from the camera.

Figure 1E:
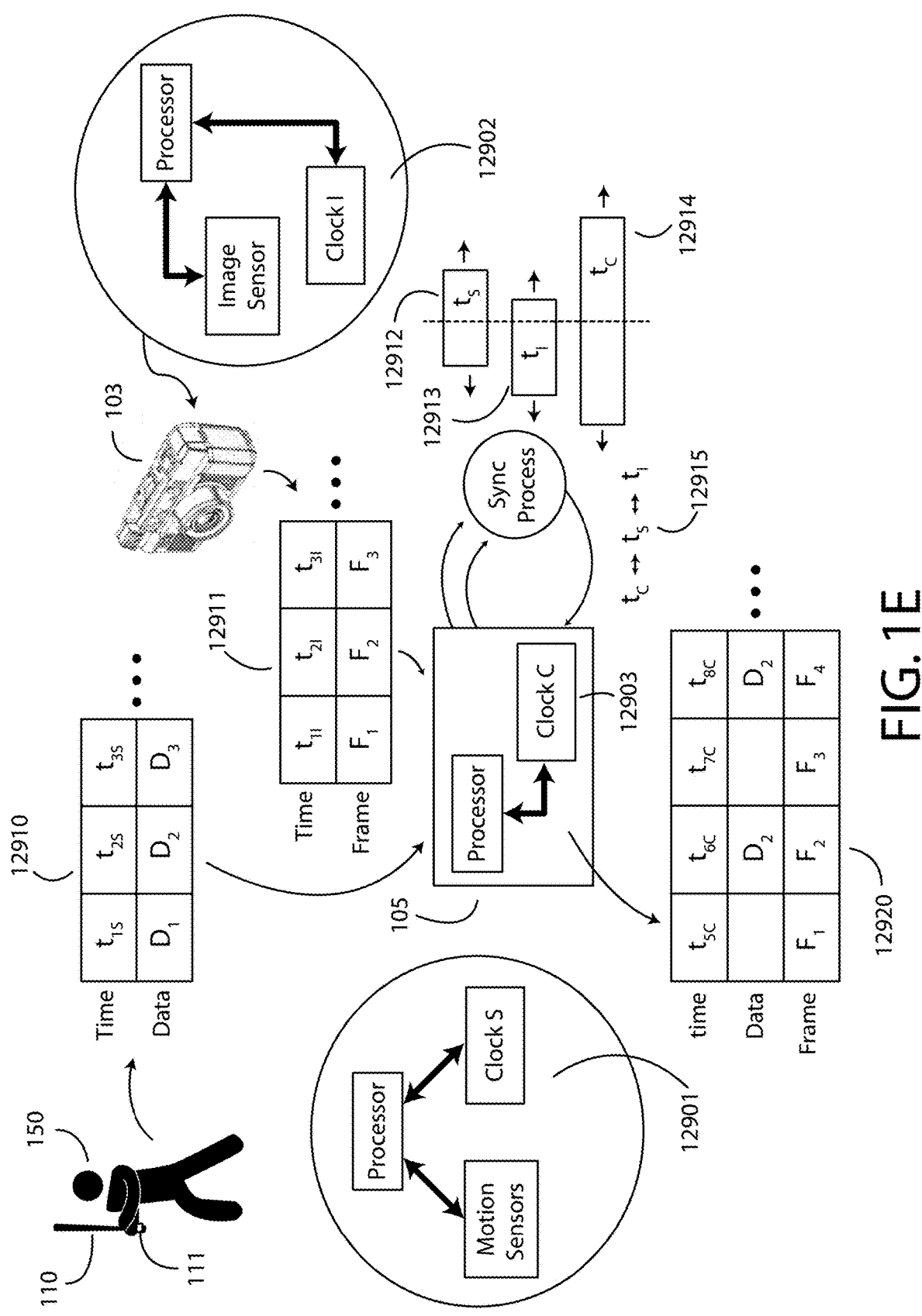
FIG. 1E illustrates a synchronization chart that details the shifting of motion event times and/or video event times to align correctly in time.

In some embodiments the computer or computers may perform a synchronization of the motion data and the video data. Various techniques may be used to perform this synchronization. FIG. 1E illustrates an embodiment of this synchronization process. Motion capture element 111 includes a clock 12901, designated as "Clock S". When an event occurs, the motion capture element generates timestamped data 12910, with times $t_{1S}$, $t_{2S}$, $t_{3S}$, etc. from Clock S. Camera 103 captures video or images of some portion of the event. The camera also includes a clock 12902, designated as "Clock I". The camera generates timestamped image data 12911, with times $t_{1I}$, $t_{2I}$, $t_{3I}$, etc. from Clock I. Computer 105 receives the motion data and the image data. The computer contains another clock 12903, designated as "Clock C". The computer executes a synchronization process that consists of aligning the various time scales from the three clocks 12912, 12913, and 12914. The result of this synchronization is a correspondence between the clocks 12915. In general the alignment of clocks may require generating clock differences as well as stretching or shrinking timescales to reflect different clock rates. In some embodiments individual data frames or image frames may not be timestamped, but instead the first or last frame may be associated with a time and there may be a known clock rate for frame capture. In other embodiments data may not include a timestamp, but may be transmitted immediately upon capture so that the computer can estimate the time of capture based on time of receipt and possible network latency.

In the embodiment illustrated in FIG. 1E, the computer generates a synchronized event video 12920, which will include at least some of the motion data, event data, or motion analysis data obtained or calculated between the event start time and the event end time, and some of the video or images obtained from the camera within this start time and end time. This synchronized event video provides an augmented, integrated record of the event that incorporates both motion data and image data. In the example shown the synchronization process has assigned the first image frame $F_1$ to time $t_{5C}$, and the first motion data frame $D_1$ to time $t_{6C}$. In this example the image frame capture rate is twice the data frame capture rate.

One or more embodiments of the invention may also obtain at least one video start time and at least one video stop time associated with at least one video from at least one camera. One of the computers on the system may optionally synchronize the event data, the motion analysis data or any combination thereof with the at least one video based on a first time associated with the data or the event data obtained from the at least one motion capture element coupled with the user or the piece of equipment or the mobile device coupled with the user and at least one time associated the at least one video to create at least one synchronized event video. Embodiments command at least one camera to transfer the at least one synchronized event video captured at least during a timespan from within the event start time to the event stop time to another computer without transferring at least a portion of the video that occurs outside of the at least one video that occurs outside of the timespan from within the event start time to the event stop time to the another computer. One or more embodiments also may overlay a synchronized event video including both of the event data, the motion analysis data or any combination thereof that occurs during the timespan from the event start time to the event stop time and the video captured during the timespan from the event start time to the event stop time.

In one or more embodiments of the invention, a computer may discard video that is outside of the time interval of an event, measured from the start time of an even to the stop time of an event. This discarding may save considerable storage resources for video storage by saving only the video associated with an event of interest. FIG. 19 illustrates an embodiment of this process. Synchronized event video 1900 includes motion and image data during an event, 1901, and for some predefined pre and post intervals 1902 and 1903. Portions 1910 and 1911 before and after the pre and post intervals are discarded.

In one or more embodiments, a computer that may receive or process motion data or video data may be a mobile device, including but not limited to a mobile telephone, a smartphone 120, a tablet, a PDA, a laptop 105, a notebook, or any other device that can be easily transported or relocated. In other embodiments, such a computer may be integrated into a camera 103, 104, and in particular it may be integrated into the camera from which video data is obtained. In other embodiments, such a computer may be a desktop computer or a server computer 152, including but not limited to virtual computers running as virtual machines in a data center or in a cloud-based service. In some embodiments, the system may include multiple computers of any of the above types, and these computers may jointly perform the operations described in this specification. As will be obvious to one skilled in the art, such a distributed network of computers can divide tasks in many possible ways and can coordinate their actions to replicate the actions of a single centralized computer if desired. The term computer in this specification is intended to mean any or all of the above types of computers, and to include networks of multiple such computers acting together.

In one or more embodiments, a microcontroller associated with a motion capture element 111, and a computer 105, may obtain clock information from a common clock and to set their internal local clocks 12901 and 12903 to this common value. This methodology may be used as well to set the internal clock of a camera 12902 to the same common clock value. The common clock value may be part of the system, or it may be an external clock used as a remote time server. Various techniques may be used to synchronize the clocks of individual devices to the common clock, including Network Time Protocol or other similar protocols. FIG. 18 illustrates an embodiment of the invention that uses an NTP or GPS server 1801 as a common time source. By periodically synchronizing clocks of the devices to a common clock 1801, motion capture data and video data can be synchronized simply by timestamping them with the time they are recorded.

Figure 20:
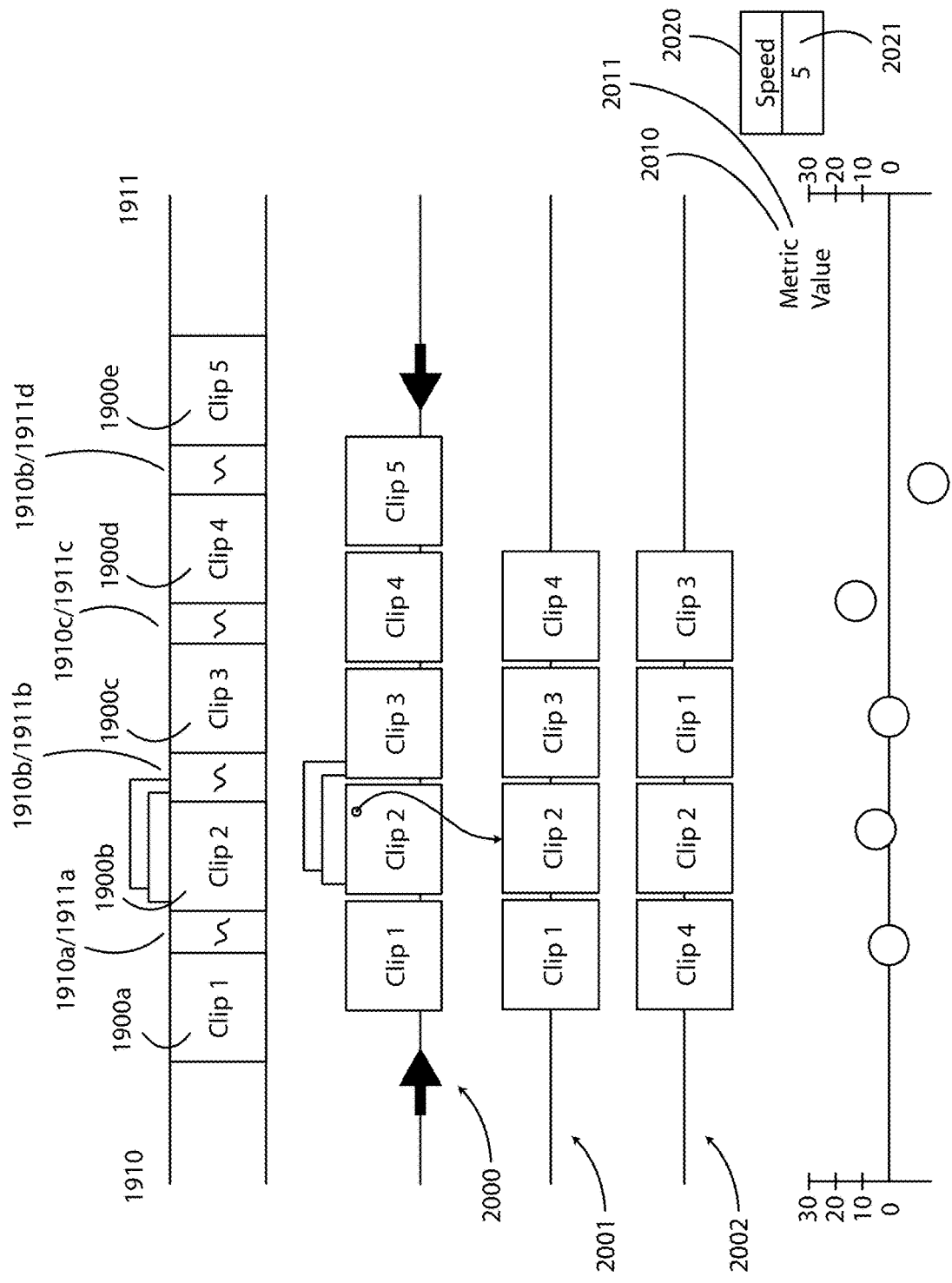
FIG. 20 illustrates the process of culling a video for event videos, and selection of a best video clip for an event period where multiple cameras captured videos of the same event, along with a selected sequence of synchronized event videos based on a selected metric, along with event videos sorted by selection criteria.

In one or more embodiments, the computer may obtain or create a sequence of synchronized event videos. The computer may display a composite summary of this sequence for a user to review the history of the events. FIG. 20 illustrates an embodiment of this process. Video clips 1900a, 1900b, 1900c, 1900d, and 1900e are obtained at different times corresponding to different events. Video or motion data prior to these events, 1910 and 1911, and between these events, 1910a, 1901b, 1910c, and 1910d, is removed. The result is composite summary 2000. In some embodiments this summary may include one or more thumbnail images generated from the videos. In other embodiments the summary may include smaller selections from the full event video. The composite summary may also include display of motion analysis or event data associated with each synchronized event video. In some embodiments, the computer may obtain or accept a metric, such as a metric associated with the at least one synchronized event video, and display the value of this metric for each event. The display of these metric values may vary in different embodiments. In some embodiments the display of metric values may be a bar graph, line graph, or other graphical technique to show absolute or relative values. In other embodiments colorcoding or other visual effects may be used. In other embodiments the numerical values of the metrics may be shown. Some embodiments may use combinations of these approaches. In the example illustrated in FIG. 20 the metric value for Speed associated with each event is shown as a graph with circles for each value.

In one or more embodiments, the computer may accept selection criteria for a metric 2010 of interest associated with the motion analysis data or event data of the sequence of events. For example, a user may provide criteria such as metrics 2010 exceeding a threshold, or inside a range, or outside a range, 2011. Any criteria may be used that may be applied to the metric values 2010, 2011 of the events. In response to the selection criteria, the computer may display only the synchronized event videos or their summaries (such as thumbnails) that meet the selection criteria. FIG. 20 illustrates an embodiment of this process. A selection criterion 2010 has been provided specifying that Speed 2020 should be at least 5, 2021. The computer responds by displaying 2001 with Clips 1 through Clip 4; Clip 5 has been excluded based on its associated speed.

In one or more embodiments, the computer may determine a matching set of synchronized event videos that have values associated with the metric that pass the selection criteria, and display the matching set of synchronized event videos or corresponding thumbnails thereof along with the value associated with the metric for each of the matching set of synchronized event videos or the corresponding thumbnails.

In some embodiments of the invention, the computer may sort and rank synchronized event videos for display based on the value of a selected metric. This sorting and ranking may occur in some embodiments in addition to the filtering based on selection criteria as described above. The computer may display an ordered list of metric values, along with videos or thumbnails associated with the events. Continuing the example above as illustrated in FIG. 20, if a sorted display based on Speed is specified, the computer generates 2002 with clips reordered from highest speed to lowest speed. In one or more embodiments, the computer may generate a highlight reel, or fail reel, or both, for example of the matching set of synchronized events, that combines the video for events that satisfy selection criteria. Such a highlight reel or fail reel, in at least one embodiment, may include the entire video for the selected events, or a portion of the video that corresponds to the important moments in the event as determined by the motion analysis. In some embodiments the highlight reel or fail reel may include overlays of data or graphics on the video or on selected frames showing the value of metrics from the motion analysis. Such a highlight reel or fail reel may be generated automatically for a user once the user indicates which events to include by specifying selection criteria. In some embodiments the computer may allow the user to edit the highlight reel or fail reel to add or remove events, to lengthen or shorten the video shown for each event, to add or remove graphic overlays for motion data, or to add special effects or soundtracks.

In one or more embodiments, a video and motion integration system may incorporate multiple cameras, such as cameras 103, 104, 130, 130*a*, and 130*b*. In such embodiments, a computer may request video corresponding to an event timeframe from multiple cameras that captured video during this timeframe. Each of these videos may be synchronized with the event data and the motion analysis data as described above for the synchronization of a single video. Videos from multiple cameras may provide different angles or views of an event, all synchronized to motion data and to a common time base.

Figure 21:
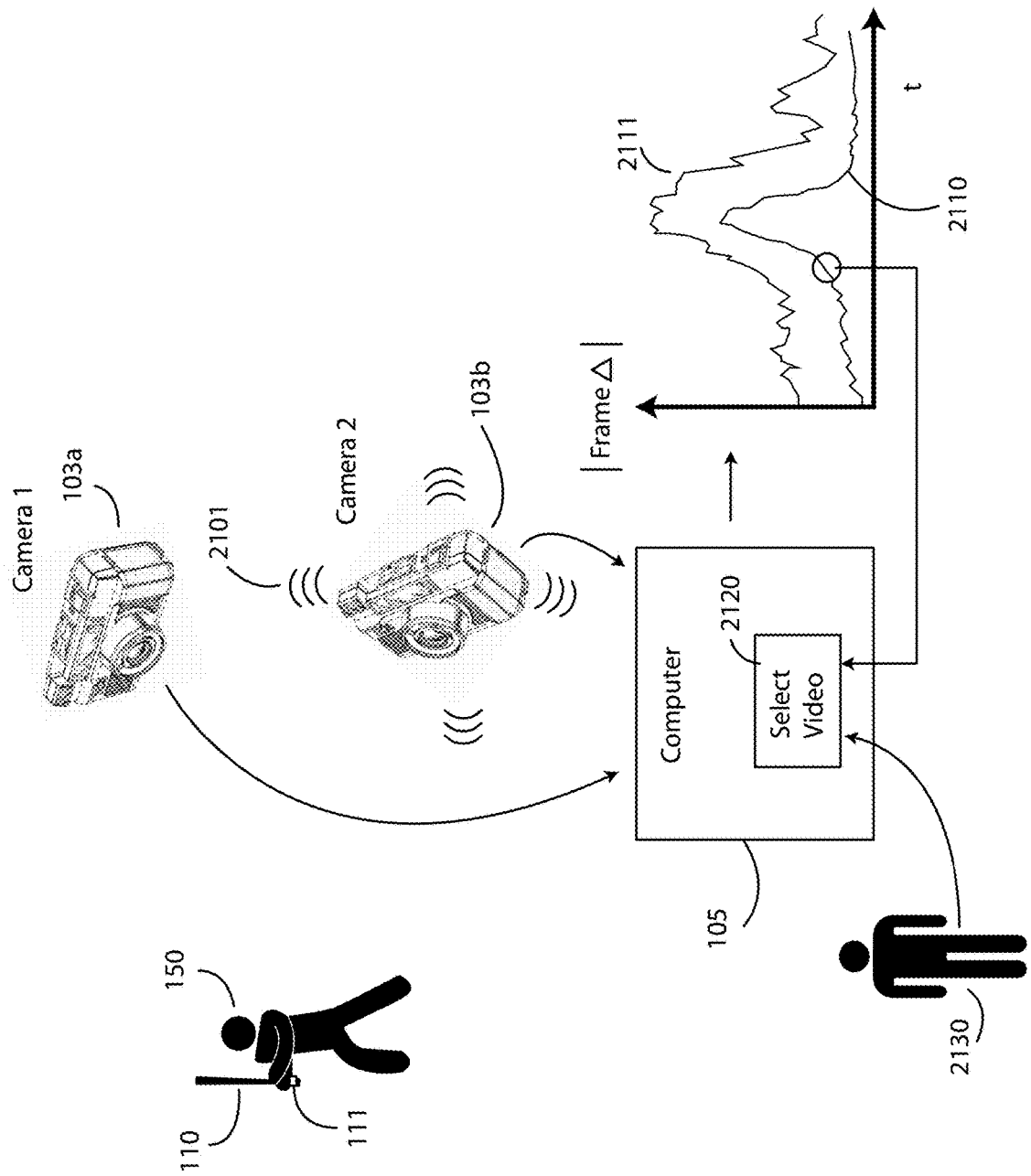
FIG. 21 illustrates image analysis to select a particular event video based on the degree of shaking of a camera during the capture of the video, and selection of the video with the most stable images.

In one or more embodiments with multiple cameras, the computer may select a particular video from the set of possible videos associated with an event. The selected video may be the best or most complete view of the event based on various possible criteria. In some embodiments the computer may use image analysis of each of the videos to determine the best selection. For example, some embodiments may use image analysis to determine which video is most complete in that the equipment or people of interest are least occluded or are most clearly visible. In some embodiments this image analysis may include analysis of the degree of shaking of a camera during the capture of the video, and selection of the video with the most stable images. FIG. 21 illustrates an embodiment of this process. Motion capture element 111 indicates an event, which is recorded by cameras 103*a* and 103*b*. Computer 105 retrieves video from both cameras. Camera 103*b* has shaking 2101 during the event. To determine the video with least shaking, Computer 105 calculates an inter-frame difference for each video. For example, this difference may include the sum of the absolute value of differences in each pixel's RGB values across all pixels. This calculation results in frame differences 2111 for camera 103*b* and 2110 for camera 103*a*. The inter-frame differences in both videos increase as the event occurs, but they are consistently higher in 2111 because of the increased shaking. The computer is thus able to automatically select video 2110 in process 2120. In some embodiments a user 2130 may make the selection of a preferred video, or the user may assist the computer in making the selection by specifying the most important criteria.

In one or more embodiments of the invention, the computer may obtain or generate notification of the start of an event, and it may then monitor event data and motion analysis data from that point until the end of the event. For example, the microcontroller associated with the motion capture element may send event data periodically to the computer once the start of an event occurs; the computer can use this data to monitor the event as it occurs. In some embodiments this monitoring data may be used to send control messages to a camera that can record video for the event. In embodiments with multiple cameras, control messages could be broadcast or could be send to a set of cameras during the event. In at least one embodiment, the computer may send a control message local to the computer or external to the computer to at least one camera.

Figure 22:
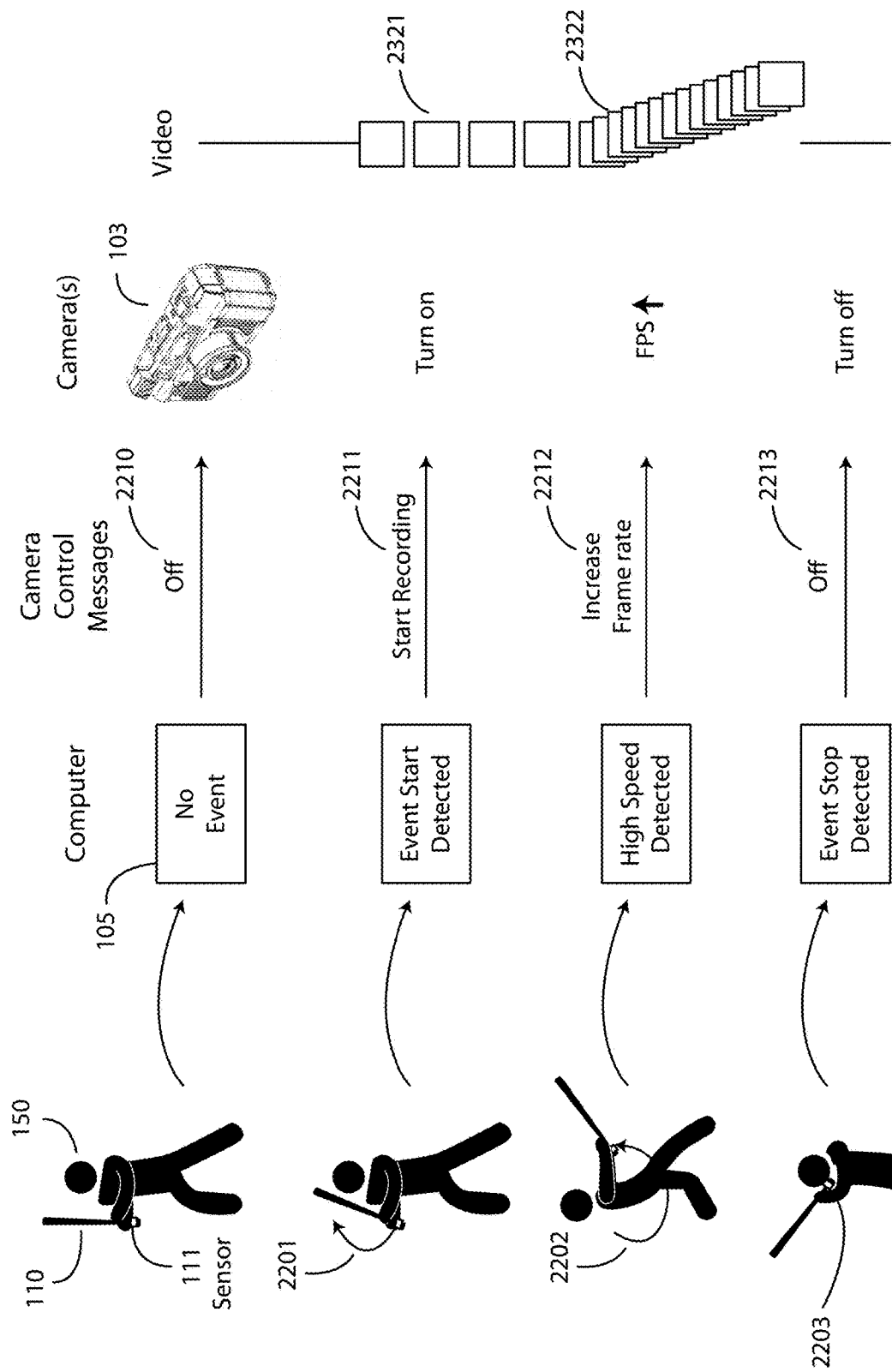
FIG. 22 illustrates control messages sent to the camera or cameras to modify the video recording parameters based on the data associated with the event, including the motion analysis data, for example while the event is occurring.

In some embodiments these control messages sent to the camera or cameras may modify the video recording parameters of the at least one video based on the data associated with the event, including the motion analysis data. FIG. 22 illustrates an embodiment of this process. Motion capture sensor 111 transmits motion data to computer 105, which then sends control messages to camera 103. In the example shown, equipment 110 is initially at rest prior to an event. The computer detects that there is no active event, and sends message 2210 to the camera instructing it to turn off recording and await events. Motion 2201 begins and the computer detects the start of the event; it sends message 2211 to the camera to turn on recording, and the camera begins recording video frames 2321 at a normal rate. Motion increases rapidly at 2202 and the computer detects high speed; it sends message 2212 to the camera to increase its frame rate to capture the high speed event. The camera generates video frames 2322 at a high rate. By using a higher frame rate during rapid motion, the user can slow the motion down during playback to observe high motion events in great detail. At 2203 the event completes, and the computer sends message 2213 to the camera to stop recording. This conserves camera power as well as video memory between events.

More generally in some embodiments a computer may send control messages to a camera or cameras to modify any relevant video recording parameters in response to event data or motion analysis data. These recording parameters may for example include the frame rate, resolution, color depth, color or grayscale, compression method, and compression quality of the video, as well as turning recording on or off.

In one or more embodiments of the invention, the computer may accept a sound track, for example from a user, and integrate this sound track into the synchronized event video. This integration would for example add an audio sound track during playback of an event video or a highlight reel or fail reel. Some embodiments may use event data or motion analysis data to integrate the sound track intelligently into the synchronized event video. For example, some embodiments may analyze a sound track to determine the beats of the sound track based for instance on time points of high audio amplitude. The beats of the sound track may then be synchronized with the event using event data or motion analysis data. For example such techniques may automatically speed up or slow down a sound track as the motion of a user or object increases or decreases. These techniques provide a rich media experience with audio and visual cues associated with an event.

In one or more embodiments, a computer may playback a synchronized event video on one or more displays. These displays may be directly attached to the computer, or may be remote on other devices. Using the event data or the motion analysis data, the computer may modify the playback to add or change various effects. These modifications may occur multiple times during playback, or even continuously during playback as the event data changes.

As an example, in some embodiments the computer may modify the playback speed of a synchronized event video based on the event data or the motion analysis data. For instance, during periods of low motion the playback may occur at normal speed, while during periods of high motion the playback may switch to slow motion to highlight the details of the motion. Modifications to playback speed may be made based on any observed or calculated characteristics of the event or the motion. For instance, event data may identify particular sub-events of interest, such as the striking of a ball, beginning or end of a jump, or any other interesting moments. The computer may modify the playback speed to slow down playback as the synchronized event video approaches these sub-events. This slowdown could increase continuously to highlight the sub-event in fine detail. Playback could even be stopped at the sub-event and await input from the user to continue. Playback slowdown could also be based on the value of one or more metrics from the motion analysis data or the event data. For example, motion analysis data may indicate the speed of a moving baseball bat or golf club, and playback speed could be adjusted continuously to be slower as the speed of such an object increases. Playback speed could be made very slow near the peak value of such metrics.

Figure 23:
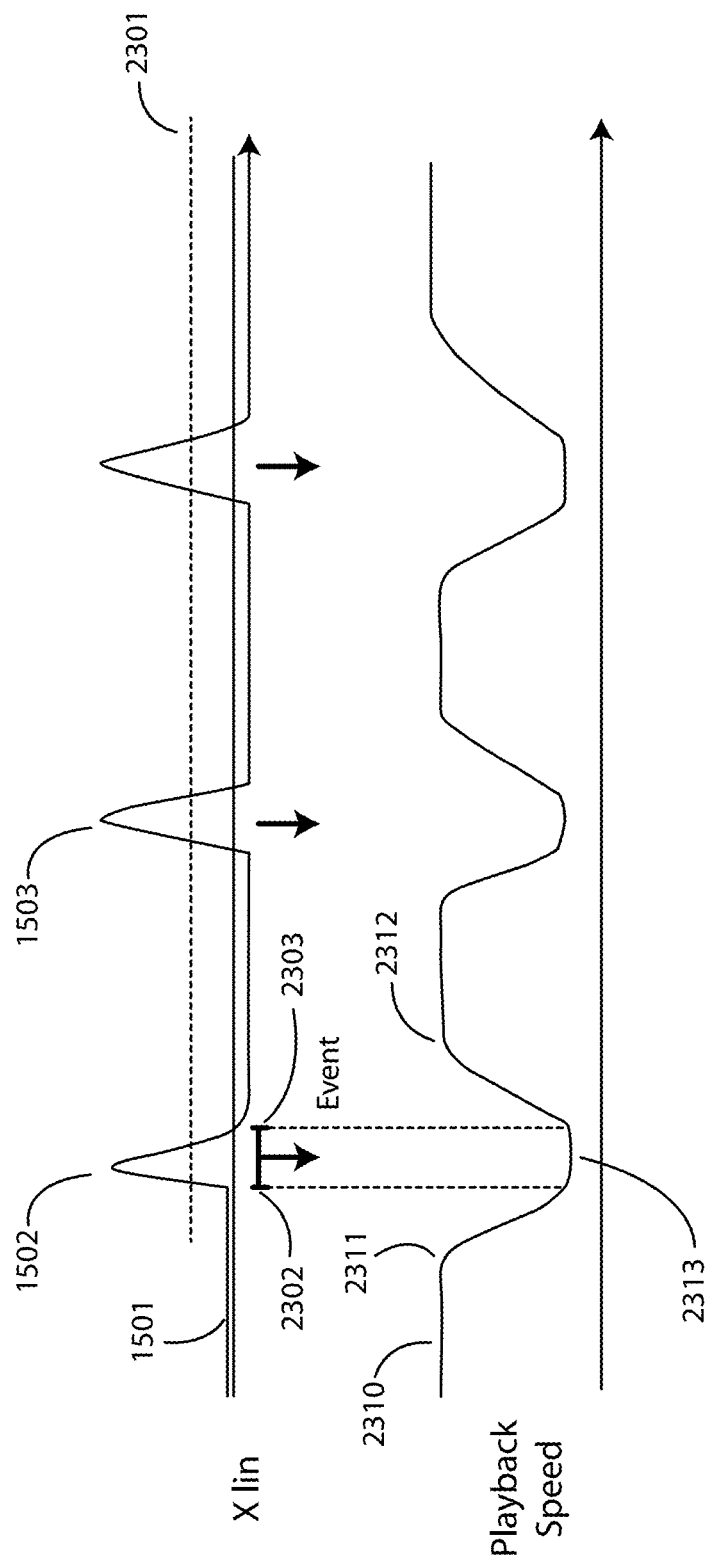
FIG. 23 illustrates an embodiment of variable speed playback using motion data.

FIG. 23 illustrates an embodiment of variable speed playback using motion data. Motion capture element 111 records motion sensor information including linear acceleration on the x-axis 1501. (In general many additional sensor values may be recorded as well; this example uses a single axis for simplicity.) Event threshold 2301 defines events of interest when the x-axis linear acceleration exceeds this threshold. Events are detected at 1502 and 1503. Event 1502 begins at 2302 and completes at 2303. On playback, normal playback speed 2310 is used between events. As the beginning of event 1502 approaches, playback speed is reduced starting at 2311 so the user can observe pre-event motion in greater detail. During the event playback speed is very slow at 2313. After the event end at 2303 playback speed increases gradually back to normal speed at 2312.

In other embodiments, modifications could be made to other playback characteristics not limited to playback speed. For example, the computer could modify any or all of playback speed, image brightness, image colors, image focus, image resolution, flashing special effects, or use of graphic overlays or borders. These modifications could be made based on motion analysis data, event data, sub-events, or any other characteristic of the synchronized event video. As an example, as playback approaches a sub-event of interest, a flashing special effect could be added, and a border could be added around objects of interest in the video such as a ball that is about to be struck by a piece of equipment.

In embodiments that include a sound track, modifications to playback characteristics can include modifications to the playback characteristics of the sound track. For example such modifications may include modifications to the volume, tempo, tone, or audio special effects of the sound track. For instance the volume and tempo of a sound track may be increased as playback approaches a sub-event of interest, to highlight the sub-event and to provide a more dynamic experience for the user watching and listening to the playback.

In one or more embodiments of the invention, a computer may use event data or motion analysis data to selectively save only portions of video stream or recorded video. This is illustrated in FIG. 19 where video portions 1910 and 1911 are discarded to save only the event video 1901 with a pre-event portion 1902 and a post-event portion 1903. Such techniques can dramatically reduce the requirements for video storage by focusing on events of interest. In some embodiments, a computer may have an open communication link to a motion capture sensor while an event is in progress. The computer may then receive or generate a notification of a start of an event, and begin saving video at that time; it may then continue saving video until it receives or generates a notification of the end of the event. The computer may also send control messages to a camera or cameras during the event to initiate and terminate saving of video on the cameras, as illustrated in FIG. 22.

In other embodiments the computer may save or receive videos and event data after the event has completed, rather than via a live communication link open through the event. In these embodiments the computer can truncate the saved video to discard a portion of the video outside the event of interest. For example, a server computer 152 may be used as a repository for both video and event data. The server could correlate the event data and the video after upload, and truncate the saved video to only the timeframes of interest as indicated by the event data.

Figure 24:
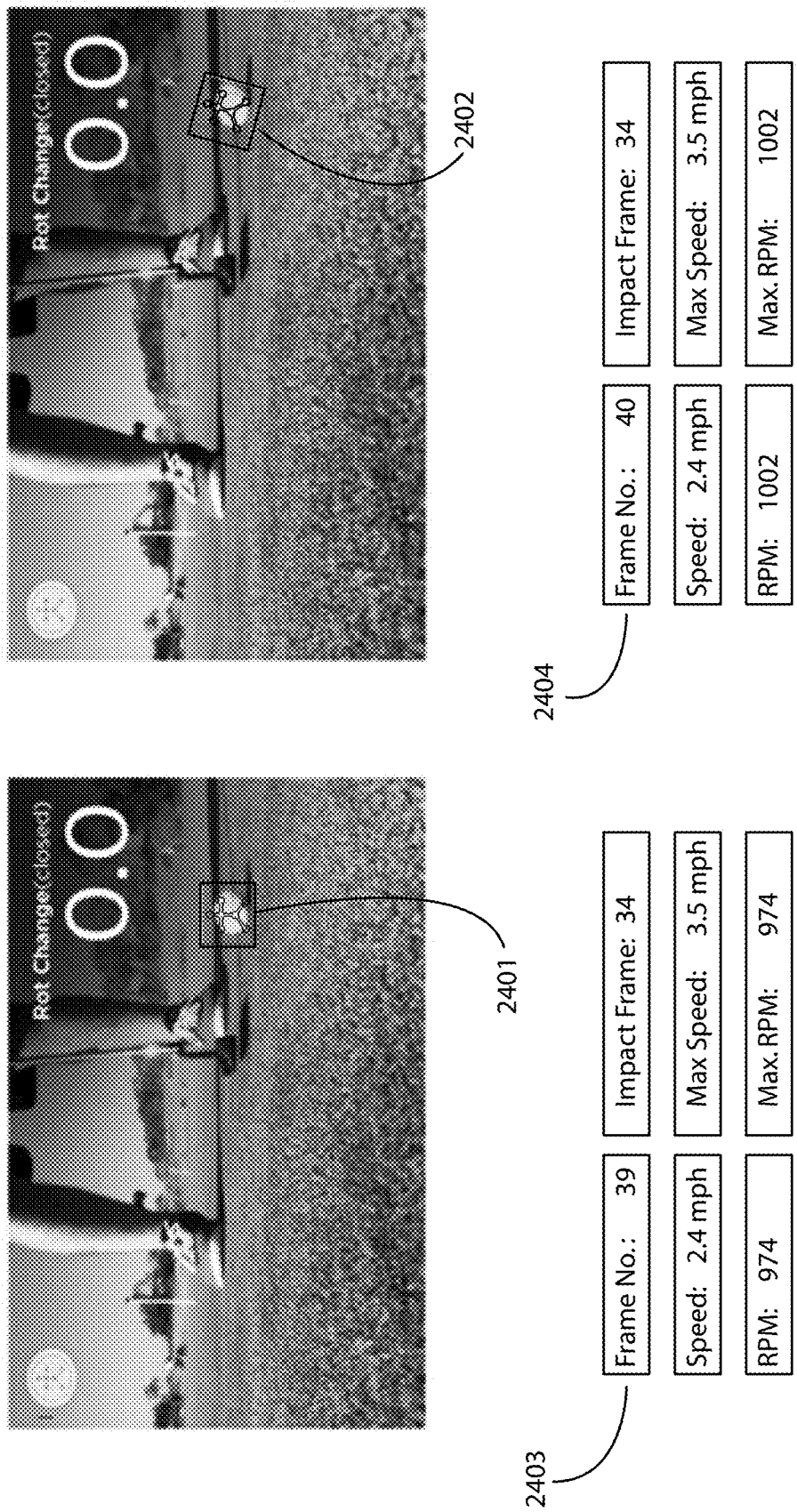
FIG. 24 illustrates image analysis of a video to assist with synchronization of the video with event data and motion analysis data and/or determine a motion characteristic of an object in the video not coupled with a motion capture sensor.

In one or more embodiments a computer may use image analysis of a video to assist with synchronization of the video with event data and motion analysis data. For example, motion analysis data may indicate a strong physical shock (detected, for instance, using accelerometers) that comes for instance from the striking of a ball like a baseball or a golf ball, or from the landing of a skateboard after a jump. The computer may analyze the images from a video to locate the frame where this shock occurs. For example, a video that records a golf ball may use image analysis to detect in the video stream when the ball starts moving; the first frame with motion of the golf ball is the first frame after the impact with the club, and can then be synchronized with the shock in the corresponding motion analysis data. This is illustrated in FIG. 24 where image analysis of the video identifies golf ball 2401. The frame where ball 2401 starts moving, indicated in the example as Impact Frame 34, can be matched to a specific point in the motion analysis data that shows the shock of impact. These video and motion data frames can be used as key frames; from these key frames the video frames that correspond most closely to the start and end of an event can be derived.

In one or more embodiments, a computer may use image analysis of a video to generate a metric from an object within the video. This metric may for instance measure some aspect of the motion of the object. Such metrics derived from image analysis may be used in addition to or in conjunction with metrics obtained from motion analysis of data from motion sensors. In some embodiments image analysis may use any of several techniques known in the art to locate the pixels associated with an object of interest. For instance, certain objects may be known to have specific colors, textures, or shapes, and these characteristics can be used to locate the objects in video frames. As an example, a golf ball may be known to be approximately round, white, and of texture associate with the ball's materials. Using these characteristics image analysis can locate a golf ball in a video frame. Using multiple video frames the approximate speed and rotation of the golf ball could be calculated. For instance, assuming a stationary or almost stationary camera, the location of the golf ball in three-dimensional space can be estimated based on the ball's location in the video frame and based on its size. The location in the frame gives the projection of the ball's location onto the image plane, and the size provides the depth of the ball relative to the camera. By using the ball's location in multiple frames, and by using the frame rate which gives the time difference between frames, the ball's velocity can be estimated.

FIG. 24 illustrates this process where golf ball is at location 2401 in frame 2403, and location 2402 in frame 2404. The golf ball has an icon that can be used to measure the ball's distance from the camera and its rotation. The velocity of the ball can be calculated using the distance moved between frames and the time gap between frames. As a simple example if the ball's size does not change appreciably between frames, the pixel difference between the ball's locations 2402 and 2401 can be translated to distance using the camera's field of view and the ball's apparent size. The frame difference shown in the example is 2 frames (Frame 39 to Frame 41), which can be converted to time based on the frame rate of the camera. Velocity can then be calculated as the ratio of distance to time.

In one or more embodiments, a computer can access previously stored event data or motion analysis data to display comparisons between a new event and one or more previous events. These comparisons can be for the same user and same equipment over time, or between different users and different equipment. These comparisons can provide users with feedback on their changes in performance, and can provide benchmarks against other users or users of other types or models of equipment. As an illustration, FIG. 1D shows device 101 receiving event data associated with users 150 and 152. This data is transmitted to computer 105 for display and comparison. A user 151 can compare performance of user 150 and 152, and can track performance of each user over time.

Figure 1F:
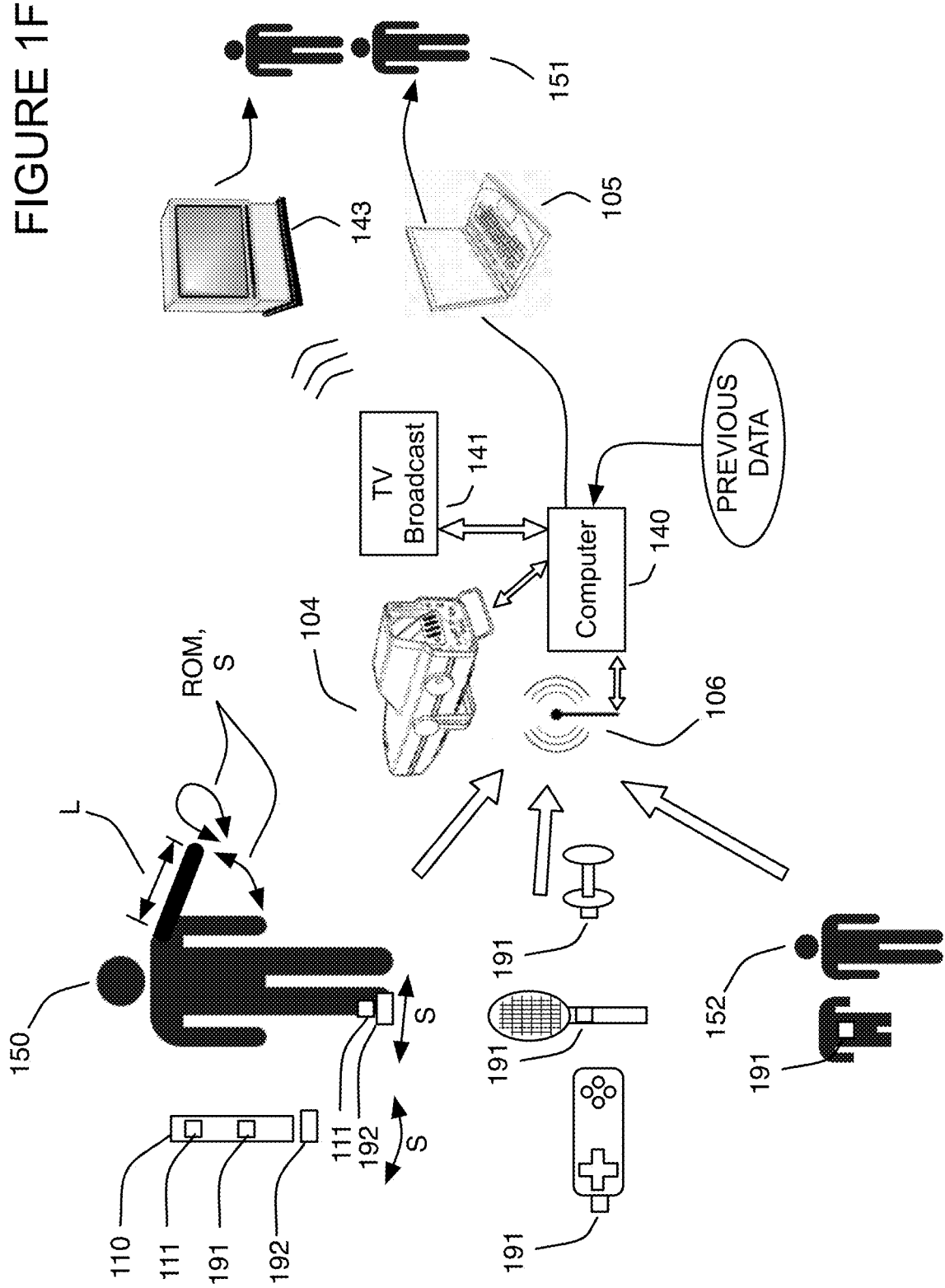
FIG. 1F illustrates a data flow diagram for an embodiment of the system, including broadcasting components.

FIGS. 1F and 1G illustrate an embodiment of the system that enables broadcasting images with augmented motion data including at least one camera 103, 104, configured to receive images associated with or otherwise containing at least one motion capture element 111, a computer 140, and a wireless communication interface 106 configured to receive motion capture data from the at least one motion capture element. In one or more embodiments, the computer 140 is coupled with the wireless communication interface 106 and the at least one camera, and the computer 140 is configured to receive the motion capture data after a communications link to the at least one motion capture element 111 is available and capable of receiving information for example as shown in FIG. 1F, and FIG. 1G at 1191. Embodiments also may receive the motion capture data after an event or periodically request the motion capture data, at 1192 of FIG. 1G, as per FIG. 1F from the at least one motion capture element 111 as per FIG. 1. This enables the system to withstand communication link outages, and even enables the synchronization of video with motion capture data in time at a later point in time, for example once the motion capture element is in range of the wireless receiver. Embodiments may receive motion capture data from at least one motion capture element 111, for example from one user 150 or multiple users 150, 151, 152 or both. One or more embodiments also may recognize the at least one motion capture element 111 associated with a user 150 or piece of equipment 110 and associate the at least one motion capture element 111 with assigned locations on the user 150 or the piece of equipment 110, at 1193 of FIG. 1G. For example, when a user performs a motion event, such as swinging, hitting, striking, or any other type of motion-related activity, the system is able to associate the motion event with locations on the user, or equipment such as a golf club, racket, bat, glove, or any other object, to recognize, or identify, the at least one motion capture element. Embodiments may also receive data associated with the at least one motion capture element 111 via the wireless communication interface at 1194 as per FIG. 1G, and also may receive one or more images of the user associated with the motion capture element at 1195 of FIG. 1G from the at least one camera 103, 104. Such data and images allow the system to, for example, obtain an array of information associated with users, equipment, and events and/or to output various performance elements therefrom. One or more embodiments may also analyze the data to form motion analysis data at 1196 of FIG. 1G. Motion analysis data, for example, allows the system to obtain and/or output computer performance information to for example broadcast to the users, to viewers, coaches, referees, networks, and any other element capable of receiving such information. Motion analysis data for example may show motion related quantitative data in a graphical or other easy to understand viewing format to make the data more understandable to the user than for example pure numerical lists of acceleration data. For example, as shown in FIG. 1G, embodiments of the invention may also at 1197, draw a three-dimensional overlay onto at least one of the one or more images of the user, a rating onto at least one of the one or more images of the user, at least one power factor value onto at least one of the one or more images of the user, a calculated ball flight path onto at least one of the one or more images of the user, a time line showing points in time along a time axis where peak values occur onto at least one of the one or more images of the user, an impact location of a ball on the piece of equipment onto at least one of the one or more images of the user, a slow motion display of the user shown from around the user at various angles at normal speed onto at least one of the one or more images of the user, or any combination thereof associated with the motion analysis data. One or more embodiments may also broadcast the images at 1198, to a multiplicity of display devices including television 143, mobile devices 101, 102, 102a, 102b, computer 105, and/or to the Internet 171. For example, the multiplicity of display devices may include televisions, mobile devices, or a combination of both televisions and mobile devices, or any other devices configured to display images.

Figure 1H:
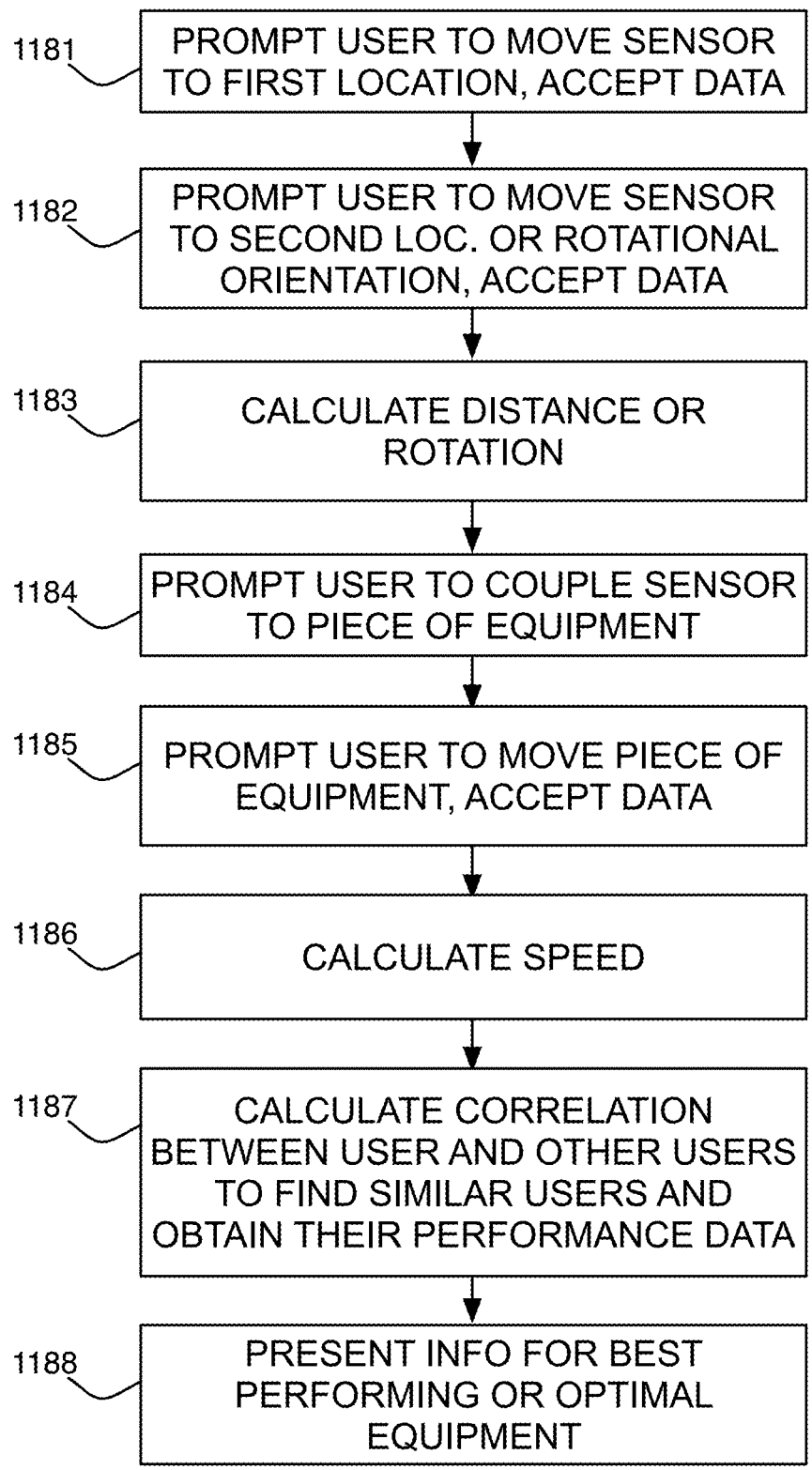
FIG. 1H illustrates a flow chart for an embodiment of the system that prompts a user to make motions and measures distances and rotations to find optimal equipment.

FIG. 1H shows an embodiment of the processing that occurs on the computer. In one or more embodiments the application is configured to prompt a first user to move the motion capture sensor to a first location at 1181 and accept a first motion capture data from the motion capture sensor at the first location via the wireless communication interface, prompt the first user to move the motion capture sensor to a second location or rotation at 1182, accept a second motion capture data or rotation from the motion capture sensor at the second location via the wireless communication interface, calculate a distance or rotation at 1183 between the first and second location or rotation based on the first and second motion capture data. The distance may include a height or an arm length, or a torso length, or a leg length, or a wrist to floor measurement, or a hand size or longest finger size or both the hand size and longest finger size of the first user, or any combination thereof or any other dimension or length associated with the first user. Distances may be calculated by position differences, or by integrating velocity or doubly integrating acceleration, or in any other manner determining how far apart or how much rotation has occurred depending on the types of internal sensors utilized in the motion capture sensor as one skilled in the art will appreciate. For example, embodiments of the invention may prompt the user to hold the motion capture sensor in the user's hand and hold the hand on top of the user's head and then prompt the user to place the sensor on the ground, to calculate the distance therebetween, i.e., the height of the user. In another example, the system may prompt the user to hold the sensor in the hand, for example after decoupling the sensor from a golf club and then prompt the user to place the sensor on the ground. The system then calculates the distance as the "wrist to floor measurement", which is commonly used in sizing golf clubs for example. Embodiments of the system may also prompt the user to move the sensor from the side of the user to various positions or rotational values, for example to rotate the sensor while at or through various positions to calculate the range of motion, for example through flexion, extension, abduction, adduction, lateral rotation, medial rotation, etc. Any of these characteristics, dimensions, distances, lengths or other parameters may be stored in Table 180a shown in FIG. 1B and associated with the particular user. In one or more embodiments, the application is further configured to prompt the first user to couple the motion capture sensor to a piece of equipment at 1184 and prompt the first user to move the piece of equipment through a movement at 1185, for example at the speed intended to be utilized when playing a particular sport or executing a particular movement associated with a piece of sporting equipment. The application is further configured to accept a third motion capture data from the motion capture sensor for the movement via the wireless communication interface and calculate a speed for the movement at 1186 based on the third motion capture data. In one or more embodiments, the application is configured to calculate a correlation at 1187 between the distance and the speed for the first user with respect to a plurality of other users and present information associated with an optimally fit or sized piece of equipment associated with other users. For example, the system may choose a second user having a maximum value correlation or correlation to the first user within a particular range, for example at least with the distance and the speed of the first user. The system may then search through the closest parameter users and choose the one with the maximum or minimum performance or score or distance of hitting, etc., and select the make/model of the piece of equipment for presentation to the user. For example, one such algorithm may for example provide a list of make and model of the lowest scoring golf shaft, or longest hitting baseball bat associated with a similar size/range of motion/speed user. Embodiments of the user may use the speed of the user through motions or the speed of the equipment through motions or both in correlation calculations for example. The information for the best performing make/model and size of the piece of equipment is presented to the user at 1188.

In one or more embodiments, the microcontroller coupled to a motion capture element may communicate with other motion capture sensors to coordinate the capture of event data. The microcontroller may transmit a start of event notification to another motion capture sensor to trigger that other sensor to also capture event data. The other sensor may save its data locally for later upload, or it may transmit its event data via an open communication link to a computer while the event occurs. These techniques provide a type of master-slave architecture where one sensor can act as a master and can coordinate a network of slave sensors.

In one or more embodiments of the invention, a computer may use event data to discover cameras that can capture or may have captured video of the event. Such cameras need to be proximal to the location of the event, and they need to be oriented in the correct direction to view the event. In some systems the number, location, and orientation of cameras is not known in advance and must be determined dynamically. As an event occurs, a computer receiving event data can broadcast a request to any cameras in the vicinity of the event or oriented to view the event. This request may for example instruct the cameras to record event video and to save event video. The computer may then request video from these proximal and correctly oriented cameras after the event. This is illustrated in FIG. 1 where computer 160 may receive notification of an event start from motion capture element 111. Computer 160 may broadcast a request to all cameras in the vicinity such as 103, 104, 130, 130*a*, and 130*b*. As an example, cameras 103 and 130 may be proximal and correctly oriented to view the event; they will record video. Camera 104 may be too far away, and cameras 130*a* and 130*b* may be close enough but not aiming at the event; these cameras will not record video.

In some embodiments one or more videos may be available on one or more computers (such as servers 152, or cloud services) and may be correlated later with event data. In these embodiments a computer such as 152 may search for stored videos that were in the correct location and orientation to view an event. The computer could then retrieve the appropriate videos and combine them with event data to form a composite view of the event with video from multiple positions and angles.

In one or more embodiments, a computer may obtain sensor values from other sensors, such as the at least one other sensor, in addition to motion capture sensors, where these other sensors may be located proximal to an event and provide other useful data associated with the event. For example, such other sensors may sense various combinations of temperature, humidity, wind, elevation, light, sound and physiological metrics (like a heartbeat or heart rate). The computer may retrieve, or locally capture, these other values and save them, for example along with the event data and the motion analysis data, to generate an extended record of the event during the timespan from the event start to the event stop. In one or more embodiments, the types of events detected, monitored, and analyzed by the microprocessor, the computer, or both, may include various types of important motion events for a user, a piece of equipment, or a mobile device. These important events may include critical or urgent medical conditions or indicators of health. Some such event types may include motions indicative of standing, walking, falling, heat stroke, a seizure, violent shaking, a concussion, a collision, abnormal gait, and abnormal or non-existent breathing. Combinations of these event types may also be detected, monitored, or analyzed.

In one or more embodiments, the computer 160 of FIG. 1 may be embedded in any device, including for example, without limitation, a mobile device, a mobile phone, a smart phone, a smart watch, a camera, a laptop computer, a notebook computer, a table computer, a desktop computer, or a server computer. Any device that may receive data from one or more sensors or one or more cameras, and process this data, may function as the computer 160. In one or more embodiments, the computer 160 may be a distributed system with components embedded in several devices, where these components communicate and interact to carry out the functions of the computer. These components may be any combination of devices, including the devices listed above. For example, in one or more embodiments the computer 160 may include a mobile phone and server computer combination, where the mobile phone initially receives sensor data and detects events, and then forwards event data to a server computer for motion analysis. Embodiments may use distributed processing across devices in any desired manner to implement the functions of computer 160. Moreover, in one or more embodiments the computer 160 or portions of the computer 160 may be embedded in other elements of the system. For example, the computer 160 may be embedded in one of the cameras like camera 104. In one or more embodiments the computer 160, the motion capture element 111, and the camera 104 may all be physically integrated into a single device, and they may communicate using local bus communication to exchange data. For example, in one or more embodiments computer 160, motion capture element 111, and camera 104 may be combined to form an intelligent motion-sensing camera that can recognize events and analyze motion. Such an intelligent motion-sensing camera may be mounted for example on a helmet, on goggles, on a piece of sports equipment, or on any other equipment. In one or more embodiments the computer 160 may include multiple processors that collaborate to implement event detection and motion analysis. For example, one or more embodiments may include a camera with an integrated motion capture element and a processor, where the camera captures video, the motion capture element measures motion, and the processor detects events. The processor that detects events may then for example generate a synchronized event video, forward this synchronized event video to a mobile device such as 120 and a database such as 172, and then discard video from the camera 104 that is outside the event timeframe associated with the synchronized event video. Mobile device 120 may for example include another processor that receives the synchronized event video, optionally further analyzes it, and displays it on the mobile device screen.

In at least one embodiment, the at least one motion capture element 111 may be contained within a motion capture element mount, a mobile device, a mobile phone, a smart phone, a smart watch, a camera, a laptop computer, a notebook computer, a tablet computer, a desktop computer, a server computer or any combination thereof.

In one or more embodiments, motion capture element 111 may use any sensor or combination of sensors to detect events. For example, in one or more embodiments, motion capture 111 may include or contain an accelerometer, and recognition of events may for example include comparing accelerometer values to a threshold value; high acceleration values may correspond to high forces acting on the motion capture element, and thus they may be indicative of events of interest. For example, in an embodiment used to monitor motion of an athlete, high acceleration values may correspond to rapid changes in speed or direction of motion; these changes may be events of primary interest in some embodiments. Video captured during time periods of high acceleration may for example be selected for highlight reels or fail reels, and other video may be discarded. In one or more embodiments that include an accelerometer, recognition of events may include comparing changes in acceleration over time to a threshold; rapid changes in a specified time interval may for example indicate shocks or impacts or other rapid movements that correspond to desired events.

Figure 25:
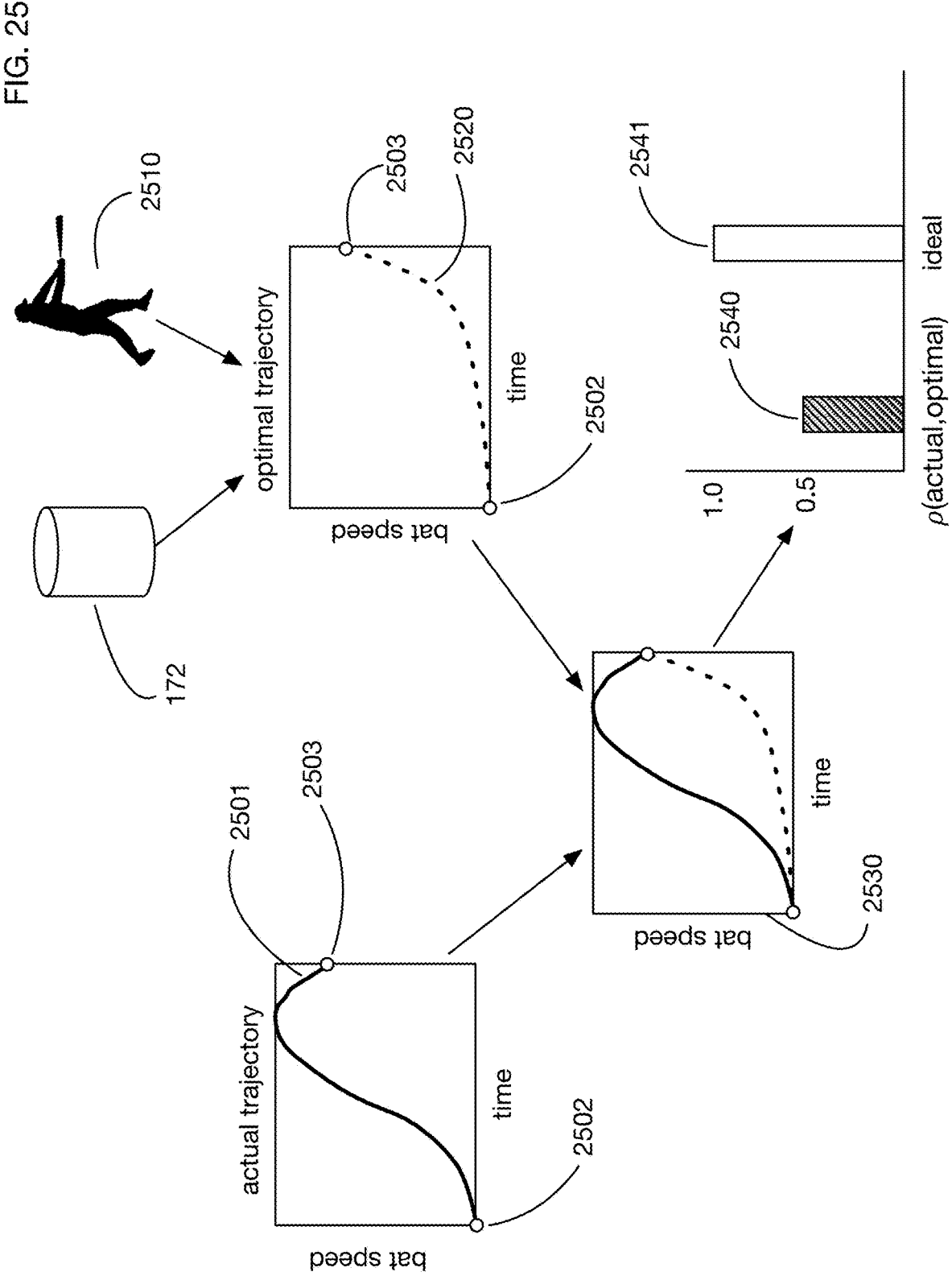
FIG. 25 illustrates an embodiment of the system that analyzes the swing of a baseball bat by comparing the trajectory of the bat speed over time to an optimal trajectory derived from a biomechanical model or from data mining of a database of swings.

Motion analysis of sensor data and event data in one or more embodiments may include comparing motion to an optimal motion trajectory. Such an optimal motion trajectory for example may represent the most efficient path to achieve the resulting position, velocity, or other characteristic of the motion. As an example, FIG. 25 illustrates an embodiment of the system that measures and analyzes swings of a baseball bat. A motion variable of interest for a baseball swing is the speed of the bat over time. This speed typically is low at the beginning of the swing, and then increases rapidly up to the point of impact with the baseball. Other embodiments may use different motion variables of interest, such as for example, without limitation, position, acceleration, orientation, angular velocity, angular acceleration, or any values derived from these quantities or from the sensor data. In the example shown in FIG. 25, the motion capture element measures actual trajectory 2501 for bat speed over time for a particular swing, with the starting point 2502 being the beginning of the swing, and the ending point 2503 being the point of impact with the baseball. This swing may be considered as inefficient since the bat speed peaks prior to the impact point 2503; thus for example the batter may have wasted energy by accelerating the bat too quickly, but being unable to sustain the top speed. In one or more embodiments the system may identify or select an optimal trajectory 2520 that represents an optimal path from the starting point 2502 to the ending point 2503, and may then generate a comparison 2530 between the optimal trajectory 2520 and the actual trajectory 2501. The criterion or criteria for optimality may vary across embodiments. For example in the embodiment shown in FIG. 25 the optimality criterion may be maximum efficiency in the sense of using the least amount of energy to achieve the desired endpoint for the swing. Other embodiments may use other criteria, such as shortest time, least stress on certain joints, or any other criteria for optimality.

One or more embodiments may determine optimal trajectory 2520 from a mechanical model 2510 of the action resulting in the motion. In the example shown in FIG. 25, mechanical model 2510 may for example be a biomechanical model of the system consisting of the batter and the bat; such a model may for example model the batter's joints, muscles, and energy sources. The optimal trajectory may be calculated for example by optimizing the mechanical model to find a trajectory that maximizes the quantity or quantities of interest. For illustration of such an approach, consider for example a simplified 1-dimensional model of a baseball swing with a bat travelling on a trajectory x(t). The batter applies force f(t) to the bat, which has mass m, and the biomechanical model specifies additional forces on the bat based for example tension and resistance in the user's muscles and joints. The additional forces may be modeled for example as $B(x(t), \dot{x}(t))$ for some biomechanical function B. We assume for illustration that the bat begins at position $x(0)=x_0$ with initial velocity $v(0)=0$, and that the trajectory must be completed in 1 second and reach final position $x(1)=x_1$ in order to contact the ball. We also assume that the final speed $v(1)=v_1$ is given. The bat trajectory satisfies the differential equation:

$$m\ddot{x}=f(t)+B(x(t),\dot{x}(t));\ x(0)=x_0;\ \dot{x}(0)=0$$

The force f(t) determines the trajectory of the bat. To determine an optimal trajectory, we assume for illustration that the quantity of interest is the amount of energy expended by the batter during the swing; this is quantity $E=\int_0^1 f(t)\dot{x}(t)dt$; the optimal trajectory is the trajectory that minimizes the energy E. In addition the optimal trajectory must satisfy the constraints $x(1)=x_1$, $v(1)=v_1$. The problem of finding the optimal trajectory is now completely specified. As will be obvious to one skilled in the art, solving for the optimal trajectory is a classical problem in optimal control theory, and any of the techniques of optimal control theory may be used in one or more embodiments to determine an optimal trajectory from a model of the objects of interest.

One or more embodiments may determine optimal trajectory 2520 by analyzing database 172 to identify trajectories that are high efficiency or that have high scores on some quantity of interest. An optimal trajectory may be selected from the high efficiency trajectories in the database, or alternatively a model may be constructed from these high efficiency trajectories, for example using a regression model or other parametric model to fit the high efficiency trajectories.

Optimal trajectory 2520 is compared at 2530 to actual trajectory 2503, potentially after transforming the optimal trajectory so that it has the same starting point 2502 and endpoint 2503 as the actual trajectory. An efficiency metric (or other metric) may then be calculated from the comparison, representing how closely the actual trajectory corresponds to the optimal trajectory. For example, in the embodiment illustrated in FIG. 25, a correlation coefficient 2540, denoted ρ(actual,optimal), is calculated between the two trajectories and this correlation coefficient is used as the efficiency metric for the actual trajectory, with an ideal trajectory having a correlation 2541 of 1.0. Embodiments may use any desired metric to measure the similarity of an actual trajectory to an optimal trajectory.

In one or more embodiments, a motion variable of interest may for example be the trajectory of the position of an object of interest. As an example, in embodiments applied to golf, the trajectory of a golf ball after the ball is hit is a trajectory of interest. In embodiment applied to baseball, for example, the trajectory of the baseball after the ball is hit is a trajectory of interest.

Figure 26:
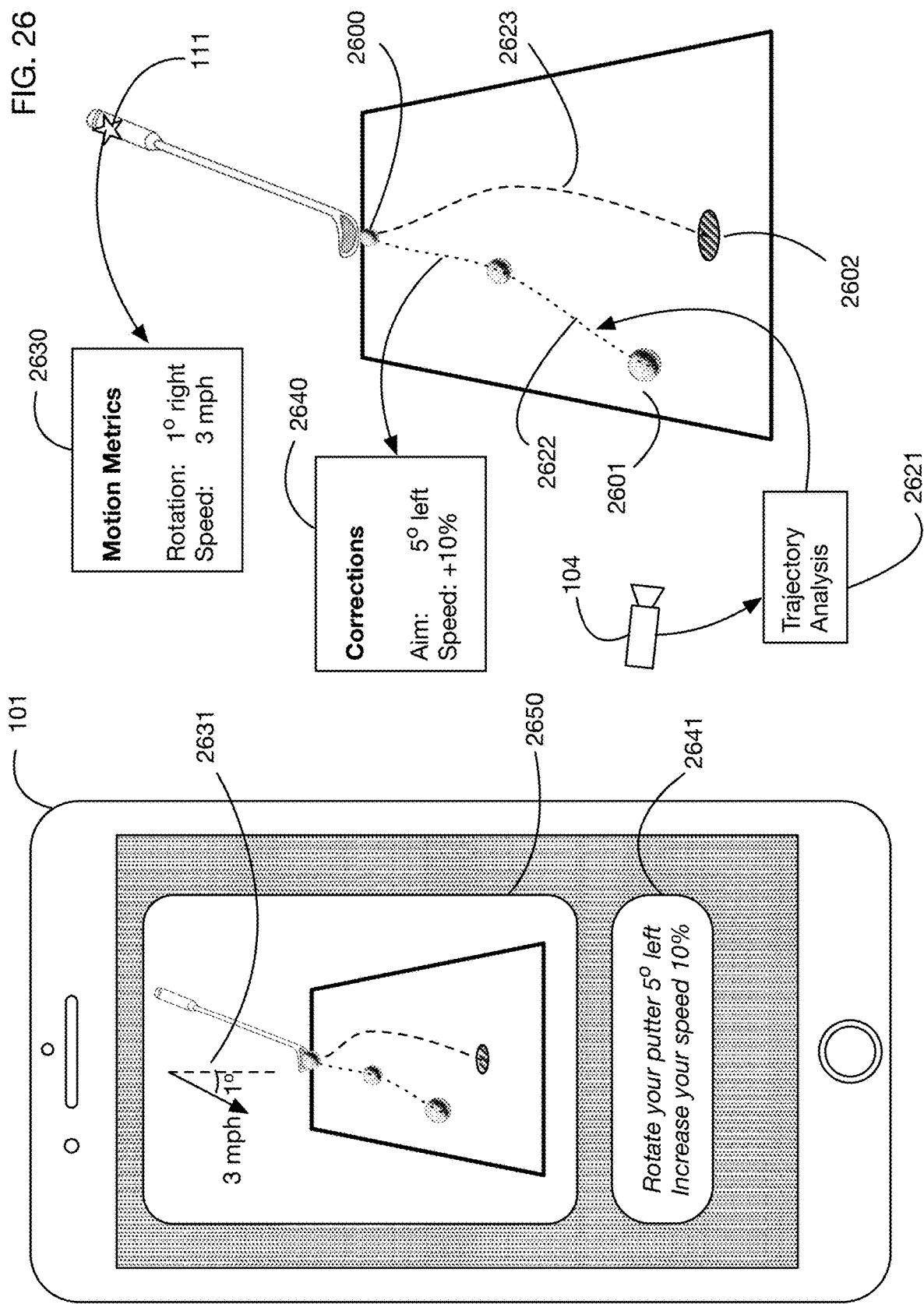
FIG. 26 illustrates an embodiment of the system that analyzes the trajectory of a golf ball using video analysis, calculates the necessary corrections to hit the ball correctly into the hole, and displays the corrections along with the video on a mobile device.

In one or more embodiments, a desired trajectory for an object of interest is known or may be estimated. For example, in an embodiment that measures golf swings, the desired trajectory for the golf ball is towards the hole. In baseball, for example, the desired trajectory for a baseball hit by a batter may be for the baseball to be hit fair and deep. Using video analysis, sensor data, or both, one or more embodiments may measure the actual trajectory of an object of interest, and compare this actual trajectory to the desired trajectory. This comparison generates a motion metric for the object. Moreover, one or more embodiments may further measure the initial conditions that generated the observed trajectory. For example, in golf, the orientation, location, and velocity of the clubhead at the time of impact with the ball determine the subsequent ball trajectory. Similarly in baseball the orientation, location, and velocity of the bat at the time of impact with the ball determine the subsequent ball trajectory (along with the velocity and rotation of the ball as thrown by the pitcher). These initial conditions may be measured as motion metrics as well, again using sensor data, video analysis, or both. One or more embodiments may further calculate the changes that would be necessary in these initial conditions to generate the desired trajectory instead of the observed trajectory, and report these changes as additional motion metrics. FIG. 26 illustrates an example with an embodiment that measures putting. The putter has a sensor 111 on the grip, which measures the motion of the putter. In addition video camera 104 records the trajectory of the ball after it is hit. The desired trajectory 2623 for the ball is towards and into the hole 2602. In this example, the ball 2600 is hit at an angle, and the ball travels on actual trajectory 2622, coming to rest at 2601. This trajectory is observed by camera 104 and analyzed by analysis module 2621. The resulting motion metrics 2630 and 2640 provide feedback to the golfer about the putt. Metrics 2630 are calculated from the sensor on the putter; they show for example that the speed of the putter at impact was 3 mph, and that the putter face rotated 1 degree to the right from the backstroke to the forward stroke. Analysis of the trajectory 2622 determines that the required correction to the putt to put the ball in the hole requires aiming 5 degrees more to the left, and increasing the putter speed by 10%. The analysis of changes in initial conditions needed to change a trajectory to a desired trajectory may for example take into account any other factors that may influence the trajectory, such as in this case the speed or the slope of the putting green.

In the example shown in FIG. 26, the synchronized event video is displayed on mobile device 101, which may for example be a mobile phone or any other device. In the illustrative display, a video or a still image 2650 of the putting event is displayed, along with graphics showing the actual trajectory and the desired trajectory for the ball. Graphics 2631 shown the motion metrics 2630 measured by sensor 111. Text box 2641 is displayed under the synchronized event video 2650; it contains the corrections 2640 needed to achieve the desired trajectory. One or more embodiments may combine synchronized event videos and motion analysis data in any desired manner for display on a mobile device or on any other viewing device; for example, motion analysis data may be displayed as overlays onto the video, as graphics or text displayed next to the video, or as graphics or text that may be shown separately on a different screen or a different tab. In one or more embodiments the camera 104 may be a camera that is integrated into mobile device 101. In one or more embodiments the motion capture element 111 may be integrated into mobile device 101.

In the example shown in FIG. 26, the desired trajectory 2623 for the golf ball is a curved path, rather than a straight line between initial ball position 2600 and the hole 2602. This curved path may be calculated by the trajectory analysis 2621 based on knowledge of the characteristics of the putting green. One or more embodiments may obtain a model of an area of activity in which trajectories occur, and use this model to calculate the desired trajectory and the changes in initial conditions need to generate this desired trajectory. A model of an area may include for example, without limitation, the topography of the area, the coefficients of friction of the area at various points, any forces like friction or other forces between the area and the objects of interest, and any other physical properties of the area. For example in calculating the desired trajectory for a putt, the topography of the green as well as the "speed" of the green (corresponding roughly to the coefficient of friction) may affect the desired trajectory. One or more embodiments may obtain models of an area of activity from any source, including for example from a 3d scanner that has measured the topography of a green, or from weather data that may indicate for example whether a green is wet or dry (which affects its speed). Models of areas of activity in one or more embodiments may incorporate elements such as for example the shape of surfaces, the materials of the surfaces, frictional or viscous forces, coefficients of static friction, sliding friction, and rolling friction, effects of wind or altitude on air resistance and forces from air, surface textures that may affect motion, or any other physical factors affecting motion of objects of interest.

Returning to FIG. 1, one or more embodiments of the system may include one or more computers coupled to the database 172. In one or more embodiments, any processor or collection of processors in the system may be coupled to the database, and may be used to retrieve and analyze data in the database. Computers or processors in one or more embodiments of the system may have multiple functions; for example, a mobile device may have a computer that interfaces with a motion capture element embedded in the mobile device; this computer may also control a camera, and it may access the database and analyze information stored in the database. In FIG. 1 for example, laptop 105 may be a database analysis computer. Mobile device 120 may be a database analysis computer. Camera 104 may be a database analysis computer if it includes a processor. Motion capture element 111 may also serve as a database analysis computer. A database analysis computer may for example be incorporated into one or more of a mobile device, a smart watch, a camera, a desktop computer, a server computer. One or more database analysis computers may access the synchronized event videos stored in database 172, and may generate any desired metrics, reports, models, alerts, graphics, comparisons, trends, charts, presentations, or other data from the data in the database.

Figure 27:
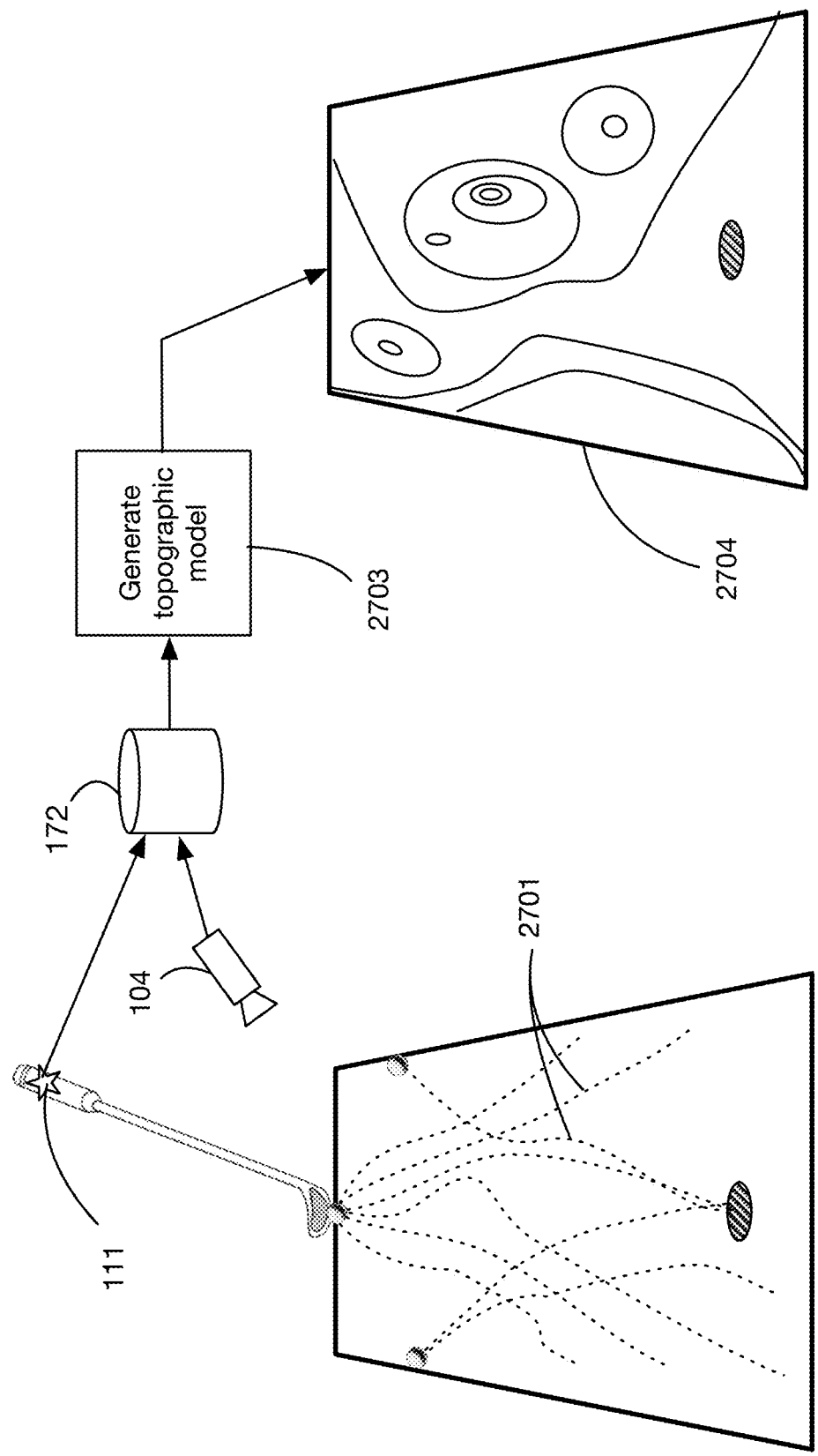
FIG. 27 illustrates an embodiment of the system that analyzes the trajectories of putts stored in a database to derive a topographic model of a putting green.

As an example of the analyses that may be performed on the database, FIG. 27 illustrates an embodiment of the system that may be used to generate a model of an area of activity, such as the model discussed above in conjunction with the trajectory analyses of the embodiment in FIG. 26.

In this embodiment, the system captures a potentially large number of putts on a putting green using motion capture element 111 in the grip of a putter, and using video camera 104 that records video of the ball trajectories such as trajectories 2701. The trajectories of putts that are recorded may for example include putts starting at different ball locations, and putts that were successful (into the hole) as well as those that were unsuccessful. Data on the putts along with the videos of the ball trajectories are stored in database 172. A computer executes analysis module 2703 to generate a topographic model of the putting green 2704. This analysis process 2703 determines the slope of the green at each point (or at representative points) using the observed curvature of each putt trajectory, combined with data on the initial speed and direction of the putter at the time of impact. As discussed above, a model of an area of activity may also include factors such as coefficients of friction or other physical forces; analysis module 2703 may also in one or more embodiments calculate these factors to develop a more complete model of the area of activity. The model 2704 of the putting green may then be provided to the system to calculate a desired trajectory and compare it a specific actual trajectory, as illustrated in FIG. 26 and as discussed above.

Figure 28:
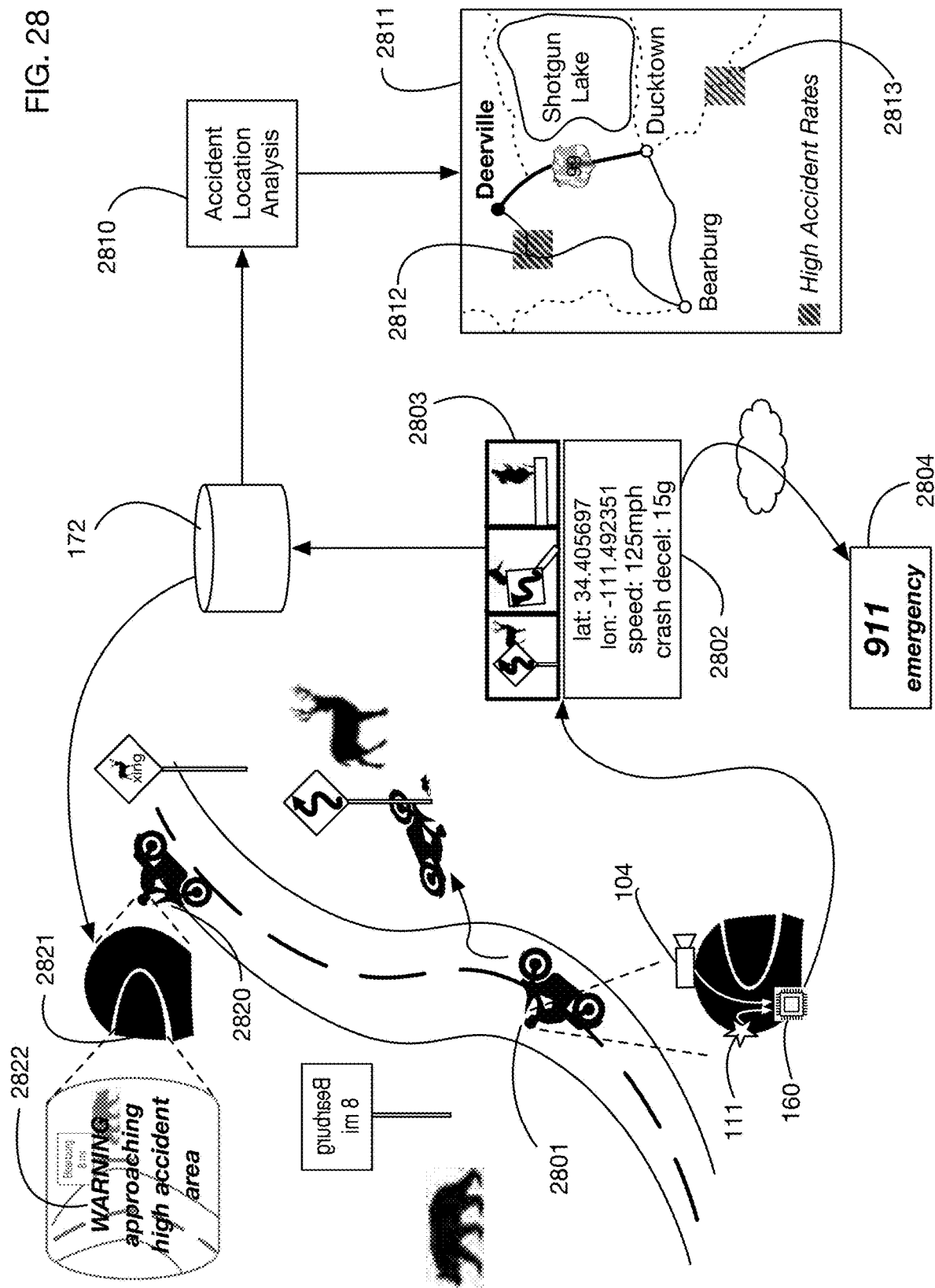
FIG. 28 illustrates an embodiment of the system with video and motion sensors installed on a motorcycle helmet; the system detects motorcycle crashes, forwards crash data to an emergency service, and analyzes aggregate crash data to identify high risk road areas.

As another example of the analyses that may be performed on the database, one or more embodiments may analyze the database 172 to determine the time or location of accidents, potentially along with other information collected about the accident. The results of this analysis may for example include real-time alerts or other alerts to emergency services, reports to safety agencies, warnings to other people or groups at risk, and graphics that may be used to highlight risky areas based on accident rates in those areas. FIG. 28 illustrates an embodiment that performs accident analysis. In this embodiment, a motorcyclist wears a motorcycle helmet 2801 that is equipped with motion capture element 111, camera 104, and processor 160. These components in the helmet 2801 are connected for example by local busses or by a personal area wireless network (or both). In this example, the processor 160 may detect crashes of the motorcycle. For example, a crash may be detected by a rapid spike in acceleration, or by a sudden reduction in speed. When processor 160 detects a crash event, the processor generates a synchronized event video for the crash, which includes data 2802 about the location, speed, and acceleration of the crash, and selected video frames 2803 showing the view from the helmet just before the crash. The processor may for example discard video captured during normal riding and only save crash video, in order to conserve video memory and reduce transfer times. In this example, the helmet may transmit the synchronized event video for the crash (2803 and 2802) immediately to an emergency service 2804 to alert the authorities about the crash so they can assess the severity and respond at the required location.

In addition to the real-time alert sent to the emergency service 2804, the synchronized event video is uploaded to database 172. A computer (or network of computers) analyzes this database using accident analysis module 2810, to determine locations that have unusually high accident rates. One or more embodiments may perform analyses of the database 172 to identify locations involving any activities of interest. In the example of FIG. 28, the analysis 2810 identifies two high-accident locations. It outputs graphics that are overlaid onto map 2811, showing high-accident areas 2812 and 2813. These graphics and identifications of high-accident areas may be provided for example to safety authorities, or to other drivers to alert them of hazardous areas. One or more embodiments may generate various graphics from analysis of the database, such as overlays onto maps, videos, images, charts, graphs, or reports. As another illustrative example, one or more embodiments may monitor movements of persons for example in a house, office, building, or city block, and may analyze the database of the synchronized event videos for these movements to generate graphics showing areas of high activity. One or more embodiments may also for example analyze the database to identify areas of unexpected activity or unexpected types of motion within an area.

Continuing with the embodiment illustrated in FIG. 28, in this example a second motorcyclist 2820 is equipped with a smart helmet 2821 that may receive information from database 172 and display information on the face shield of the helmet. The smart helmet 2821 is equipped with a position tracking system, such as for example a GPS. Therefore the helmet processor can determine when the motorcyclist 2820 is approaching a location with a high accident rate based on the accident reports stored in database 172. When the motorcyclist nears a high accident area, an alert message 2822 is displayed on the face shield of the helmet. One or more embodiments may broadcast data from database 172 to any persons or groups that may benefit from the data, including for example groups at risk for accidents as shown in FIG. 28. One or more embodiments may select data from the database that is useful to particular persons or groups based for example on sensors associated with those persons or groups, such as for example the GPS sensor on the motorcyclist 2820.

Another example of database analysis is analyzing motion data to determine if an object has been used in legitimate way. FIG. 29 illustrates an example embodiment that analyzes motion data associated with the use of a baseball bat. The bat is equipped with a motion capture element 111. The legitimate, expected use for the bat is hitting a baseball 2901. The embodiment obtains a signature 2911 for the motion data associated with this legitimate use. In this illustrative example, the signature tracks the magnitude of the angular rotation of the bat, which may for example be captured by a gyroscope in motion capture element 111. For the legitimate use of hitting a baseball, the angular velocity is expected to rise rapidly up to the point of impact, and then drop as momentum is transferred from the bat to the ball; however the angular velocity does not drop to zero since the bat continues swinging past the point of impact. In contrast, the example considers a non-legitimate use for the bat of trying to chop down a tree 2902 with the bat. In this non-legitimate use, the angular velocity signature 2912 drops close to zero after impact, since the bat cannot continue to move forward once it hits the tree 2902. This difference in post-impact angular velocity signatures allows the system to differentiate between legitimate and non-legitimate use of the bat. Angular velocity data for multiple events is stored in database 172, and the analysis 2920 reviews this data against the signatures 2911 and 2912. If all or most signatures match 2911, the system determines that the use 2921 has been legitimate; otherwise the system determines that the use 2922 has not been legitimate. One or more embodiments may use any desired signatures on any motion data, including video, to differentiate between legitimate and non-legitimate use of a piece of equipment. One or more embodiments may be used by equipment manufacturers, distributors, or service centers, for example, to determine whether a warranty claim for equipment damage is valid; for example, if equipment use has been legitimate, a warranty claim may be valid, but if the use has been non-legitimate, the warranty claim may be invalid.

The meaning of legitimate use may vary depending on the application for an embodiment. For example, in one or more embodiments the legitimate use for equipment may be determined by a contract or by a user manual. In other embodiments legitimate use may correspond to expected use, normal use, typical use, routine use, use under certain conditions such as environment conditions, or any other application-specific interpretation of legitimate. Embodiments of the invention may be used for any differentiation between one type of use and another type of use. Any uses of motion capture data or synchronized event videos to differentiate between multiple types of use for equipment is in keeping with the spirit of the invention.

One or more embodiments of the invention may be used to measure or monitor the range of motion of a user. Returning to FIG. 1, one or more embodiments of the mobile device 120 may for example prompt and accept motion inputs from a given motion capture sensor as moved by the user to specific locations or through rotations, to measure a dimension or size of user 150, or range of motion. For example, the app may prompt the user to move motion capture sensor 111 by hand, after removal from piece of equipment 110, between the user's other hand and shoulder. The distance between the two points is shown as length "L", e.g., of the user's arm. In addition, the system may prompt the user for a range of motion, shown as "ROM" with the sensor held in the other hand and with the sensor moved by the user as prompted from the side to the highest point with the arm extended, or with the wrist rotated while at the same location, to measure that specific range of motion for that body part. Embodiments may optionally only measure a range of motion and determine "L" via as the center point of the radius of the range of motion as well. The system may also measure the speed, shown as "S" at the same time or with piece of equipment 110, e.g., after motion capture sensor 111 is again coupled with the piece of equipment as prompted by the system for example, or alternatively with an existing motion capture sensor mounted on the piece of equipment via mount 192. Embodiments may also then utilize the same sensor to capture motion data from the piece of equipment, for example to further optimize the fit of and/or further collect motion capture data. Embodiments may provide information related to the optimal fit or otherwise suggest purchase of a particular piece of sporting equipment. Embodiments may utilize correlation or other algorithms or data mining of motion data for size, range of motion, speed of other users to maximize the fit of a piece of equipment for the user based on other user's performance with particular equipment. For example, this enables a user of a similar size, range of motion and speed to data mine for the best performance equipment, e.g., longest drive, lowest putt scores, highest winning percentage, etc., associated with other users having similar characteristics.

Embodiments that measure a user's range of motion may further track this data in the database 172. This range of motion data may be analyzed over time to monitor the user's progress, to suggest equipment changes or therapies, or to provide a warning of potential problems. For example, one or more embodiments of the invention may suggest exercises and/or stretches that would improve performance to a predicted performance level based on other users performance data and suggest equipment that would be appropriate for an increase strength or flexibility so that users can "grow into" or "improve into" equipment. Through use of the range of motion and date/time fields, and using the differences therebetween, the range of motion over time may be shown to increase, decrease or stay the same. In addition, other embodiments of the invention may be utilized over time to detect tight areas or areas that may be indicative of injury for example and alert the user in a similar manner. For example if the range of motion or speed S decreases, over time, the user may be alerted or a massage may be automatically scheduled for example. The user may be alerted in any manner to the changes and exercises or stretches or other equipment may be suggested to the user. One or more embodiments of the invention may be utilized for gait analysis for fitting of shoes, for example for improved standing, walking or running. Any combination of these may be determined and/or otherwise derived and utilized for example compared to baselines or thresholds or ranges to determine where problems exist or where a piece of equipment provides adequate or optimal fit.

Figure 30:
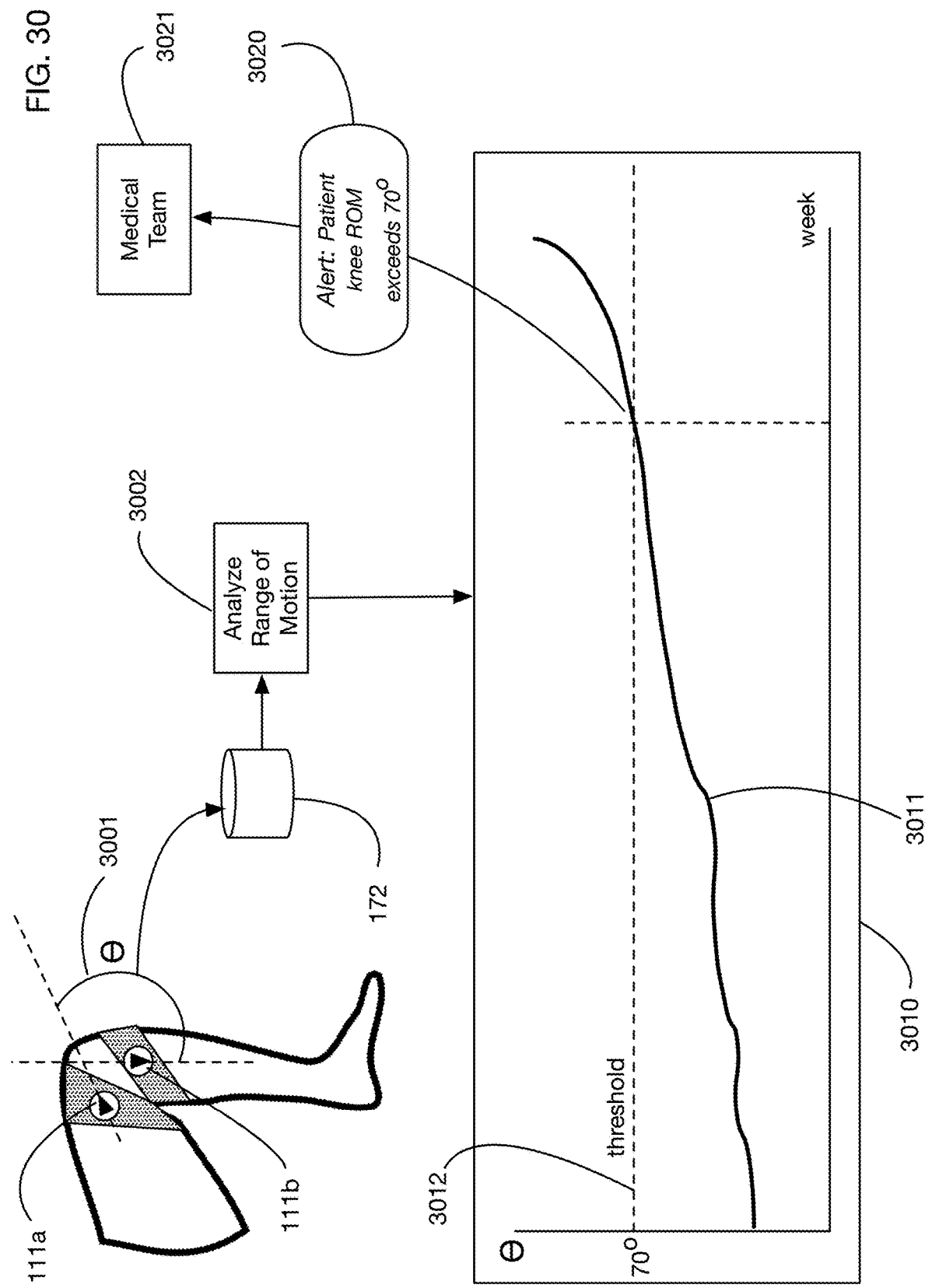
FIG. 30 illustrates an embodiment of the system that analyzes the range of motion of a knee joint using two motion capture elements on either side of the joint, and sends an alert when the range of motion exceeds a threshold.

Another example of database analysis is analyzing motion data to determine trends in range of motion, for example for a joint of a user. FIG. 30 illustrates an embodiment with motion capture elements integrated into a knee brace. In this example, the knee brace contains two motion capture elements: motion capture element 111a is located above the knee, and motion capture element 111b is located below the knee. By measuring the orientation of these two motion capture elements, the system can determine the angle 3001 of the knee joint. In this embodiment, the angle 3001 is monitored periodically or continuously and stored in database 172. A computer uses range of motion analysis 3002 to analyze trends in the user's range of motion of time. This results in chart 3010, which tracks the actual range of motion 3011 over time, and may optionally compare the range of motion to a threshold value 3012.

One or more embodiments that measure the range of motion of a joint of a user may use at least two motion capture elements located on opposite sides of the joint in order to measure the angle of the joint. The angle of the joint may be measured for example by measuring the orientation of each of the two motion capture elements, and then calculating the rotation that transforms one of these orientations into the other orientation. One or more embodiments may use any desired sensors to measure orientation or to measure the relative orientation of each of the two motion capture elements. For example, in one or more embodiments the two motion capture elements on opposite sides of a joint may include an accelerometer and a magnetometer; these two sensor provide sufficient information to measure orientation in three dimensional space regardless of the user's orientation, when the user is not moving. The accelerometer shows the direction of the gravitational field, and the magnetometer shows the direction of the earth's magnetic field. However, accelerometer readings provide accurate orientation information only when the user is not accelerating. Therefore one or more embodiments may further incorporate a rate gyroscope into the motion capture elements to track changes in orientation over time while the user is moving. These sensor configurations are only illustrative; embodiments may employ any sensors or combinations of sensors to measure the range of motion of a joint.

One or more embodiments that measure the range of motion of a joint of a user may send an alert message if the range of motion exceeds a target value or a threshold value. FIG. 30 illustrates an embodiment with a threshold value for knee joint rotation 3012 set to 70°, which may for example represent the maximum safe rotation of the knee joint. If the actual rotation exceeds the threshold value, alert message 3020 is sent by the system, for example to the medical team 3021 monitoring the patient. Alert messages may be sent to medical teams, to the user, to the user's family or caregivers, or generally to any persons or systems wanted to monitor the range of motion. The illustrative alert message 3020 indicates that the range of motion exceeds the threshold; alert messages in one or more embodiments may include any additional information from database 172 for example, including the time history 3011 of the range of motion.

Figure 31:
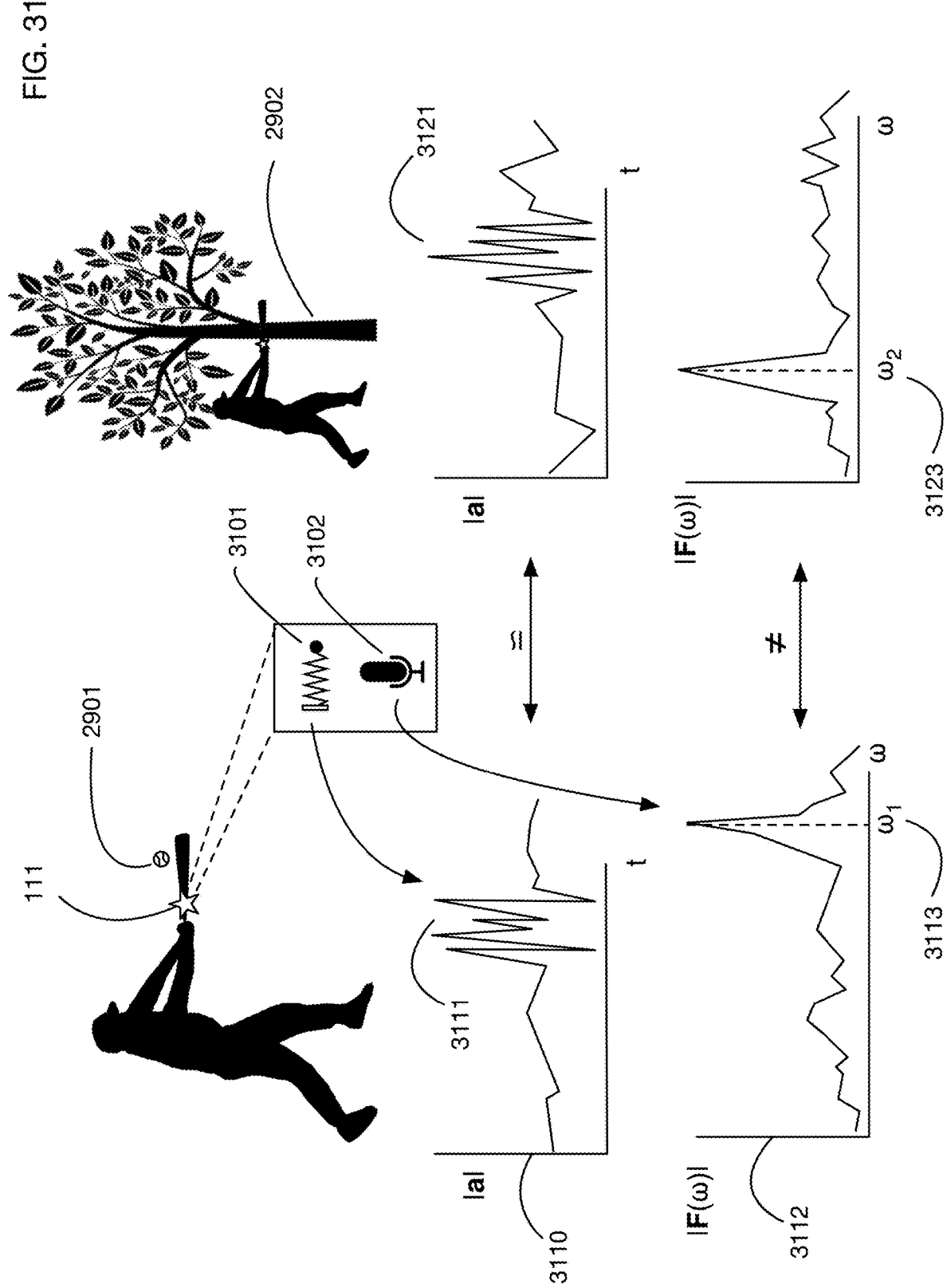
FIG. 31 illustrates an embodiment of the system with a microphone and an inertial sensor in the motion capture element; the system uses audio data from the microphone to distinguish between a true impact event and a false positive impact event.

One or more embodiments of the system may incorporate one or more motion capture elements that include a microphone to measure audio signals. One or more embodiments may incorporate microphones installed in mobile devices, for example in mobile phones, or microphones integrated into cameras. These embodiments may use audio data captured by the microphones to support event detection and motion analysis. For example, FIG. 31 illustrates a variant of the embodiment shown in FIG. 29 that uses motion data analysis to determine whether a baseball bat is hitting a baseball or is hitting a different object. In the embodiment shown in FIG. 31, motion capture element 111 installed on a baseball bat includes an accelerometer 3101 and a microphone 3102. When the bat impacts the baseball 2901, the accelerometer values 3110 show a shock 3111 from the impact event, where acceleration increases rapidly and then rapidly oscillates from the vibration after the impact shock. However, a similar accelerometer signature may occur for impact of the bat with other objects. For example, when the bat impacts the tree 2902, the accelerometer impact signature 3121 is very similar to the signature 3111. Therefore this illustrative embodiment may not be able to reliable differentiate between true ball impact events and false positives caused by impact with other objects. Audio signals captured by the microphone 3102 are used by this embodiment to differentiate between true ball impact events and false positives. The Fourier transform 3112 of the audio signal for the ball impact shows a relatively high peak audio frequency 3113 ($\omega_1$). In comparison the transformed audio signal for the tree impact has a much lower peak audio frequency 3123 ($\omega_2$). The embodiment may therefore determine whether the impact was with a ball or with another object by using the audio signal in conjunction with the accelerometer impact signature. One or more embodiments may use audio signals captured by microphones in motion capture elements or in other devices to improve event detection, to differentiate between true events and false positives, and to improve motion analysis.

Figure 32:
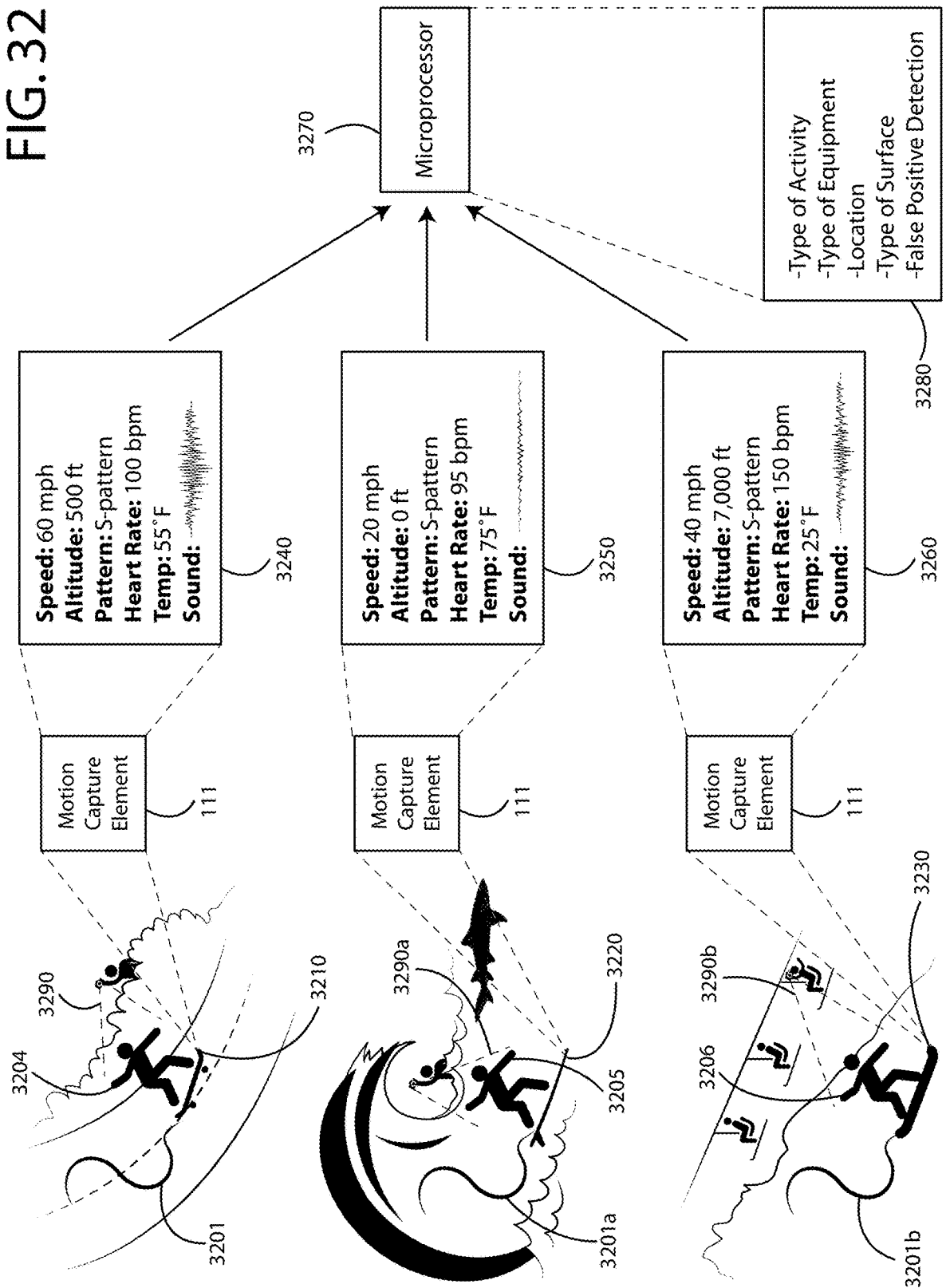
FIG. 32 illustrates an embodiment of the system that receives other values associated with temperature, humidity, wind, elevation, light sound and heart rate, to correlate the data or event data with the other values to determine a false positive, type of equipment the motion capture element is coupled with or a type of activity.

FIG. 32 illustrates an embodiment of the system that receives other values associated with temperature, humidity, wind, elevation, light sound and heart rate, to correlate the data or event data with the other values to determine a false positive, type of equipment the motion capture element is coupled with or a type of activity.

As shown in FIG. 32, one or more embodiments may include at least one motion capture element 111 that may couple with a user 3204, 3205, 3206 or piece of equipment 3210, 3220, 3230, or mobile device coupled with the user 3204, 3205, 3206. In at least one embodiment, the at least one motion capture element 111 includes a memory, such as a sensor data memory, and a sensor that may capture any combination of values associated with an orientation, position, velocity, acceleration (linear and/or rotational), angular velocity and angular acceleration, of the at least one motion capture element 111, for example associated with the user 3204, 3205, 3206 or the piece of equipment 3210, 3220, 3230. In at least one embodiment, the at least one motion capture element 111 may include a first communication interface or at least one other sensor, and a microcontroller or microprocessor 3270 coupled with the memory, the sensor and the first communication interface. In one or more embodiments, the microprocessor 3270 may be part of the at least one motion capture element 111, or an external element bi-directionally coupled with the at least one motion capture element 111.

According to at least embodiment of the invention, the microcontroller may be the microprocessor 3270.

By way of one or more embodiments, the first communication interface may receive one or more other values associated with a temperature, humidity, wind, elevation, light, sound, heart rate, or any combination thereof. In at least one embodiment, the at least one other sensor may locally capture the one or more other values associated with the temperature, humidity, wind, elevation, light sound, heart rate, or any combination thereof or of any other environmental or physiological sensors. At least one embodiment of the invention may include both the first communication interface and the at least one other sensor and obtain sensor values from either or both.

In at least one embodiment, the microprocessor 3270 may correlate the data or the event data with the one or more other values associated with the temperature, humidity, wind, elevation, light, sound, heart rate, or any combination thereof. As such, in at least one embodiment, the microprocessor 3270 may correlate the data or the event data with the one or more other values to determine one or more of a false positive event, a type of equipment that the at least one motion capture element 111 is coupled with, and a type of activity indicated by the data or the event data.

For example, in one or more embodiments, the at least one motion capture element 111 may determine, sense or calculate, at 3240, wherein the speed is 60 mph, the altitude is 500 feet, the pattern is an S-pattern, the surrounding temperature is 55 degrees Fahrenheit, and the user's heart rate is 100 beats per minute (bpm).

Given the data determined 3240 from the sensor and from the first communication interface and/or the at least one other sensor, in at least one embodiment, the microprocessor 3270 may determine wherein the surrounding temperature is relatively mild, and the elevation is not at sea level but not too high. In one or more embodiments, given the speed, the altitude and the pattern detected, the microprocessor 3270 may determine, at 3280, wherein the activity may be skateboarding and the piece of equipment may include a skateboard. Furthermore, in one or more embodiments, the microprocessor 3270 may determine wherein given the speed of 60 mph, the pattern of an S-pattern 3201, and the heart rate of 100 bpm, the user 3204 may be a healthy, fit and/or experienced rider.

For example, in one or more embodiments, the at least one motion capture element 111 may determine, sense or calculate, at 3250, wherein the speed is 20 mph, the altitude is 0 feet, the pattern 3201a, the surrounding temperature is 75 degrees Fahrenheit, and the user's heart rate is 95 bpm.

Given the data determined 3250 from the sensor, and from the first communication interface and/or the at least one other sensor, in at least one embodiment, the microprocessor 3270 may determine wherein the temperature is relatively warm, and the elevation is at sea level. In one or more embodiments, given the speed, the altitude, the pattern detected and the temperature, the microprocessor 3270 may determine, at 3280, wherein the activity may be a water sport, such as surfing and the piece of equipment is may be a surf board or any another type of water sport equipment. Furthermore, in one or more embodiments, the microprocessor 3270 may determine wherein given the speed of 20 mph, the path or pattern 3201a, and the heart rate of 95 bpm, the user 3205 may be a very healthy, fit and experienced surfer.

For example, in one or more embodiments, the at least one motion capture element 111 may determine, sense or calculate, at 3260, wherein the speed is 40 mph, the altitude is 7,000 feet, the pattern 3201b, the surrounding temperature is 25 degrees Fahrenheit, and the user's heart rate is 150 bpm.

Given the data determined 3260 from the sensor, and from the first communication interface and/or the at least one other sensor, in at least one embodiment, the microprocessor 3270 may determine wherein the temperature is relatively cold, and the elevation is relatively high, for example a high mountain or hill. In one or more embodiments, given the speed, the altitude, the pattern detected and the temperature, the microprocessor 3270 may determine, at 3280, wherein the activity may be skiing or snowboarding or any other snow activity and the piece of equipment may be skis or a snowboard or another type of snow equipment. Furthermore, in one or more embodiments, the microprocessor 3270 may determine wherein given the speed of 40 mph, the pattern 3201b, and the heart rate of 150 bpm, the user 3206 may be unhealthy, unfit and/or inexperienced.

In one or more embodiments, even if the motion sensor data is basically the same, i.e., all three pieces of equipment undergo approximately the same "S" pattern motion, 3201, 3201a and 3201b, then based on the other sensor values, e.g., elevation, altitude, temperature, audio, heart rate, humidity or any other environmental or physiological value, the type of activity and type of equipment that the sensor is coupled with is determined. In addition, the sensor(s) or computer(s) in the system may broadcast for other sensors to save their data for a defined event that is detected, even if the other sensors do not detect the event themselves. Furthermore, the sensor(s) or computer(s) in the system may request for videos in the vicinity, for example with a given field of view 3290, 3290a, 3290b to create event videos that are concise videos from a predetermined amount of time before and after an event detection. In this manner, great amounts of bandwidth and time for video transfer are saved.

In one or more embodiments, the microprocessor 3270 may detect the type of equipment the at least one motion capture sensor or element 111 is coupled with or the type of activity the at least one motion sensor 111 is sensing through the correlation to differentiate a similar motion for a first type of activity with respect to a second type of activity, for example at 3280. In at least one embodiment, the at least one motion capture sensor 111 may differentiate the similar motion based on the one or more values associated with temperature, humidity, wind, elevation, light, sound, heart rate, or any combination thereof from 3240, 3250 and 3260. Specifically, even if all three pieces of equipment or activities undergo a particular motion, embodiments of the invention enable a determination of what type of equipment and activity that similar or the same motion sensor data may be associated with for example.

By way of one or more embodiments, the microprocessor 3270 may detect the type of equipment or the type of activity through the correlation to differentiate a similar motion for a first type of activity, such as surfing or skateboarding, with respect to a second type of activity, such as snowboarding or skiing, as discussed above. In at least one embodiment, the microprocessor 3270 may differentiate the similar motion based on the temperature or the altitude or both the temperature and the altitude. In at least one embodiment, the microprocessor 3270 may recognize a location of the sensor on the piece of equipment 3210, 3220, 3230 or the user 3204, 3205, 3206 based on the data or event data. In one or more embodiments, the microprocessor 3270 may collect data that includes sensor values from the sensor based on a sensor personality selected from a plurality of sensor personalities. In at least one embodiment, the sensor personality may control sensor settings to collect the data in an optimal manner with respect to a specific type of movement or the type of activity associated with a specific piece of equipment or type of clothing.

For example, a first type of activity may include skateboarding, a second type of activity may include surfing, and a third type of activity may include snowboarding. As shown in FIG. 32, in at least one embodiment, wherein the activity is skateboarding, the user or skateboarder 3204 is coupled to, attached to, riding, or holding the piece of equipment or skateboard 3210 in a windy or S-pattern 3201. In one or more embodiments, wherein the second type of activity is surfing, the user or surfer 3205 is coupled to, attached to, riding, or holding the piece of equipment or surf board 3220 in pattern 3201a. In at least one embodiment, wherein the third type of activity is snowboarding, the user or skateboarder 3206 is coupled to, attached to, riding, or holding the piece of equipment or snowboard 3230 in a downhill pattern 3201b.

According to one or more embodiments, the least one motion capture element 111 may couple with the user 3204, 3205, 3206 or the piece of equipment 3210, 3220, 3230, wherein via the sensor and/or the at least one other sensor, alone or in combination, the at least one motion capture element 111 may determine the one or more values or the one or more other values associated with the user 3204, 3205, 3206 or the piece of equipment 3210, 3220, 3230 or the surroundings thereof, as 3240, 3250, 3260, respectively.

In at least one embodiment of the invention, the at least one motion capture element 111 and/or the microprocessor 3270 may determine, sense or calculate, from the sensor, and from the first communication interface and/or the at least one other sensor a user's posture, the user's stability, the user's balance, the location of the user's feet and hands on the piece of equipment, or any combination thereof. As such, in at least one embodiment, the microprocessor 3270 may determine whether the user is holding, standing, kneeling or sitting on the piece of equipment, to correlate the different values in determining the type of activity, such as snowboarding versus skiing or surfboarding versus water skiing, the type of piece of equipment, such as a board versus skis, and the user's level of expertise. For example, in one or more embodiments, the at least one motion capture element 111 and/or the microprocessor 3270 may determine, sense or calculate, from the sensor, and from the first communication interface and/or the at least one other sensor an angular movement from the user and/or from the piece of equipment, such as a twist of the user's body, such that the microprocessor 3270 may determine whether the user's legs are moving independently or whether the user's legs are locked together in determining whether the activity is skiing or snowboarding. As such, in at least one embodiment of the invention, the one or more values from the sensor, the first communication interface and/or the at least one other sensor enable the microprocessor 3270 to determine whether the piece of equipment includes a single piece of equipment or multiple pieces of equipment.

In one or more embodiments of the invention, the at least one motion capture element 111 and/or the microprocessor 3270 may determine, sense or calculate, from the sensor and from the first communication interface and/or the at least one other sensor a sound of the piece of equipment on a particular surface, a distance from the piece of equipment to the surface or into the surface, an amount of friction between the piece of equipment and the surface, or any combination thereof. As such, in at least one embodiment, the microprocessor 3270 may determine whether the sound is associated with gravel, water, snow, or any other surface, whether the piece of equipment is flat on the surface, is partially submerged in the surface or is above the surface, and the amount of friction detected between the piece of equipment and the surface for a determined period of time. In at least one embodiment, at least one motion capture element 111 and/or the microprocessor 3270 may determine, sense or calculate, from the sensor and from the first communication interface and/or the at least one other sensor a shape of surfaces or terrains, the materials of the surfaces or terrains, frictional or viscous forces on the surface or terrains, coefficients of static friction between the at least one piece of equipment and the surface or terrain, sliding friction on the surface or terrain, and rolling friction the surface or terrain, effects of wind or altitude on air resistance and forces from air, surface or terrains textures that may affect motion, or any other physical factors affecting motion of the user and/or the at least one piece of equipment.

As such, in one or more embodiments, the microprocessor 3270, for example at 3280, may correlate the different values in determining the type of activity, the type of piece of equipment, the location of the surface or terrain, a type of event, and the user's level of expertise.

In one or more embodiments of the invention, the at least one motion capture element 111 and/or the microprocessor 3270 may determine, sense or calculate, from the sensor and from the first communication interface or the at least one other sensor ambient noise and features surrounding the at least one motion capture element 111. For example, the features may include oxygen level, obstacles, walls, trees, cars, water, or any combination thereof. As such, in at least one embodiment, the microprocessor 3270 may determine whether the activity is taking place in a crowded area, whether an event is occurring, such as a competition including a plurality of other users surrounding the user, whether the activity is taking place in a closed environment or an open environment, or any combination thereof. As such, in one or more embodiments, the microprocessor 3270, for example at 3280, may correlate the different values in determining the type of activity, the type of piece of equipment, the surrounding area the activity is taking place in, and the type of event. For example, in at least one embodiment, from the determined surrounding oxygen level, alone or in combination with the various other values determined, the microprocessor may determine wherein the user is located in a mountainous area with lower oxygen levels, or located at sea level.

In at least one embodiment of the invention, the at least one motion capture element 111 and/or the microprocessor 3270 may determine, sense or calculate, from the sensor and the first communication interface or the at least one other sensor a specific location of the user and/or the piece of equipment, for example a specific beach resort, a specific mountain resort or mountain location and a specific type of event currently happening.

For example, in one or more embodiments, the motion capture element 111 may obtain from one or more of a repository, a viewer, a server, another computer, a social media site, a mobile device, a network, and an emergency service, external data. As such, in at least one embodiment, the microprocessor 3270 may determine wherein the type of activity is part of a specific type of event, such as a basketball game, football game, or any other sports game, or an athletic competition, such as the Olympics, high school event, college event, etc., based on the external data obtained and from the values and the one or more other values. For example, in one or more embodiments, the external data may include social media posts, news articles, emergency amber alerts, or any combination thereof. In one or more embodiments, the microprocessor 32 and/or the motion capture element 111 may obtain external data from one or more cameras or other external sensor located in a proximity surrounding the user and/or the piece of equipment.

According to at least one embodiment, the motion capture element 111 and/or the microprocessor 3270 may determine the user's level of expertise, the user's fitness level and/or training techniques or suggestions that the user may benefit from. In one or more embodiments, various levels or degrees of speed, altitude, patterns, heart rates and temperatures may be detected.

By way of one or more embodiments, the microprocessor 3270 may determine the false positive event as detect a first value from the sensor values having a first threshold value and detect a second value from the sensor values having a second threshold value within a time window. In at least one embodiment, the microprocessor 3270 may then signify a prospective event, compare the prospective event to a characteristic signal associated with a typical event and eliminate any false positive events, signify a valid event if the prospective event is not a false positive event, and save the valid event in the sensor data memory including information within an event time window as the data.

In one or more embodiments, the microprocessor 3270 may recognize the at least one motion capture element 111 with newly assigned locations after the at least one motion capture element 111 is removed from the piece of equipment and coupled with a second piece of equipment of a different type based on the data or event data.

In at least one embodiment of the invention, the sensor or the computer may include a microphone that records audio signals. In one or more embodiments, the recognize an event may include determining a prospective event based on the data, and correlating the data with the audio signals to determine if the prospective event is a valid event or a false positive event. In at least one embodiment, the computer may store the audio signals in the computer memory with the at least one synchronized event video if the prospective event is a valid event. In one or more embodiments, the microprocessor 3270, the computer and/or the motion capture element 111 may determine if the determined activity, event, location, surface type and/or type of piece of equipment is valid or is a false positive based on the correlation of the one or more values and one or more other values from one or more of 3240, 3250 and 3260. In at least one embodiment, the microprocessor 3270, the computer and/or the motion capture element 111 may determine if the determine activity, event, location, surface type and/or type of piece of equipment is valid or is a false positive based on one or more of the external data and the sensor or sensors surrounding or coupled with the user and/or the piece of equipment.

One or more embodiments of the invention includes a plurality of sensor types that may be integrated within and/or coupled to the at least one motion sensor 111. In one or more embodiments, the plurality of sensor types include the sensor and the at least one other sensor, as discussed above. In at least one embodiment, the microprocessor 3270 may correlate content and/or different types of values from the plurality of sensor types, such as a combination and correlation between at least two sensor types from the plurality of sensor types, to determine one or more of a type of activity, a type of piece of equipment, a type of event, false positive events, a location, a type of terrain or surface, etc. In one or more embodiments of the invention, the plurality of sensor types, including the sensor and the at least one other sensor, may include one or more of sound sensors, temperature sensors, vibration sensors, air quality sensors, water quality sensors, weather sensors, location sensors such as navigation and global positioning systems, pressure sensors, motion sensors and biological sensors.

For example, by way of at least one embodiment, the sound, temperature and vibration sensors may include a sensor that detects Earth's seismic activity at a particular location and time. In one or more embodiments, the sound, temperature and vibration sensors may include a defect detector sensor that identifies an equipment crash or derail, such as the at least one piece of equipment, car, train, etc., from the wheels or surface of the equipment. In at least one embodiment, the sound, temperature and vibration sensors may include a sound sensor that detects extreme or mass sounds indicating a particular or unique or predefined event, for example sounds obtained from a plurality of locations external to the at least one motion capture element 111, such as a reaction to a touchdown during a football game or a reaction to any other game, event or competition. In one or more embodiments, the sound, temperature and vibration sensors may include a temperature sensor, such as a temperature sensor for the equipment that detects concentrations of traffic and movement patterns in a hot or cold weather scenario. As such, for example, the at least one motion capture element 111 and/or the microprocessor 3270 may determine an indication of a mass or cluster of equipment trapped in a particular radius or area at a particular time of day.

For example, by way of at least one embodiment, the air and water quality sensors or the weather sensors may include a sensor that detects air quality, such as an amount of carbon-dioxide and/or smoke content or any other chemical or gas content, to indicate poor, fair or good air quality for animals and/or humans. In one or more embodiments, the sensor that detects air quality may indicate whether a fire is occurring that may impact one or more bodies surrounding the location of the fire. In one or more embodiments, the air and water quality sensors or the weather sensors may include a sensor that detects water quality, such as an amount of acidity and/or temperature, to indicate the poor, fair or good water quality for animals and/or humans, to indicate a pollution event, a sea life event and/or a geological event. In at least one embodiment, the air and water quality sensors or the weather sensors may include weather sensors that detect storms, extreme heat, and various weather changes to indicate weather alerts.

For example, by way of at least one embodiment, the location sensors may include an altitude sensor, such as on a plane or car or any piece of equipment, to indicate a crash or forecast of a forthcoming crash. In one or more embodiments, the altitude sensor and other location sensors may indicate a combination of data or values obtained from one or more users, such as flight passengers, hikers, or any other users in one or more locations.

For example, by way of at least one embodiment, the motion sensors may include an accelerometer that detects a mass of users and/or pieces of equipment moving at a fast rate that may indicate a type of activity or event, such as a marathon, sports competition, and may indicate a life threatening or alerting event causing the mass of users and/or pieces of equipment to all move at away from a particular location. In one or more embodiments, the motion sensors may include an impact sensor that detects a collision or a plurality of collisions that indicate an accident or event, such as a collision between users, cars or pieces of equipment, and may indicate a sports event collision, such as football tackle, or all or specific types of tackles on a particular day or of a particular activity or event.

For example, by way of at least one embodiment, the biological sensors may include a heart rate sensor that detects an elevation in heart rate from a user or a plurality of users that may indicate an occurrence of an event, competition, race or activity, such as during an exciting event or a scary event. In one or more embodiments, the biological sensors may include a brain wave sensor that detects, tracks and combines content from at least one user with similar brain activity, similar personalities, similar mind set, similar train of thought, similar emotions, or any combination thereof.

In one or more embodiments, sensor or video data may be collected over long periods of time, where only certain portions of those time periods contain interesting activities. One or more embodiments may therefore receive signatures of activities of interest, and use these signatures to filter the sensor and video data to focus on those activities of interest. For example, in one or more embodiments, a set of highlight frames may be selected from a video that show specifically the activities of interest. FIG. 33 illustrates an example of an embodiment that generates highlight frames using sensor data to locate activities of interest. A snowboard has an attached sensor 4102, which includes an accelerometer. In addition video camera 4101 captures video of the snowboarder. In one or more embodiments, the video camera 4101 may be attached to the user, and the camera may include the sensor 4102. The embodiment obtains signature 4120 for activities of interest. In this illustrative example, one activity of interest is a jump at high speed. The signature for a jump is that the magnitude of the acceleration drops below g/2, indicating that the snowboard is in free fall, and that the magnitude of the velocity is above 50 mph. Acceleration magnitude 4110 received from sensor 4102 is compared to the acceleration threshold value over time. The accelerometer is integrated (along with data from other inertial sensors such as a gyro) to form velocity data 4111. The acceleration magnitude drops below the threshold at frame 4103, at 4112, because the snowboarder makes a small jump; however the velocity at that time is not sufficiently fast to match the activity signature 4120. The acceleration magnitude drops again below the threshold at time corresponding to video frame 4104; at this time the velocity also exceeds the required threshold, so the data matches the activity signature 4120. Three highlight video frames 4130 are selected to show the jump activity that was detected by comparing the acceleration motion metric to the threshold. One or more embodiments may select highlight frames during an activity of interest that include all of the frames captured during the activity time period. One or more embodiments may add additional frames to the highlight frames that are before or after the activity time period. One or more embodiments may sample only selected frames during the activity time period, for example to generate a small set of highlight images rather than a complete video. In the example illustrated in FIG. 33, the speed of the snowboard is displayed with or overlaid with graphic overlay 4135 onto the highlight frames; this speed may be calculated for example from the sensor data, from the video analysis, or by sensor fusion of both data sources. One or more embodiments may overlay any desired metrics or graphics onto highlight frames. Highlight frames 4130 with overlays 4135 are then distributed over network 4140 to any set of consumers of the highlight frames. In one or more embodiments that generate highlight frames, consumers of highlight frames may include for example, without limitation: any video or image viewing device; repositories for video, images, or data; a computer of any type, such as a server, desktop, laptop, or tablet; any mobile device such as a phone; a social media site; any network; and an emergency service. An example of an embodiment that may send video highlights to an emergency service is a crash detection system, for example for a bicycle or a motorcycle. This embodiment may monitor a user using for example an accelerometer to detect a crash, and an onboard camera to capture video continuously. When a crash is detected, information about the location and severity of the crash may be sent directly to an emergency service, along with video showing the crash. Any cameras local to the event, whether a highlight event or crash or any other type of event may be queried to determine if they have video from that location and time, for example using a field of view that would envelope the location of the event for example. The videos that cover the event, or any other sensors near the event and near the time may also be queried and sent out to define a group event. Other sensor data, including heart rate and sound or sound levels may also be indicative of an event that is worthy of a highlight or other type of event, such as a fail. Members of any group associated with the user may subscribe to the event or group event and obtain the highlights or fails of the day.

With respect to highlight thresholds, the best events according to one or more metrics may be tagged, and in addition, the worst events or any other range of events may be tagged. The tagging of an event may indicate that the event may indicate that the respective event videos or motion data is to be associated with a given highlight reel, or fail reel. In one or more embodiments, metrics or activity signatures may be utilized to identify epic fails or other fails, for example where a user fails to execute a trick or makes a major mistake. FIG. 33A illustrates an example that is a variation of the snowboarder example of FIG. 33. A signature for 41A20 a fail is defined as having a high velocity, following shortly by having a very small or zero velocity; this signature characterizes a crash. At frame 4104 the snowboarder executes a jump, and then hits a tree at frame 41A05. Thus the velocity transitions quickly from a high speed to zero at 41A13. The epic fail frames 41A30 are selected to record the fail. As in FIG. 33, these fail frames may be overlaid with metric data 4135. The fail frames may be sent to other viewers or repositories 4140, and a message 41A50 may be sent to the camera to discard frames other than the selected fail frames. One or more embodiments may use multiple signatures for activities of interest to identify and capture various types of activities; for example, an embodiment may simultaneously use a highlight signature like signature 4120 in FIG. 33 as well as a fail signature like signature 41A20 in FIG. 33A. Any video characteristic or motion data may be utilized to specify a highlight or fail metric to create the respective reel. In one or more embodiments any computer in the system detecting a particular level of fail may automatically send out a message for help, for example through wireless communications to call emergency personnel or through audio or social media post to notify friends of a potential medical emergency.

One or more embodiments may generate highlight frames using the above techniques, and may then discard non-highlight frames in order to conserve storage space and bandwidth. One or more embodiments may also send messages to other systems, such as to the camera that initially captured the video, indicating that only the highlight frames should be retained and that other frames should be discarded. This is illustrated in FIG. 33 with discard message 4150 sent to camera 4101, telling the camera to discard all frames other than those selected as highlight frames.

In one or more embodiments, sensor data may be collected and combined with media obtained from servers to detect and analyze events. The media may then be combined with the sensor data and reposted to servers, such as social media sites, as integrated, media-rich and data-rich records of the event. Media from servers may include for example, without limitation, text, audio, images, and video. Sensor data may include for example, without limitation, motion data, temperature data, altitude data, heart rate data, or more generally any sensor information associated with a user or with a piece of equipment. FIG. 34 illustrates an embodiment of the system that combines sensor data analysis and media analysis for earthquake detection. Detection of earthquakes is an illustrative example; embodiments of the system may use any types of sensor data and media to detect and analyze any desired events, including for example, without limitation personal events, group events, environmental events, public events, medical events, sports events, entertainment events, political events, crime events, or disaster events.

In FIG. 34, a user is equipped with three sensors: sensor 12501 is a motion sensor; 12502 is a heart rate sensor; and sensor 12503 is a position sensor with a clock. These sensors may be held in one physical package or mount or multiple packages or mounts in the same location on a user or in multiple locations. One or more embodiments may use any sensor or any combination of sensors to collect data about one or more users or pieces of equipment. Sensors may be standalone devices, or they may be embedded for example in mobile phones, smart watches, or any other devices. Sensors may also be near a user and sensor data may be obtained through a network connection associated with one or more of the sensors or computer associated with the user (see FIG. 1A for topology of sensors and sensor data that the system may obtain locally or over the network). In the embodiment shown in FIG. 34, sensor 12503 may be for example embedded in a smart watch equipped a GPS. Heart rate data 12512 from sensor 12502, acceleration data 12511 from motion sensor 12501, and time and location information 12513 from sensor 12503 are sent to computer or mobile device 101 for analysis. Alternatively, the mobile device may contain all or any portion of the sensors or obtain any of the sensor data internally or over a network connection. In addition, the computer may be collocated with sensor 12502, for example in a smart watch or mobile phone. Mobile device 101 is illustrative; embodiments may use any computer or collection of computers to receive data and detect events. These computers may include for example, without limitation, a mobile device, a mobile phone, a smart phone, a smart watch, a camera, a laptop computer, a notebook computer, a tablet computer, a desktop computer, and a server computer.

In the example of FIG. 34 the mobile device 101 is configured to scan for a set of event types, including but not limited to earthquake events for example. Earthquake event detection includes comparison of sensor data to a sensor earthquake signature 12520, and comparison of media information to a media earthquake signature 12550. Embodiments may use any desired signatures for one or more events. Sensor data signatures for events used by one or more embodiments may include for example, without limitation, sensor values exceeding one or more thresholds or falling into or out of one or more ranges, trends in values exceeding certain thresholds for rates of change, and combinations of values from multiple sensors falling into or out of certain multidimensional ranges. In FIG. 34, the rapid increase in heart rate shown in 12512 is indicative of an event, which may be an earthquake for example. The rapid increase in acceleration 12511 is also indicative of an earthquake. Based on these two signatures, device 101 may for example determine that a sensor earthquake signature has been located. In one or more embodiments, sensor data from multiple users with at least some of the sensors may be utilized by any computer such as computer 101 to determine if the acceleration 12511 is observed by multiple sensors, even if slightly time shifted based on location and time to determine that an earthquake has potentially occurred.

Computer 101 may also scan media from one or more servers to confirm the event. Embodiments may obtain media data from any type or types of servers, including for example, without limitation, an email server, a social media site, a photo sharing site, a video sharing site, a blog, a wiki, a database, a newsgroup, an RSS server, a multimedia repository, a document repository, a text message server, and a Twitter® server. In the example shown in FIG. 34, computer or mobile device 101 scans media on two servers: a text message server 12530 that provides a log of text messages sent and received, and a social media website 12540 that allows users to post text and images to their personal home pages. The text messages on 12530 and postings on 12540 are not necessarily associated with the user wearing sensors 12501, 12502, and 12503; embodiments of the system may access any servers to obtain media from any sources. Media are compared to media earthquake signature 12550. Embodiments may use any desired media signatures for events, including for example, without limitation, frequencies of selected keywords or key phrases in text, rates of media postings or updates on selected servers, appearance of specific images or videos matching any specified characteristics, urgency of messages sent, patterns in sender and receiver networks for messages, and patterns in poster and viewer networks for social media sites. In FIG. 34, the media earthquake signature 12550 includes appearance of key works like 12531 "shaking" and 12541 "falling down" in the text messages and home page, respectively. The media earthquake signature may also include analysis of photos or videos for images that are characteristic of an earthquake, such as images of buildings swaying or falling for example. In FIG. 34, image 12542 shows a falling monument that is consistent with the media earthquake signature 12550. Keywords may be utilized to eliminate false positives for images showing similar items, for example "movie" in case someone posted an image or video not related to a current event for example.

One or more embodiments may generate integrated event records that combine sensor data with media describing the event, such as photos, videos, audio, or text commentaries. The media may be obtained for example from servers such as social media sites, from sensors associated with the system such as local cameras, or from combinations thereof. One or more embodiments may curate this data, including the media from social media sites, to generate highlights of an event. The curated, integrated event records may combine media and data in any desired manner, including for example through overlays of data onto photos or videos. Integrated event records may contain all or a selected subset of the media retrieved from servers, along with all or a selected subset of the sensor data, metrics, and analyses of the event. Integrated event records may be reposted to social media sites or broadcast to other users.

One or more embodiments may correlate sensor data and media by time, location, or both, as part of event detection and analysis. For example, earthquakes occur at specific points in time and at specific locations; therefore two shaking signatures separated by a 100 day time interval are likely not related, while events separated by a relatively small time interval, e.g., minutes and perhaps within a given predefined range for example based on the event type, e.g., miles in this case, are more likely to indicate a prospective related event. In FIG. 34, sensor 12503 provides the time and location 12513 of the user, which may be correlated with the sensor data 12511 and 12512. This time and location data may be used in the searches of servers 12530 and 12540 for media that may confirm the event, for example within predefined thresholds for time and location, and optionally based on event type. One or more embodiments may group sensor data and media by time and location to determine if there are correlated clusters of information that represent events at a consistent time and location. The scale for clustering in time and location may depend upon the event. For example, an earthquake may last several minutes, but it is unlikely to last several weeks. It may also cover a wide area, but it is unlikely to have an effect over several thousand miles.

In FIG. 34, the text message 12531 and the posting 12541 both occur within one minute of the sensor data 12511, 12512, and 12513; therefore, the mobile device 101 correlates the media with the sensor data. Since the sensor data match sensor signature 12520 and the media match media signature 12550, the mobile device confirms an earthquake event 12560.

The text analysis of text messages and postings in FIG. 34 uses a simple media signature for an event based on the appearance of selected keywords. One or more embodiments may employ any text processing or text analysis techniques to determine the extent to which a textual information source matches an event signature. One or more embodiments may be configured to scan for multiple types of events; in these embodiments textual analysis may include generating a relative score for various event types based on the words located in textual information sources.

FIG. 35 illustrates an embodiment of the system that uses an event-keyword weighting table 12620 to determine the most likely event based on text analysis. Each keyword is rated for each event of interest to determine an event-keyword weight. In this example the keyword 12621 ("Air") has an event-keyword weight for four possible events: Touchdown, Crash, Earthquake, and Jump. These weights may for example reflect the relative likelihood that messages or texts describing these events include that keyword. Weights may be determined in any desired manner: they may be based on historical analysis of documents or messages, for example; they may be configured based on judgment; and they may be developed using machine learning algorithms from training sets. In the example shown in FIG. 35, event 12601 is observed by several users that send tweets about the event; these tweets are available on server 12610. The system scans these tweets (potentially using event times and locations as well to limit the search) and identifies three messages containing keywords. For example, the first message 12611 contains the keyword 12621 from table 12620.

The weights of the keywords for each event are added, generating event scores 12630. In this example the "Jump" event has the highest score, so the system determines that this is the most likely event. One or more embodiments may use scoring or weighting techniques to assess probabilities that various events have occurred, and may use probability thresholds to confirm events. One or more embodiments may use Bayesian techniques, for example, to update event probabilities based on additional information from other media servers or from sensor data. In addition, the sensor or computer associated with the computer that detects a potential event may broadcast to nearby cameras and/or computers for any related video for example during the duration of the event, including any pre-event or post-event window of time. Users that are on a ski lift for example generating video of the epic fail, may thus receive a message requesting any video near the location and time of the event. Direction of the camera or field of view may be utilized to filter event videos from the various other users at the computer or at the other user's computers. Thus, the event videos may be automatically curated or otherwise transferred and obtained without the non-event video outside of the time window of the event. In addition, the video may be trimmed automatically on the various computers in the system in real-time in post processing to discard non-event related video. In one or more embodiments, the computer may query the user with the event videos and request instructions to discard the remaining non-event video. The event videos may be transferred much more efficiently without the non-event video data and the transfer times and storage requirements maybe 2 to 3 orders of magnitude lower in many cases.

Figure 36:
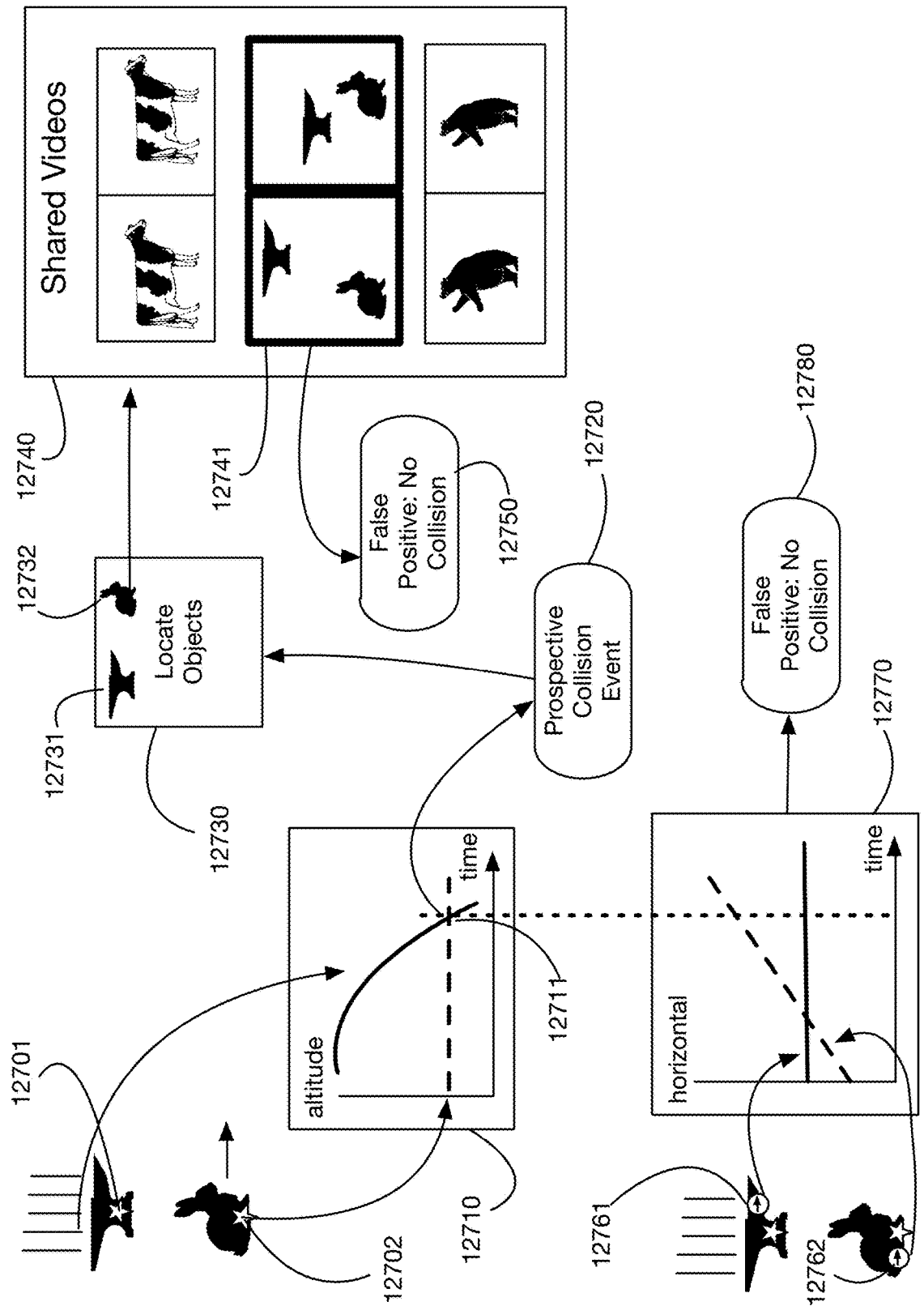
FIG. 36 illustrates an embodiment that uses sensor data to determine a prospective event, (a collision), and uses analysis of media to determine whether the prospective event is valid or is a false positive.

One or more embodiments of the system may use a multi-stage event detection methodology that first determines that a prospective event has occurred, and then analyzes additional sensor data or media data to determine if the prospective event was a valid event or a false positive event. FIG. 36 illustrates an example of a multi-stage event detection system. For illustration, a falling anvil is equipped with an altitude sensor 12701, and a rabbit is also equipped with an altitude sensor 12702. The system receives sensor data samples from 12701 and 12702 and combines them to form graph 12710. In one or more embodiments additional processing may be desired to synchronize the clocks of the two sensors 12701 and 12702; (see FIG. 1E for examples of time synchronization that the system may utilize). Analysis 12710 of the relative altitude predicts a prospective collision event 12720 at time 12711 when the altitudes of the two objects coincide. However, this analysis only takes into account the vertical dimension measured by the altitude sensor; for a collision to occur the objects must be at the same three-dimensional coordinates at the same time. FIG. 36 illustrates two examples of using additional information to determine if prospective event 12720 is a valid event or a false positive. One technique used by one or more embodiments is to review media information from one or more servers to confirm or invalidate the prospective event. For example, the system may perform a search 12730 to locate objects 12731 and 12732 in media on available servers, such as the server 12740 that contains videos shared by users. For example, the shape, size, color, or other visual characteristics of the objects 12731 and 12732 may be known when the sensors 12701 and 12702 are installed. In this example, video 12741 is located that contains the objects, and analysis of the frames shows that a collision did not occur; thus the system can determine that the event was a false positive 12750. One or more embodiments may use any criteria to search servers for media that may confirm or invalidate a prospective event, and may analyze these media using any techniques such as for example image analysis, text analysis, or pattern recognition. The lower right of FIG. 36 illustrates another example that uses additional sensor information to differentiate between a prospective event and a valid event. In this example the anvil and the rabbit are equipped with horizontal accelerometers 12761 and 12762, respectively. Using techniques known in the art, horizontal acceleration is integrated to form horizontal positions 12770 of the objects over time. By combining the vertical trajectories 12710 and the horizontal trajectories 12770, the system can determine that at time 12711 the horizontal positions of the two objects are different; thus the system determines that the prospective event 12720 is a false positive 12780. These examples are illustrative; embodiments may use any combination of additional sensor data and media information to confirm or invalidate a prospective event. For example, media servers may be checked and if there are posts that determine that some collision almost occurred, such as "wow that was close", etc., (see FIG. 35 for a crash scenario with media keyword score checking), or did not occur at 12750.

Figure 37:
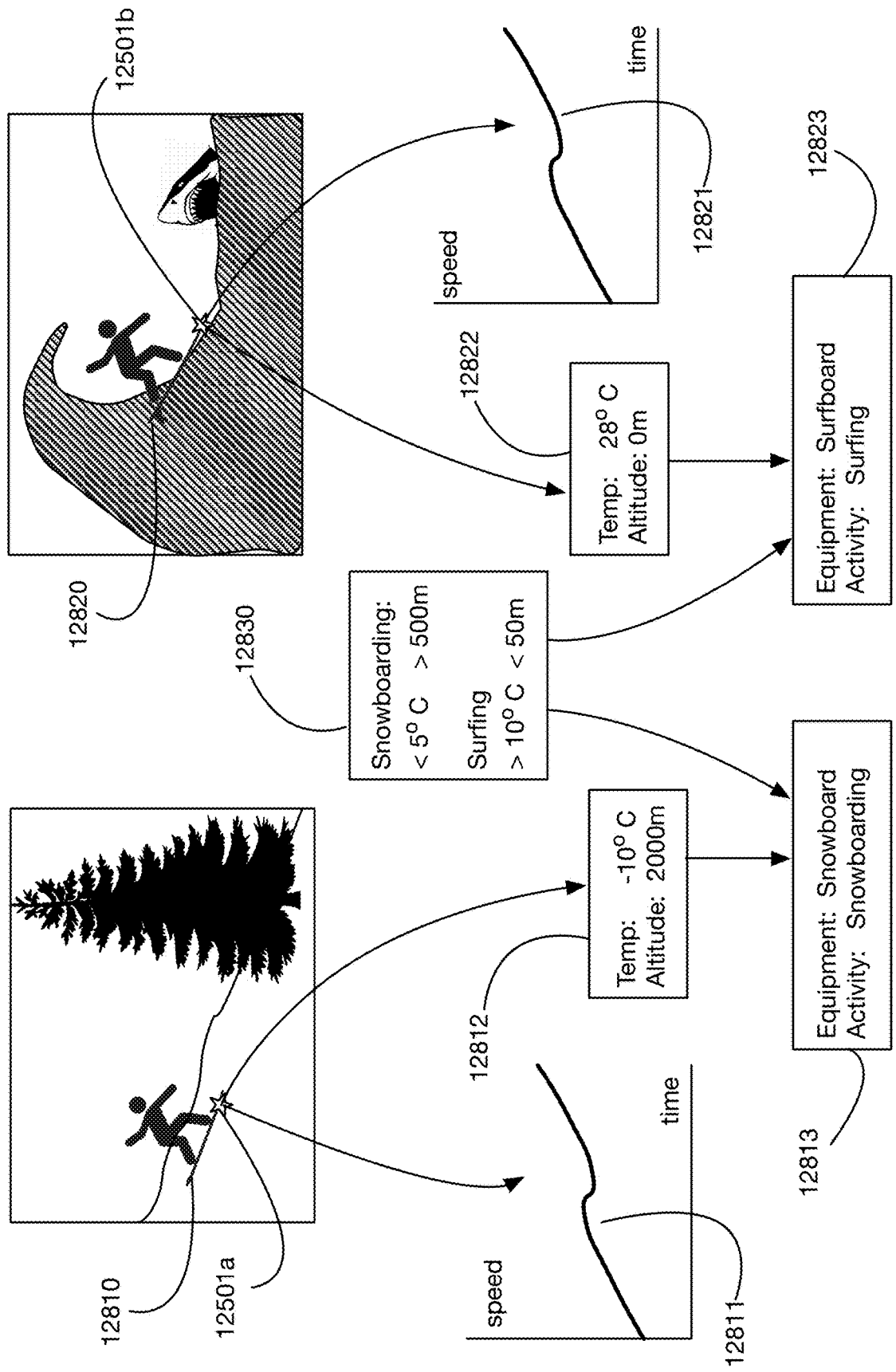
FIG. 37 illustrates an embodiment that collects data using a motion sensor, and uses data from additional sensors, a temperature sensor and an altitude sensor, to determine whether the activity generating the motion data was snowboarding or surfing.

One or more embodiments may use additional sensor data to determine a type of activity that was performed or a type of equipment that was used when sensor data was captured. FIG. 37 illustrates an example of a user that may use a motion sensor for either snowboarding or surfing. Motion sensor 12501*a* is attached to snowboard 12810, and motion sensor 12501*b* is attached to surfboard 12820. The motion sensors may for example include an accelerometer, a rate gyroscope, and potentially other sensors to detect motion, position or orientation. In one or more embodiments the devices 12501*a* and 12501*b* may be identical, and the user may be able to install this device on either a snowboard or a surfboard. Based on the motion sensor data, the speed of the user over time is calculated by the system. The speed chart 12811 for snowboarding and the speed chart 12821 for surfing are similar; therefore it may be difficult or impossible to determine from the motion data alone which activity is associated with the data. In this example, sensors 12501*a* and 12501*b* also include a temperature sensor and an altitude sensor. The snowboarding activity generates temperature and altitude data 12812; the surfing activity generates temperature and altitude data 12822. The system is configured with typical signatures 12830 for temperature and altitude for surfing and snowboarding. In this illustrative example, the typical temperature ranges and altitude ranges for the two activities do not overlap; thus it is straightforward to determine the activity and the type of equipment using the temperature and altitude data. The low temperature and high altitude 12812 combined with the signatures 12830 indicate activity and equipment 12813 for snowboarding the high temperature and low altitude 12822 combined with the signatures 12830 indicate activity and equipment 12823 for surfing. One or more embodiments may use any additional sensor data, not limited to temperature and altitude, to determine a type of activity, a type of equipment, or both.

Figure 38:
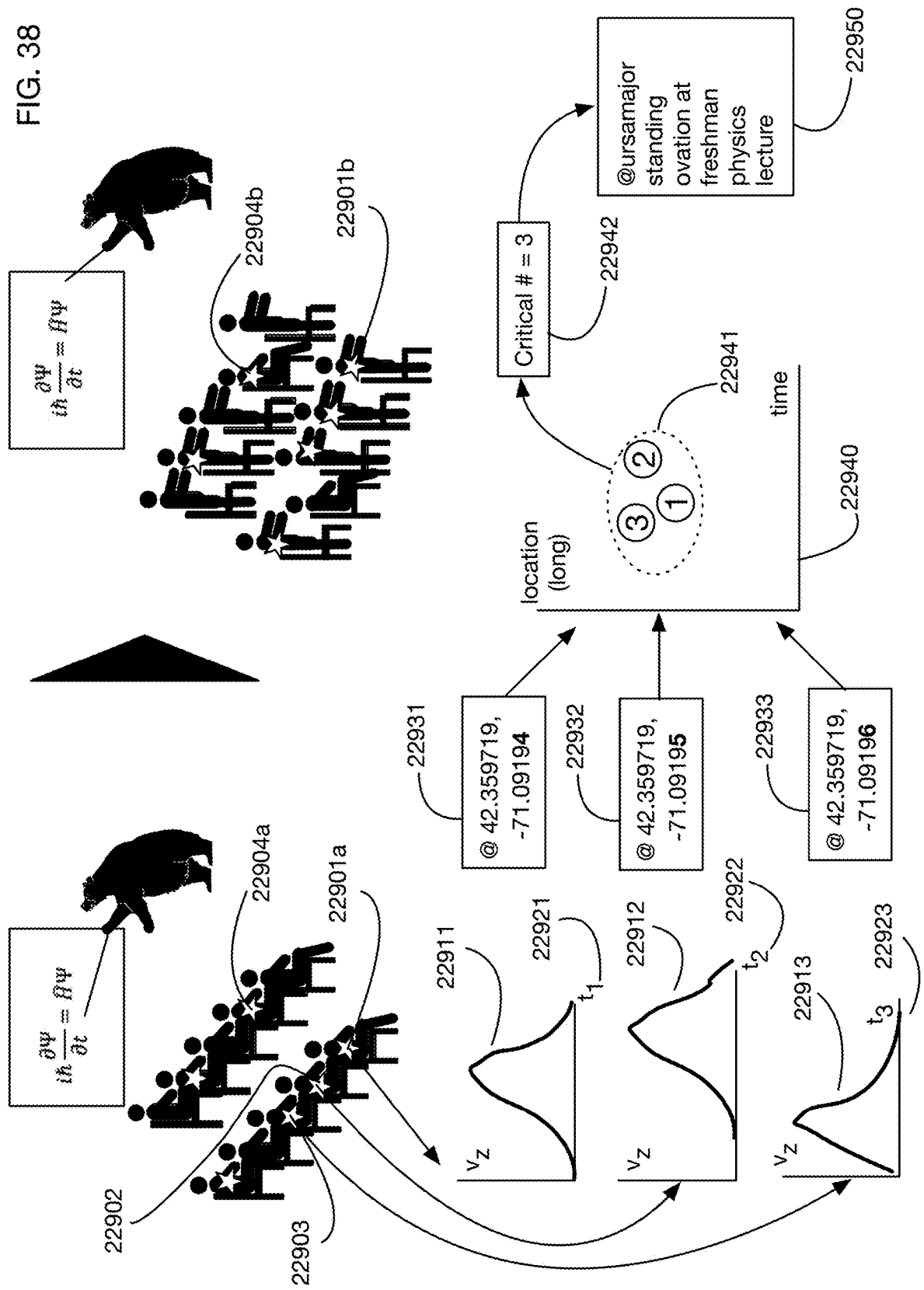
FIG. 38 illustrates an embodiment that collects and correlates data from a large number of sensors to detect an event involving an entire group of persons; the vertical motion of audience members standing up at approximately the same time indicates a standing ovation event.

One or more embodiments of the system may collect data from multiple sensors attached to multiple users or to multiple pieces of equipment, and analyze this data to detect events involving these multiple users or multiple pieces of equipment. FIG. 38 illustrates an example with sensors attached to people in an audience. Several, but not necessarily all, of the members of the audience have sensors that in this example measure motion, time, and location. These sensors may for example be embedded in mobile devices carried or worn by these users, such as smart phones or smart watches. As shown, at least 4 users have sensors 22901*a*

(22901*b*), 22902, 22903, and 22904*a* (22904*b*). The system collects motion data and determines the vertical velocity (vz) of each user over time, for example 22911, 22912, and 22913. While the users are seated, the vertical velocity is effectively zero or very small; when they stand, the vertical velocity increases, and then decreases back to zero. In this illustrative example, the system monitors the sensor data for this signature of a user standing, and determines the time at which the standing motion completes. For example, the times for the completion of standing for the users with sensors 22901*a*, 22902, and 22903 are 22921, 22922, and 22923, respectively. The system also monitors the location data 22931, 22932, and 22933 from the sensors 22901*a*, 22902, and 22903, respectively. Location data shown here is encoded as latitude and longitude; one or more embodiments may use any method for determining and representing partial or complete location data associated with any sensor.

The illustrative system shown in FIG. 38 is configured to detect a standing ovation event from the audience. The signature of this event is that a critical number of users in the same audience stand up at approximately the same time. This signature is for illustration; one or more embodiments may use any desired signatures of sensor data to detect one or more events. Because the system may monitor a large number of sensors, including sensors from users in different locations, one or more embodiments may correlate sensor data by location and by time to determine collective events involving multiple users. As shown in FIG. 38, one approach to correlating sensor data by time and location is to monitor for clusters of individual events (from a single sensor) that are close in both time and location. Chart 22940 shows that the individual standing events for the three users are clustered in time and in longitude. For illustration we show only the longitude dimension of location and use an example where latitudes are identical. One or more embodiments may use any or all spatial dimensions and time to cluster sensor data to detect events. Cluster 22941 of closely spaced individual sensor events contains three users, corresponding to sensors 22901*a*, 22902, and 22903. The system is configured with a critical threshold 22942 of the number of users that must stand approximately at the same time (and in approximately at the same location) in order to define a standing ovation event. In this example the critical count is three, so the system declares a standing ovation event and sends a message 22950 publishing this event. In addition, other sensors including sound sensors may be utilized to characterize the event as an ovation or booing. Any other physiological sensors including heart rate sensors may also be utilized to determine the qualitative measure of the event, in this case a highly emotional standing ovation if the heart rates are over a predefined threshold. Furthermore, blog sites, text messages or other social media sites may be checked to see if the event correlates with the motion sensor, additional sensors such as sound or heart rate or both, to determine whether to publish the event, for example on a social media website or other Internet site for example (see FIG. 34 for an example of checking a website for corroborating evidence that embodiments of the system may utilize).

Figure 39:
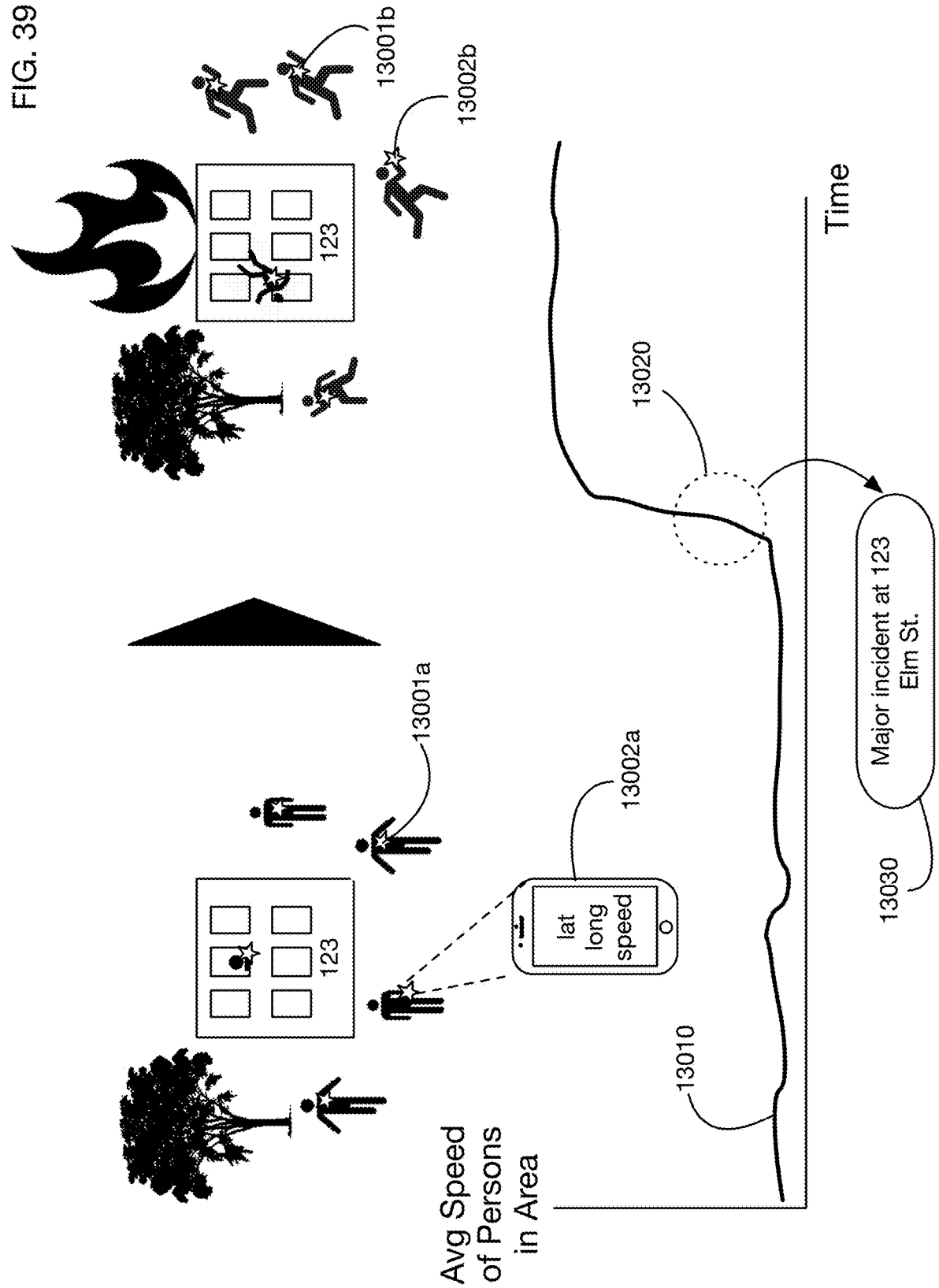
FIG. 39 illustrates an embodiment that collects motion sensor data from a group of users near a location, and analyzes an aggregate metric, average speed, to detect that a major incident has occurred at that location.

FIG. 38 illustrates an embodiment of the system that detects an event using a threshold for the number of individual sensor events occurring within a cluster of closely spaced time and location. FIG. 39 illustrates an embodiment that detects an event using an aggregate metric across sensors rather than comparing a count to threshold value. In this embodiment, a potentially large number of users are equipped with motion and position sensors such as sensor 13001*a*, 13001*b* worn by a user, and smart phone 13002*a*, 13002*b* carried by a user. Each sensor provides a data feed including the user's latitude, longitude, and speed. For example, the sensor may include a GPS to track latitude and longitude, and an inertial sensor that may be used to determine the user's speed. In this illustrative system, sensors are partitioned into local areas based on the user's current latitude and longitude, and the average speed 13010 of users in each local area is calculated and monitored. When the system detects an abrupt increase 13020 in the average speed of users in an area, it determines that a "major incident" 13030 has occurred at that local area, for example at 123 Elm St. This event may be published for example as an email message, a text message, a broadcast message to users in the vicinity, a tweet, a posting on a social media site, or an alert to an emergency service. In this example the sensor data is not sufficient to characterize the event precisely; for example, instead of a fire as shown in FIG. 39, other events that might cause users to start moving rapidly might be an earthquake, or a terrorist attack. However, the information that some major incident has occurred at this location may be of significant use to many organizations and users, such as first responders. Moreover, embodiments of the system may be able to detect such events instantaneously by monitoring sensor values continuously. The average speed metric used in FIG. 39 is for illustration; one or more embodiments may calculate any desired aggregate metrics from multiple sensor data feeds, and may use these metrics in any desired manner to detect and characterize events. One or more embodiments may combine the techniques illustrated in FIGS. 38 and 39 in any desired manner; for example, one or more embodiments may analyze individual sensor data to determine individual events, cluster the number of individual events by time and location, and then calculate an aggregate metric for each cluster to determine if an overall event has occurred. One or more embodiments may assign different weights to individual events based on their sensor data for example, and use weighted sums rather than raw counts compared to threshold values to detect events. Any method of combining sensor data from multiple sensors to detect events is in keeping with the spirit of the invention. As shown, with users travelling away from a given location, the location may be determined and any associated sound or atmospheric sensors such as $CO_2$ sensors located near the location may be utilized to confirm the event as a fire. Automatic emergency messages may be sent by computer 13002*a*, which may also broadcast for any pictures or video around the location and time that the event was detected.

Sensor events associated with environmental, physiological and motion capture sensors may thus be confirmed with text, audio, image or video data or any combination thereof, including social media posts for example to detect and confirm events, and curate media or otherwise store concise event videos or other media in real-time or near real-time. For example, one or more embodiments may access social media sites to retrieve all photos and videos associated with an event, potentially by matching time and location data in the photos and video to sensor data timestamps and location stamps. The retrieved media may then be curated or organized to generate integrated event records that include all or a selected subset of the media. In addition, social media sites may utilize embodiments of the invention to later confirm events using environmental, physiological and motion capture sensors according to one or more embodiments of the invention, for example by filtering events based on time or location or both in combination with embodiments of the invention. Ranking and reputation of posts or other media may also be utilized to filter or publish events in combination with one or more embodiments of the invention. Multiple sources of information for example associated with different users or pieces of equipment may be utilized to detect or confirm the event. In one or more embodiments, an event may be detected when no motion is detected and other sensor data indicates a potential event, for example when a child is in a hot car and no movement is detected with a motion sensor coupled with the child. Events may also be prioritized so that if multiple events are detected, the highest priority event may be processed or otherwise published or transmitted first.

In one or more embodiments the event analysis and tagging system may analyze sensor data to automatically generate or select one or more tags for an event. Event tags may for example group events into categories based on the type of activity involved in the event. For example, analysis of football events may categorize a play as a running play, a passing play, or a kicking play. For activities that occur in multiple stages (such as the four downs of a football possession, or the three outs of a baseball inning), tags may indicate the stage or stages at which the event occurs. For example, a football play could be tagged as occurring on third down in the fourth quarter. Tags may identify a scenario or context for an activity or event. For example, the context for a football play may include the yards remaining for first down; thus a play tag might indicate that it is a third down play with four yards to go ($3^{rd}$ and 4). Tags may identify one or more players associated with an event; they may also identify the role of each player in the event. Tags may identify the time or location an event. For example, tags for a football play may indicate the yard line the play starts from, and the clock time remaining in the game or quarter when the play begins. Tags may measure a performance level associated with an event, or success or failure of an activity. For example, a tag associated with a passing play in football may indicate a complete pass, incomplete, or an interception. Tags may indicate a result such as a score or a measurable advancement or setback. For example, a football play result tag might indicate the number of yards gained or lost, and the points scored (if any). Tags may be either qualitative or quantitative; they may have categorical, ordinal, interval, or ratio data. Tags may be generic or domain specific. A generic tag for example may tag a player motion with a maximum performance tag to indicate that this is the highest performance for that player over some time interval (for example "highest jump of the summer"). Domain specific tags may be based on the rules and activities of a particular sport. Thus for example result tags for a baseball swing might include baseball specific tags such as strike, ball, hit foul, hit out, or hit safe.

Figure 40:
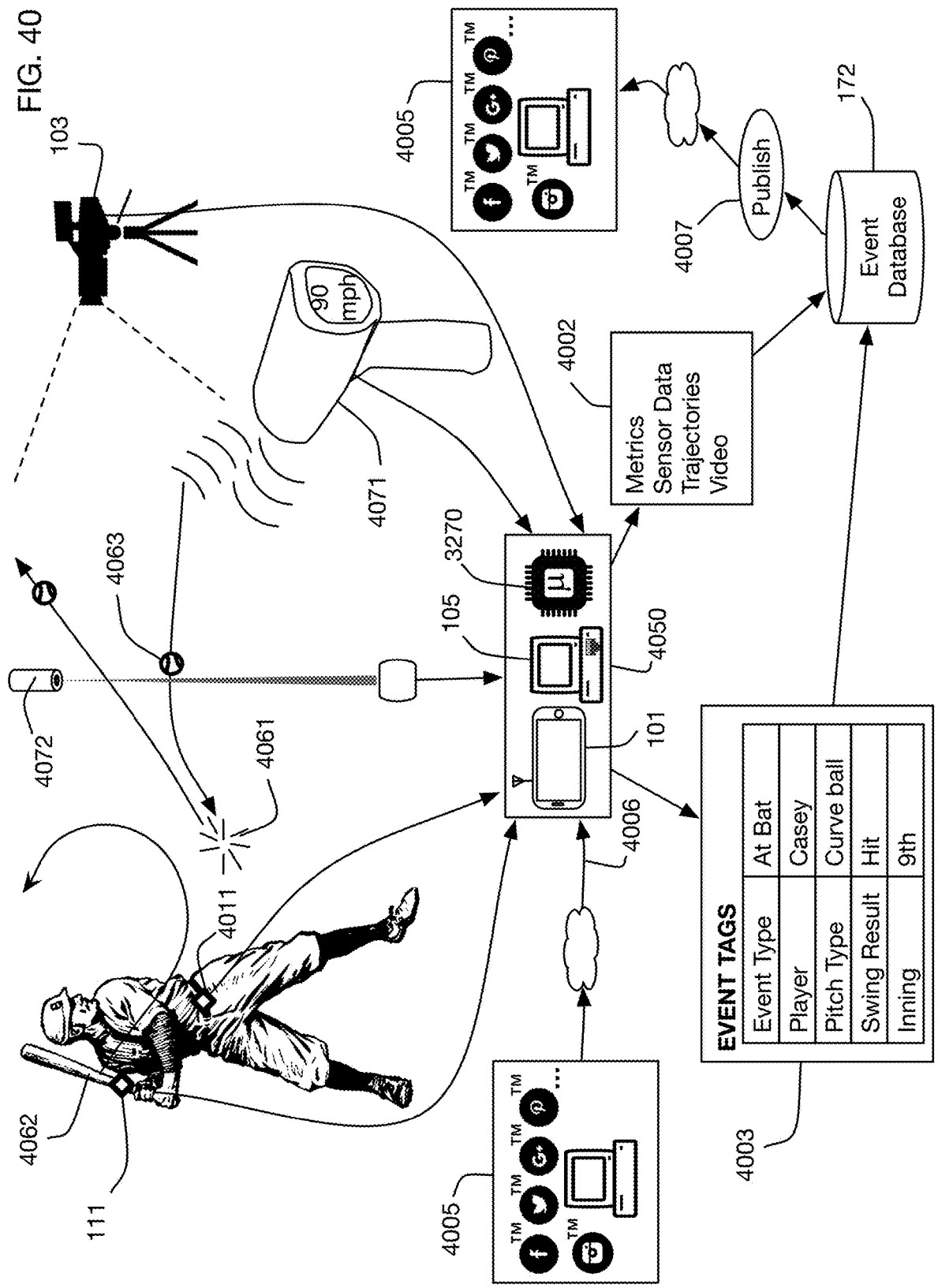
FIG. 40 illustrates an embodiment that automatically adds tags to an event based on analysis of sensor data, and stores the tags along with the metrics and sensor data for the event in an event database.

FIG. 40 illustrates an example in which event analysis and tagging system 4050 analyzes sensor data for a pitch and the corresponding baseball swing. Event analysis and tagging is performed for example by any or all of computer 105, mobile device 101, and microprocessor 3270. Microprocessor 3270 may for example be integrated with or communicate with one or more motion sensors or other sensors, such as for example inertial sensor 111 or sensor 4011. The microprocessor 3270 may perform event analysis and tagging, or it may collect sensor data, potentially from multiple sensors, and forward the data to computer 105 or mobile device 101 for analysis and tagging. One or more embodiments may perform event analysis and tagging in multiple stages. For example, microprocessor 3270 may generate a set of tags for an event, and forward these tags with event data to computer 105 or mobile device 101; computer 105 or mobile device 101 may then perform additional analysis and add additional tags. Sensors may include for example inertial sensor 111; sensor 4011, which may for example measure values associated with a temperature, humidity, wind, elevation, light, sound, or heart rate; video camera 103; radar 4071; and light gate 4072. The analysis system 4050 detects the swing, and then analyzes the sensor data to determine what tags to associate with the swing event. Tags 4003 identify for example the type of event (an at bat), the player making the swing (Casey), a classification for the type of pitch (curve ball, as determined from analysis of the shape of the ball trajectory), the result of the swing (a hit, as detected by observing the contact 4061 between the bat 4062 and the ball 4063), and a timestamp for the event ($9^{th}$ inning). These tags are illustrative; one or more embodiments may generate any tag or tags for any activity or event. The system may store the event tags 4003 in an event database 172. Additional information 4002 for the event may also be stored in the event database, such as for example metrics, sensor data, trajectories, or video.

The event analysis and tagging system 4050 may also scan or analyze media from one or more servers or information sources to determine, confirm, or modify event tags 4003.

Embodiments may obtain media data from any type or types of servers or information sources, including for example, without limitation, an email server, a social media site, a photo sharing site, a video sharing site, a blog, a wiki, a database, a newsgroup, an RSS server, a multimedia repository, a document repository, a text message server, and a Twitter® server. Media may include for example text, audio, images, or videos related to the event. For example, information on social media servers 4005 may be retrieved 4006 over the Internet or otherwise, and analyzed to determine, confirm, or modify event tags 4003. Events stored in the event database may also be published 4007 to social media sites 4005, or to any other servers or information systems. One or more embodiments may publish any or all data associated with an event, including for example metrics, sensor data, trajectories, and video 4002, and event tags 4003.

Figure 41:
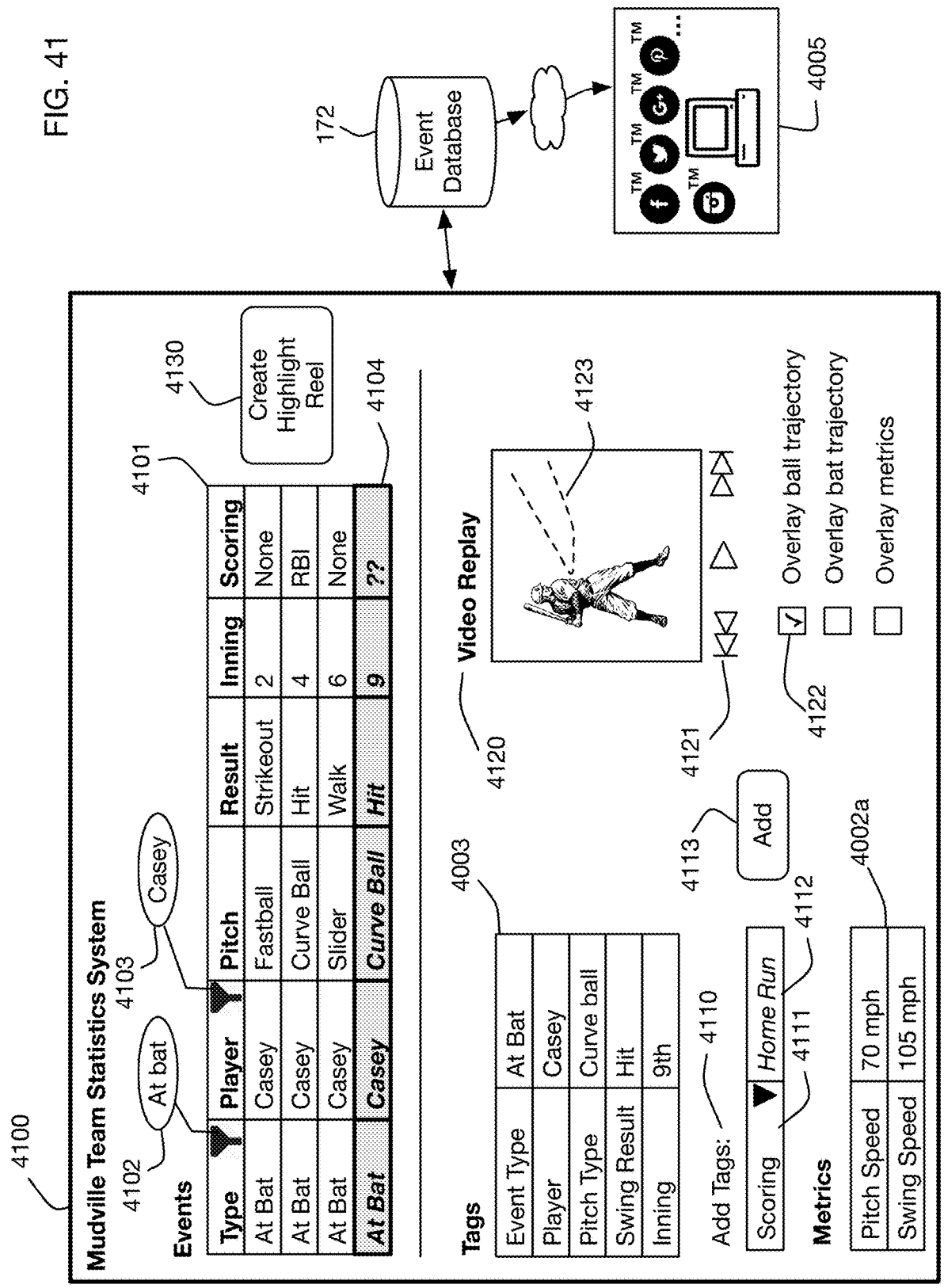
FIG. 41 shows an illustrative user interface that supports filtering of events by tag values, adding manually selected tags to events, and generation of a highlight reel containing video for a selected set of events.

One or more embodiments may provide capabilities for users to retrieve or filter events based on the event tags generated by the analysis system. FIG. 41 shows an illustrative user interface 4100 that may access event database 172. A table of events 4101 may be shown, and it may provide options for querying or filtering based on event tags. For example, filters 4102 and 4103 are applied to select events associated with player "Casey" and event type "at bat." One or more embodiments may provide any type of event filtering, querying, or reporting. In FIG. 41 the user selects row 4104 to see details of this event. The user interface then displays the tags 4003 that were generated automatically by the system for this event. A manual tagging interface 4110 is provided to allow the user to add additional tags or to edit the tags generated by the system. For example, the user may select a tag name 4111 to define a scoring result associated with this event, presuming for example that the automatic analysis of sensor data is not able in this case to determine what the scoring result was. The user can then manually select or enter the scoring result 4112. The manually selected tags may then be added to the event record for this event in the event database 172 when the user hits the Add button 4113 for the new tag or tags. The user interface may show other information associated with the selected event 4104, such as for example metrics 4002a and video 4120. It may provide a video playback feature with controls 4121, which may for example provide options such as 4122 to overlay a trajectory 4123 of a projectile or other object onto the video. One or more embodiments may provide a feature to generate a highlight reel for one or more events that correspond to selected event tags. For example, when a user presses the Create Highlight Reel button 4130, the system may retrieve video and related information for all of the events 4101 matching the current filters, and concatenate the video for all of these events into a single highlight video. In one or more embodiments the highlight reel may be automatically edited to show only the periods of time with the most important actions. In one or more embodiments the highlight reel may contain overlays showing the tags, metrics, or trajectories associated with the event. One or more embodiments may provide options for the generation or editing of the highlight reel; for example, users may have the option to order the events in the highlight reel chronologically, or by other tags or metrics. The highlight reel may be stored in event database 172, and may be published to social media sites 4005.

Figure 42:
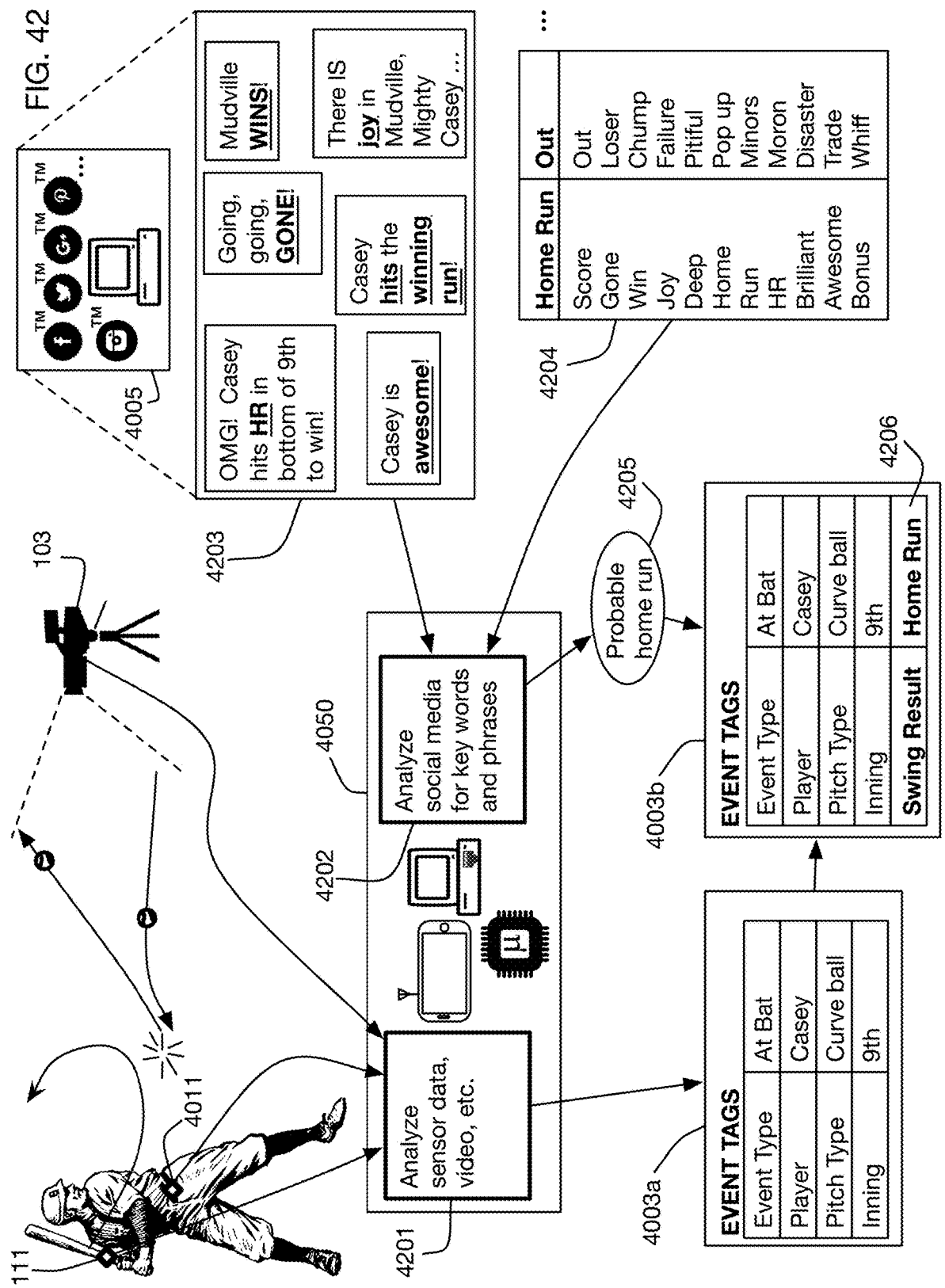
FIG. 42 illustrates an embodiment that analyzes social media postings to generate tags for an event.

FIG. 42 illustrates an embodiment that analyzes social media postings to augment tags for an event. Data from sensors such as inertial sensor 111, other sensor 4011, and video camera 103 is analyzed 4201 by the event analysis and tagging system 4050, resulting in initial event tags 4003a. In this illustrative example, the sensors 111, 4011, and 103 are able to detect that the player hit the ball, but are not able to determine the result of the hit. Therefore, event tags 4003a do not contain a "Swing Result" tag since the sensor data is insufficient to create this tag. (This example is illustrative; in one or more embodiments sensor data may be sufficient to determine a swing result or any other information.) The event analysis and tagging system 4050 accesses social media sites 4005 and analyzes postings 4203 related to the event. For example, the system may use the time and location of the event to filter social media postings from users near that location who posted near the time of the event. In this example, the system searches text postings for specific keywords 4204 to determine the result of the event. Although the sensors or video may be utilized to indicate that a hit has occurred, social media may be analyzed to determine what type of hit, i.e., event has actually occurred. For example, based on this text analysis 4202, the system determines that the result 4205 is a likely home run; therefore it adds tag 4206 to the event tags with this result. The augmented event tags 4003b may then be stored in the event database and published to social media sites. The keyword search shown in FIG. 42 is illustrative; one or more embodiments may use any method to analyze text or other media to determine, confirm, or modify event tags. For example, without limitation, one or more embodiments may use natural language processing, pattern matching, Bayesian networks, machine learning, neural networks, or topic models to analyze text or any other information. Embodiments of the system yield increased accuracy for event detection not possible or difficult to determine based on sensor or video data in general. Events may be published onto a social media site or saved in a database for later analysis, along with any event tags for example.

Figure 43:
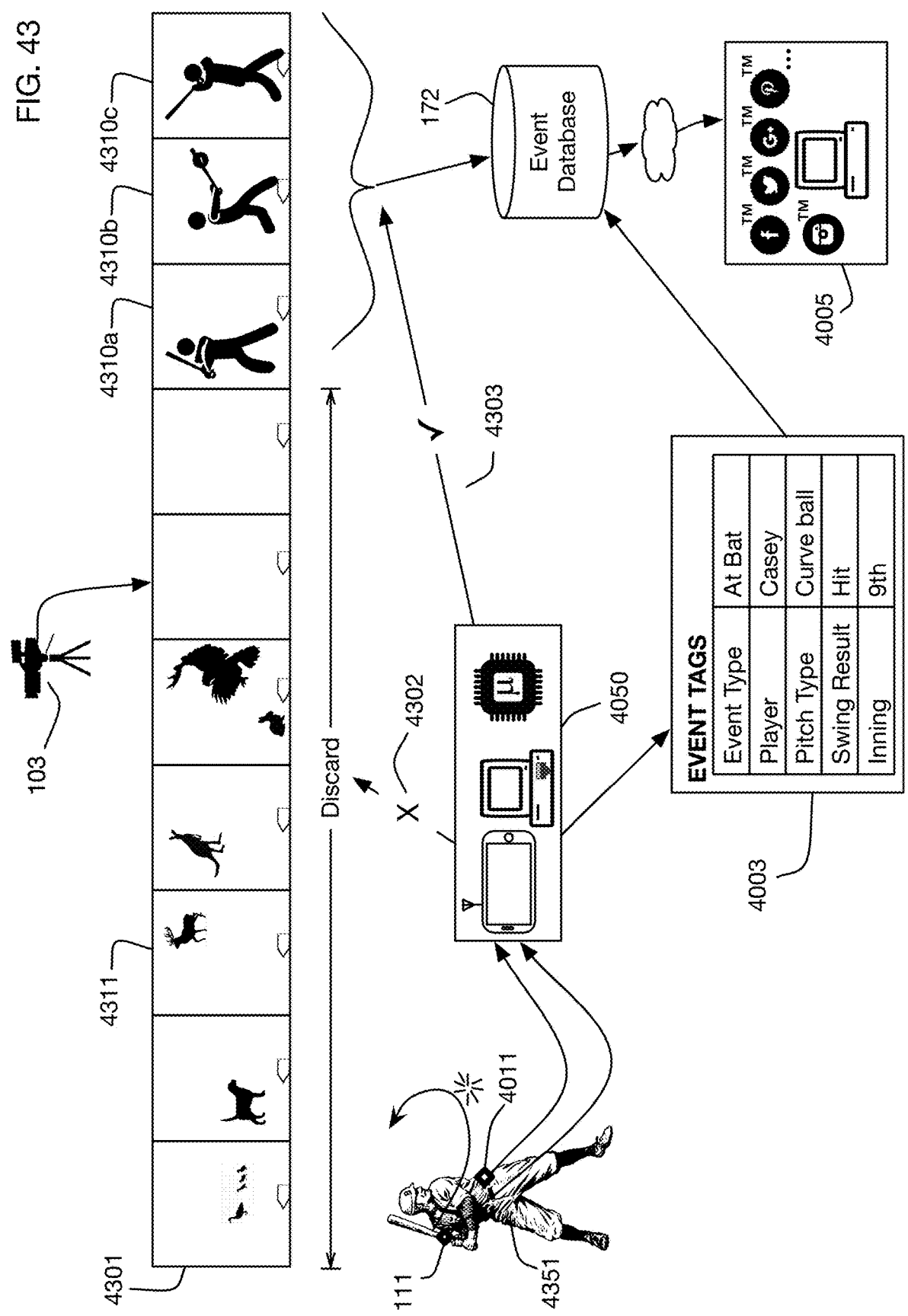
FIG. 43 illustrates an embodiment that discards a portion of a video capture not related to an event, and saves the relevant portion of the video along with the event and the event tags.

One or more embodiments may save or transfer or otherwise publish only a portion of a video capture, and discard the remaining frames. FIG. 43 illustrates an embodiment with video camera 103 that captures video frames 4301. The video contains frames 4310a, 4310b, and 4310c related to an event of interest, which in this example is a hit performed by batter 4351. The bat is equipped with an inertial sensor 111, and there may be an additional sensor 4011 that may measure for example temperature, humidity, wind, elevation, light, sound, or heart rate. Data from sensors 111 and 4011 is analyzed by event analysis and tagging system 4050 to determine the time interval of interest for the hit event. This analysis indicates that only the video frames 4310a, 4310b, and 4310c are of interest, and that other frames such as frame 4311 should be discarded 4302. The system generates event tags 4003 and saves the tags and the selected video frames 4303 in event database 172. This information, including the selected video frames, may be published for example to social media sites 4005, e.g., without transferring the non-event data. The discard operation 4302 may for example erase the discarded frames from memory, or may command camera 103 to erase these frames. One or more embodiments may use any information to determine what portion of a video capture to keep and what portion to discard, including information from other sensors and information from social media sites or other servers.

It will be apparent to those skilled in the art that numerous modifications and variations of the described examples and embodiments are possible in light of the above teaching. The disclosed examples and embodiments are presented for purposes of illustration only. Other alternate embodiments may include some or all of the features disclosed herein. Therefore, it is the intent to cover all such modifications and alternate embodiments as may come within the true scope of this invention.

What is claimed is:

1. A disparate sensor event correlation system comprising:
   at least one motion capture element comprising
      a sensor configured to capture one or more values associated with an orientation, position, velocity, acceleration, angular velocity, and angular acceleration of said at least one motion capture element;
   a computer processor coupled with said sensor directly or indirectly, wherein said computer processor is configured to
      collect data that comprises sensor values that include said one or more values from said sensor;
      obtain one or more other values associated with at least one of
         an environmental sensor comprising one or more of
            an altitude sensor,
            a temperature sensor,
            a sound sensor,
            a humidity sensor,
         a physiological sensor comprising one or more of
            a heart rate sensor,
            a pulse sensor,
            a breathing sensor;
      wherein said computer processor is configured to
         analyze said data and recognize an event within said data to determine event data;
         correlate at least one of said data, said event data with said one or more other values associated with said at least one of said environmental sensor, said physiological sensor to determine
            a type of event or true event or a false positive event.

2. The disparate sensor event correlation system of claim 1, wherein said computer processor is further configured to further determine one or more tags for said event and wherein said one or more tags represent one or more of
   an activity type of said event;
   a location of said event;
   a timestamp of said event;

a stage of an activity associated with said event;
a player identity associated with said event;
a performance level associated with said event; and,
a scoring result associated with said event.

3. The disparate sensor event correlation system of claim 2, wherein said computer processor is configured to analyze one or more of text, audio, image, and video from a server to determine said one or more tags for said event.

4. The disparate sensor event correlation system of claim 1, wherein said computer processor comprises one or more of a microprocessor or a computer coupled directly to said sensor or indirectly to said sensor through a communication interface and wherein said sensor comprises at least one sensor.

5. The disparate sensor event correlation system of claim 3, wherein said analyze one or more of said text, audio, image, and video comprises search said text for key words or key phrases related to said event.

6. The disparate sensor event correlation system of claim 1, wherein said computer processor is further configured to analyze one or more of text, audio, image, and video from a server to confirm said event for a particular location and time to create a confirmed event.

7. The disparate sensor event correlation system of claim 1, wherein said at least one motion capture element is located within a mobile device, or is configured to couple with a user or piece of equipment or couple with said mobile device coupled with the user, and wherein said computer processor is further configured to recognize a location of said sensor on said piece of equipment or said user based on said data or said event data.

8. The disparate sensor event correlation system of claim 1, wherein said computer processor is further configured to collect said sensor values from said sensor based on a sensor personality selected from a plurality of sensor personalities, wherein the sensor personality is configured to control sensor settings to collect the data in an optimal manner with respect to a specific type of movement or said type of activity associated with a specific piece of equipment or a type of clothing.

9. The disparate sensor event correlation system of claim 1, wherein
said computer processor is further configured to determine said false positive event as
detect a first value from said sensor values having a first threshold value and
detect a second value from said sensor values having a second threshold value within a time window;
signify a prospective event;
compare said prospective event to a characteristic signal associated with a typical event and eliminate any false positive events; and,
signify said true event if said prospective event is not said false positive event.

10. The disparate sensor event correlation system of claim 1, wherein said computer processor further configured to recognize said at least one motion capture element with newly assigned locations after said at least one motion capture element is removed from a first piece of equipment and coupled with a second piece of equipment of a different type based on said data or said event data.

11. The disparate sensor event correlation system of claim 1, wherein said at least one motion capture element is configured to couple with a user or piece of equipment or couple with a mobile device coupled with the user wherein said at least one motion capture element is contained within one or more of a motion capture element mount, said mobile device, a mobile phone, a smart phone, a smart watch, a camera, a laptop computer, a notebook computer, a tablet computer, a desktop computer, and a server computer, or any combination of any number of said motion capture element mount, said mobile device, said mobile phone, said smart phone, said smart watch, said camera, said laptop computer, said notebook computer, said tablet computer, said desktop computer and said server computer.

12. The disparate sensor event correlation system of claim 1, wherein said computer processor is further configured to determine
a type of equipment that said at least one motion capture element is coupled with selected from a plurality of types of equipment or
a type of activity indicated by said data or said event data selected from a plurality of types of activities; and,
wherein said computer processor is further configured to transmit said at least one of said data, said event data, said type of event, said true event, said false positive event, said type of equipment, said type of activity, for said event to one or more of a repository, a viewer, a server, another computer, a social media site, a mobile device, a network, and an emergency service.

13. The disparate sensor event correlation system of claim 1,
wherein said computer processor is further configured to analyze said event data to form motion analysis data;
store said event data, or said motion analysis data, or both said event data and said motion analysis data in a computer memory coupled with said computer processor;
obtain an event start time and an event stop time from said event data or from said motion analysis data;
obtain at least one video start time and at least one video stop time associated with at least one video;
synchronize said event data, said motion analysis data or any combination thereof with said at least one video based on
a first time associated with said data or said event data obtained from said
at least one motion capture element and
at least one time associated with said at least one video to create at least one synchronized event video; and,
store said at least one synchronized event video in said computer memory without at least a portion of said at least one video outside of said event start time to said event stop time.

14. The disparate sensor event correlation system of claim 13, wherein said computer processor is further configured to transmit said type of event or said true event or said false positive event.

15. The disparate sensor event correlation system of claim 14, wherein said computer processor is coupled with a video display and is further configured to
display on said video display both of
said event data, said motion analysis data or any combination thereof that occurs during a timespan from said event start time to said event stop time; and,
said at least one synchronized event video.

16. The disparate sensor event correlation system of claim 14, wherein said computer processor is further configured to
discard or
instruct another computer to discard or
instruct a camera to discard said at least a portion of said at least one video outside of said event start time to said event stop time.

17. The disparate sensor event correlation system of claim 14, further comprising at least one camera and said computer processor is further configured to send a control message locally to said at least one camera coupled with said computer processor or externally to said at least one camera, to modify video recording parameters of said at least one video associated with said at least one camera based on said data or said event data or said motion analysis data; wherein said video recording parameters comprise one or more of frame rate, resolution, color depth, color or gray scale, compression method, compression quality, and recording on or off.

18. The disparate sensor event correlation system of claim 14, wherein said computer processor is further configured to transmit one or more of said event or said type of event, and said true event to one or more of a repository, a viewer, a server, another computer, a social media site, a mobile device, a network, and an emergency service.

19. The disparate sensor event correlation system of claim 14, wherein said computer processor is further configured to
accept a metric associated with said at least one synchronized event video;
accept selection criteria for said metric;
determine a matching set of synchronized event videos that have a value or values associated with said metric that pass said selection criteria; and,
display said matching set of synchronized event videos or corresponding thumbnails thereof along with said value or values associated with said metric for each of said matching set of synchronized event videos or said corresponding thumbnails.

20. The disparate sensor event correlation system of claim 14, wherein said computer processor is further configured to
accept one or more user selected tags for said event; and,
store said one or more user selected tags for said event in said computer memory coupled with said computer processor.

21. The disparate sensor event correlation system of claim 19, wherein said computer processor is further configured to generate a highlight reel or fail reel of said matching set of synchronized event videos.

22. The disparate sensor event correlation system of claim 14, wherein
said sensor or said computer processor is coupled with a microphone that records audio signals; and,
said recognize said event comprises
a determination of a prospective event based on said data; and,
a correlation of said data with said audio signals to determine if said prospective event is said true event or said false positive event or a crash event or fall event.

23. The disparate sensor event correlation system of claim 22, wherein said computer processor is further configured to store said audio signals in said computer memory with said at least one synchronized event video if said prospective event is said true event.

24. The disparate sensor event correlation system of claim 22, wherein said computer processor is further configured to synchronize said motion analysis data with said at least one video based on image analysis to more accurately determine a start event frame or a stop event frame in said at least one video or both said start event frame and said stop event frame, that is most closely associated with said event start time or said event stop time or both said start event frame and said stop event frame.

25. The disparate sensor event correlation system of claim 14, wherein said computer processor is further configured to
access previously stored event data or said motion analysis data associated with a user or a piece of equipment; and,
display information comprising a presentation of said event data associated with said user on a display based on
said event data or said motion analysis data associated with said user or said piece of equipment; and,
said previously stored event data or said motion analysis data associated with said user or said piece of equipment.

26. The disparate sensor event correlation system of claim 14, wherein said computer processor is further configured to
access previously stored event data or said motion analysis data associated with at least one other user or at least one other piece of equipment; and,
display information comprising a presentation of said event data associated with a user on a display based on said event data or said motion analysis data associated with said user or a piece of equipment; and,
said previously stored event data or said motion analysis data associated with said at least one other user or said at least one other piece of equipment.

27. The disparate sensor event correlation system of claim 14, wherein said computer processor in said at least one motion capture element is further configured to transmit said event or a detection of said event to at least one other motion capture element or another computer or at least one other mobile device or any combination thereof, and wherein said at least one other motion capture element or said computer or said at least one other mobile device or any combination thereof is configured to save said data or transmit said data or both save said data and transmit said data associated with said event even if said at least one other motion capture element has not detected said event.

28. The disparate sensor event correlation system of claim 14, wherein said computer processor is further configured to
request or broadcast a request for cameras having locations proximal to said event or oriented to view said event or both having locations proximal to and oriented to view said event; and,
request said at least one video from at least one camera of said cameras, wherein said at least one video contains said event without said at least a portion of said at least one video outside of said event start time to said event stop time.

29. The disparate sensor event correlation system of claim 14, wherein said computer processor is further configured to confirm said event for a particular location and time by analyzing one or more of text, audio, image, and video from a server to create a confirmed event and publish said confirmed event.

30. The disparate sensor event correlation system of claim 14, wherein said computer processor is further configured to determine one or more tags for said event by analyzing one or more of text, audio, image, and video from a server.

* * * * *